US011861136B1

(12) United States Patent
Faulkner et al.

(10) Patent No.: US 11,861,136 B1
(45) Date of Patent: Jan. 2, 2024

(54) SYSTEMS, METHODS, AND GRAPHICAL USER INTERFACES FOR INTERACTING WITH VIRTUAL REALITY ENVIRONMENTS

(71) Applicant: Apple Inc., Cupertino, CA (US)

(72) Inventors: Jeffrey M. Faulkner, San Francisco, CA (US); Wesley M. Holder, San Francisco, CA (US); Giancarlo Yerkes, Menlo Park, CA (US); Israel Pastrana Vicente, Santa Clara, CA (US); William A. Sorrentino, III, Mill Valley, CA (US); Stephen O. Lemay, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 56 days.

(21) Appl. No.: 16/138,774

(22) Filed: Sep. 21, 2018

Related U.S. Application Data

(60) Provisional application No. 62/565,636, filed on Sep. 29, 2017.

(51) Int. Cl.
  *G06F 3/04815* (2022.01)
  *G06F 3/0346* (2013.01)
  *G06F 3/04886* (2022.01)

(52) U.S. Cl.
  CPC ........ *G06F 3/04815* (2013.01); *G06F 3/0346* (2013.01); *G06F 3/04886* (2013.01)

(58) Field of Classification Search
  CPC . G06F 3/04815; G06F 3/0346; G06F 3/04886
  See application file for complete search history.

(56) References Cited

U.S. PATENT DOCUMENTS

| | | | |
|---|---|---|---|
| 8,965,460 B1* | 2/2015 | Rao | G06F 3/005 455/566 |
| 9,367,203 B1* | 6/2016 | Costello | G06F 1/1686 |
| 9,630,098 B2* | 4/2017 | Mikhailov | A63F 13/213 |
| 9,754,398 B1* | 9/2017 | Cardwell | G06T 13/20 |
| 9,767,613 B1* | 9/2017 | Bedikian | G06F 3/04845 |
| 9,865,089 B2* | 1/2018 | Burns | G06F 3/012 |
| 9,921,644 B2* | 3/2018 | Daguet | G06F 3/044 |
| 9,983,717 B2* | 5/2018 | Pacheco | G06F 3/0416 |
| 9,990,779 B2* | 6/2018 | Kinstner | G06T 19/006 |
| 10,139,854 B2* | 11/2018 | Krishnakumar | G06F 1/1601 |
| 10,181,219 B1* | 1/2019 | Murphy | A63F 13/26 |

(Continued)

*Primary Examiner* — Jeremy L Stanley
(74) *Attorney, Agent, or Firm* — Morgan, Lewis & Bockius LLP

(57) ABSTRACT

A computer system displays a view of at least a portion of a simulated three-dimensional space, and a view of a user interface object located within the simulated three-dimensional space. The user interface object is a representation of a computing device that has a non-immersive display environment that provides access to a plurality of different applications. The user interface object includes a first user interface that corresponds to the non-immersive display environment of the computing device and is responsive to touch inputs from a user on the input device, and a pose of the user interface object in the simulated three-dimensional space corresponds to a pose of the input device in a physical space surrounding the input device. In response to a touch input that corresponds to a respective location in the first user interface, an appearance of the first user interface is updated.

63 Claims, 75 Drawing Sheets

(56) References Cited

U.S. PATENT DOCUMENTS

| | | | | |
|---|---|---|---|---|
| 10,186,088 | B2* | 1/2019 | Kinstner | G06T 17/10 |
| 10,254,846 | B1* | 4/2019 | Kinstner | G06F 3/011 |
| 10,281,987 | B1* | 5/2019 | Yang | G06F 3/04847 |
| 10,303,323 | B2* | 5/2019 | Gribetz | G06F 3/0482 |
| 10,325,409 | B2* | 6/2019 | Costa | G06F 3/0304 |
| 10,353,532 | B1* | 7/2019 | Holz | G06F 3/04812 |
| 10,373,342 | B1* | 8/2019 | Perez, III | G06F 3/0488 |
| 10,416,776 | B2* | 9/2019 | Dash | G06F 3/011 |
| 10,459,519 | B2* | 10/2019 | Kobayashi | G06F 3/038 |
| 10,521,009 | B2* | 12/2019 | Iyer | G06F 3/017 |
| 10,521,025 | B2* | 12/2019 | Powderly | G06F 3/0346 |
| 10,569,164 | B1* | 2/2020 | Bleasdale-Shepherd | A63F 13/35 |
| 10,571,263 | B2* | 2/2020 | Abovitz | A61B 3/0008 |
| 10,650,541 | B2* | 5/2020 | Stall | G06F 3/012 |
| 11,023,036 | B1* | 6/2021 | Atlas | G06T 19/006 |
| 2011/0018903 | A1* | 1/2011 | Lapstun | G06F 3/011 345/633 |
| 2012/0102435 | A1* | 4/2012 | Han | G06F 3/0482 715/848 |
| 2013/0044128 | A1* | 2/2013 | Liu | G06T 19/006 345/633 |
| 2013/0257848 | A1* | 10/2013 | Westerinen | G06F 3/0346 345/419 |
| 2013/0290876 | A1* | 10/2013 | Anderson | G06T 19/006 715/761 |
| 2013/0335407 | A1* | 12/2013 | Reitan | G06T 19/006 345/419 |
| 2014/0078043 | A1* | 3/2014 | Kim | G06F 3/012 345/156 |
| 2014/0184496 | A1* | 7/2014 | Gribetz | G06F 3/04842 345/156 |
| 2014/0297823 | A1* | 10/2014 | Prakash | H04L 41/0806 709/223 |
| 2014/0337791 | A1* | 11/2014 | Agnetta | G06F 3/0346 715/784 |
| 2015/0062045 | A1* | 3/2015 | White | G06F 3/03 345/173 |
| 2015/0149964 | A1* | 5/2015 | Bernstein | G06F 3/04815 715/836 |
| 2015/0153897 | A1* | 6/2015 | Huang | G06F 3/0481 345/173 |
| 2015/0185825 | A1* | 7/2015 | Mullins | G06F 3/048 345/633 |
| 2015/0187137 | A1* | 7/2015 | Mullins | G06F 3/011 345/633 |
| 2015/0309316 | A1* | 10/2015 | Osterhout | G06F 3/012 345/8 |
| 2015/0379963 | A1* | 12/2015 | Holmanu | G02B 27/017 345/173 |
| 2016/0026253 | A1* | 1/2016 | Bradski | G02B 27/0172 345/8 |
| 2016/0062118 | A1* | 3/2016 | Osterhout | G02B 27/0172 345/8 |
| 2016/0093105 | A1* | 3/2016 | Rimon | G06T 11/60 345/633 |
| 2016/0267712 | A1* | 9/2016 | Nartker | G06T 19/006 |
| 2016/0292922 | A1* | 10/2016 | Kasahara | G06F 1/1694 |
| 2016/0378204 | A1* | 12/2016 | Chen | G06V 20/20 345/156 |
| 2017/0011553 | A1* | 1/2017 | Chen | G06T 7/74 |
| 2017/0024035 | A1* | 1/2017 | Pelis | G06F 3/044 |
| 2017/0076502 | A1* | 3/2017 | Chen | G06F 3/011 |
| 2017/0092235 | A1* | 3/2017 | Osman | G06F 3/012 |
| 2017/0236330 | A1* | 8/2017 | Seif | G06F 3/147 345/633 |
| 2017/0244811 | A1* | 8/2017 | McKenzie | G06F 3/017 |
| 2017/0249019 | A1* | 8/2017 | Sawyer | G02B 27/0179 |
| 2017/0263033 | A1* | 9/2017 | Church | G06T 11/60 |
| 2017/0315674 | A1* | 11/2017 | Kamamori | G06F 3/0426 |
| 2017/0315721 | A1* | 11/2017 | Merel | G06F 3/04815 |
| 2017/0322623 | A1* | 11/2017 | McKenzie | G06F 3/011 |
| 2018/0005438 | A1* | 1/2018 | Mathey-Owens | G02B 27/0172 |
| 2018/0005443 | A1* | 1/2018 | Poulos | G06F 3/017 |
| 2018/0033210 | A1* | 2/2018 | Vats | G06F 3/0487 |
| 2018/0107276 | A1* | 4/2018 | Heubel | G06F 3/04883 |
| 2018/0113598 | A1* | 4/2018 | Linder | G06F 3/04815 |
| 2018/0137684 | A1* | 5/2018 | Williams | G06T 19/006 |
| 2018/0160105 | A1* | 6/2018 | Ross | G06F 3/011 |
| 2018/0181199 | A1* | 6/2018 | Harvey | G06F 3/0426 |
| 2018/0284914 | A1* | 10/2018 | Yanai | G06F 3/017 |
| 2018/0308288 | A1* | 10/2018 | Harscoet | G06T 19/006 |
| 2018/0342106 | A1* | 11/2018 | Rosado | A63F 13/60 |
| 2019/0004677 | A1* | 1/2019 | Madonna | H05B 47/155 |
| 2019/0034765 | A1* | 1/2019 | Kaehler | G02B 27/0172 |
| 2019/0065026 | A1* | 2/2019 | Kiemele | G06F 3/0488 |
| 2019/0073109 | A1* | 3/2019 | Zhang | G06F 3/013 |
| 2019/0108578 | A1* | 4/2019 | Spivack | G06F 3/013 |
| 2019/0121522 | A1* | 4/2019 | Davis | G02B 27/0093 |
| 2019/0146219 | A1* | 5/2019 | Rodriguez | G06F 3/0482 345/633 |
| 2019/0384482 | A1* | 12/2019 | Shang | G06F 3/04815 |
| 2020/0034995 | A1* | 1/2020 | Joshi | H04W 4/20 |
| 2020/0219310 | A1* | 7/2020 | Hamilton | G02B 27/017 |
| 2021/0011556 | A1* | 1/2021 | Atlas | G02B 27/017 |
| 2021/0133991 | A1* | 5/2021 | Tamama | G06T 19/006 |
| 2021/0134044 | A1* | 5/2021 | Greene | G06T 19/006 |
| 2021/0152330 | A1* | 5/2021 | Satpathy | H04L 9/0631 |
| 2021/0152643 | A1* | 5/2021 | Mathur | H04L 67/141 |
| 2021/0152673 | A1* | 5/2021 | Patil | H04W 28/14 |

* cited by examiner

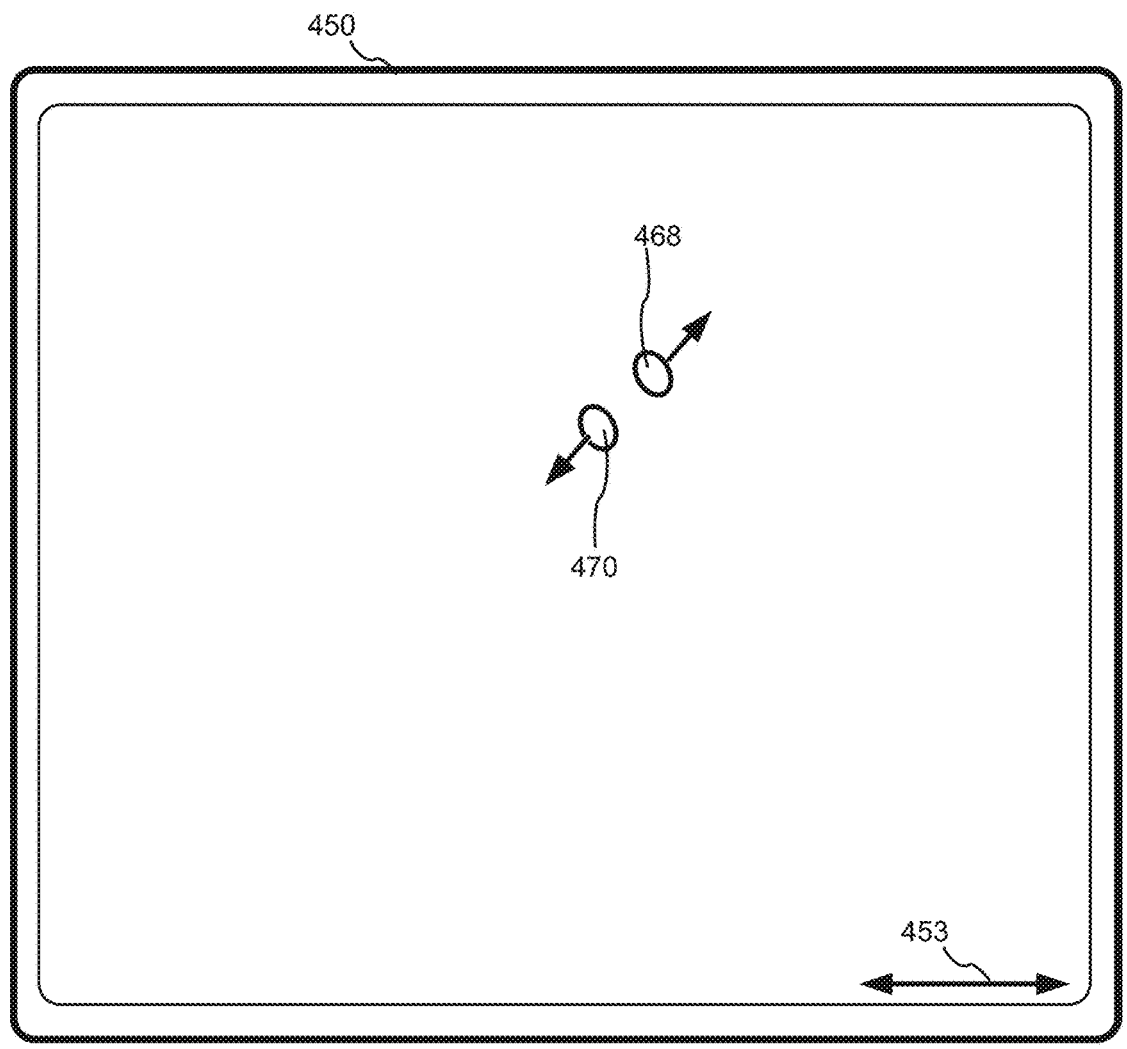
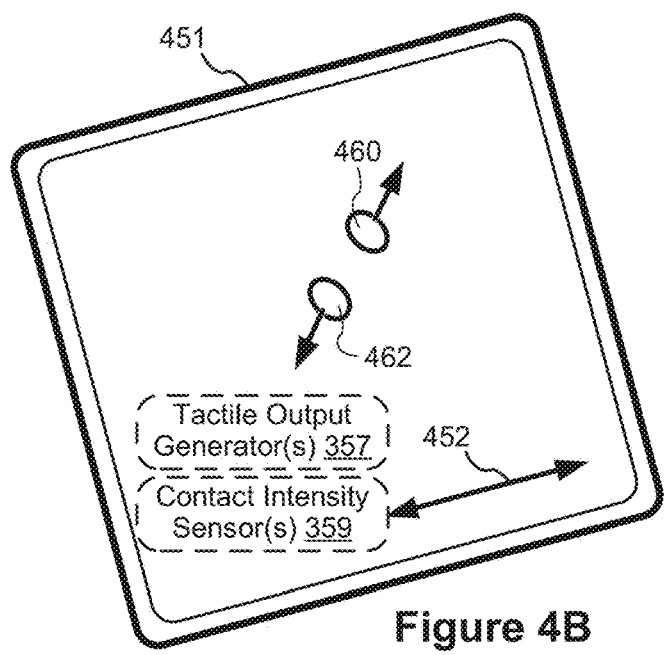
Figure 4B

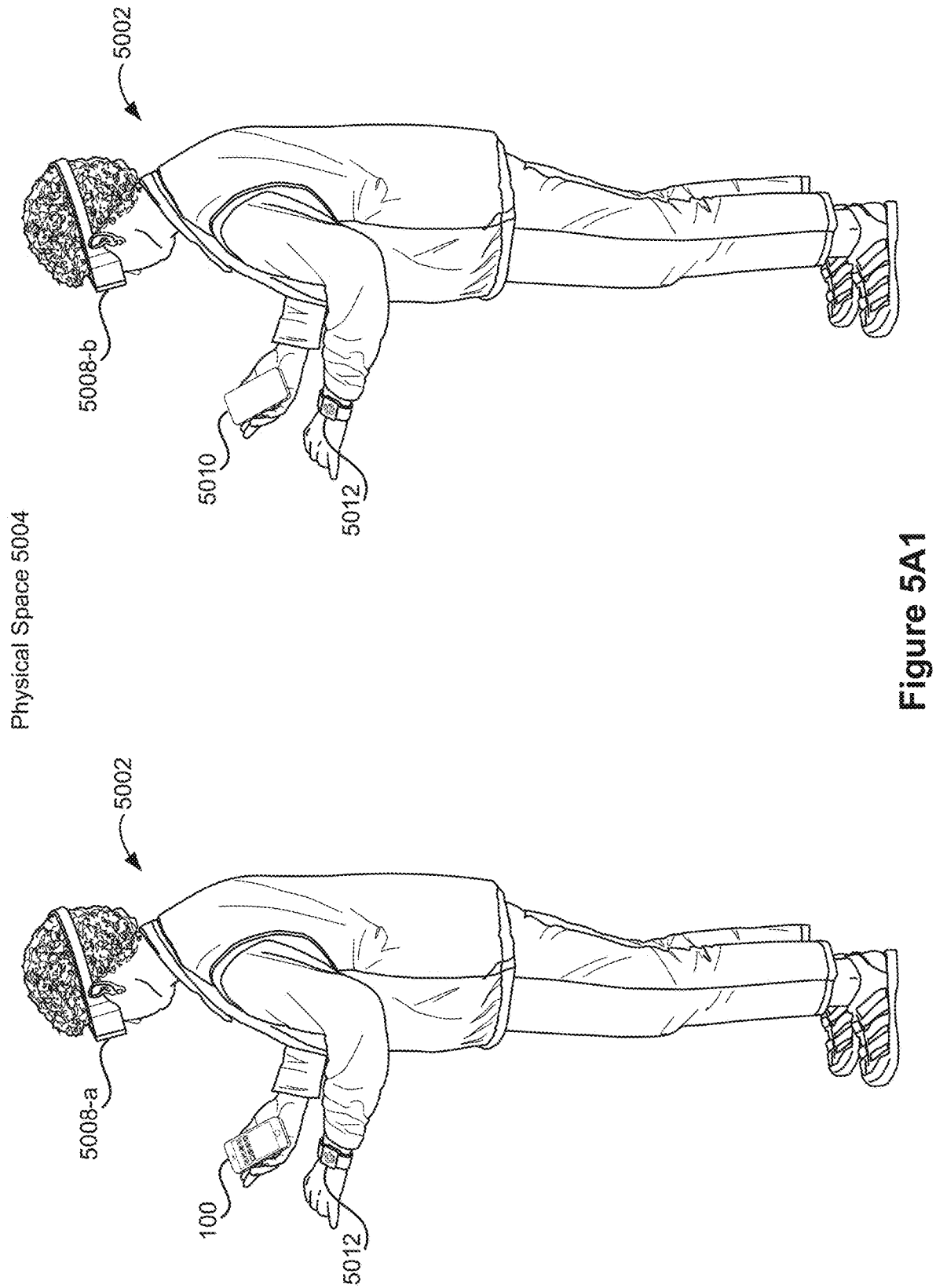
Figure 5A1

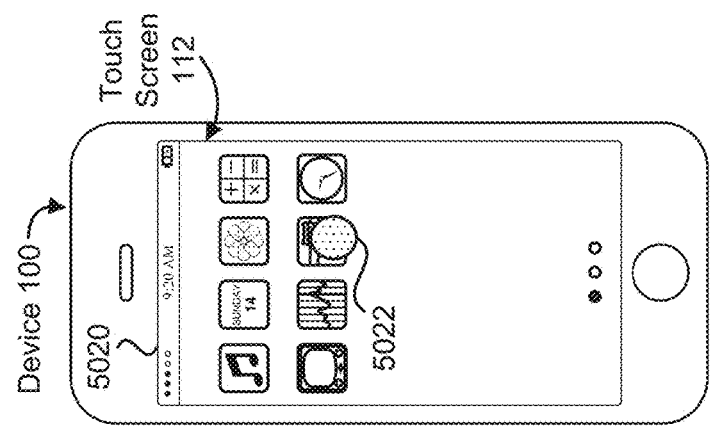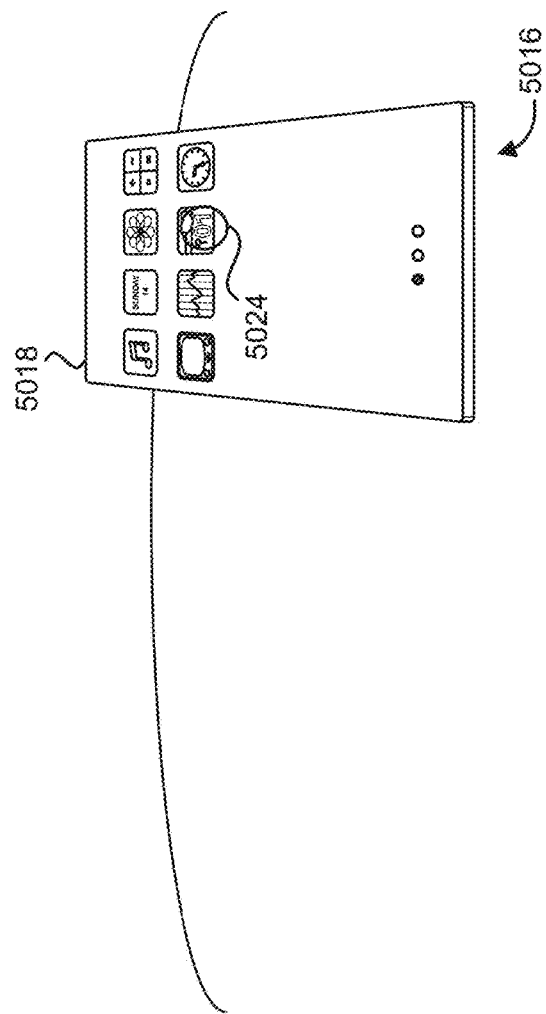
Figure 5A2

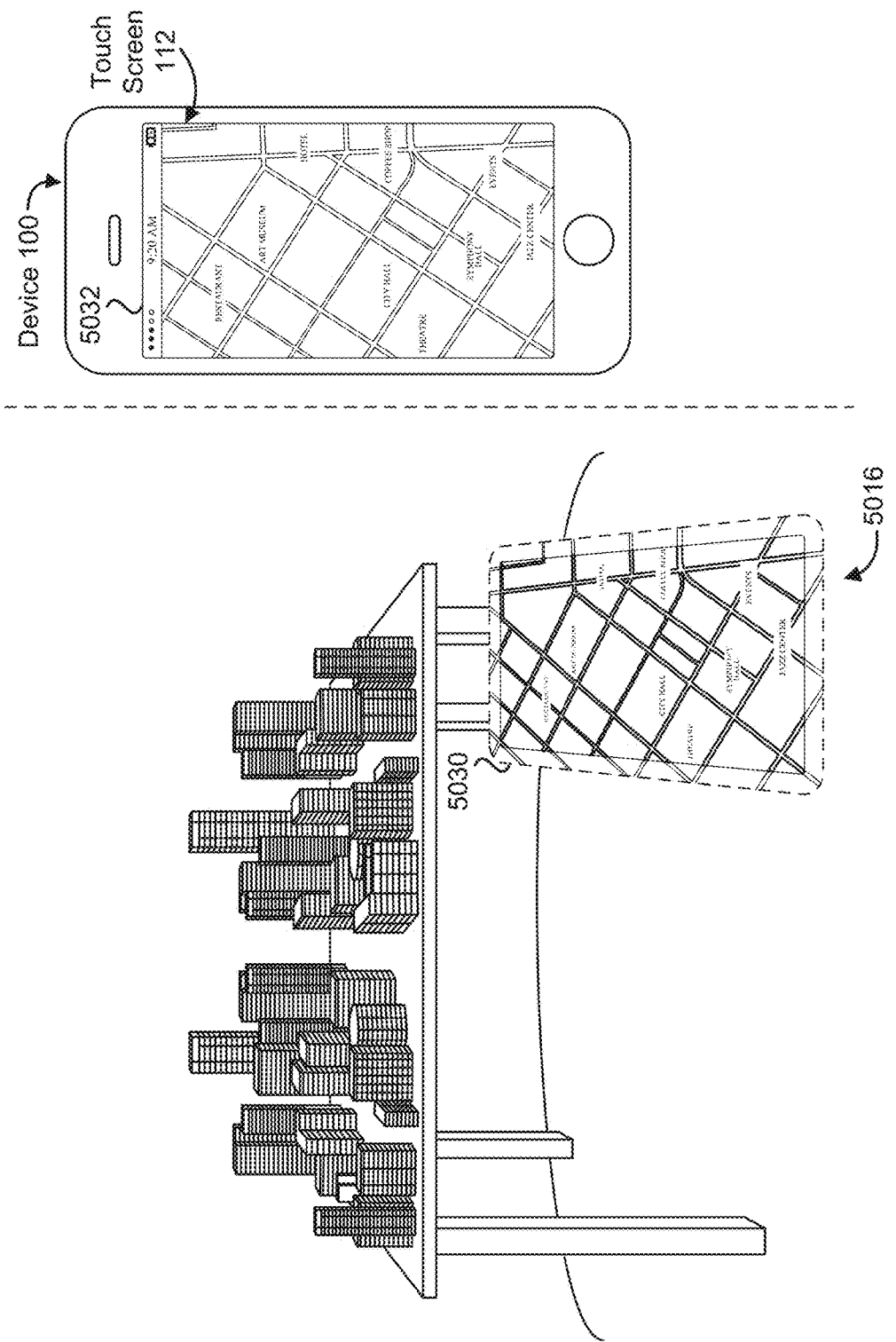
Figure 5A3

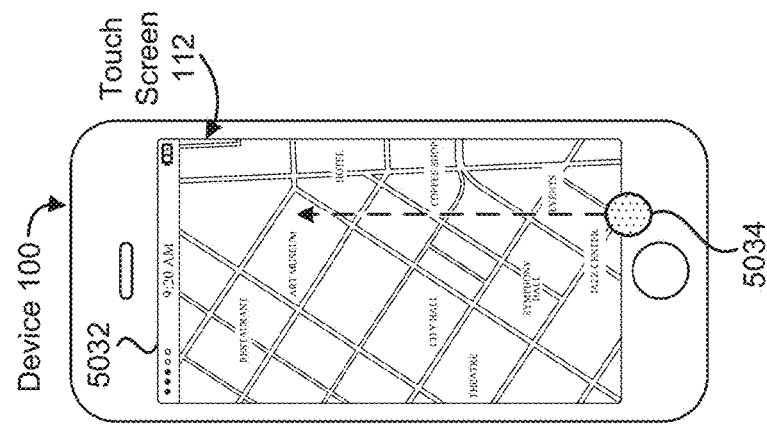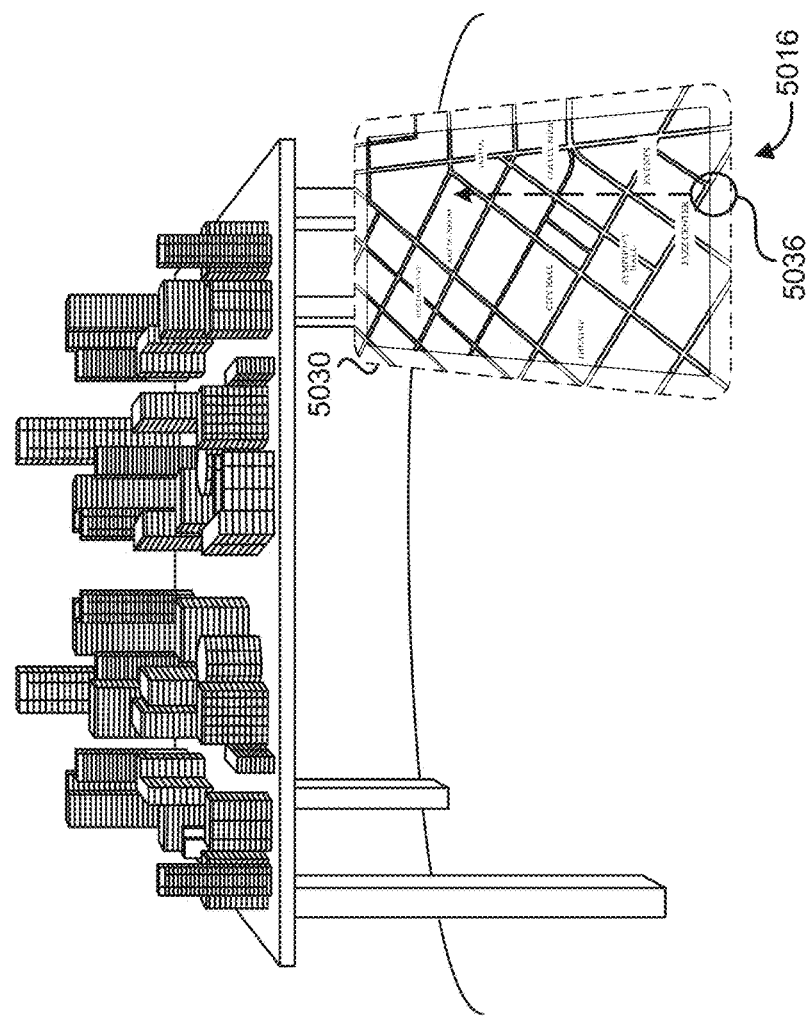
Figure 5A4

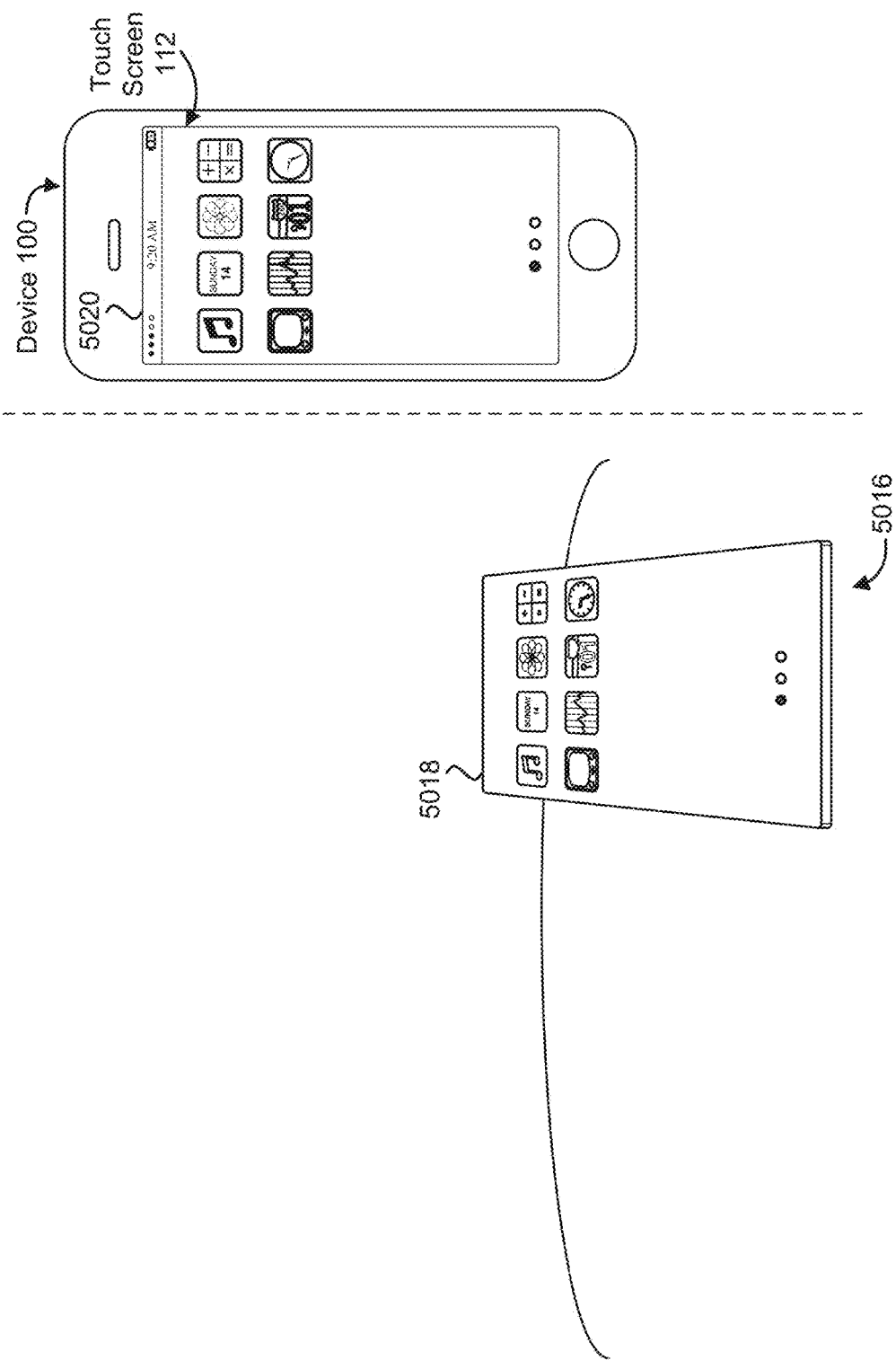

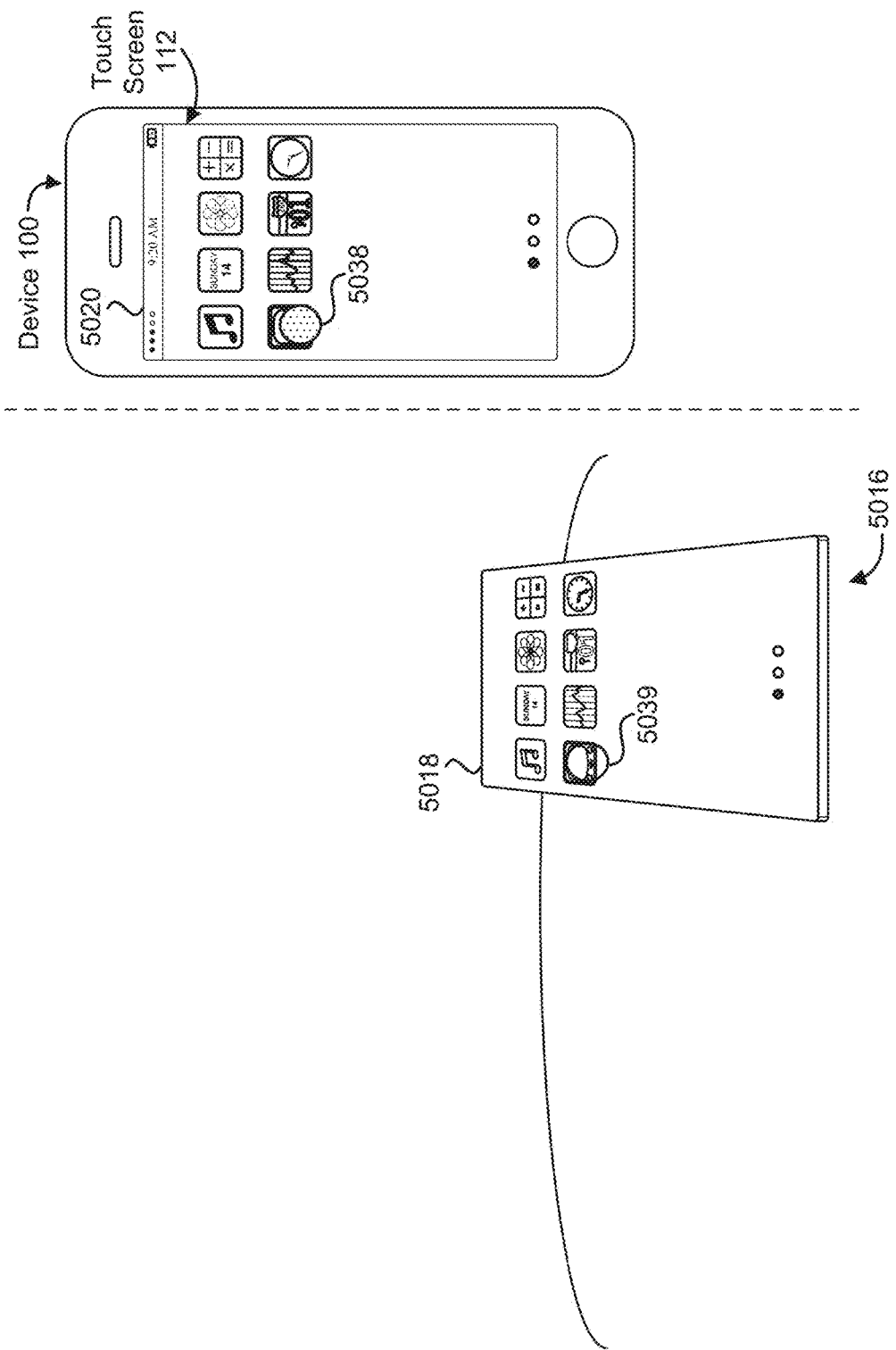
Figure 5A6

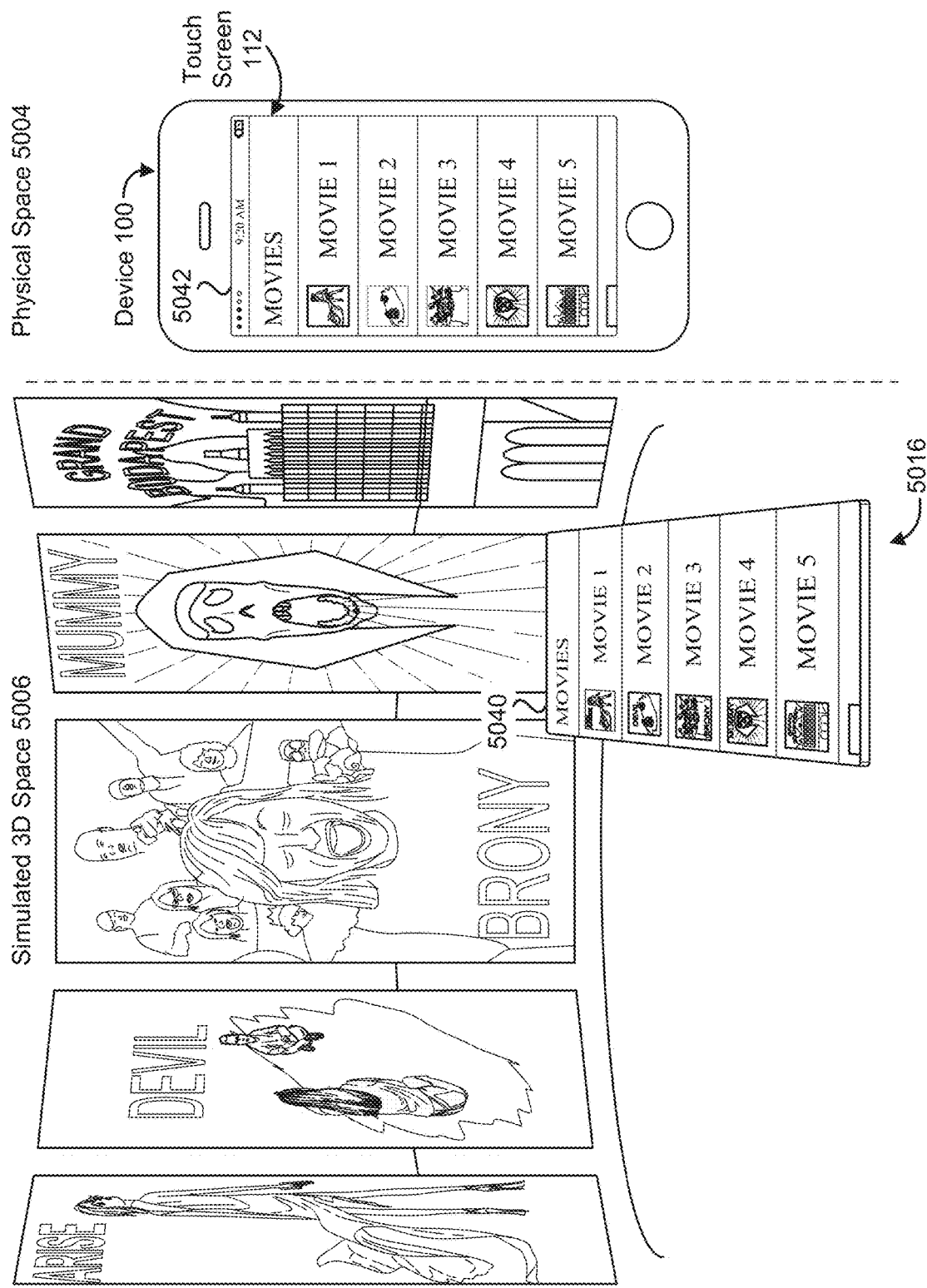
Figure 5A7

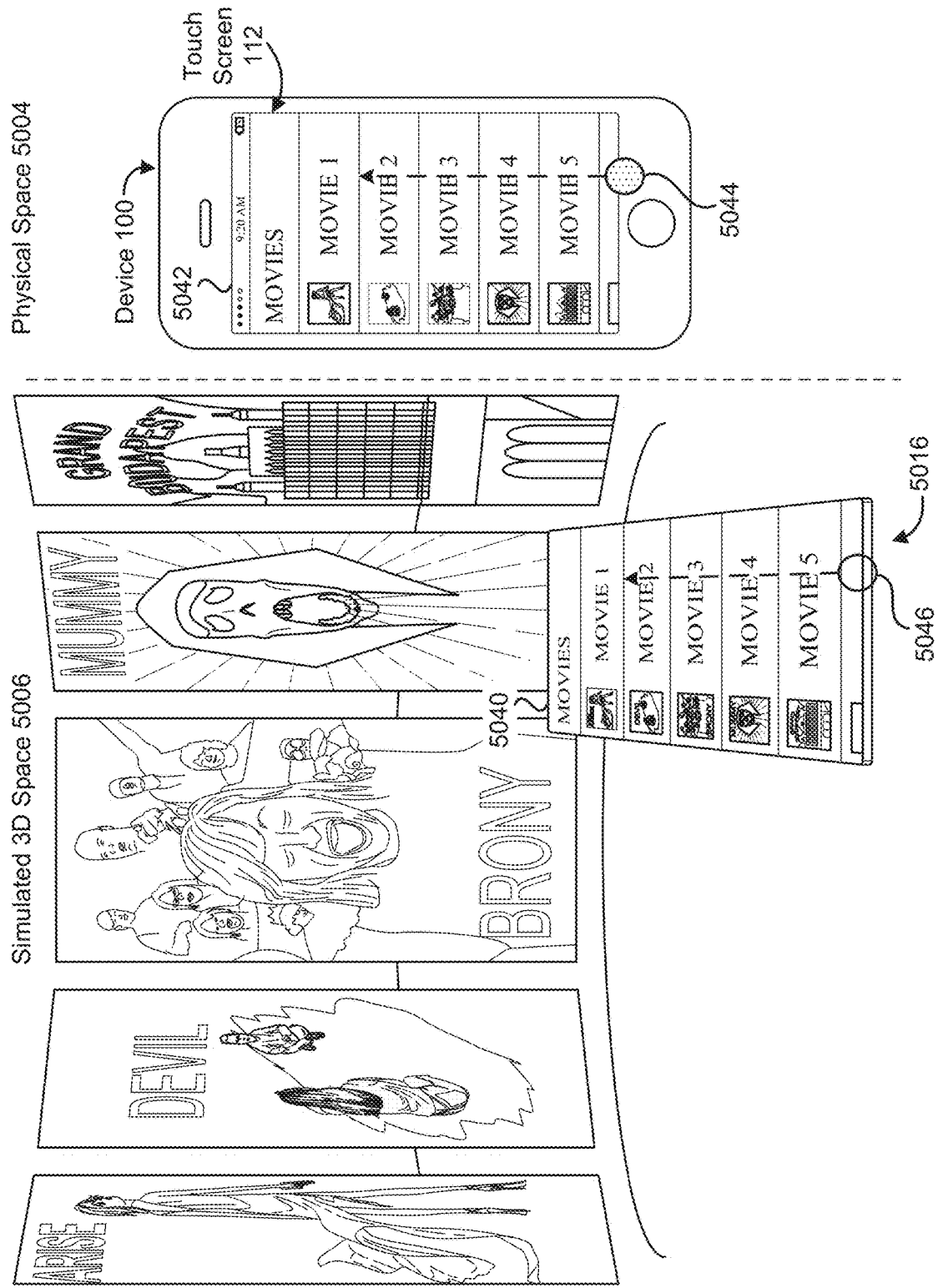
Figure 5A8

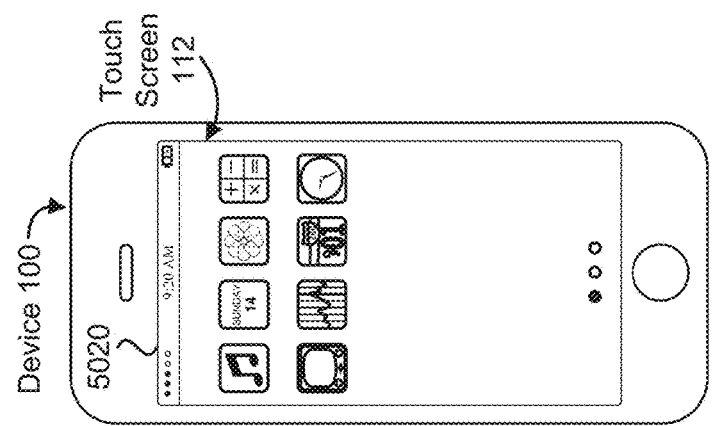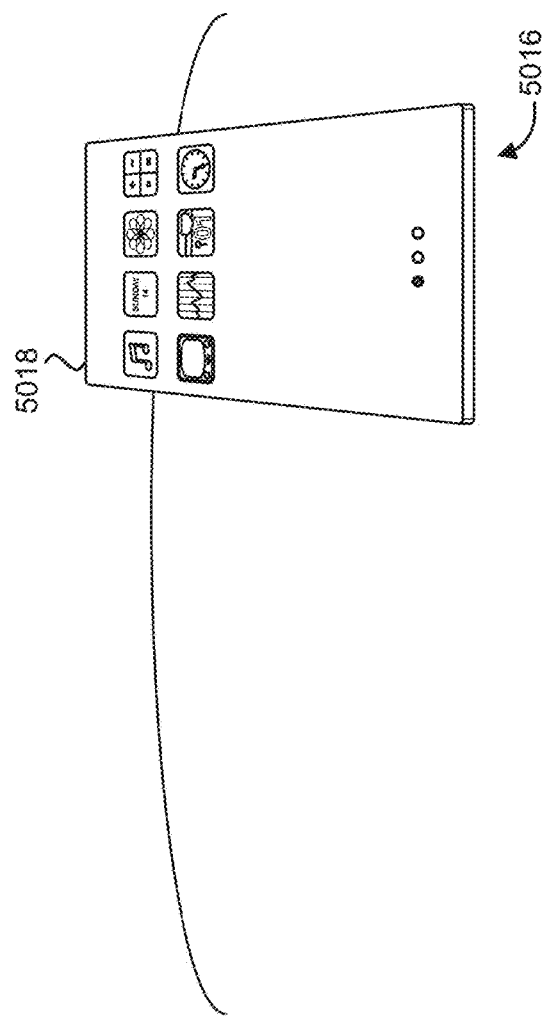
Figure 5A9

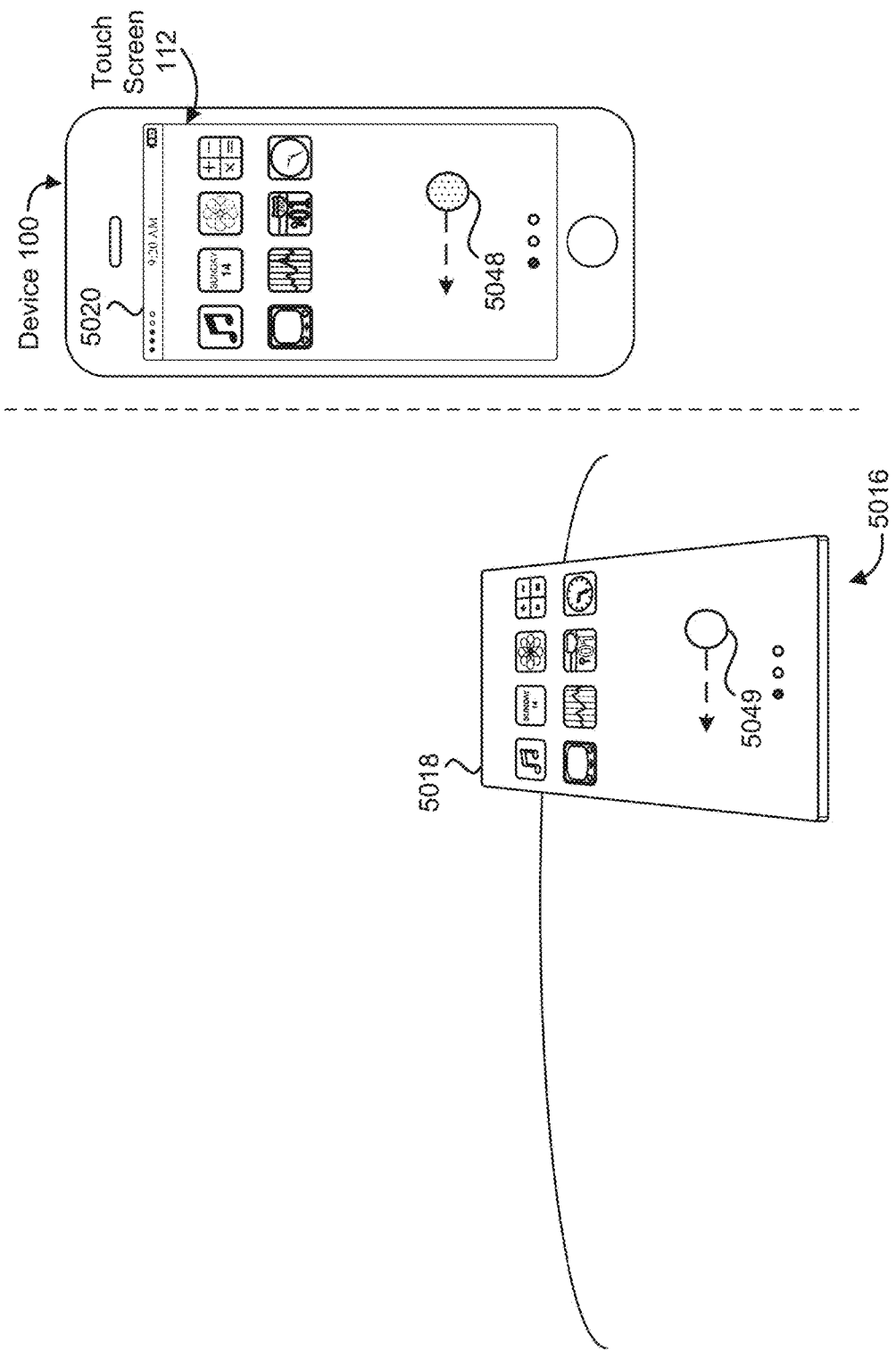
Figure 5A10

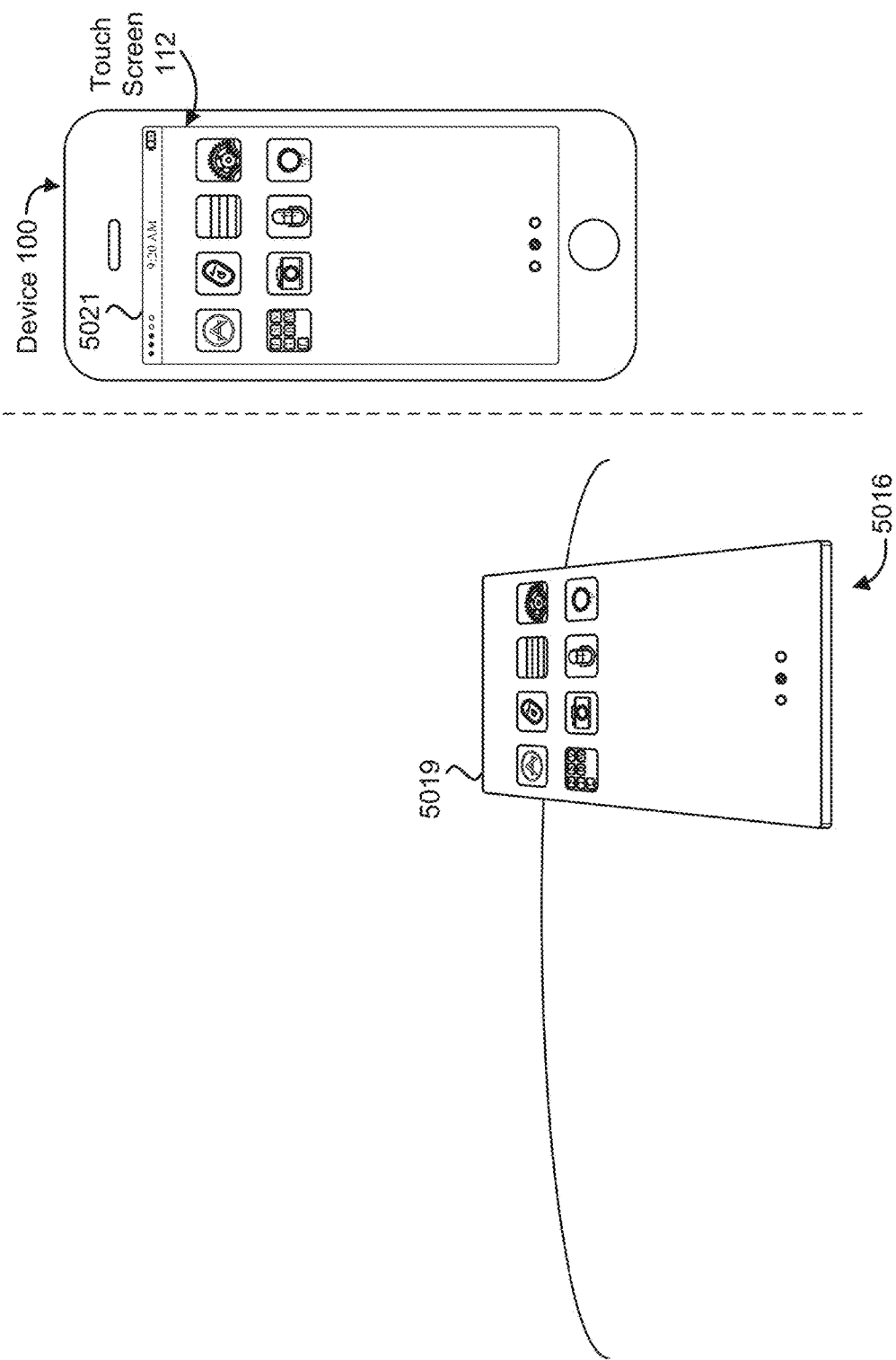
Figure 5A11

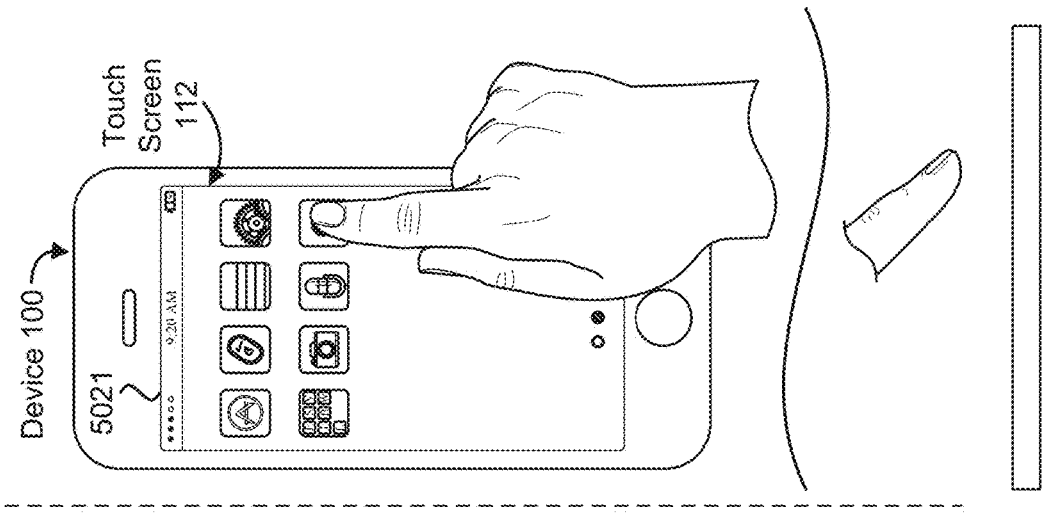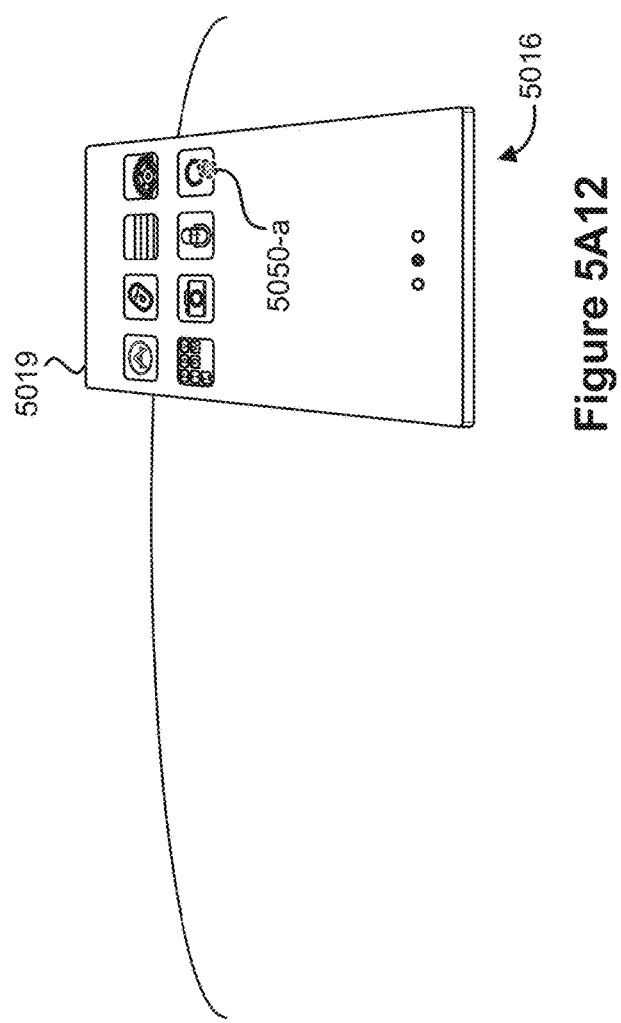
Figure 5A12

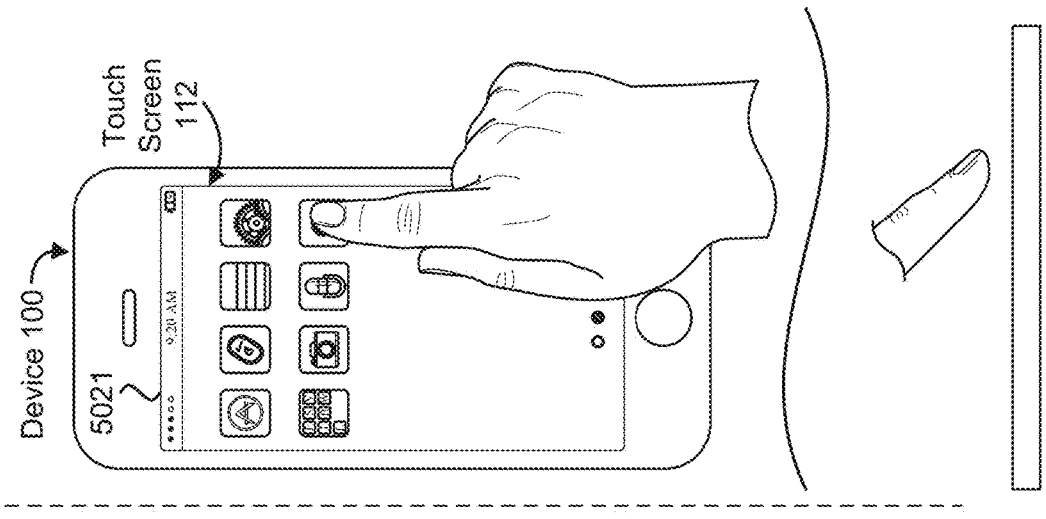
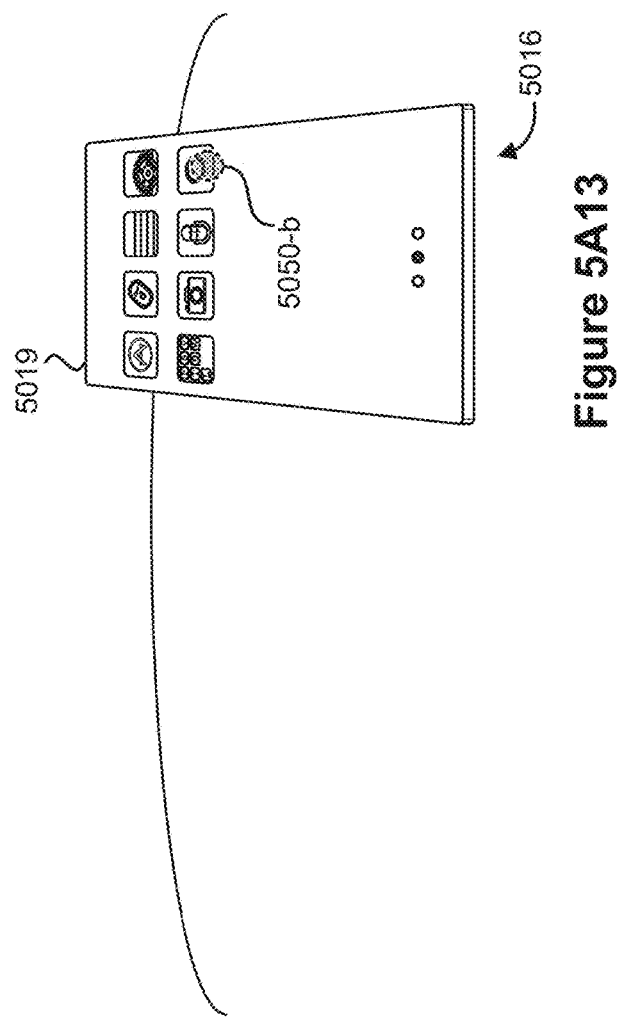
Figure 5A13

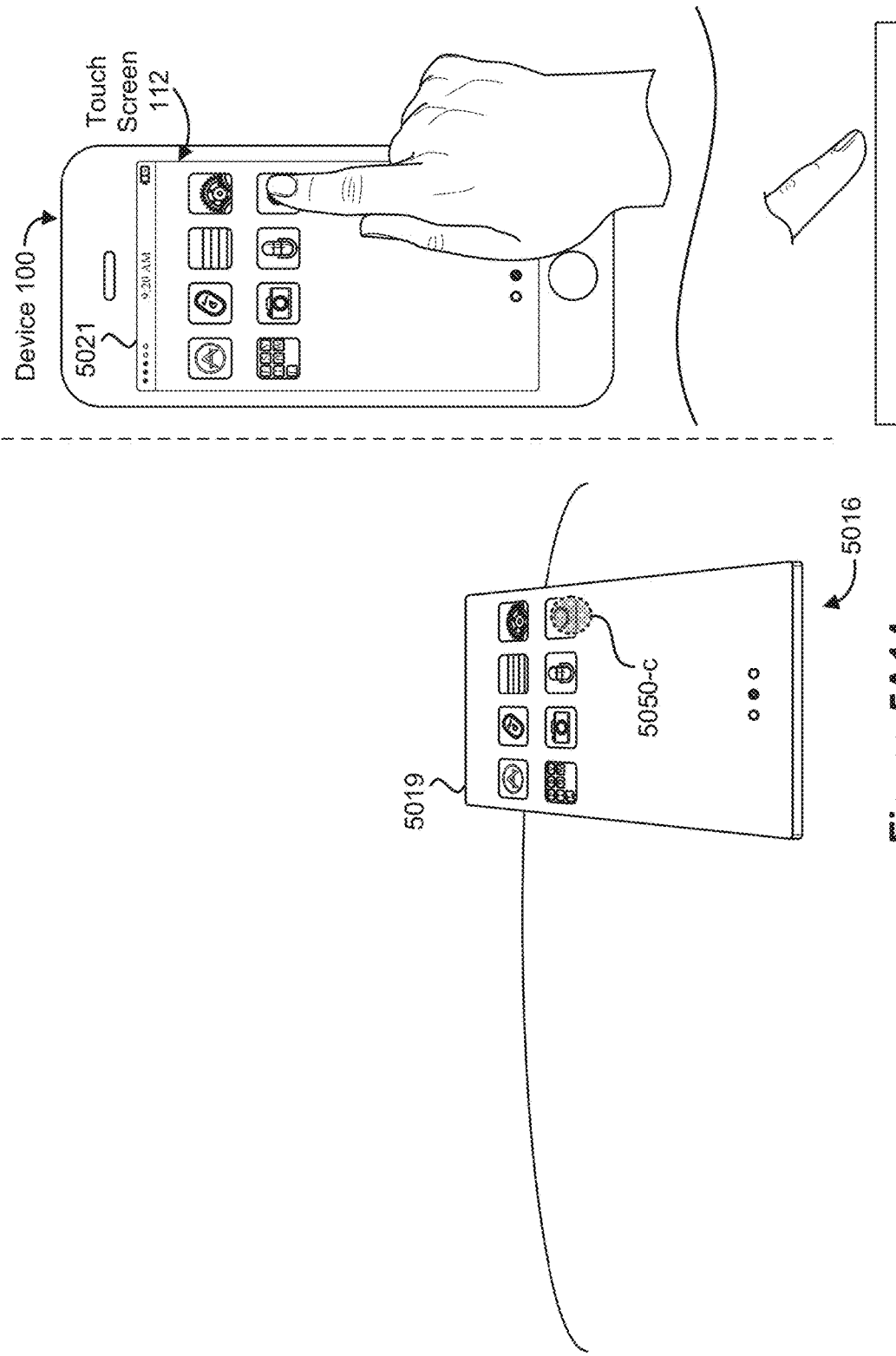
Figure 5A14

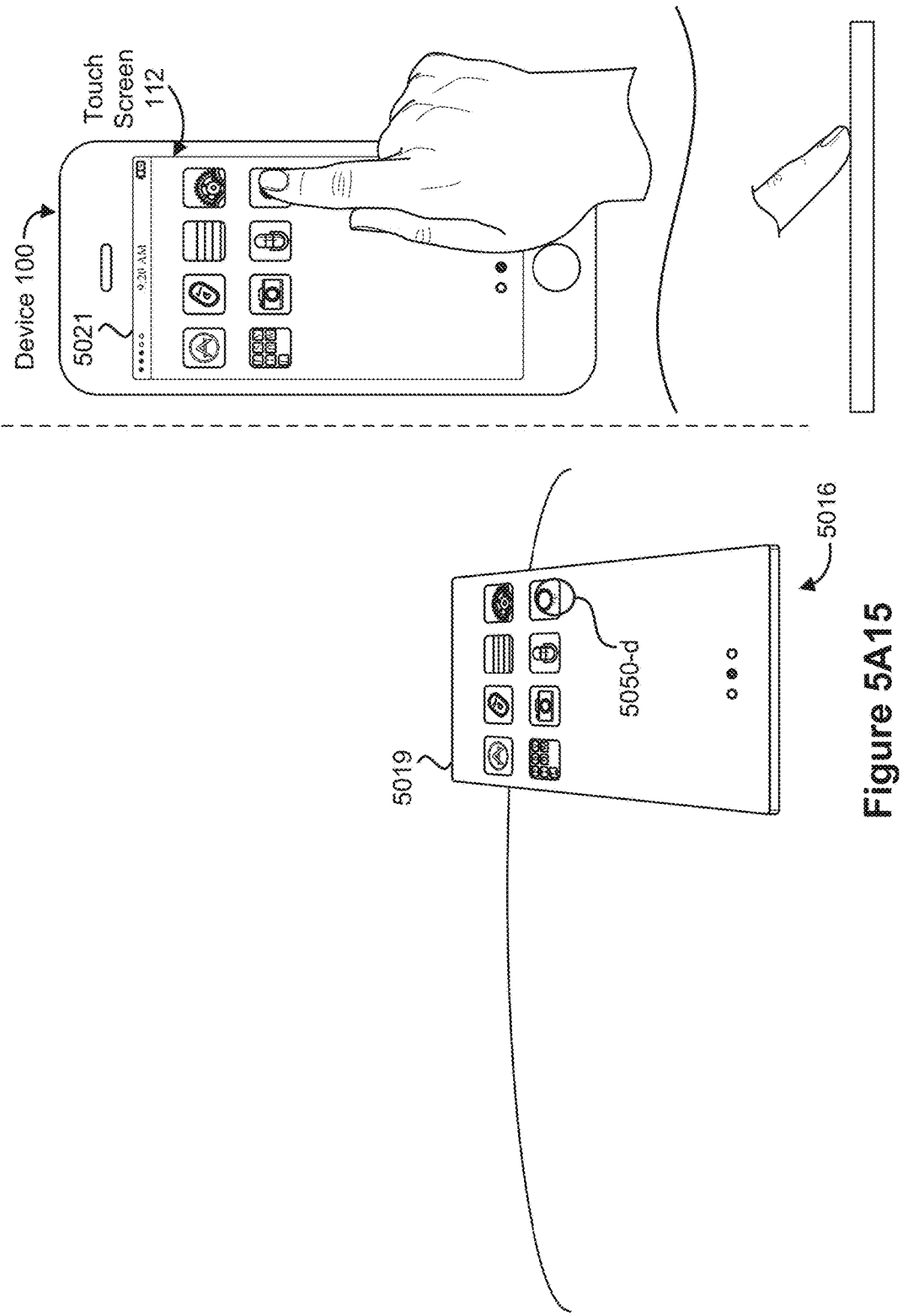
Figure 5A15

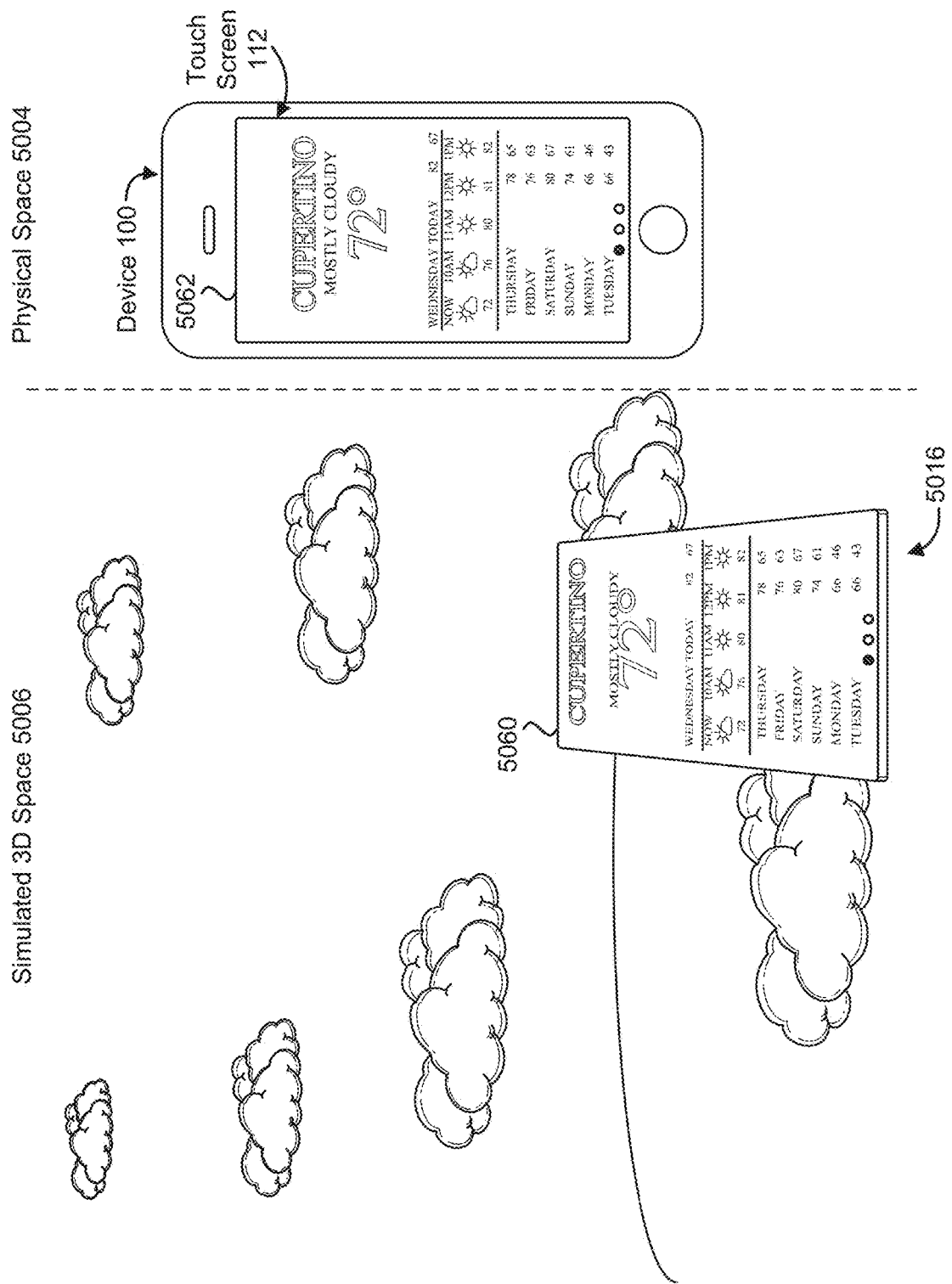
Figure 5A16

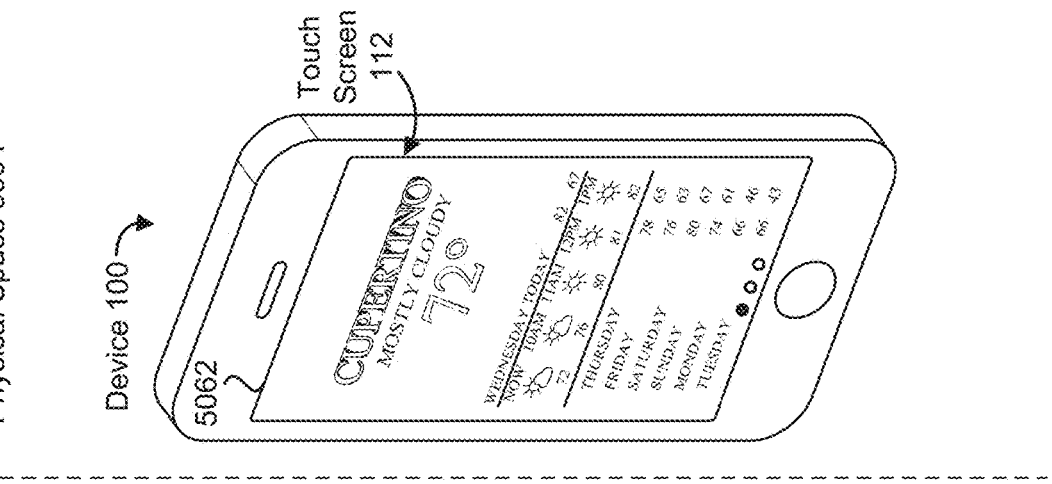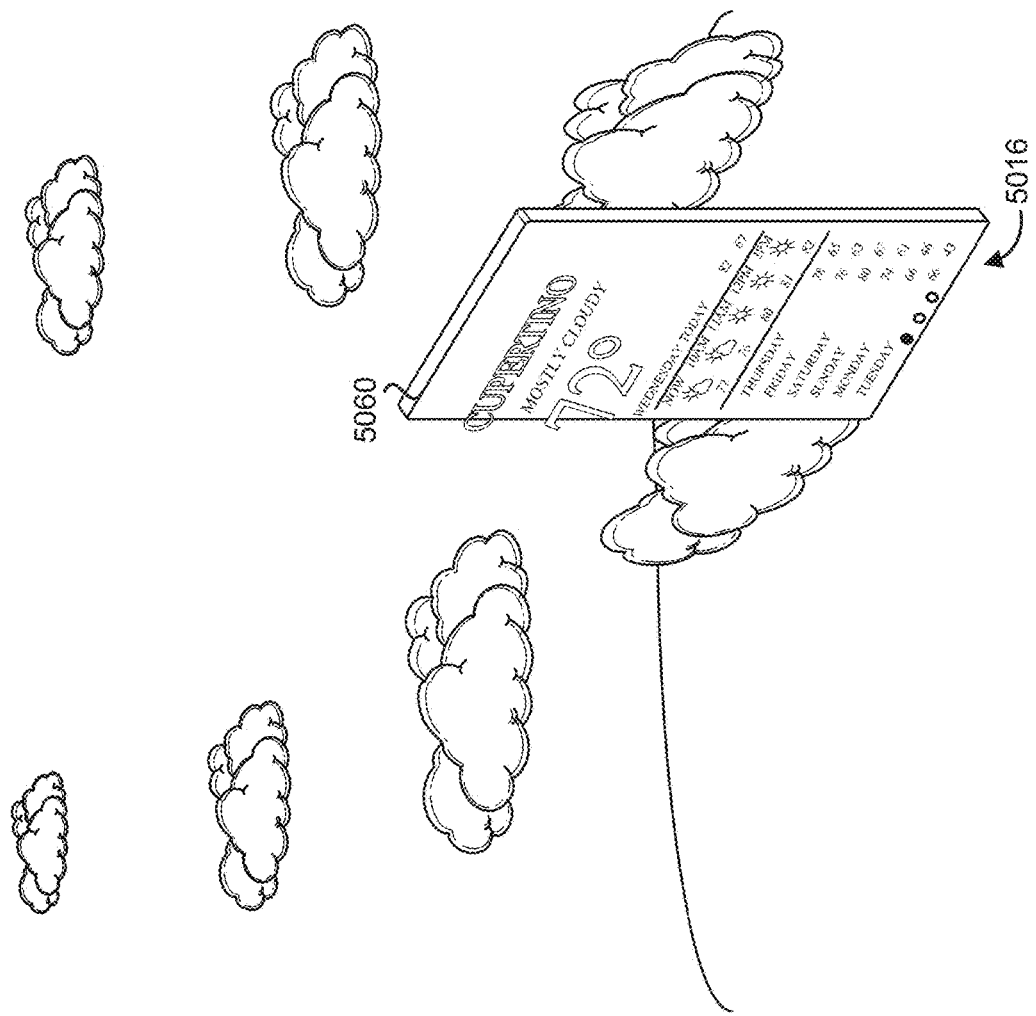
Figure 5A17

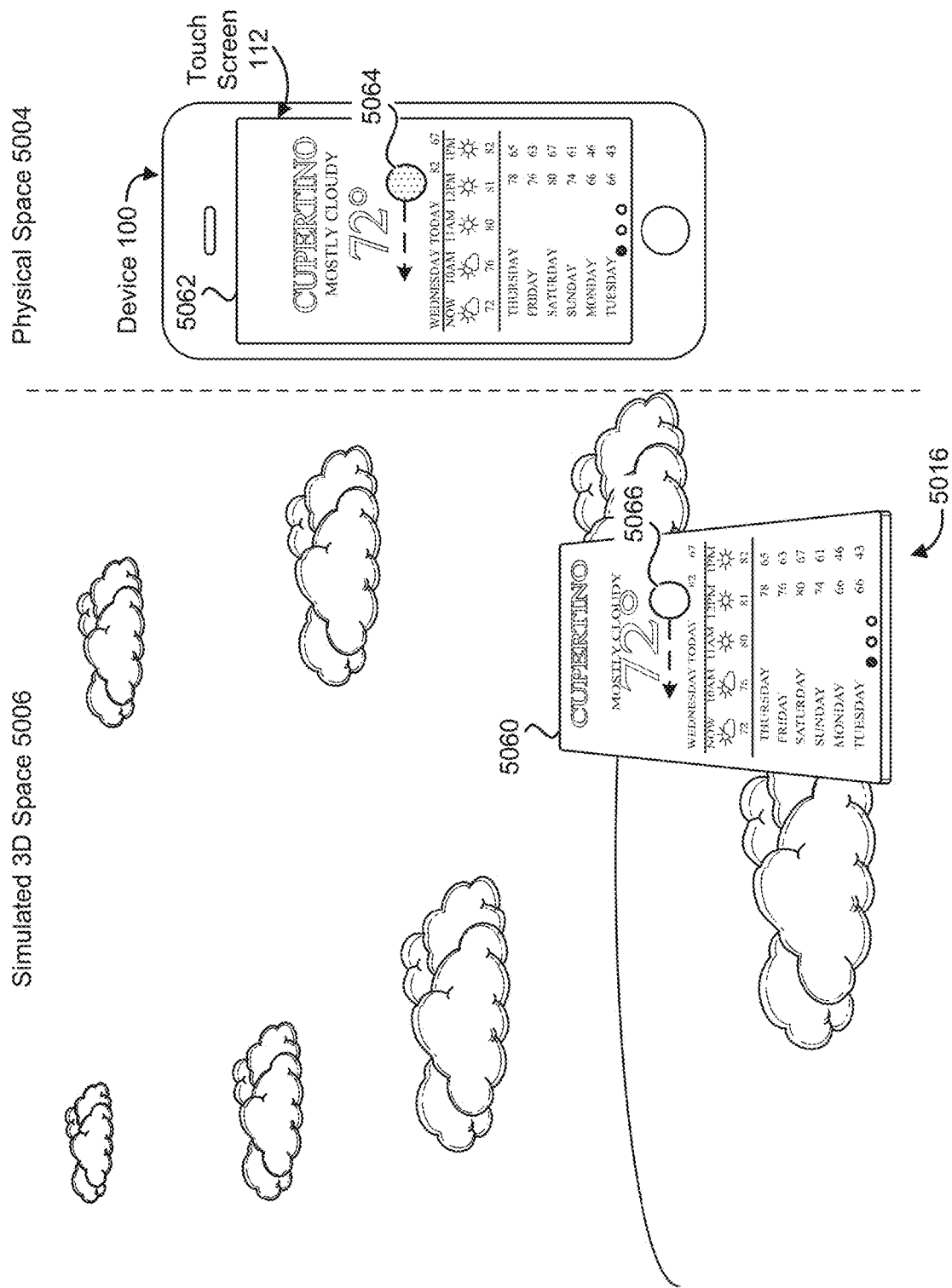

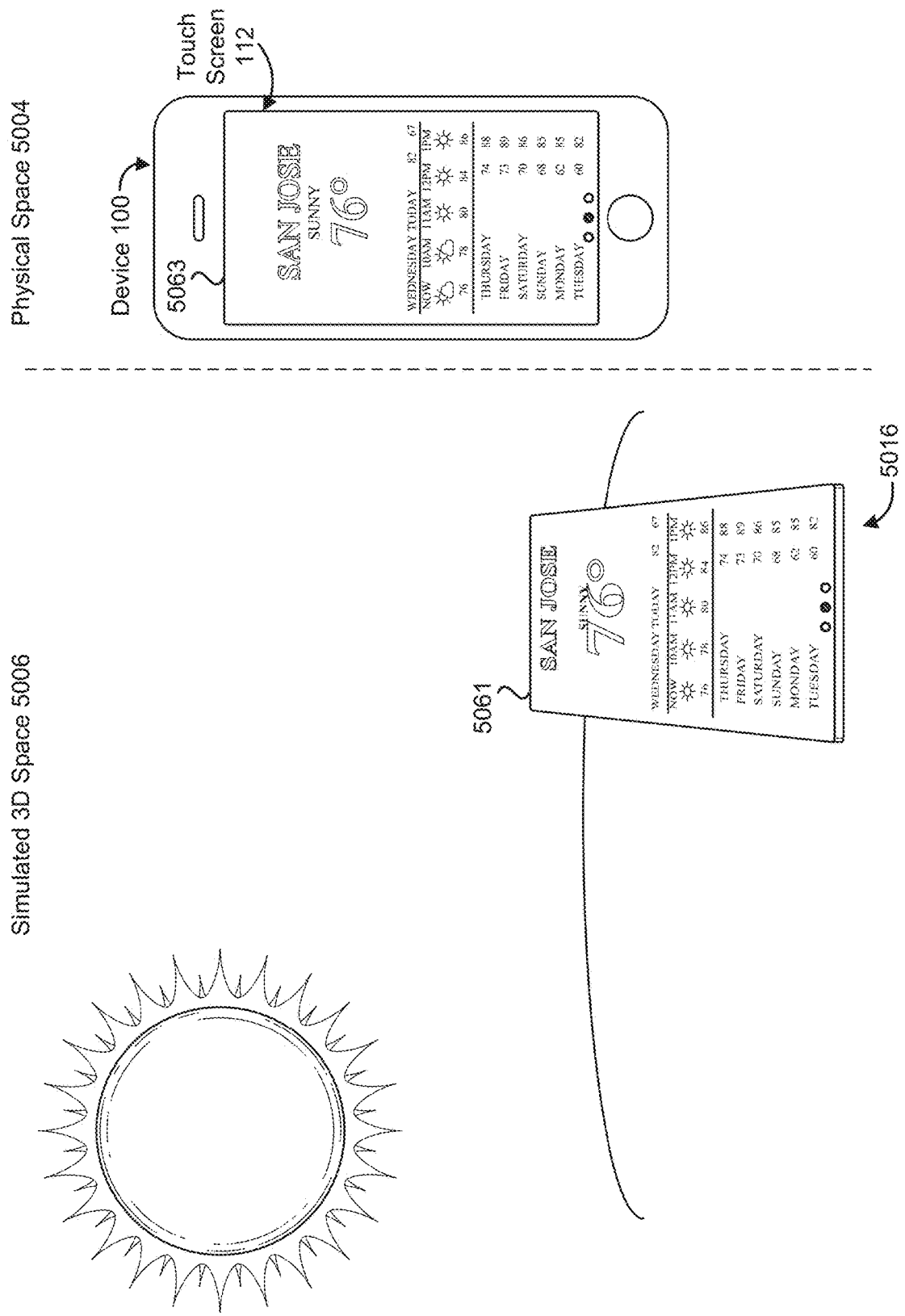

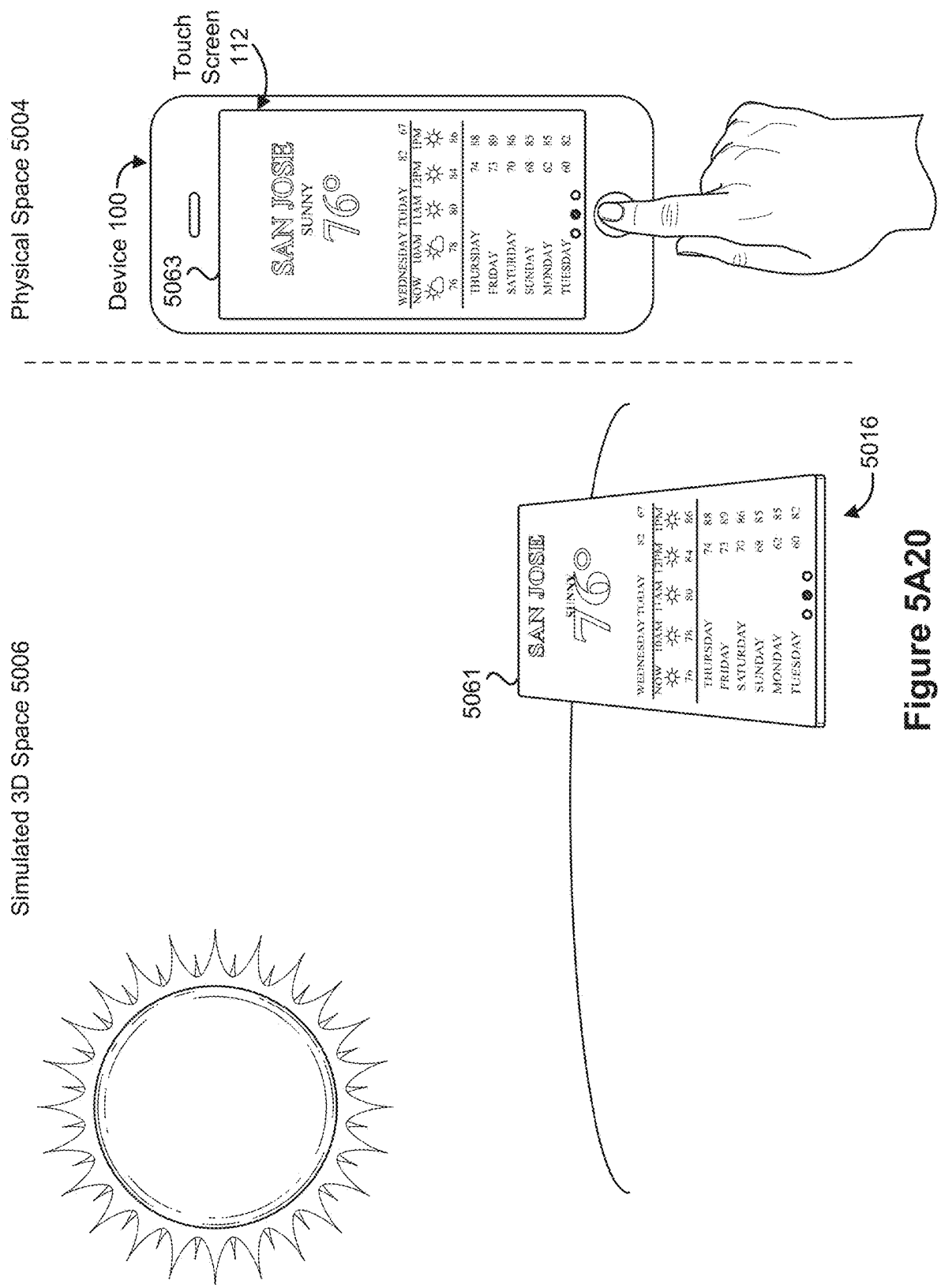
Figure 5A20

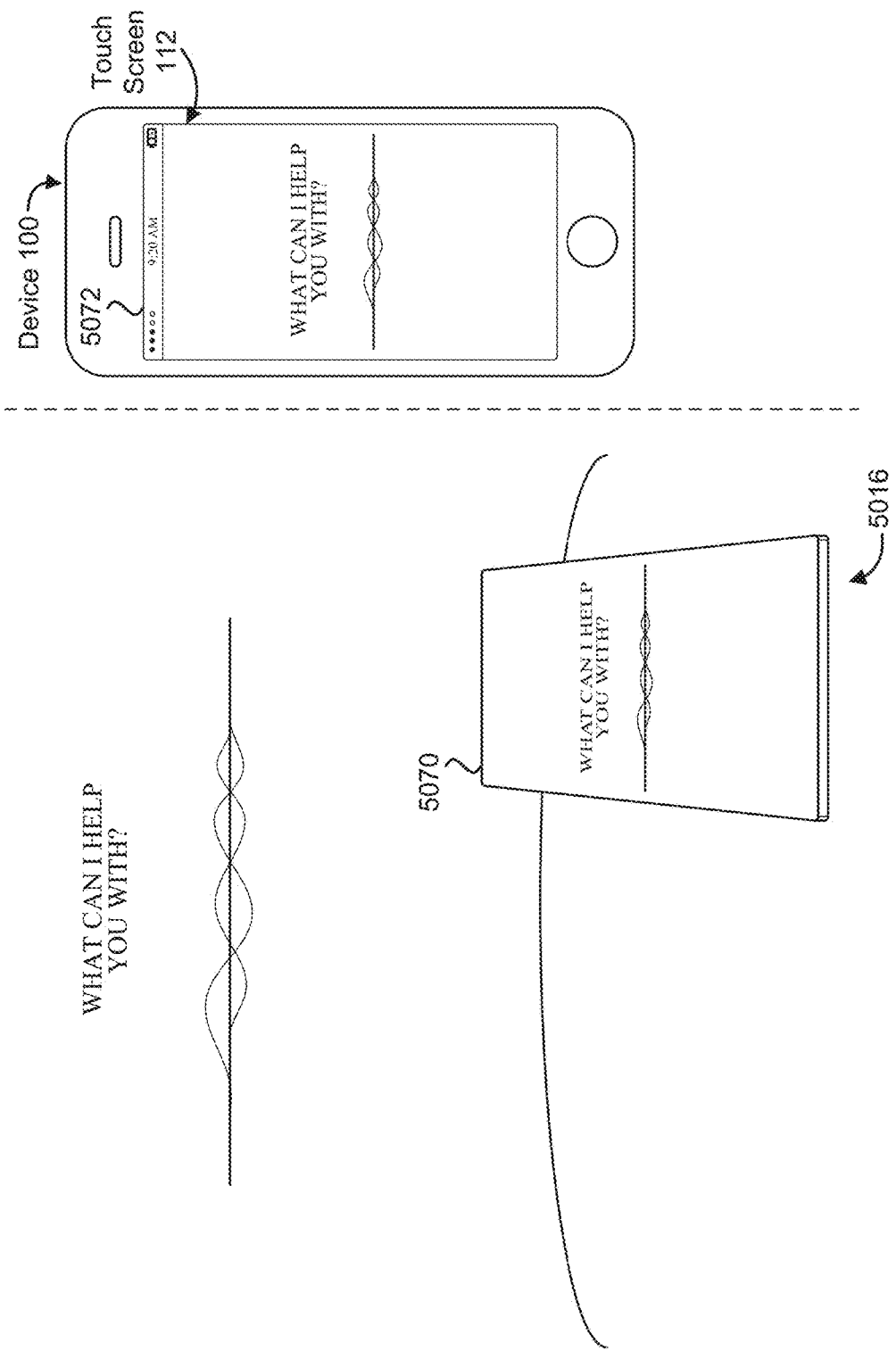
Figure 5A21

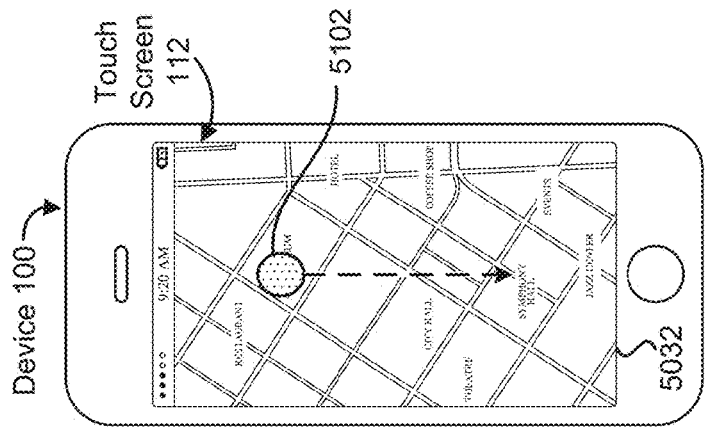
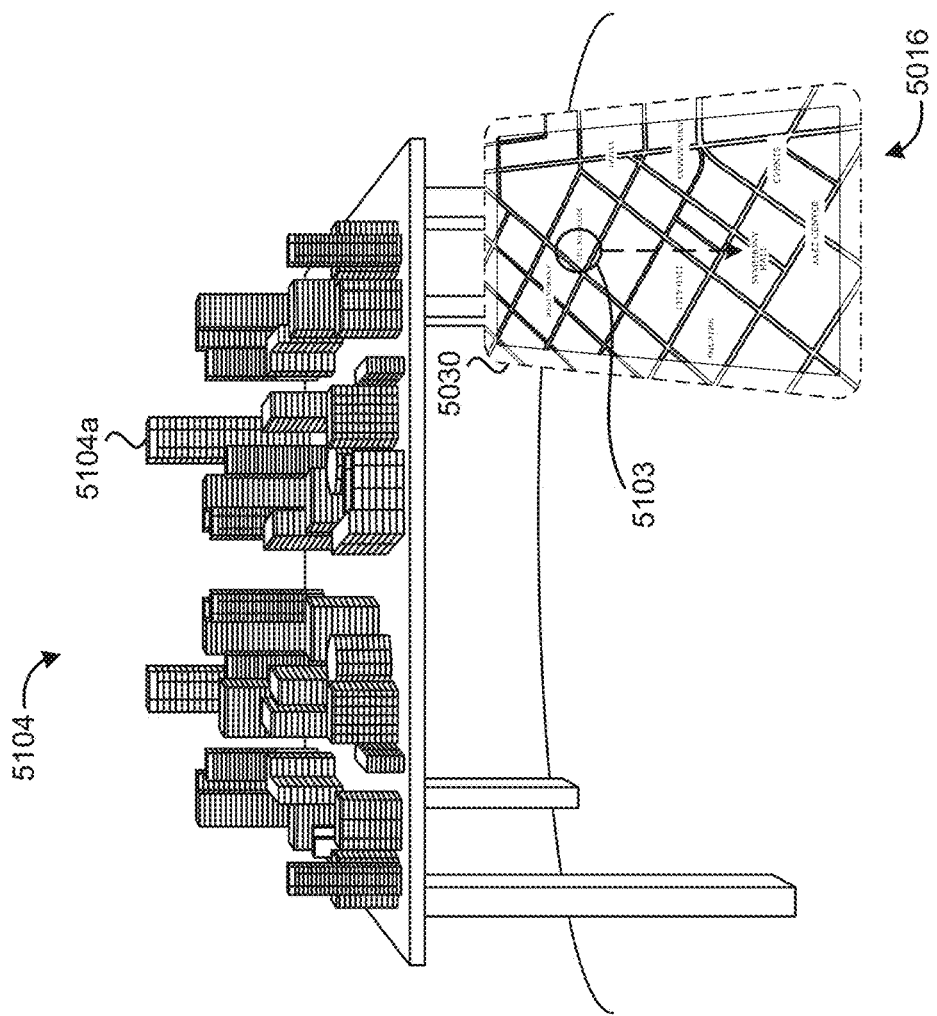
Figure 5A22

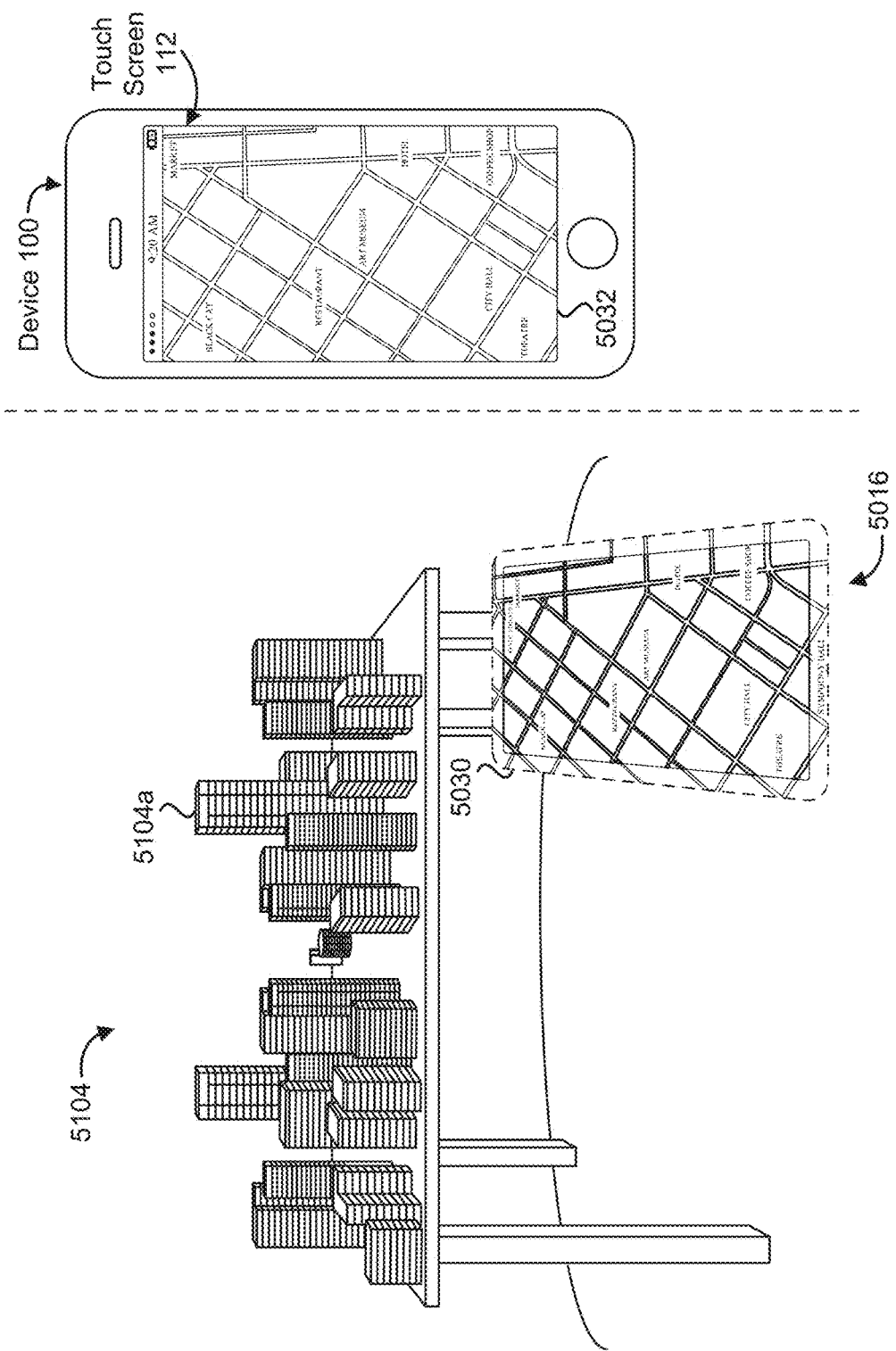
Figure 5A23

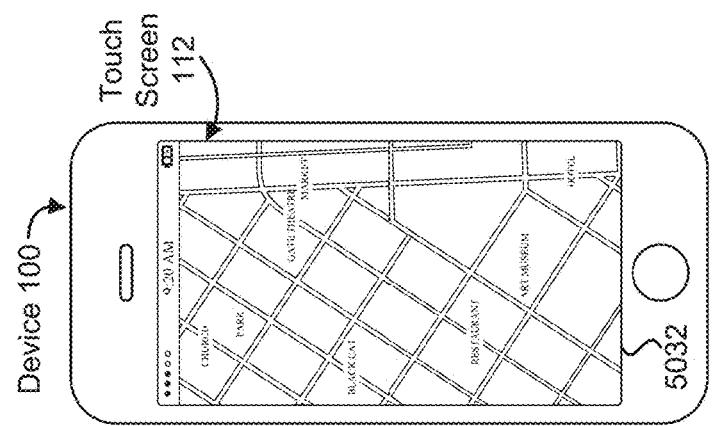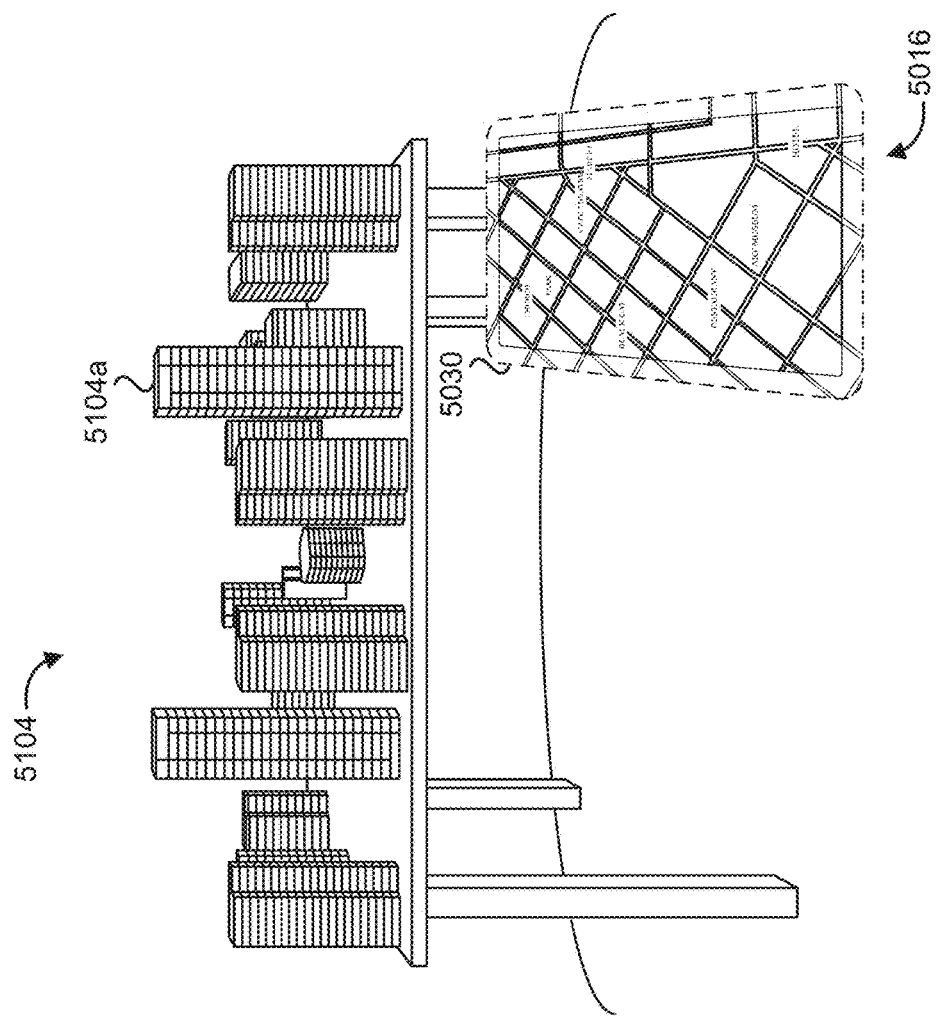
Figure 5A24

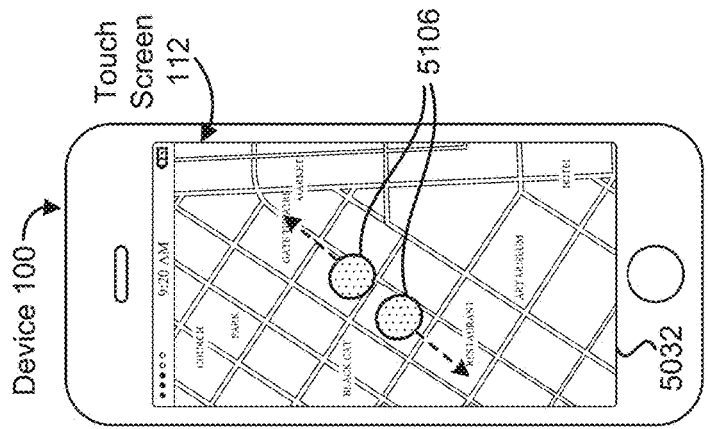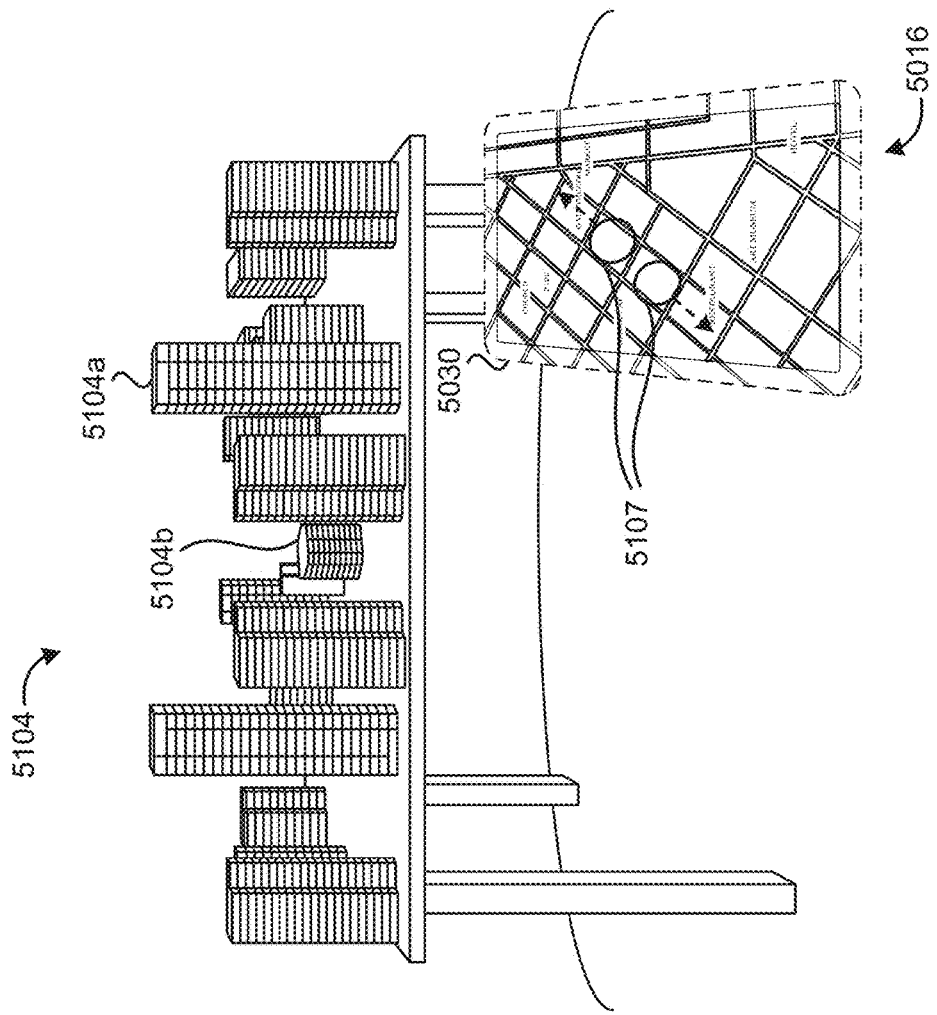
Figure 5A25

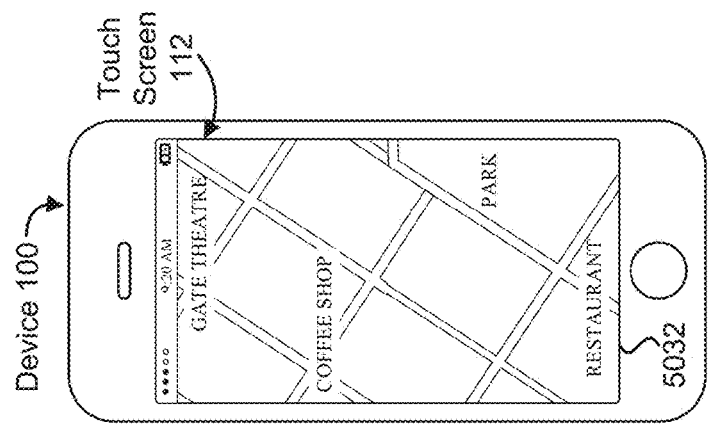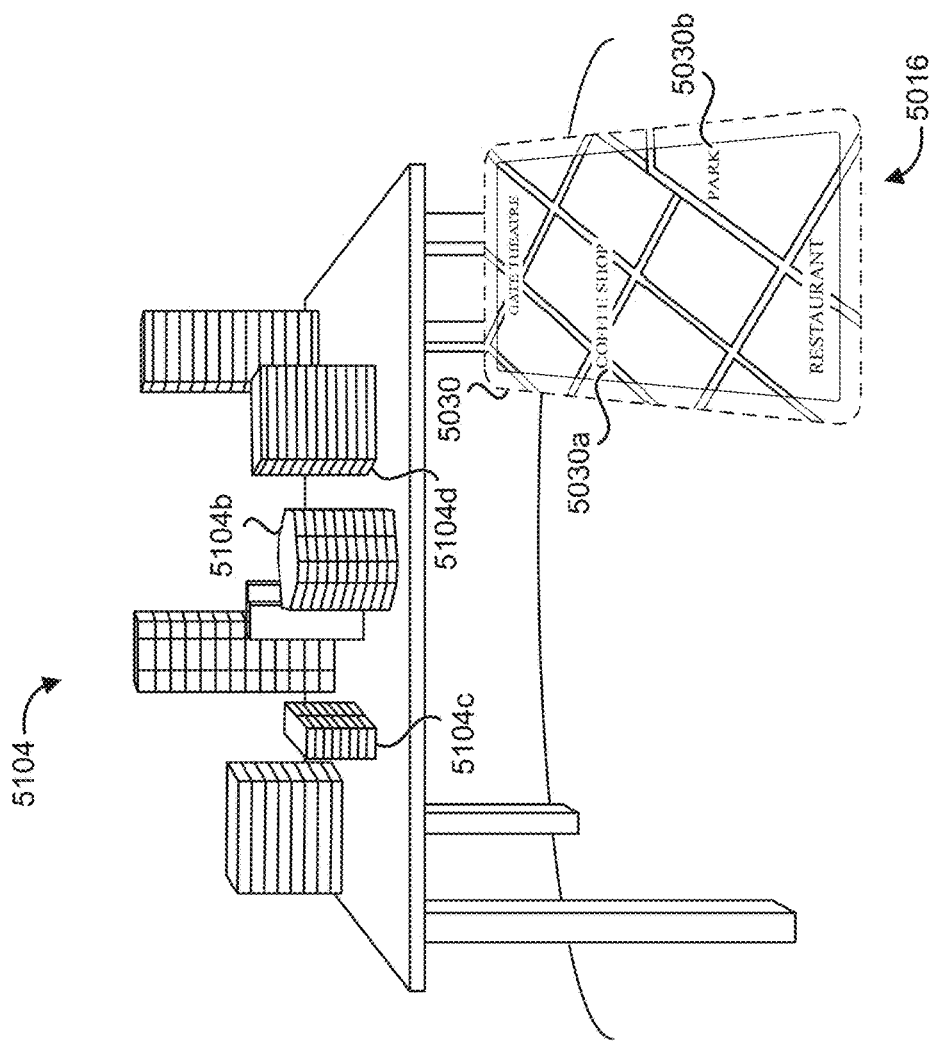
Figure 5A26

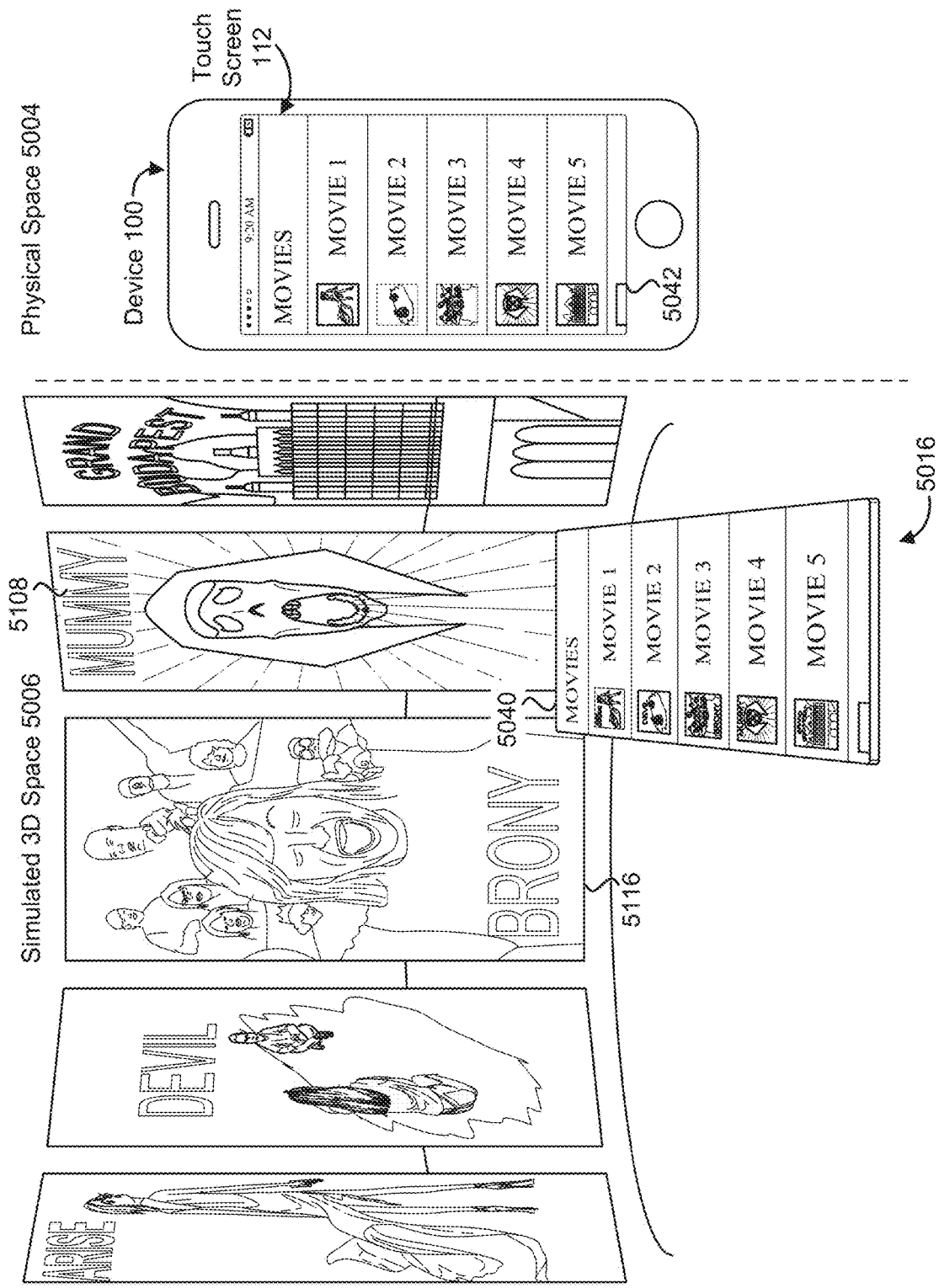
Figure 5A27

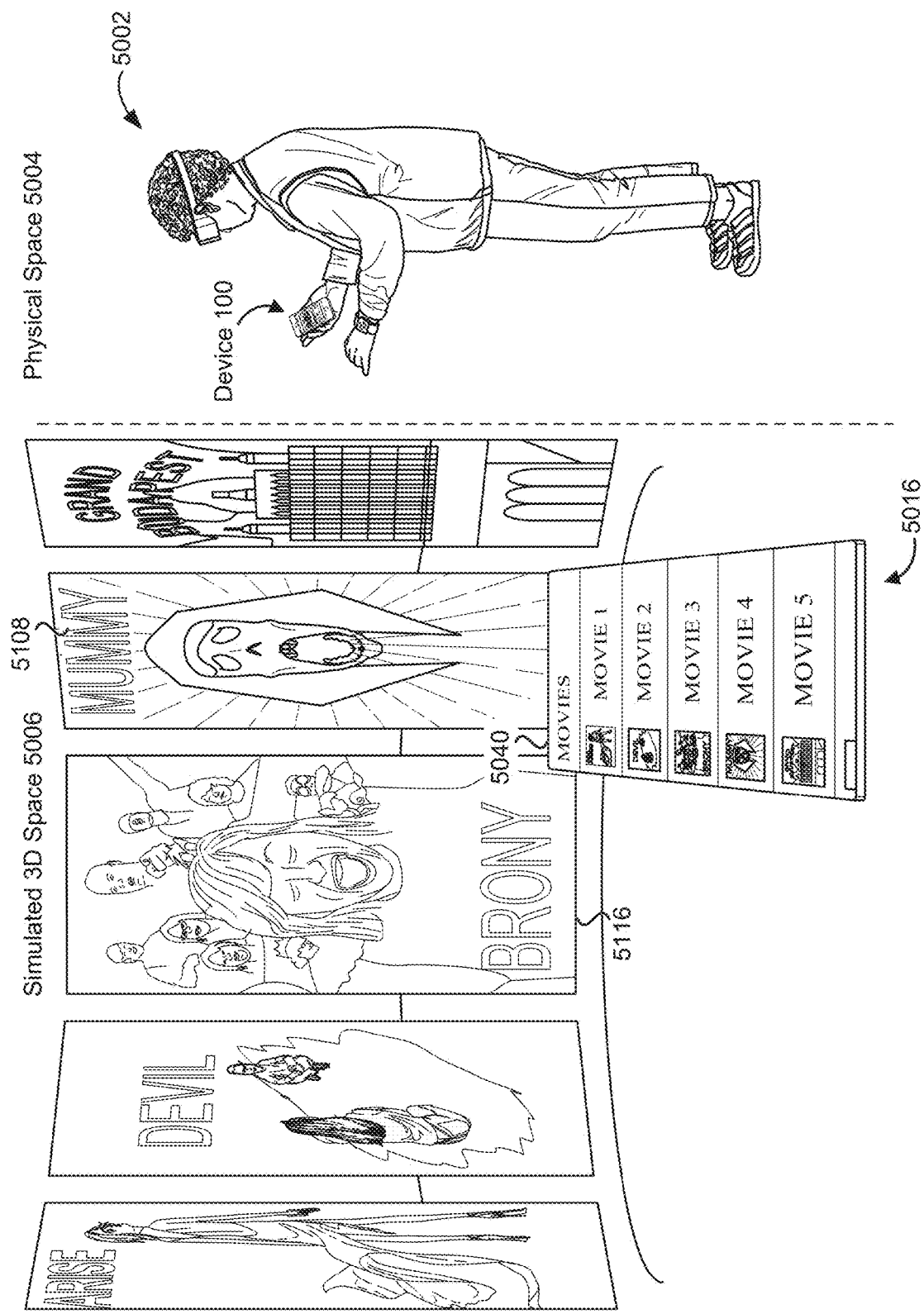
Figure 5A28

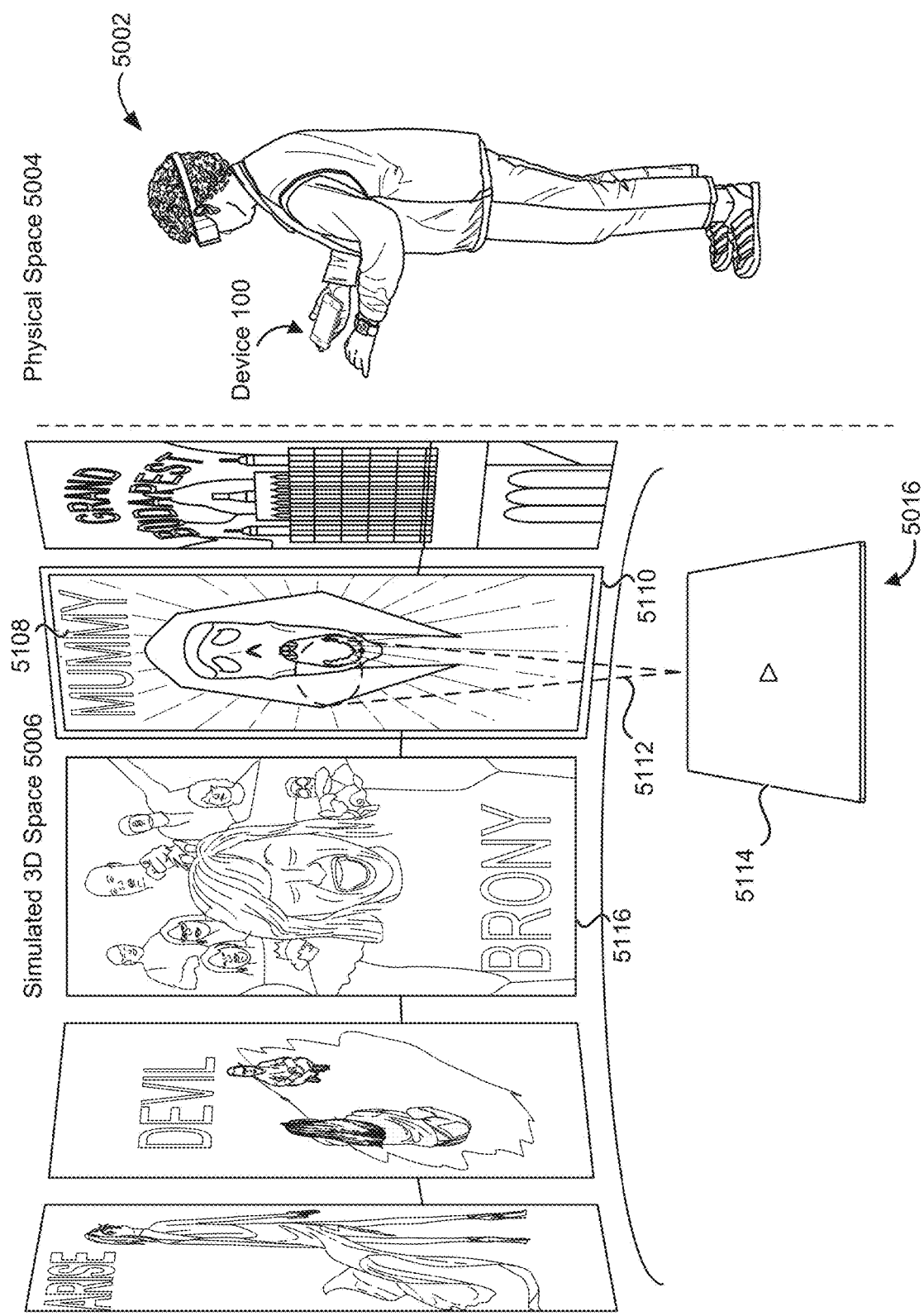
Figure 5A29

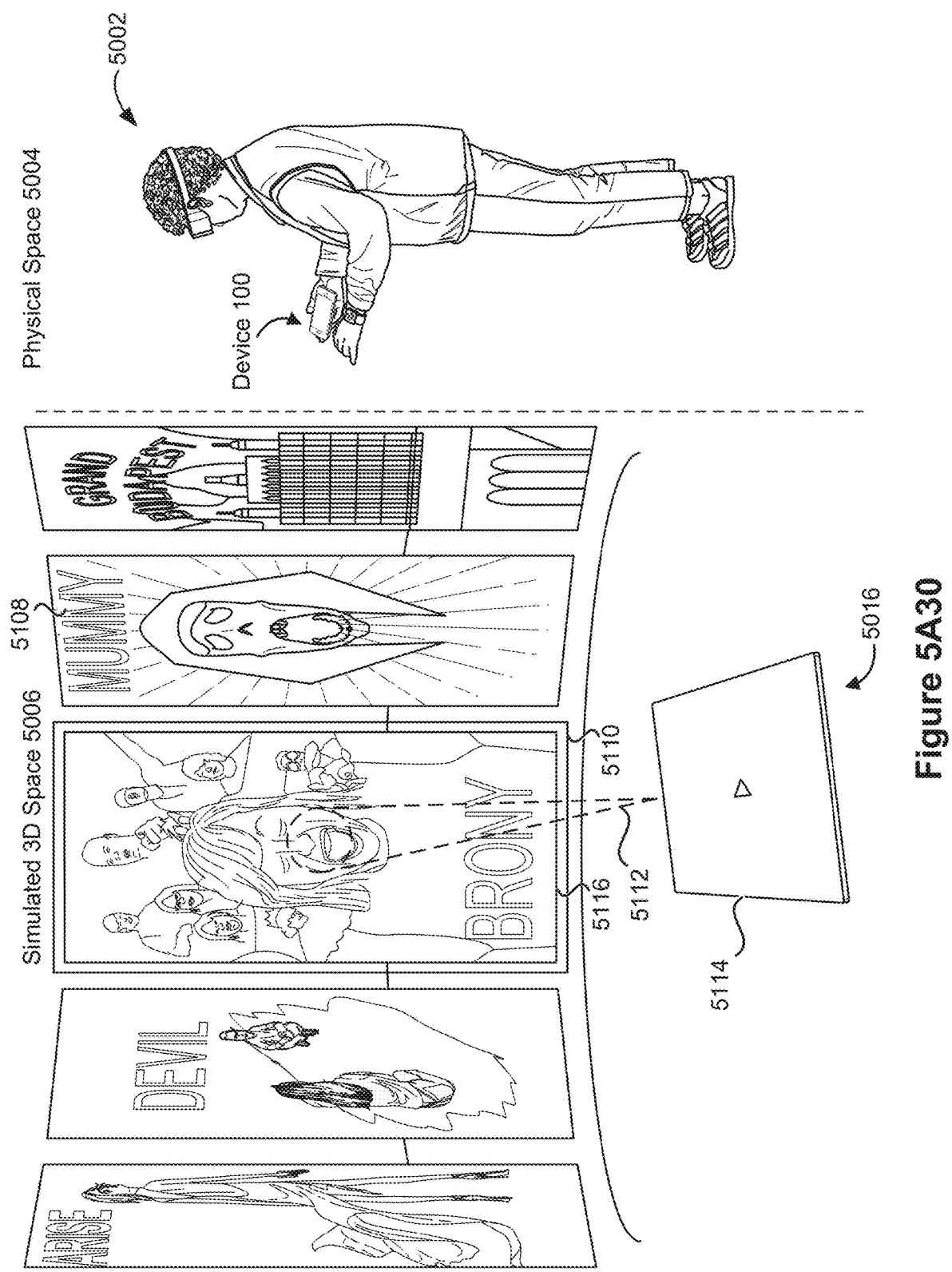
Figure 5A30

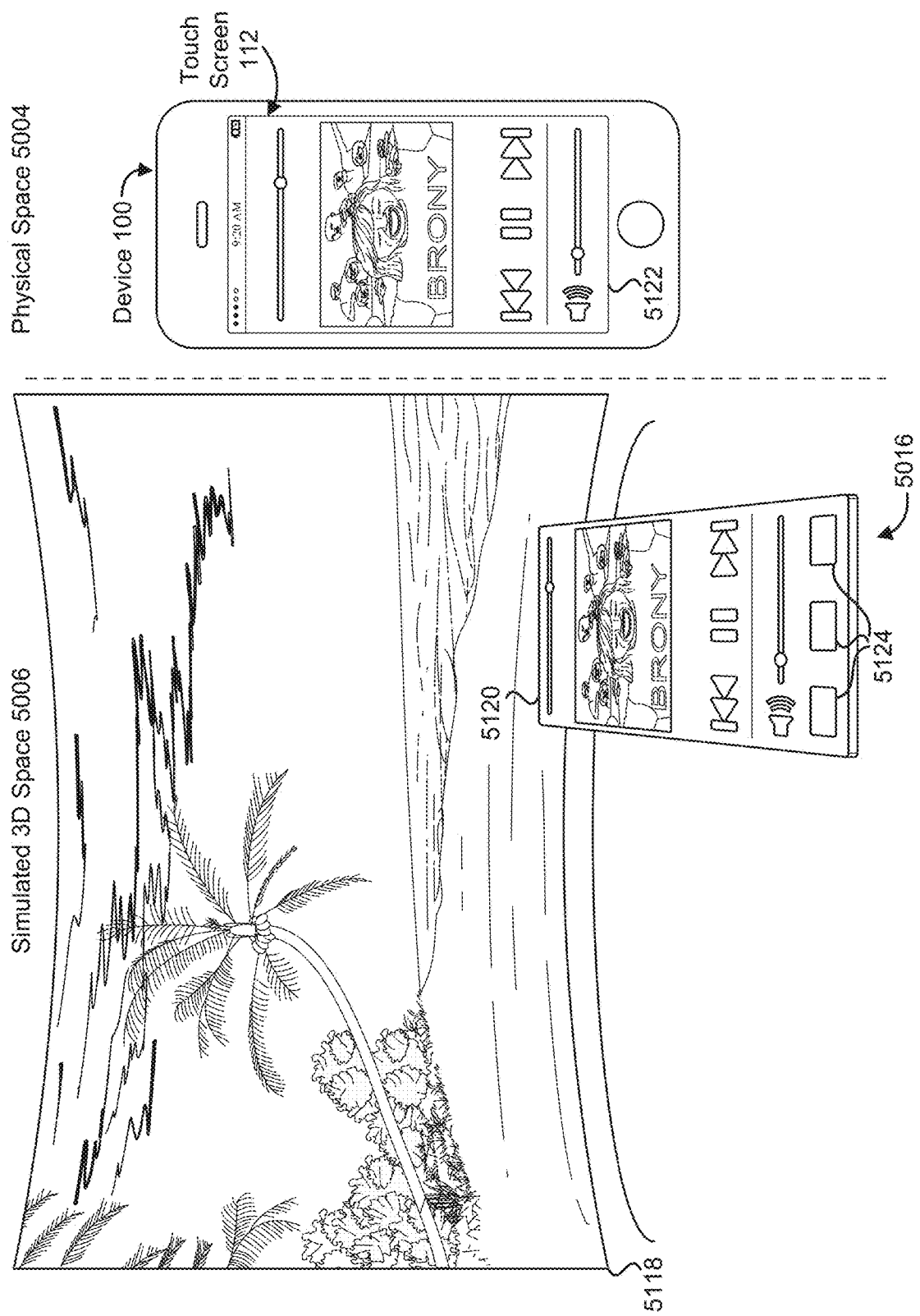
Figure 5A31

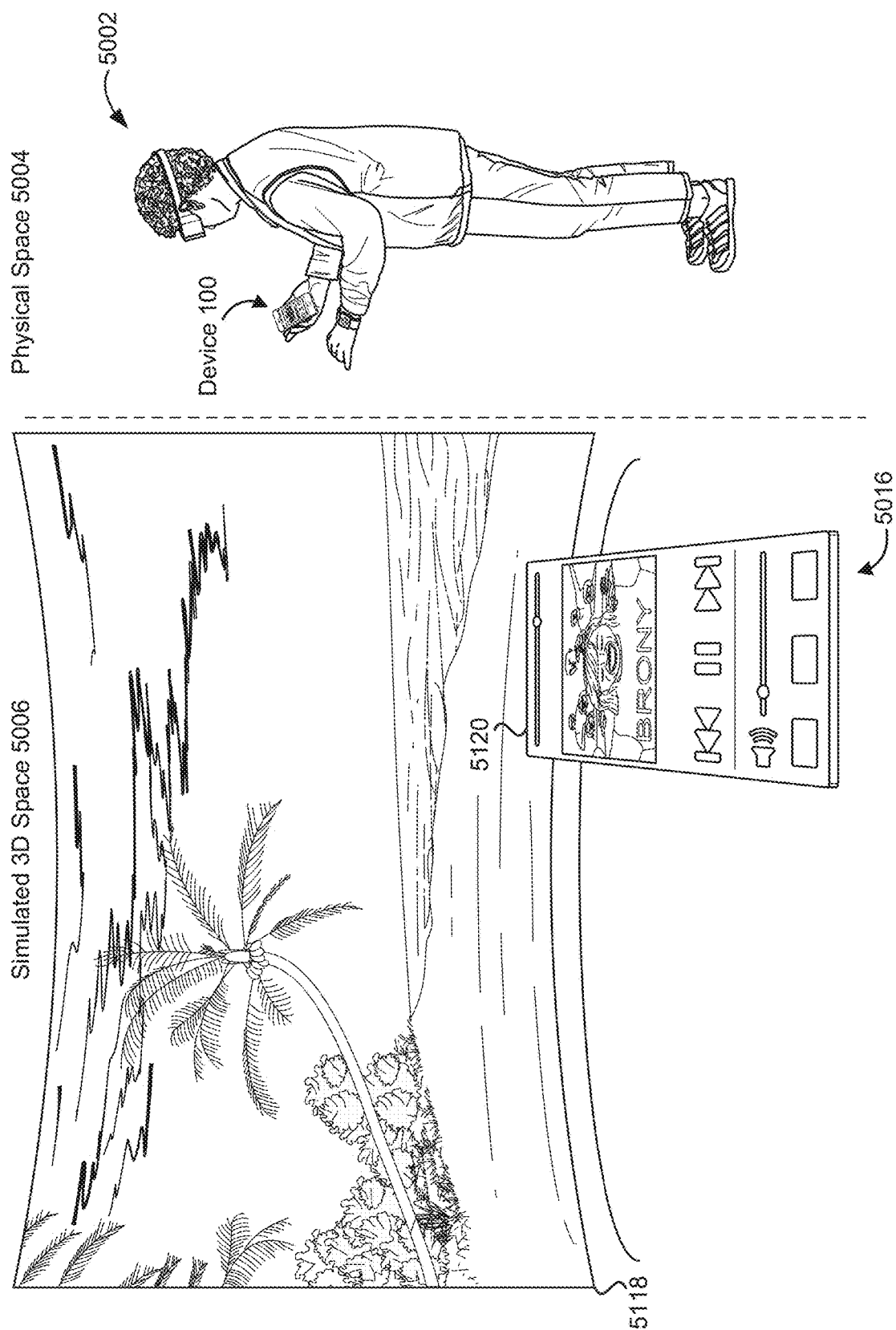
Figure 5A32

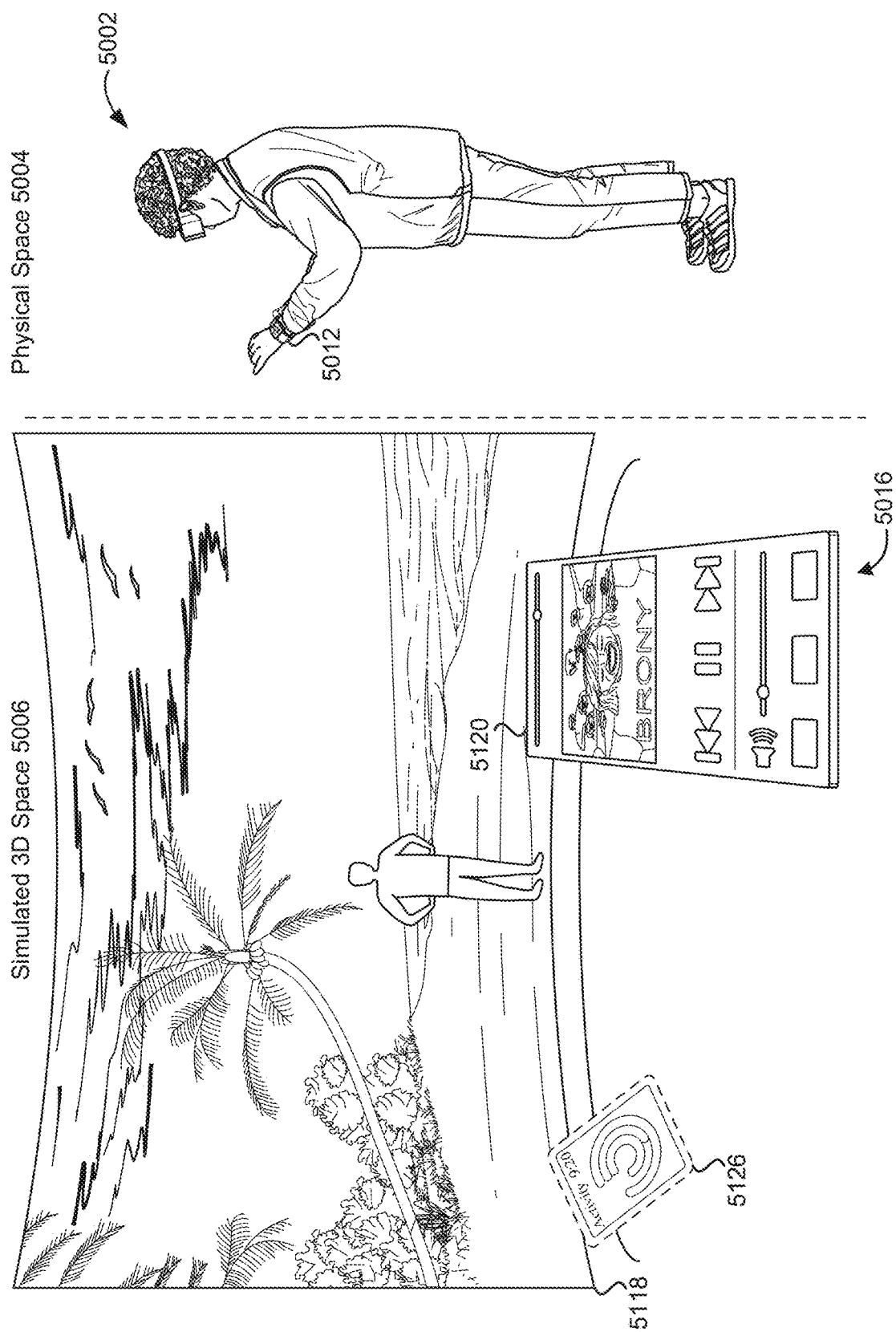
Figure 5A33

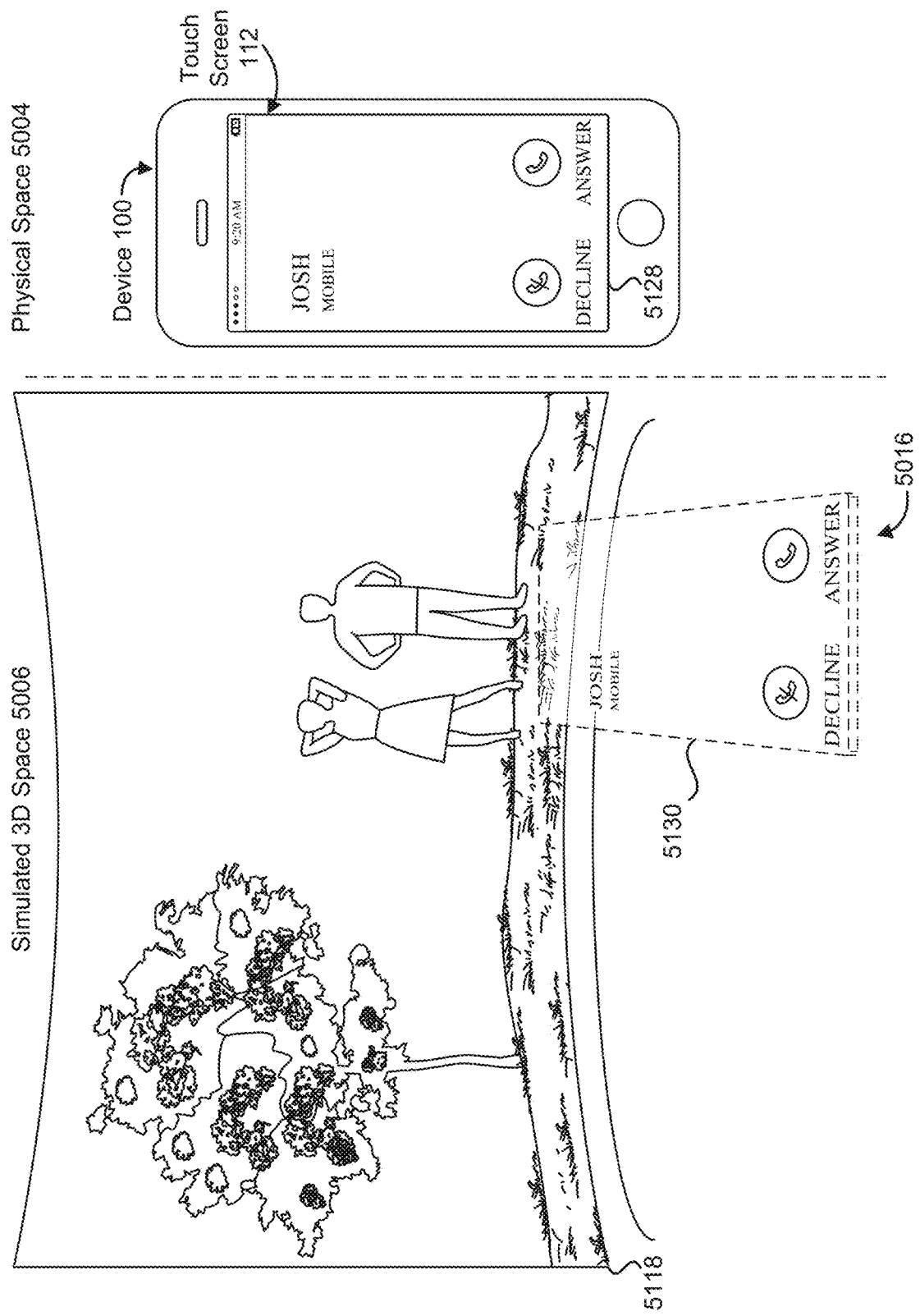
Figure 5A34

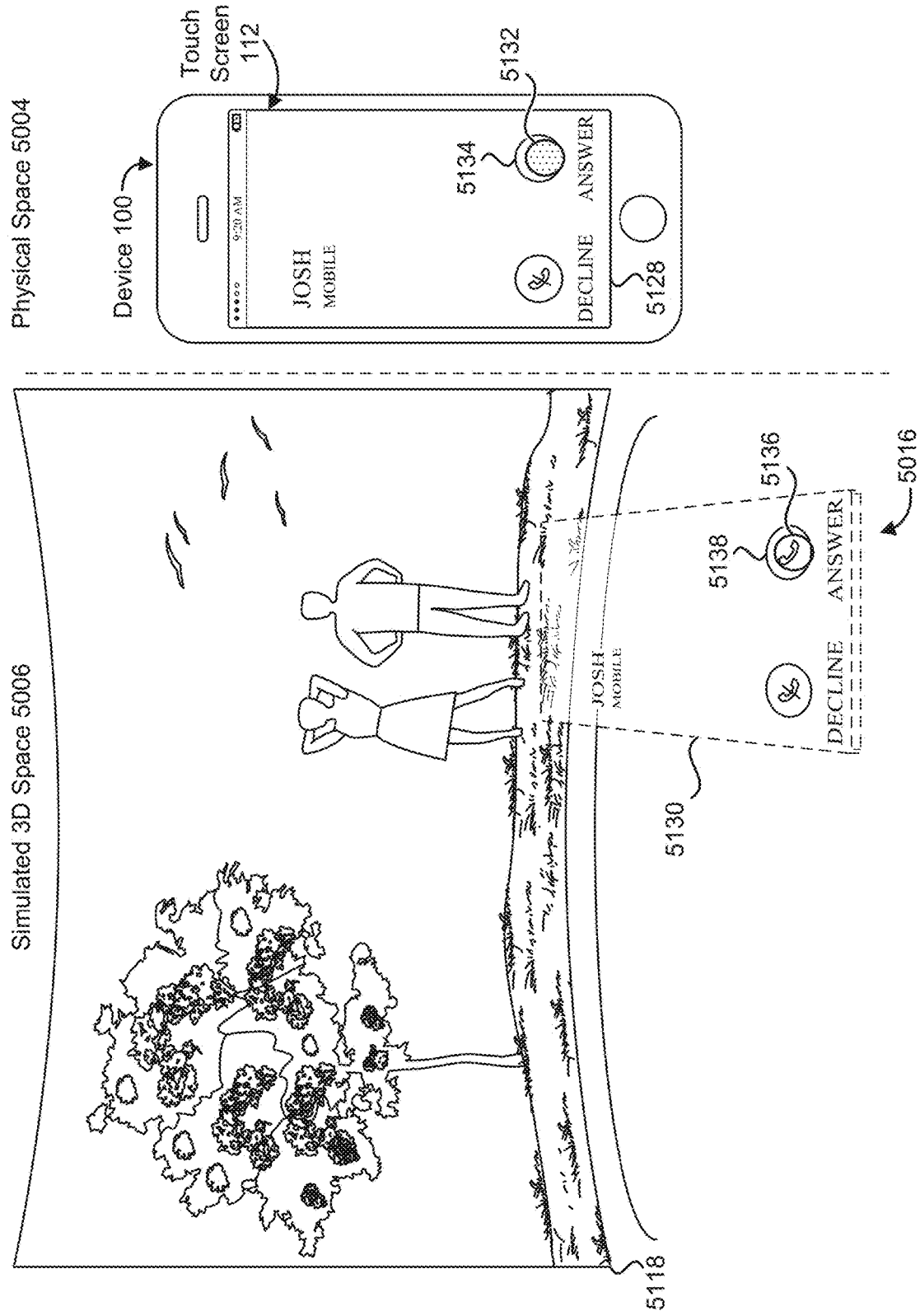
Figure 5A35

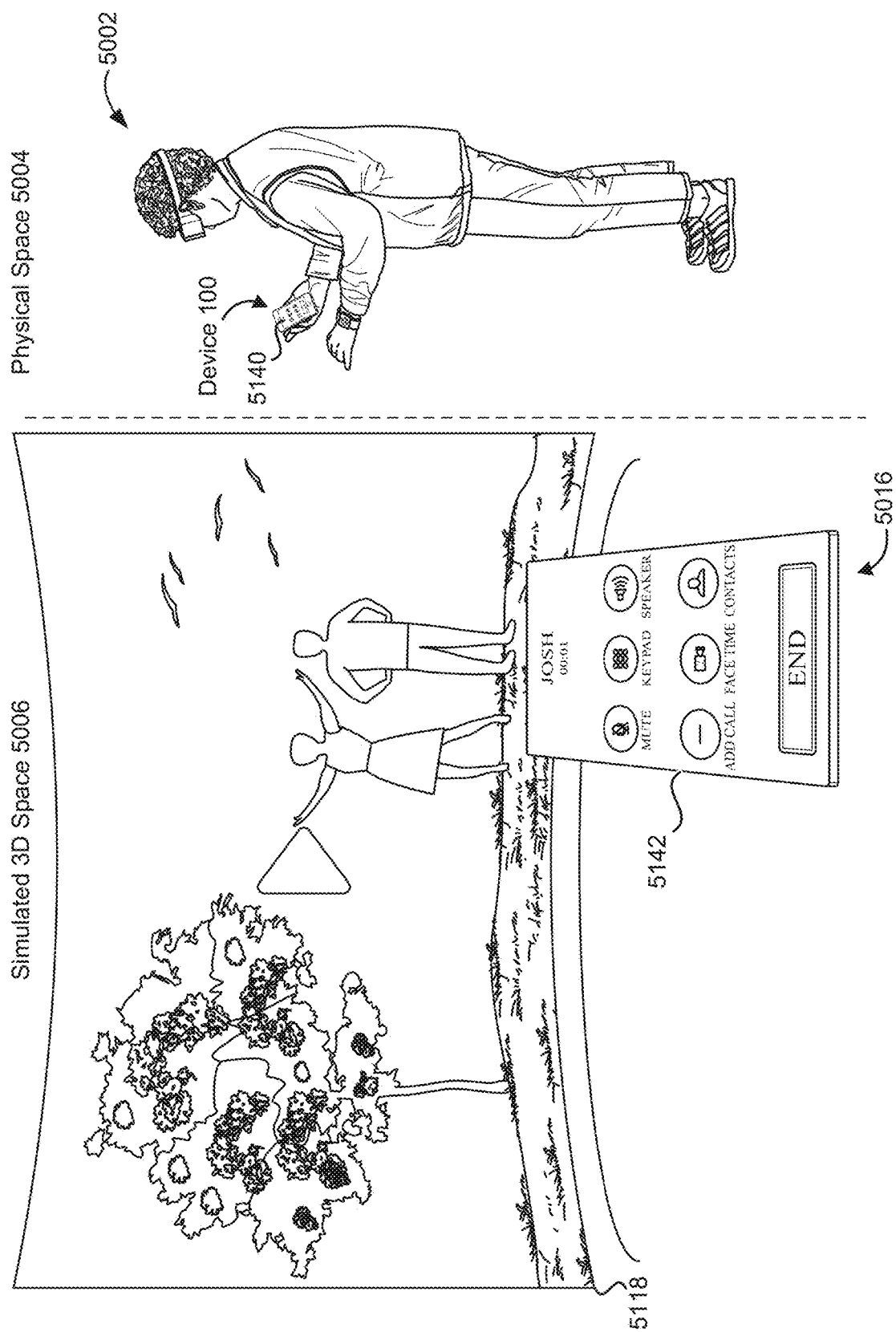
Figure 5A36

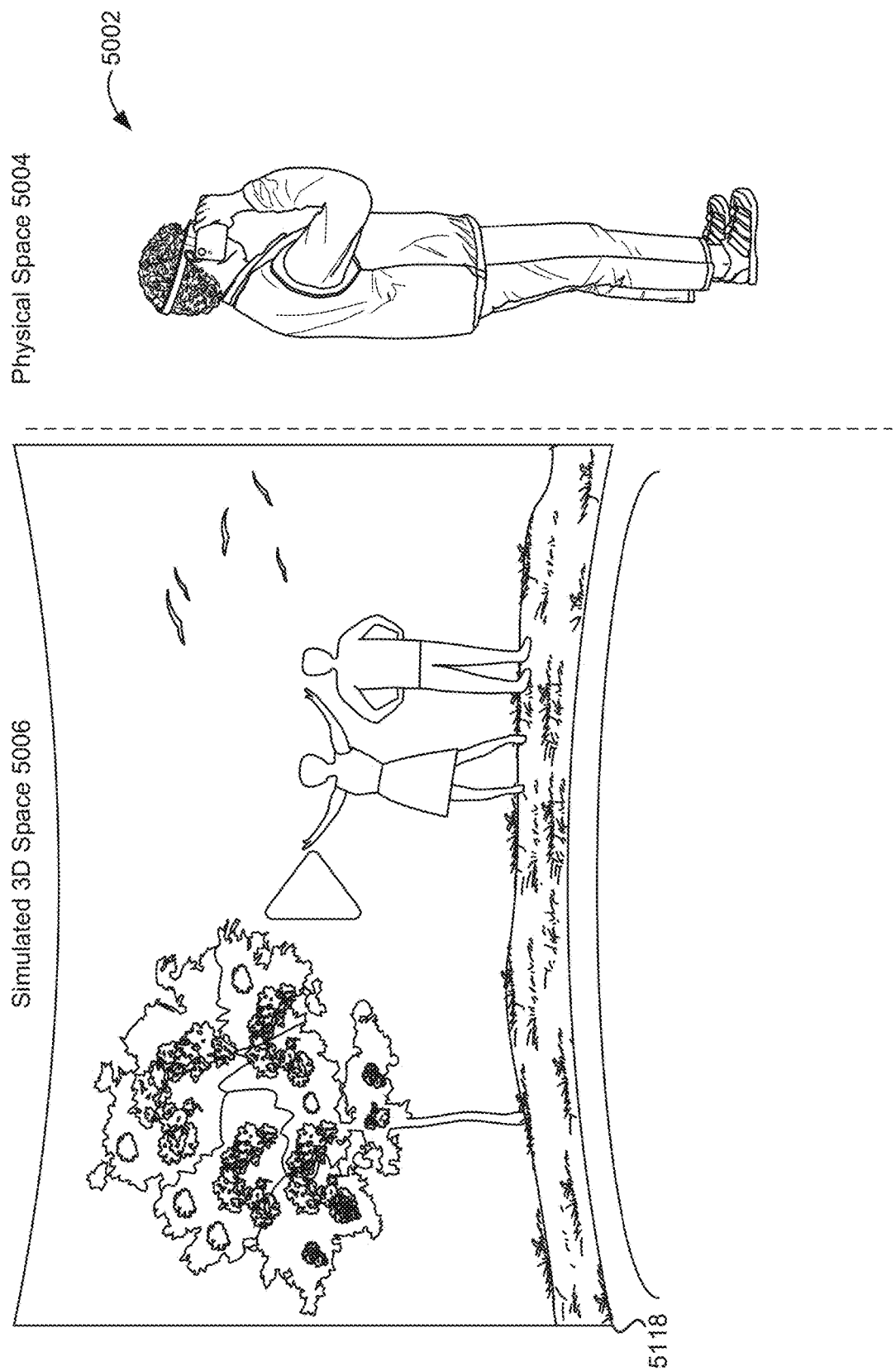
Figure 5A37

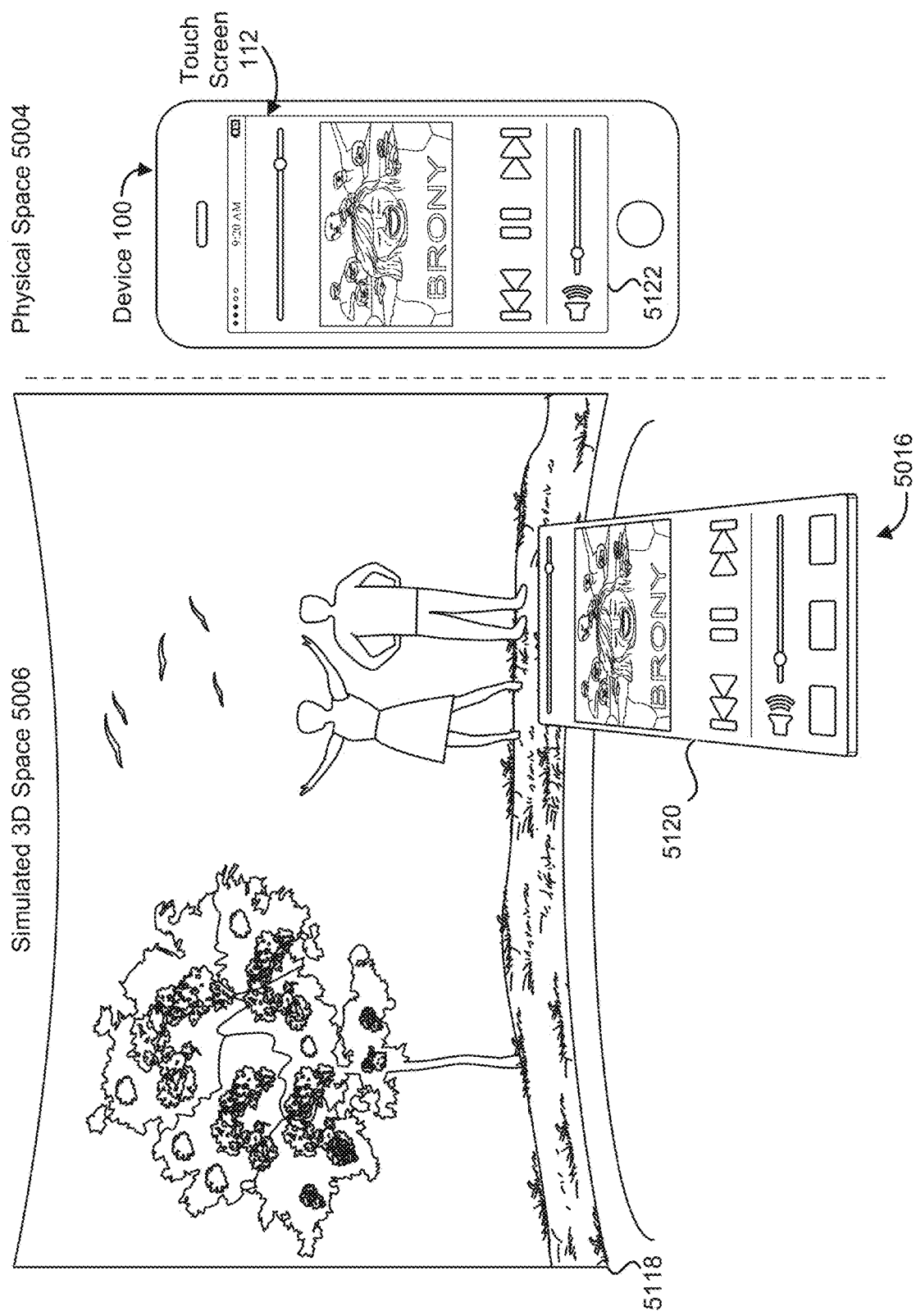
Figure 5A38

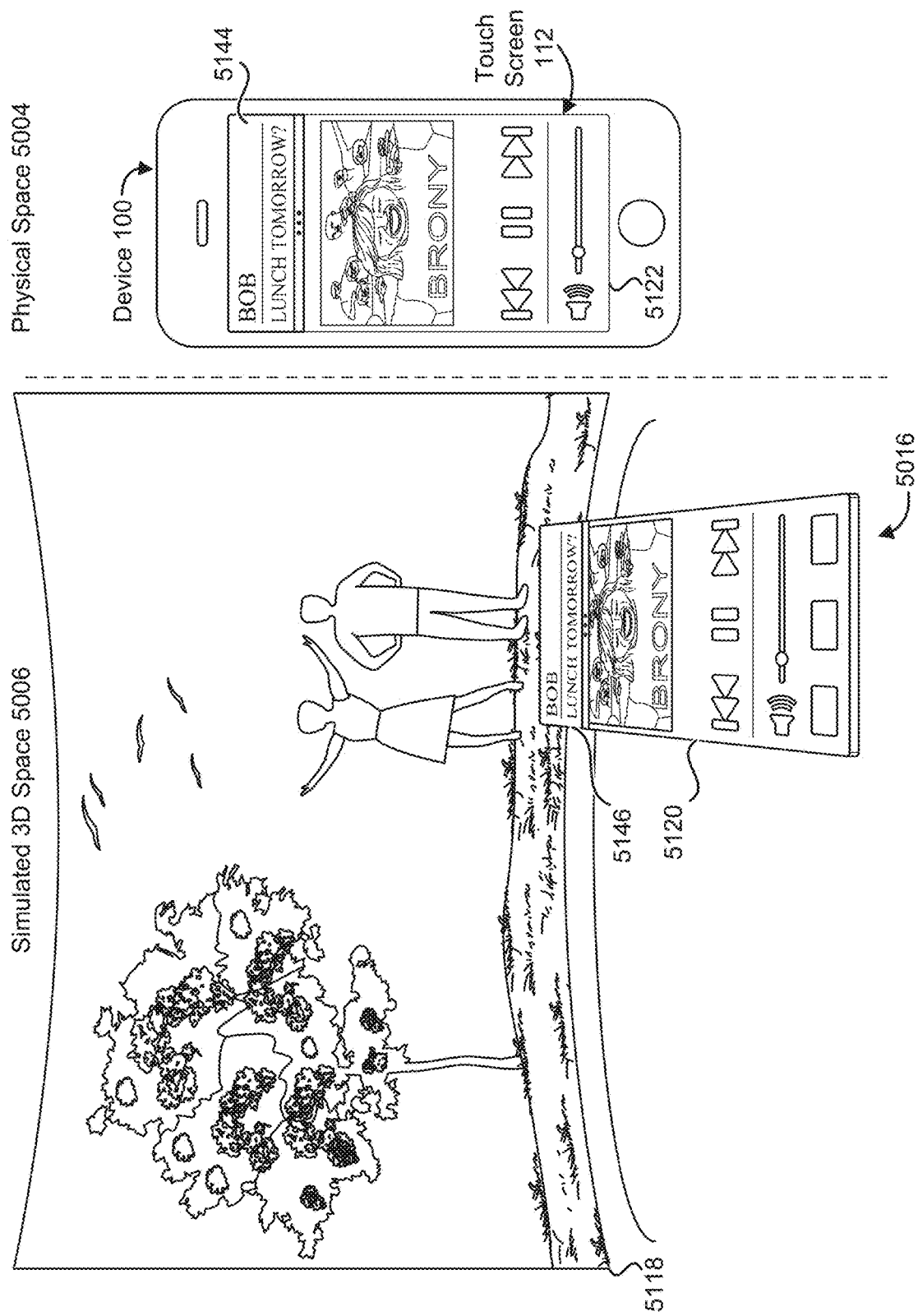
Figure 5A39

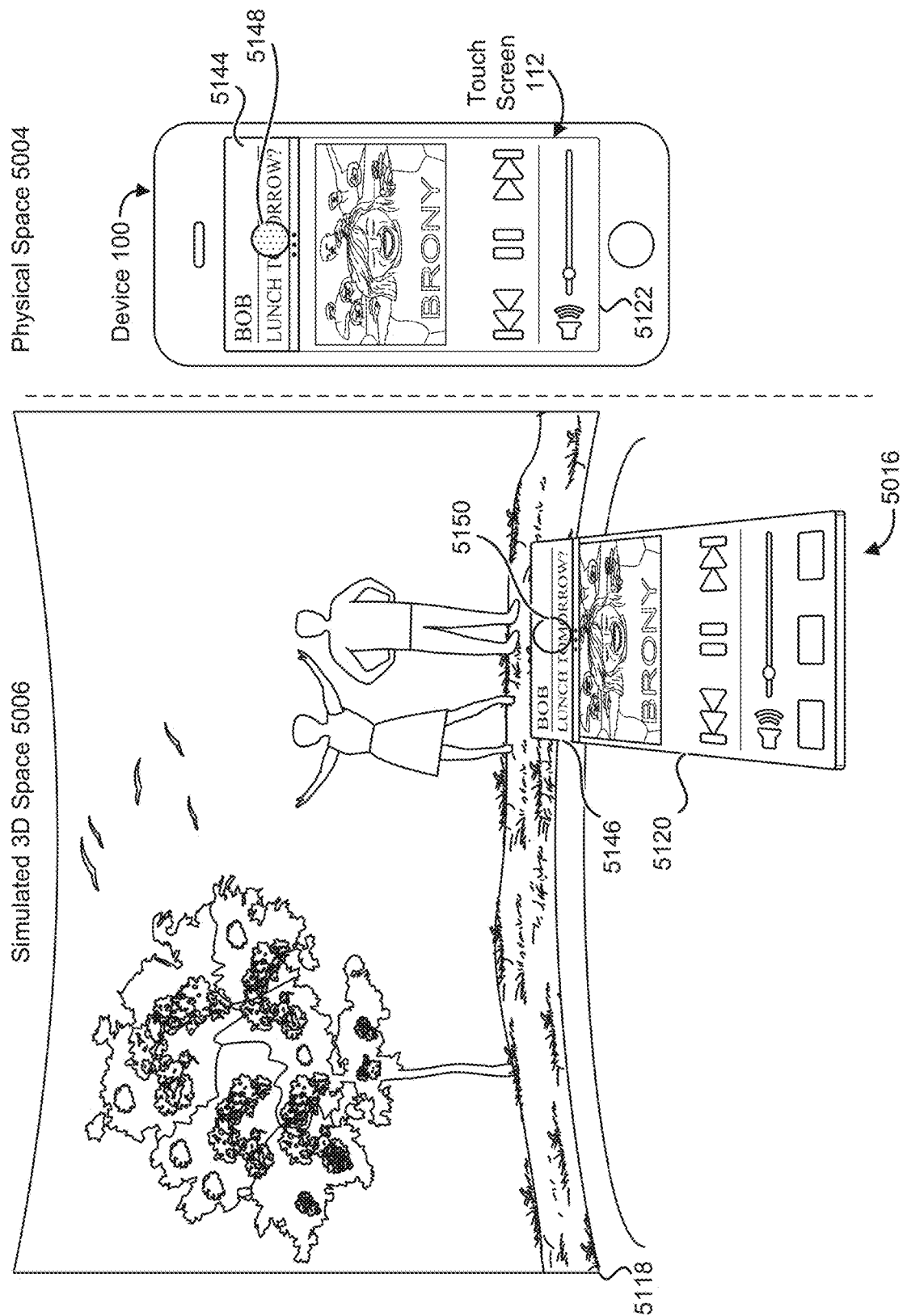
Figure 5A40

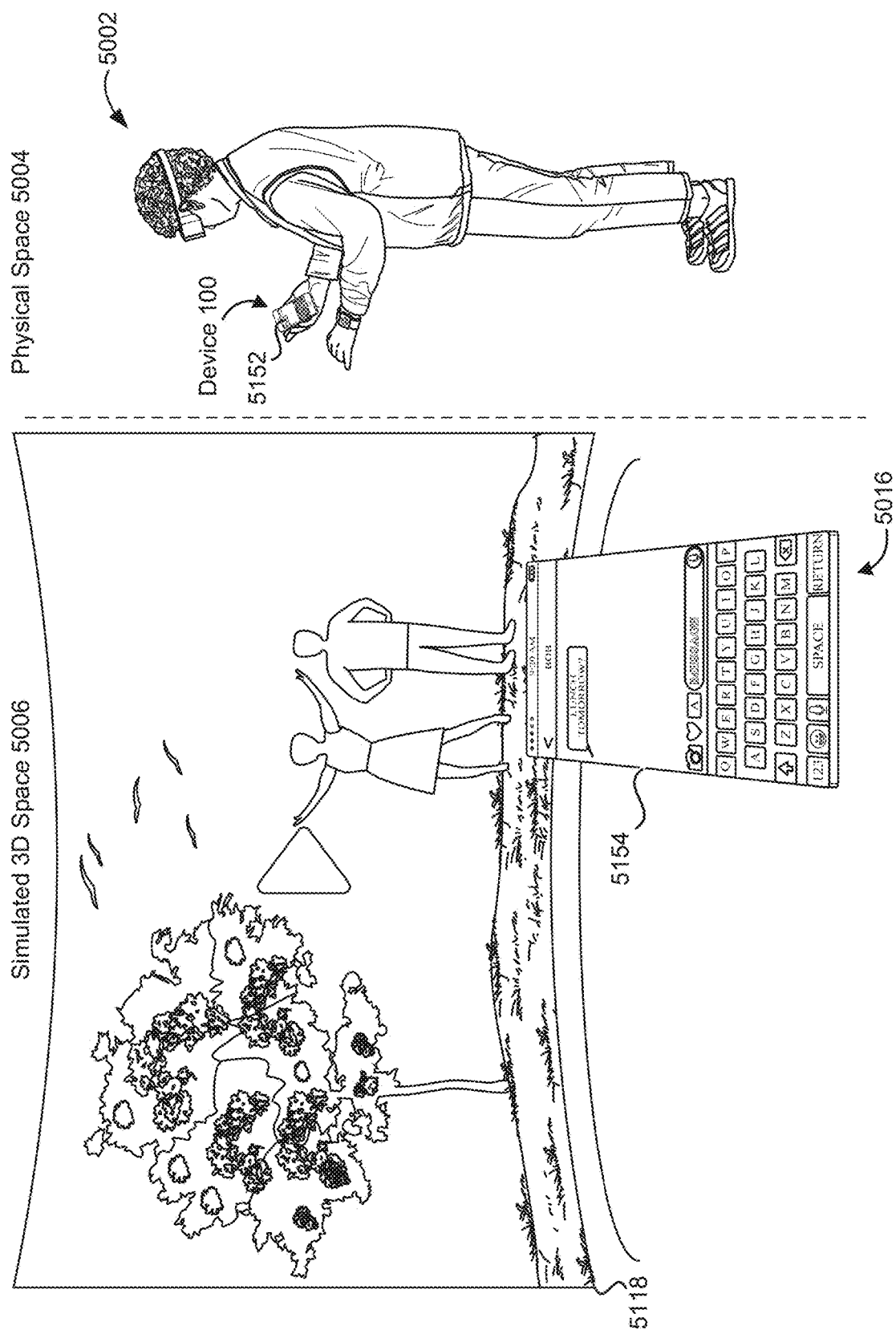
Figure 5A41

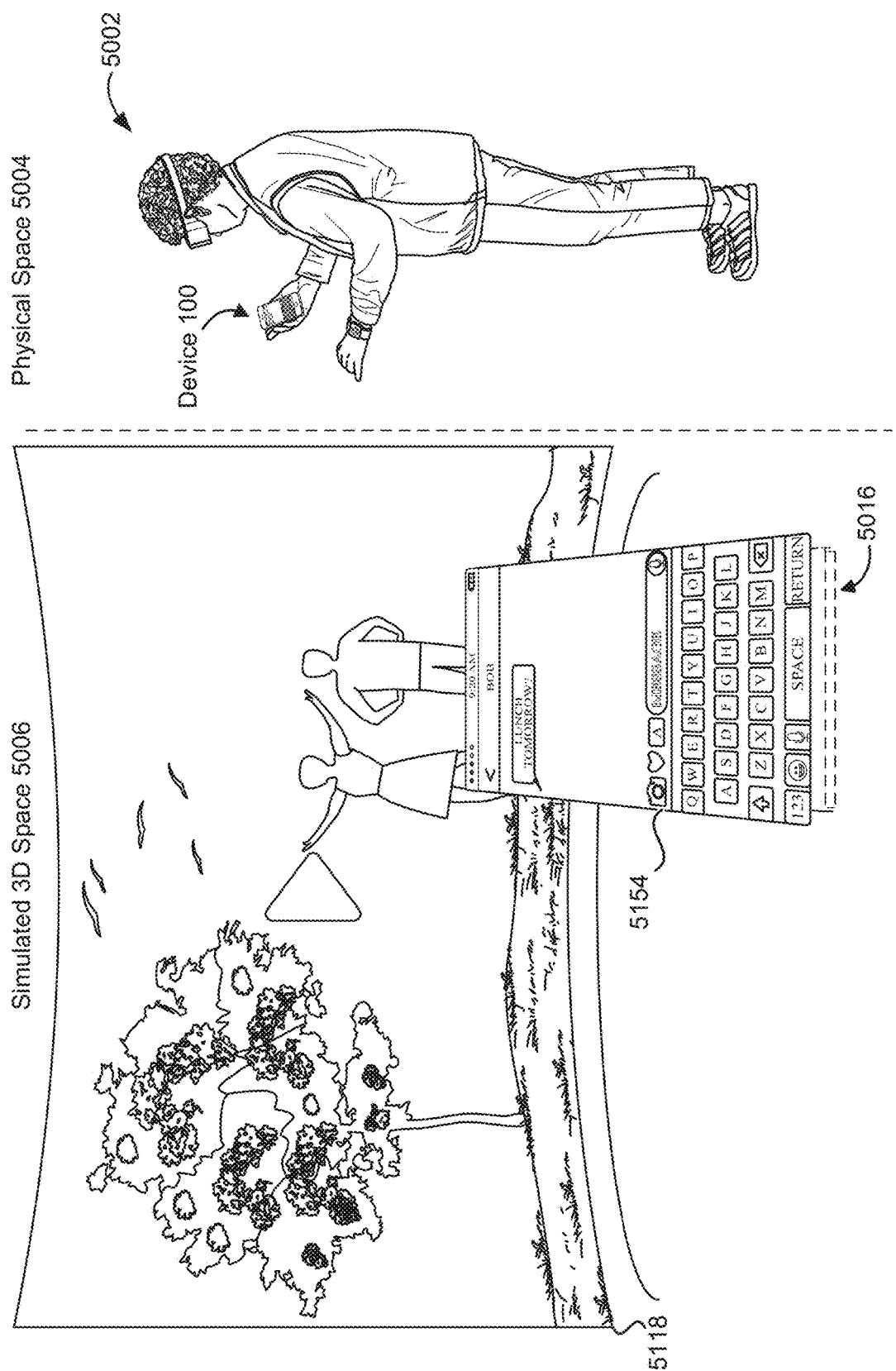
Figure 5A42

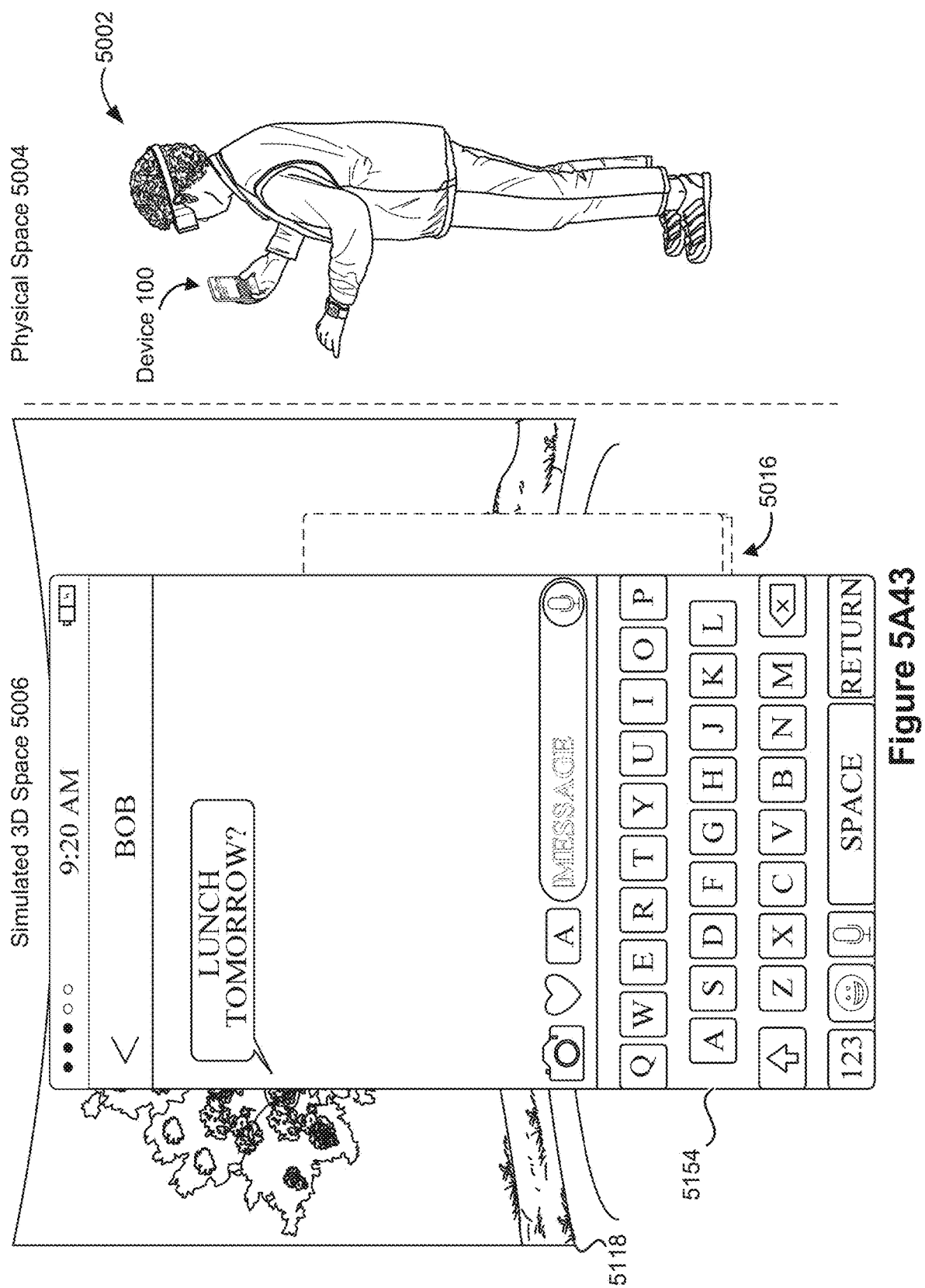
Figure 5A43

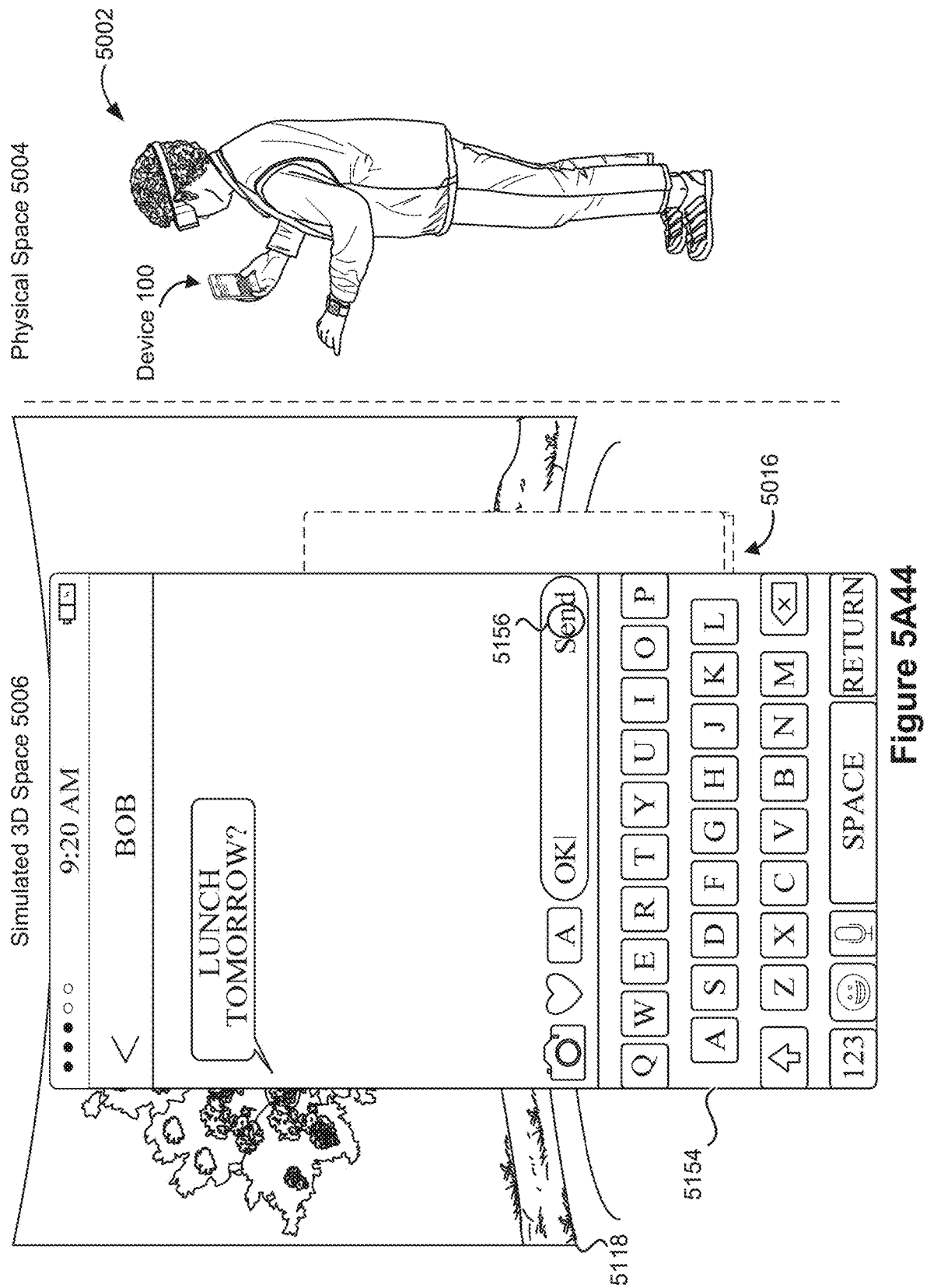
Figure 5A44

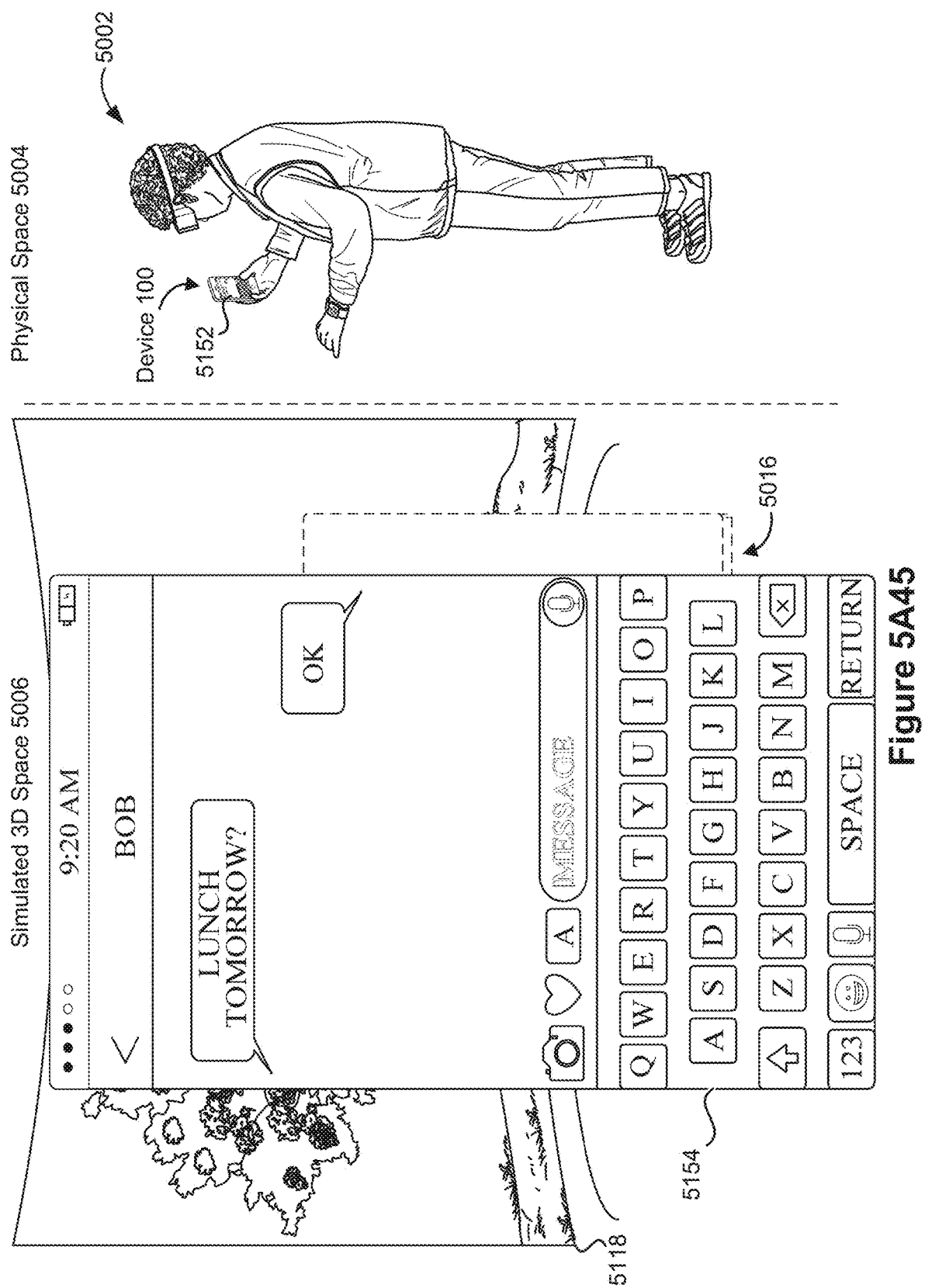
Figure 5A45

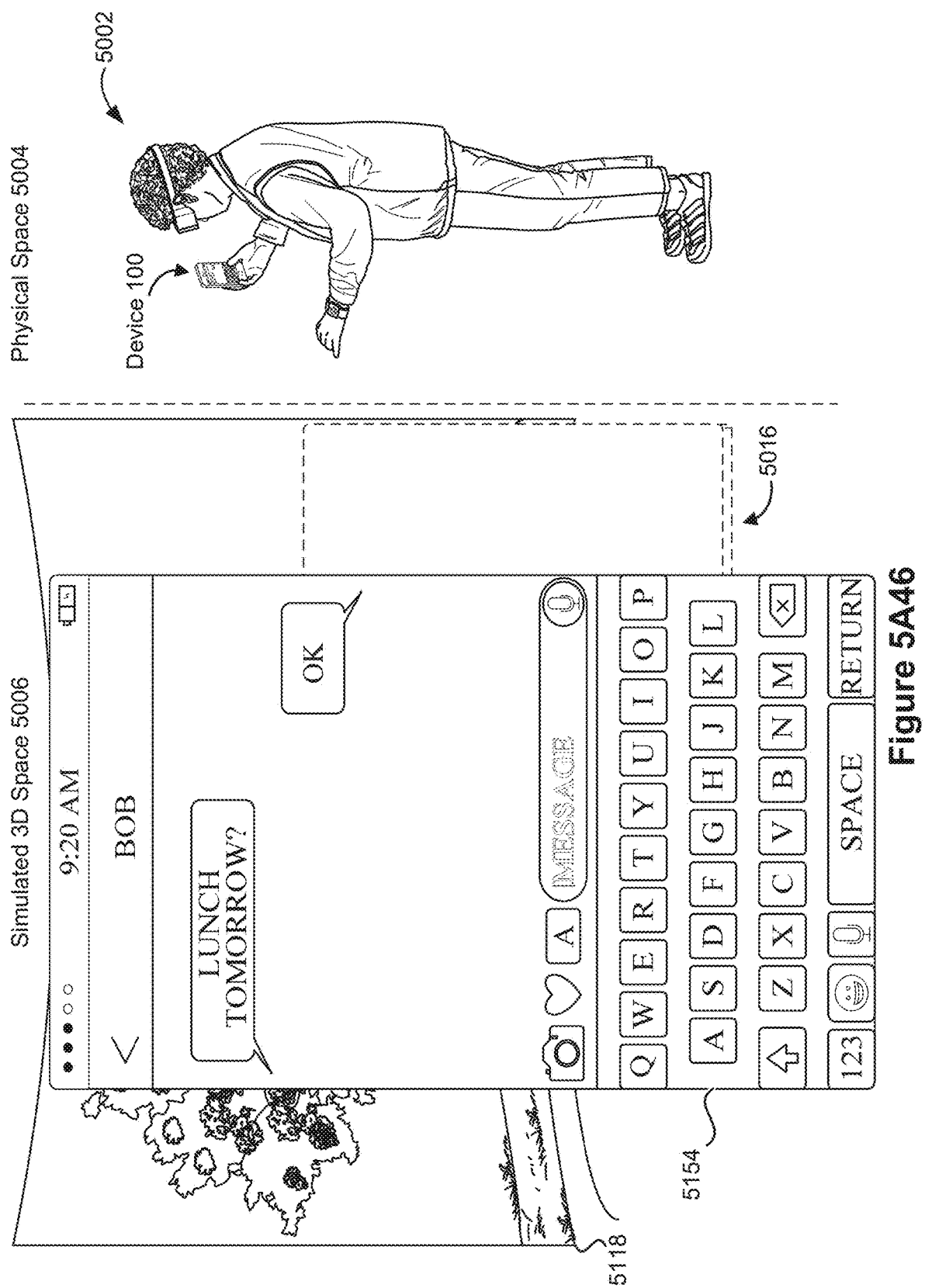
Figure 5A46

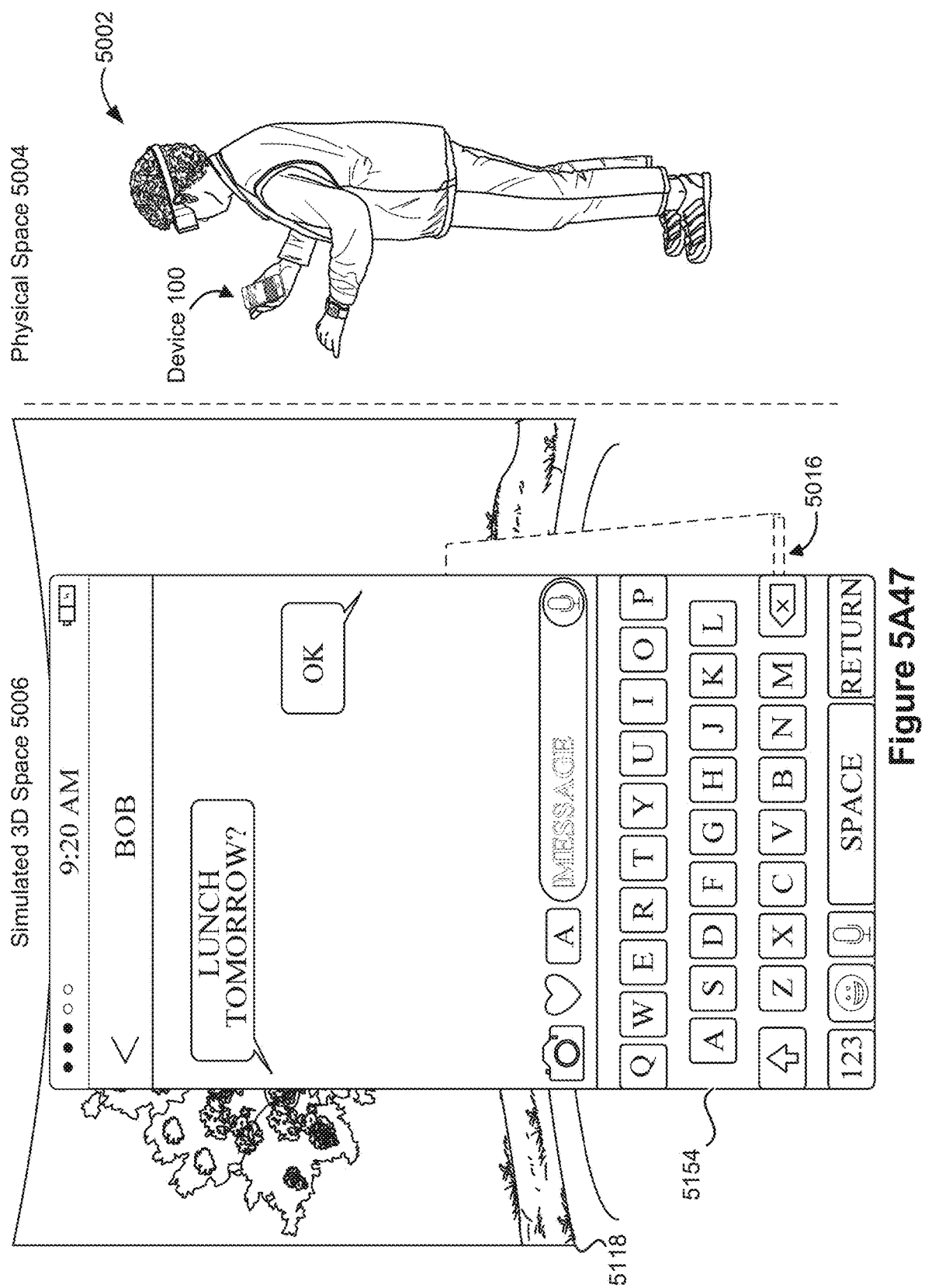
Figure 5A47

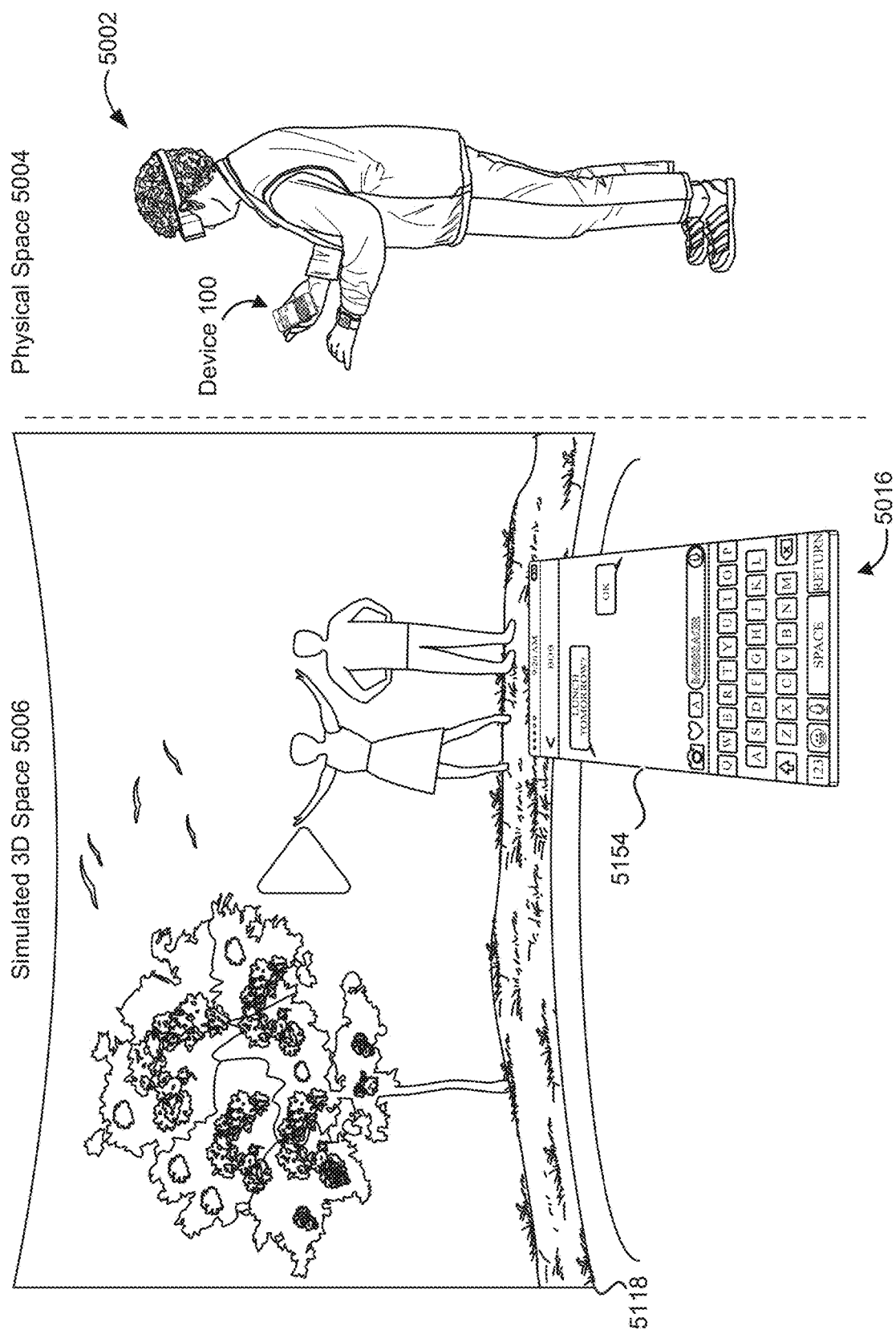
Figure 5A48

608 In response to detecting the touch input on the input device:
   in accordance with a determination that the touch input is detected at the location on the input device that corresponds to the first location in the first user interface,
      update an appearance of the three-dimensional space in a third manner in accordance with the update in appearance made to the first user interface; and
   in accordance with a determination that the touch input is detected at the location on the input device that corresponds to the second location in the first user interface,
      update the appearance of the three-dimensional space in a fourth manner that is different from the third manner, in accordance with the update in appearance made to the first user interface 610 Update, or cause the computing device to update, a second user interface displayed through the non-immersive display environment of the computing device in accordance with the touch input directed to the first location in the first user interface 612 The computing device that has the non-immersive display environment has an internal state that is used to determine the appearance of the first user interface that is displayed on the user interface object 614 Inputs in the first user interface on the user interface object cause one or more changes in the internal state of the computing device that has the non-immersive display environment 616 Changes in the internal state of the computing device that has the non-immersive display environment cause changes in the first user interface on the user interface object 618 The first user interface that is displayed on the user interface object is a simulation of a touch-sensitive user interface on the computing device

Figure 6B

620 Detect a change in the pose of the input device in the physical space surrounding the input device; and
   in response to detecting the change in the pose of the input device in the physical space surrounding the input device, change the pose of the user interface object in the simulated three-dimensional space

---

622 The first display generation component is a virtual reality headset;
   the input device is a handheld computing device that is distinct from the virtual reality headset; and
   the handheld computing device sends the first user interface to the virtual reality headset for display

---

624 The computer system is a handheld computing device; and
   the first display generation component is a touch-screen display of the handheld computing device

---

626 The input device is a touch-sensitive remote control that does not have a display

---

628 While displaying the three-dimensional space in a manner corresponding to a first application:
   detect a second touch input at a location on the input device that corresponds to launching a second application, distinct from the first application, in the first user interface that is included on the surface of the user interface object; and
   in response to detecting the second touch input on the input device:
      display the second application in the first user interface, while maintaining display of the three-dimensional space in a manner corresponding to the first application

---

630 The user interface object is displayed at a location within the simulated three-dimensional space that corresponds to a location of the input device in the user's hand in the physical space

Figure 6C

632 The first user interface that is displayed on the user interface object when the computing device is in a first mode of operation while the user is viewing the simulated three-dimensional environment corresponds to a second user interface that is displayed on the computing device when the computing device is in the first mode of operation 634 The first user interface that is displayed on the user interface object includes additional depth compared to the second user interface displayed through the non-immersive display environment of the computing device 636 Detect an activation of a button of the input device; and
in response to detecting the activation of the button of the input device, update the appearance of the first user interface that is displayed on the user interface object in accordance with the activation of the button 638 Display a first view of at least a portion of the simulated three-dimensional space, wherein the first view is associated with a third application;
detect a second touch input on the input device, wherein the second touch input launches a fourth application, distinct from the third application; and
in response to detecting the second touch input on the input device, display a second view of at least a portion of the simulated three-dimensional space, distinct from the first view, wherein the second view is associated with the fourth application 640 The first user interface that is displayed on the user interface object extends outside the user interface object 642 The first user interface that is displayed on the user interface object includes additional information about one or more of the user interface objects in the simulated three-dimensional space

Figure 6D

644 The first user interface that is displayed on the user interface object corresponds to a respective application, and the method further includes:

in accordance with a determination that the respective application includes instructions for displaying one or more three-dimensional objects in the simulated three-dimensional space, updating an appearance of the three-dimensional space in accordance with the instructions from the respective application; and in accordance with a determination that the respective application does not include instructions for displaying a simulated three-dimensional environment, displaying the simulated three-dimensional space includes displaying at least a portion of a two-dimensional user interface for the respective application that is adapted for display in the non-immersive display environment of the computing device along with one or more other user interface objects generated based on information from the respective application

---

646 Receive an indication that an event has occurred that corresponds to generation of a notification at the computing device; and in response to receiving the indication, display a representation of the notification on the first user interface that is displayed on the user interface object

Figure 6E

710 In response to detecting the movement input via the input device:
in accordance with a determination that the movement of the input device meets first pose criteria that require the pose of the input device to enter a third range of poses distinct from the first range of poses as a result of the movement, display the first user interface in the simulated three-dimensional space at a location away from the user interface object 712 The user interface object is a first user interface object, and the method includes:
displaying, via at least the first display generation component, a second user interface object that is located within the simulated three-dimensional space, wherein the second user interface object is distinct from the first user interface object, and performing the respective operation within the simulated three-dimensional space includes displaying an indication that the second user interface object is in focus; and
in accordance with a determination that the movement of the input device is detected while the input device meets the first input-mode criteria:
after performing the respective operation, detecting a touch input via the input device; and
in response to detecting the touch input, performing a selection operation with respect to the second user interface object 714 Detect a touch input via the input device that includes detecting one or more contacts;
in response to detecting the touch input via the input device, in accordance with a determination that the touch input is detected while the input device meets the first input-mode criteria, and while the touch input is maintained on the input device, perform the respective operation without regard to whether the input device meets the first input-mode criteria;
detect liftoff of the one or more contacts;
after detecting the liftoff of the one or more contacts, detect a second movement input via the input device that includes subsequent movement of the input device relative to the physical environment surrounding the input device; and
in response to detecting the second movement input via the input device:
in accordance with a determination that the subsequent movement of the input device is detected while the input device meets the first input-mode criteria, perform a second respective operation within the simulated three-dimensional space in accordance with the subsequent movement of the input device, wherein at least a portion of the second respective operation occurs outside of the user interface object; and,
in accordance with a determination that the subsequent movement of the input device is detected while the input device meets the second input-mode criteria, reposition the user interface object in the simulated three-dimensional space in accordance with the subsequent movement of the input device without performing the second respective operation

Figure 7B

716 In response to detecting the movement input via the input device, in accordance with a determination that the movement of the input device is detected while the input device meets the first input-mode criteria, cease to display the first user interface on the user interface object 718 In response to detecting the movement input via the input device, in accordance with a determination that the movement of the input device is detected while the input device meets the first input-mode criteria, display a second user interface on the user interface object 720 The first input-mode criteria further include:
    a second criterion that is satisfied when a distance from the input device to the user's eyes is within a predefined range of distances; and
    a third criterion that is satisfied when a manner in which the user holds the input device satisfies predefined criteria 722 In accordance with a determination that the movement of the input device is detected while the input device meets the first input-mode criteria, the user interface object is displayed as a pointing device; and
    in accordance with a determination that the movement of the input device is detected while the input device meets the second input-mode criteria, the user interface object is displayed as a simulation of a non-immersive display environment

Figure 7C

810 Adjusting the currently displayed portion of the first user interface on the first user interface object in accordance with the touch gesture includes laterally shifting the first user interface; and
    updating the view of the second user interface object in the simulated three-dimensional space in accordance with the adjusting of the first user interface on the first user interface object includes traversing a path between a first position and a second position on a spherical surface in the simulated three-dimensional space, wherein the first position corresponds to the first user interface, and the second position corresponds to the laterally shifted first user interface 812 The first user interface includes a two-dimensional view of content;
    adjusting the currently displayed portion of the first user interface on the first user interface object in accordance with the touch gesture includes traversing the two-dimensional view of the content; and
    updating the view of the second user interface object in the simulated three-dimensional space in accordance with the adjusting of the first user interface on the first user interface object includes traversing a three-dimensional panoramic view of the content in the simulated three-dimensional space 814 The touch gesture includes a swipe gesture in a first direction;
    adjusting the currently displayed portion of the first user interface on the first user interface object in accordance with the touch gesture includes continuously shifting the first user interface in the first direction on the first user interface object; and
    updating the view of the second user interface object in the simulated three-dimensional space in accordance with the adjusting of the first user interface on the first user interface object includes continuously updating the view of the second user interface object in accordance with the continuous shifting of the first user interface in the first direction 816 The touch gesture includes a depinch gesture;
    adjusting the currently displayed portion of the first user interface on the first user interface object in accordance with the touch gesture includes displaying additional details of at least a sub-portion of the currently displayed portion of the first user interface; and
    updating the view of the second user interface object in the simulated three-dimensional space in accordance with the adjusting of the first user interface on the first user interface object includes displaying additional details of the displayed view of the second user interface object that correspond to the additional details of at least the sub-portion of the currently displayed portion of the first user interface

Figure 8B

818 The first user interface displayed on the first user interface object includes a map user interface that includes map content, and the second user interface object is a three-dimensional representation of map content shown in at least a portion of the map user interface 820 The first user interface displayed on the first user interface object includes a multimedia user interface that includes one or more multimedia items, and the second user interface object is a three-dimensional representation of one or more of the multimedia items shown in the multimedia user interface

Figure 8C

912 In response to detecting the hover input via the input device, display a representation of the input object in the view of the simulated three-dimensional space at a second hover location above the first user interface object that corresponds to the hover location of the input object above the input element of the input device 914 Displaying the focus indicator with the second appearance on the first user interface object includes displaying the focus indicator as a translucent contact point on the first user interface object; and
    at least a portion of the first user interface that is at a location of the focus indicator is at least partly visible through the focus indicator 916 The first user interface is a representation of a respective user interface of a respective device that is represented by the first user interface object;
    the respective device is capable of detecting hover inputs; and
    the respective device does not display representations of hover inputs in the respective user interface when hover inputs are detected while the respective device is displaying the respective user interface 918 While displaying the focus indicator with the first appearance at the hover location above the first user interface object, detect a touch input at a location on the input device that corresponds to a first location in the first user interface; and
    in response to detecting the touch input on the input device, activate an element of the first user interface located at the first location 920 Detecting a change in intensity of the contact between the input object and the input element; and
    in response to the detecting the change in intensity of the contact between the input object and the input element, displaying the focus indicator with a third appearance that is distinct from the first appearance and distinct from the second appearance

Figure 9B

1010 Displaying the first user interface in the simulated three-dimensional space at a location away from the user interface object includes increasing a scale of the first user interface, wherein a rate of change in the scale of the first user interface with respect to time is greater than a rate of change in the pose of the input device with respect to time 1012 Displaying the first user interface in the simulated three-dimensional space at a location away from the user interface object includes:
    increasing a scale of the first user interface; and
    displaying the first user interface with increased scale at a predefined location in the simulated three-dimensional space 1014 Displaying the first user interface in the simulated three-dimensional space at a location away from the user interface object includes increasing a scale of the first user interface, and the method includes, after displaying the first user interface in the simulated three-dimensional space at the location away from the user interface object:
    detecting a second movement input via the input device; and
    in response to detecting the second movement input:
        in accordance with a determination that the second movement input corresponds to a movement of the input device relative to the physical environment surrounding the input device, and that the movement of the input device meets second pose criteria that require the pose of the input device to decrease as a result of the movement, decreasing the scale of the first user interface 1016 The first pose criteria requiring a parameter of change in the pose of the input device to meet a set of one or more thresholds includes the first pose criteria requiring a pose of the input device to enter a first pose range, and the second pose criteria require the pose of the input device to leave a second pose range that encompasses a greater range of poses in at least one direction than the first pose range

Figure 10B

1018 After displaying the first user interface in the simulated three-dimensional space at the location away from the user interface object:
   detect a third movement input via the input device; and
   in response to detecting the third movement input:
      in accordance with a determination that the third movement input corresponds to a movement of the input device relative to the physical environment surrounding the input device, and that the movement of the input device meets third pose criteria that require the pose of the input device to move outside of the first pose range as a result of the movement, redisplay the first user interface at a pose that corresponds to a pose of the user interface object 1020 While the first user interface is displayed at a pose that corresponds to the pose of the user interface object, the first user interface is responsive to touch inputs from a user on the input device 1022 While the user interface is displayed at the location away from the user interface object, the first user interface is responsive to touch inputs from a user on the input device 1024 Detect a touch input on the input device that includes a drag gesture, and, in response to detecting the touch input that includes the drag gesture, scroll at least a portion of the first user interface 1026 Detect a touch input that includes a tap gesture corresponding to a respective user interface object in the first user interface, and, in response to detecting the touch input that includes the tap gesture, perform an operation associated with the respective user interface object in the first user interface

Figure 10C

SYSTEMS, METHODS, AND GRAPHICAL USER INTERFACES FOR INTERACTING WITH VIRTUAL REALITY ENVIRONMENTS

RELATED APPLICATIONS

This application claims priority to U.S. Provisional Patent Application 62/565,636, filed Sep. 29, 2017, which is hereby incorporated by reference in its entirety.

TECHNICAL FIELD

This relates generally to computer systems for virtual/augmented reality, including but not limited to electronic devices for displaying and interacting with virtual reality environments.

BACKGROUND

The development of computer systems for virtual/augmented reality has increased significantly in recent years. Example virtual/augmented reality environments include at least some virtual elements that replace or augment the physical world. Input devices, such as touch-sensitive surfaces, for computer systems and other electronic computing devices are used to interact with virtual/augmented reality environments. Example touch-sensitive surfaces include touchpads, touch-sensitive remote controls, and touch-screen displays. Such surfaces are used to manipulate user interfaces and objects therein on a display. Example user interface objects include digital images, video, text, icons, and control elements such as buttons and other graphics.

But methods and interfaces for interacting with environments that include at least some virtual elements (e.g., augmented reality environments, mixed reality environments, and virtual reality environments) are cumbersome, inefficient, and limited. For example, using a sequence of inputs to select one or more user interface objects (e.g., one or more virtual elements in the virtual/augmented reality environment) and perform one or more actions on the selected user interface objects is tedious, creates a significant cognitive burden on a user, and detracts from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for displaying and interacting with virtual reality environments. Such methods and interfaces optionally complement or replace conventional methods for displaying and interacting with virtual reality environments. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for virtual/augmented reality are reduced or eliminated by the disclosed computer systems. In some embodiments, the computer system includes a desktop computer. In some embodiments, the computer system is portable (e.g., a notebook computer, tablet computer, or handheld device). In some embodiments, the computer system includes a personal electronic device (e.g., a wearable electronic device, such as a watch). In some embodiments, the computer system has (and/or is in communication with) a touchpad. In some embodiments, the computer system has (and/or is in communication with) a touch-sensitive display (also known as a "touch screen" or "touch-screen display"). In some embodiments, the computer system has a graphical user interface (GUI), one or more processors, memory and one or more modules, programs or sets of instructions stored in the memory for performing multiple functions. In some embodiments, the user interacts with the GUI in part through stylus and/or finger contacts and gestures on the touch-sensitive surface. In some embodiments, the functions optionally include game playing, image editing, drawing, presenting, word processing, spreadsheet making, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at a computer system having one or more display generation components, an input device, and one or more pose sensors for detecting respective poses of one or more of the input device and display generation components. The method includes displaying, via at least a first display generation component of the one or more display generation components: a view of at least a portion of a simulated three-dimensional space; and a view of a user interface object that is located within the simulated three-dimensional space. The user interface object is a representation of a computing device that has a non-immersive display environment that provides access to a plurality of different applications; the user interface object includes a first user interface that corresponds to the non-immersive display environment of the computing device and is responsive to touch inputs from a user on the input device; and a pose of the user interface object in the simulated three-dimensional space corresponds to a pose of the input device in a physical space surrounding the input device. The method also includes detecting a touch input at a location on the input device that corresponds to a respective location in the first user interface. The method further includes, in response to detecting the touch input on the input device: in accordance with a determination that the touch input is detected at a location on the input device that corresponds to a first location in the first user interface, updating an appearance of the first user interface that is displayed on the user interface object in a first manner; and in accordance with a determination that the touch input is detected at a location on the input device that corresponds to a second location in the first user interface, updating the appearance of the first user interface that is displayed on the user interface object in a second manner that is different from the first manner.

In accordance with some embodiments, a method is performed at a computer system having one or more display generation components, an input device, and one or more pose sensors for detecting respective poses of one or more of the input device and display generation components. The method includes displaying, via at least a first display generation component of the one or more display generation components: a view of at least a portion of a simulated three-dimensional space; and a view of a user interface object that is located within the simulated three-dimensional space. The user interface object includes a first user interface that is responsive to touch inputs on the input device, and a pose of the user interface object in the simulated three-dimensional space corresponds to a pose of the input device in a physical space surrounding the input device. The method also includes detecting a movement input via the input device that includes movement of the input device relative to a physical environment surrounding the input device. The method further includes, in response to detecting the movement input via the input device: in accordance with a determination that the movement of the input device is detected while the input device meets first input-mode criteria that include a first criterion that is satisfied when a pose of the input device is within a first range of poses, performing a respective operation within the simulated three-dimensional space in accordance with the movement of the input device, wherein at least a portion of the respective operation occurs outside of the user interface object; and, in accordance with a determination that the movement of the input device is detected while the input device meets second input-mode criteria that require a pose of the input device to be within a second range of poses distinct from the first range of poses, repositioning the user interface object in the simulated three-dimensional space in accordance with the movement of the input device without performing the respective operation.

In accordance with some embodiments, a method is performed at a computer system having one or more display generation components and an input device with a touch-sensitive surface. The method includes displaying, via at least a first display generation component of the one or more display generation components: a view of at least a portion of a simulated three-dimensional space; a view of a first user interface object that is located within the simulated three-dimensional space, wherein the first user interface object includes a view of a first user interface; and a view of a second user interface object that is a three-dimensional representation of content shown in at least a portion of the first user interface. The method also includes detecting a touch gesture via the input device, including detecting one or more contacts on the touch-sensitive surface of the input device and detecting movement of the one or more contacts across the touch-sensitive surface of the input device. The method further includes, in response to detecting the touch gesture via the input device: adjusting a currently displayed portion of the first user interface on the first user interface object in accordance with the touch gesture; and updating the view of the second user interface object in the simulated three-dimensional space in accordance with the adjusting of the first user interface on the first user interface object.

In accordance with some embodiments, a method is performed at a computer system having one or more display generation components, and an input device with an input element that includes first sensors for detecting contact with the input element and second sensors for detecting proximity of an input object above the input element. The method includes displaying, via at least a first display generation component of the one or more display generation components: a view of at least a portion of a simulated three-dimensional space; and a view of a first user interface object that is located within the simulated three-dimensional space, and that includes a first user interface. The method also includes detecting a hover input via the input device, including detecting an input object above the input element of the input device while the input object is not touching the input element, wherein proximity of the input object to the input element meets first proximity criteria; and, in response to detecting the hover input via the input device, displaying a focus indicator with a first appearance at a hover location above the first user interface object that corresponds to a hover location of the input object above the input element of the input device. The method further includes, while displaying the focus indicator with the first appearance at the hover location above the first user interface object, detecting a contact between the input object and the input element; and in response to detecting the contact between the input object and the input element, displaying the focus indicator with a second appearance that is distinct from the first appearance at a location on the first user interface object that corresponds to a contact location of the input object on the input element of the input device.

In accordance with some embodiments, a method is performed at a computer system having one or more display generation components, an input device, and one or more pose sensors for detecting respective poses of one or more of the input device and display generation components. The method includes displaying, via at least a first display generation component of the one or more display generation components: a view of at least a portion of a simulated three-dimensional space; and a view of a user interface object that is located within the simulated three-dimensional space. The user interface object includes a view of a first user interface that is displayed at a pose that corresponds to a pose of the user interface object in the simulated three-dimensional space, and the pose of the user interface object in the simulated three-dimensional space corresponds to a pose of the input device in a physical space surrounding the input device. The method also includes detecting a movement input via the input device. The method further includes, in response to detecting the movement input: in accordance with a determination that the movement input corresponds to a movement of the input device relative to the physical environment surrounding the input device, and that the movement of the input device meets first pose criteria that require that a parameter of change in the pose of the input device meet a set of one or more thresholds as a result of the movement, displaying the first user interface in the simulated three-dimensional space at a location away from the user interface object; and in accordance with a determination that the movement input corresponds to a movement of the input device relative to the physical environment surrounding the input device, and that the movement of the input device does not meet the first pose criteria, updating the pose of the user interface object in the simulated three-dimensional space in accordance with the movement of the input object, while maintaining display of the first user interface at a pose that corresponds to the pose of the user interface object.

In accordance with some embodiments, a computer system includes (and/or is in communication with) a display generation component (e.g., a display, a projector, a heads-up display, or the like), one or more cameras (e.g., video cameras that continuously provide a live view of at least a portion of the contents that are within the field of view of the cameras and optionally generate video outputs including one or more streams of image frames capturing the contents within the field of view of the cameras), and one or more input devices (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), optionally one or more pose sensors, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions which, when executed by a computer system that includes (and/or is in communication with) a display generation component, one or more cameras, one or more input devices, optionally one or more pose sensors, optionally one or more sensors to detect intensities of contacts with the touch-sensitive surface, and optionally one or more tactile output generators, cause the computer system to perform or cause performance of the operations of any of the methods described herein. In accordance with some embodiments, a graphical user interface on a computer system that includes (and/or is in communication with) a display generation component, one or more cameras, one or more input devices, optionally one or more pose sensors, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computer system includes (and/or is in communication with) a display generation component, one or more cameras, one or more input devices, optionally one or more pose sensors, optionally one or more sensors to detect intensities of contacts with the touch-sensitive surface, optionally one or more tactile output generators, and means for performing or causing performance of the operations of any of the methods described herein. In accordance with some embodiments, an information processing apparatus, for use in a computer system that includes (and/or is in communication with) a display generation component, one or more cameras, one or more input devices, optionally one or more pose sensors, optionally one or more sensors to detect intensities of contacts with the touch-sensitive surface, and optionally one or more tactile output generators, includes means for performing or causing performance of the operations of any of the methods described herein.

Thus, computer systems that have (and/or are in communication with) one or more display generation components, one or more input devices, optionally one or more pose sensors, optionally one or more sensors to detect intensities of contacts with the touch-sensitive surface, optionally one or more cameras, and optionally one or more tactile output generators, are provided with improved methods and interfaces for displaying and interacting with virtual reality environments, thereby increasing the effectiveness, efficiency, and user satisfaction with such computer systems. Such methods and interfaces may complement or replace conventional methods for displaying and interacting with virtual reality environments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4B illustrates an example user interface for a multifunction device with a touch-sensitive surface that is separate from the display in accordance with some embodiments.

FIGS. 5A1-5A48 illustrate example user interfaces for interacting with virtual reality environments, in accordance with some embodiments.

FIGS. 6A-6E are flow diagrams of a process for displaying and adjusting an appearance of a virtual user interface object in a virtual reality environment based on user inputs in the physical world, in accordance with some embodiments.

FIGS. 7A-7C are flow diagrams of a process for selecting a mode of operation of an input device in accordance with movement of and changes in pose of the input device, in accordance with some embodiments.

FIGS. 8A-8C are flow diagrams of a process for displaying and performing navigation operations within corresponding two-dimensional and three-dimensional user interfaces, in accordance with some embodiments.

FIGS. 9A-9B are flow diagrams of a process for displaying and adjusting an appearance of a focus indicator on a virtual user interface object in a virtual reality environment based on user inputs in the physical world, in accordance with some embodiments.

FIGS. 10A-10C are flow diagrams of a process for updating display of virtual user interface objects and associated virtual user interfaces in accordance with movement of and changes in pose of an input device, in accordance with some embodiments.

DESCRIPTION OF EMBODIMENTS

A virtual reality environment is an immersive three-dimensional environment that is experienced through sensory stimuli such as sights and sounds and that provides additional information and experiences to a user that are not available in the physical world. Conventional methods of interacting with virtual reality environments often require multiple separate inputs (e.g., a sequence of gestures and button presses, etc.) to achieve an intended outcome. Further, conventional methods of interacting with virtual reality environments do not allow a user to interact with other electronic devices in the physical world while still immersed in the virtual reality environment. The embodiments herein allow the user to interact with and control a virtual device in the virtual reality environment as if the user were interacting with the corresponding real device in the physical world and provide an intuitive and efficient way for the user to access functions of the real device while still immersed in the virtual reality environment (e.g., without requiring the user to remove equipment such as a virtual reality headset and headphones). Additionally, the embodiments herein enhance the interaction with the virtual device and provide a more immersive and intuitive way to interact with the virtual device by displaying the virtual device in a simulated three-dimensional environment that includes additional information and experiences that are not available in the physical world when interacting with the real device.

The systems, methods, and GUIs described herein improve user interface interactions with virtual reality environments in multiple ways. For example, they make it easier to: interact with and control a virtual device in the virtual reality environment that corresponds to a real device in the physical world, change input modes, manipulate two-dimensional and three-dimensional representations of content, distinguish hover inputs on an input device from contact inputs on the input device in the virtual reality environment, and interact with displayed virtual user interfaces.

Figure 7A:
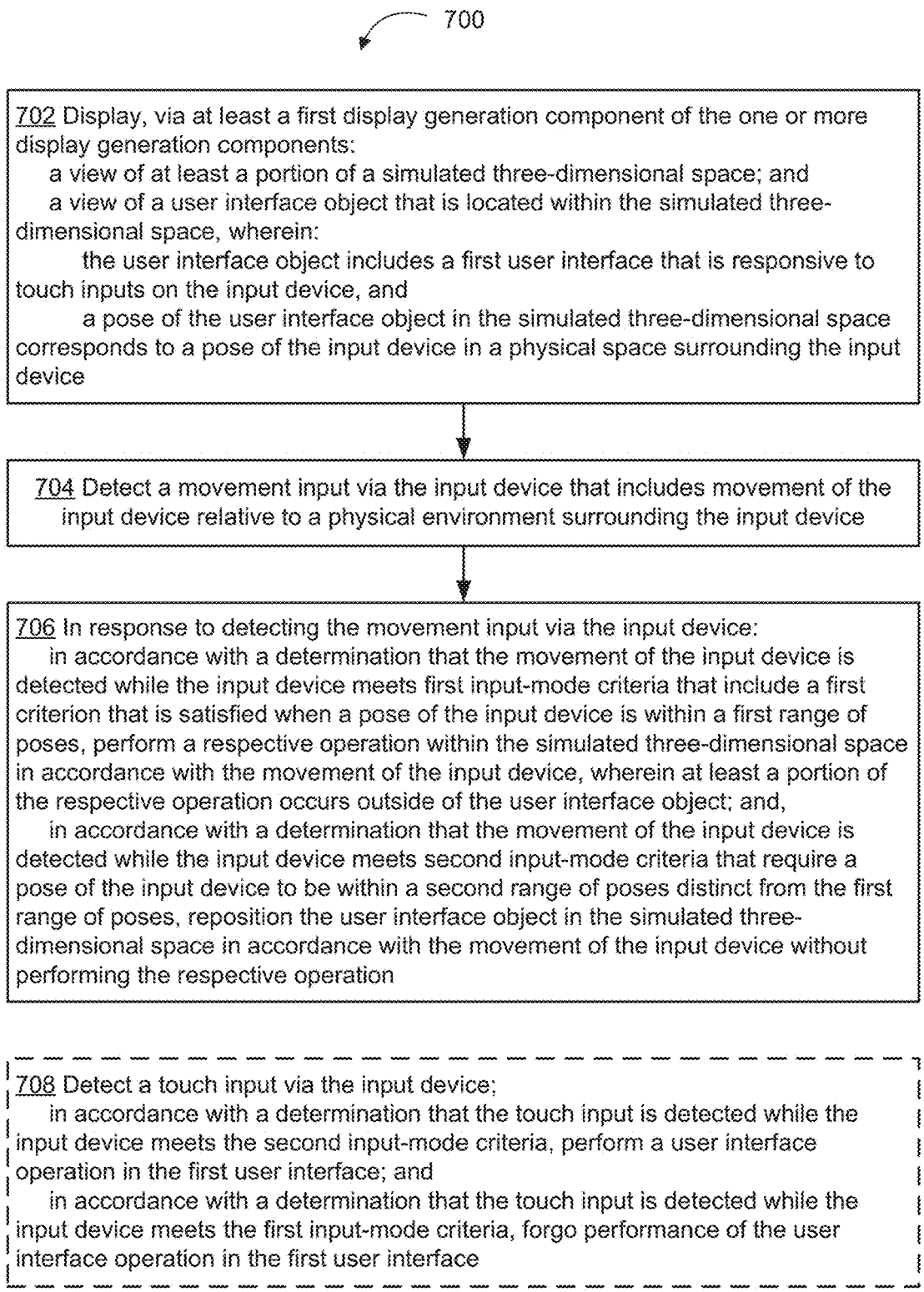
Figure 8A:
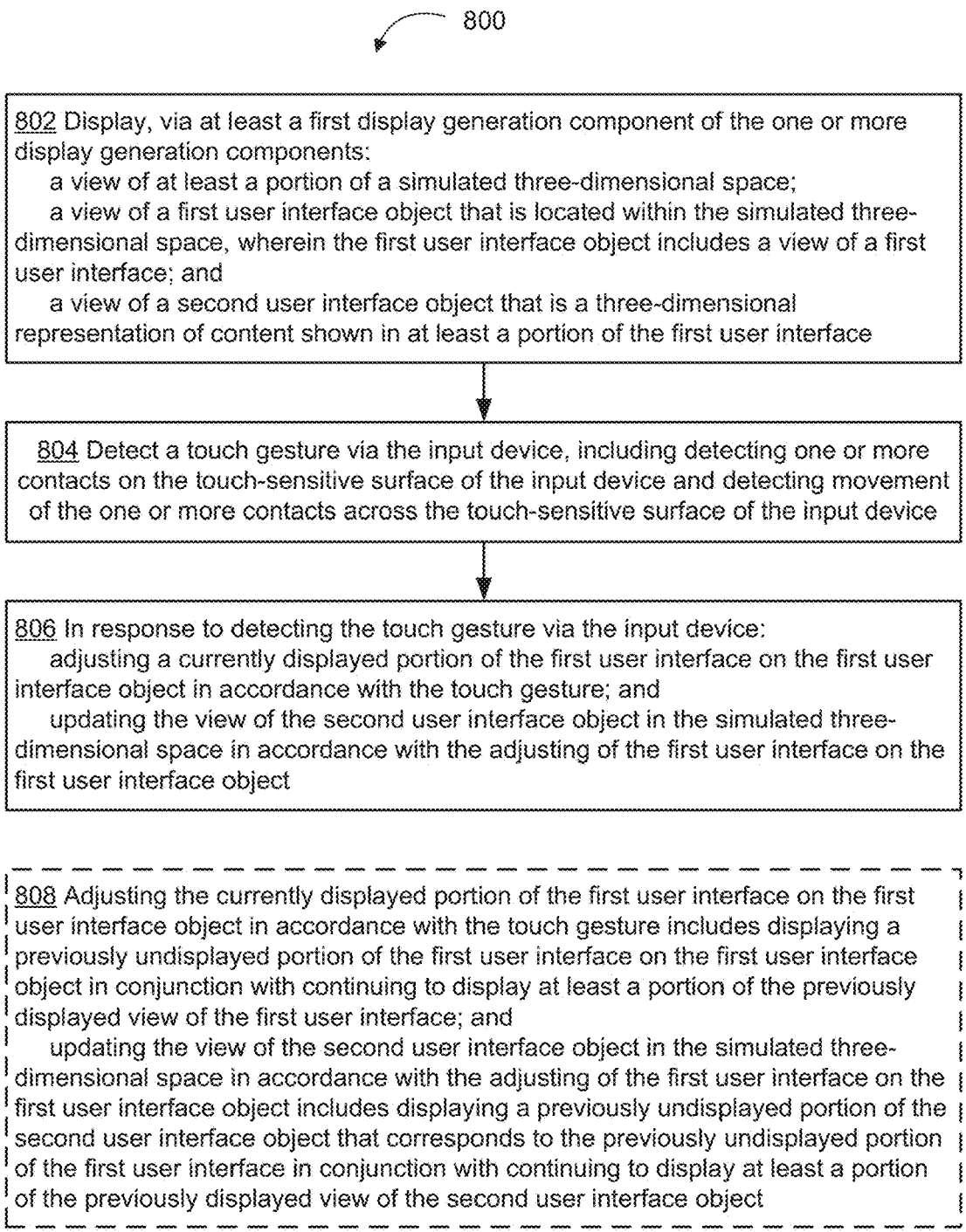
Figure 9A:
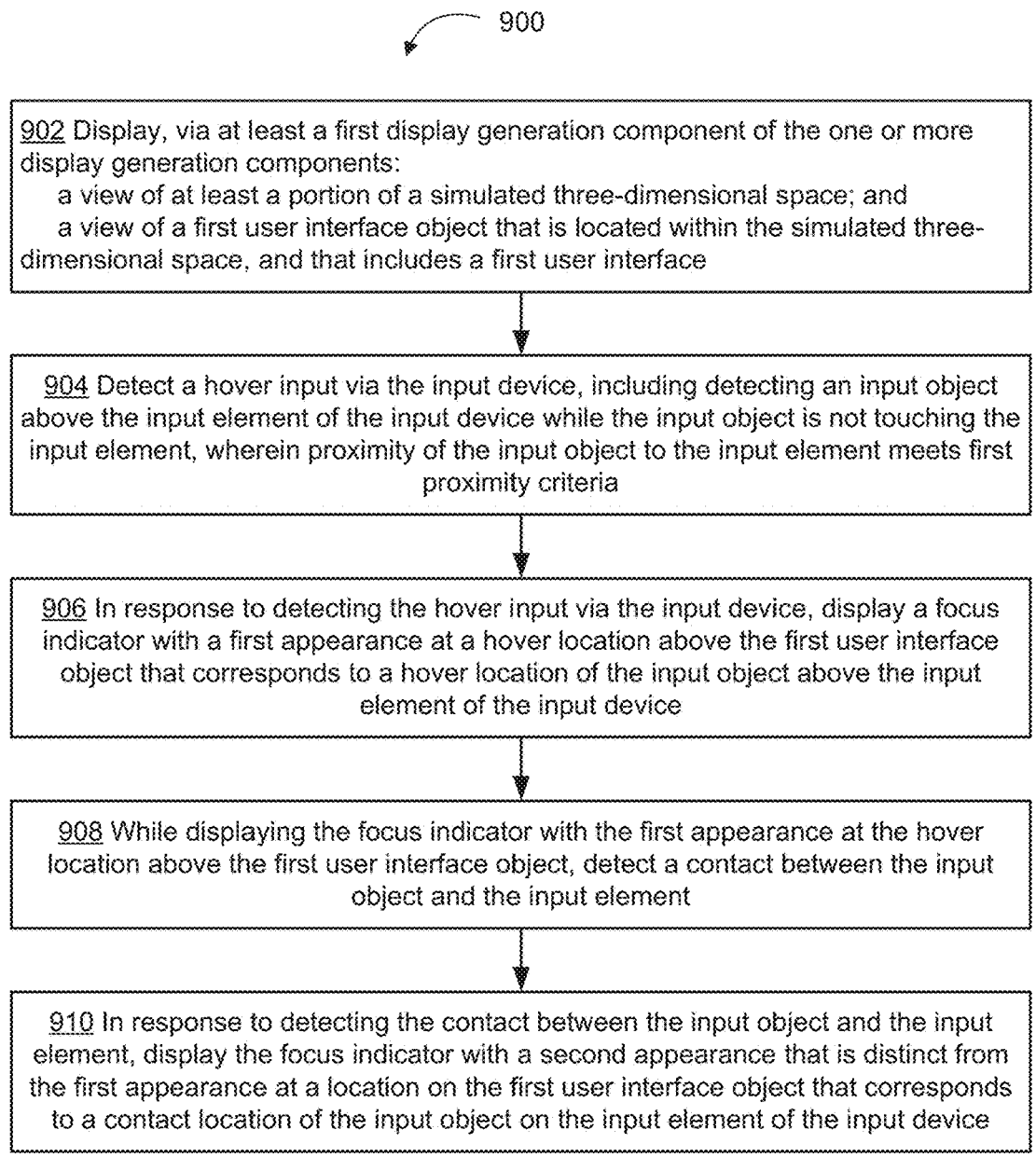
Figure 10A:
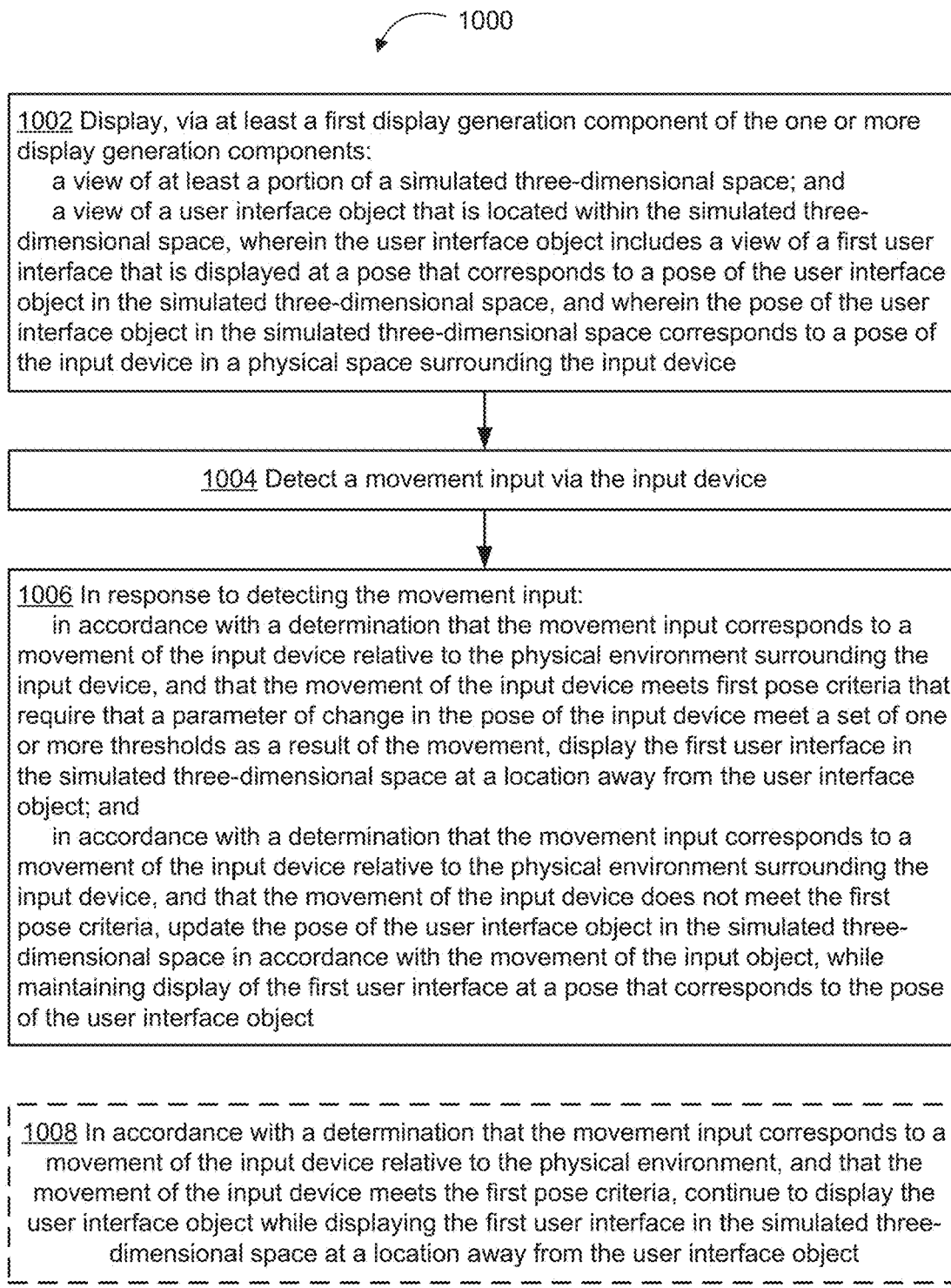

Below, FIGS. 1A-1B, 2, and 3A-3C provide a description of example devices. FIGS. 4A-4B and 5A1-5A48 illustrate example user interfaces for interacting with virtual reality environments, in accordance with some embodiments. FIGS. 6A-6E are flow diagrams of a process for displaying and adjusting an appearance of a virtual user interface object in a virtual reality environment based on user inputs in the physical world, in accordance with some embodiments. FIGS. 7A-7C are flow diagrams of a process for selecting a mode of operation of an input device in accordance with movement of and changes in pose of the input device, in accordance with some embodiments. FIGS. 8A-8C are flow diagrams of a process for displaying and performing navigation operations within corresponding two-dimensional and three-dimensional user interfaces, in accordance with some embodiments. FIGS. 9A-9B are flow diagrams of a process for displaying and adjusting an appearance of a focus indicator on a virtual user interface object in a virtual reality environment based on user inputs in the physical world, in accordance with some embodiments. FIGS. 10A-10C are flow diagrams of a process for updating display of virtual user interface objects and associated virtual user interfaces in accordance with movement of and changes in pose of an input device, in accordance with some embodiments. The user interfaces in FIGS. 5A1-5A48 are used to illustrate the processes in FIGS. 6A-6E, 7A-7C, 8A-8C, 9A-9B, and 10A-10C.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Computer systems for virtual/augmented reality include electronic devices that produce virtual/augmented reality environments. Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad) that also includes, or is in communication with, one or more cameras.

In the discussion that follows, a computer system that includes an electronic device that has (and/or is in communication with) a display and a touch-sensitive surface is described. It should be understood, however, that the computer system optionally includes one or more other physical user-interface devices, such as a physical keyboard, a mouse, a joystick, a wand controller, and/or cameras tracking the position of one or more features of the user such as the user's hands.

The device typically supports a variety of applications, such as one or more of the following: a gaming application, a note taking application, a drawing application, a presentation application, a word processing application, a spreadsheet application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed by the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
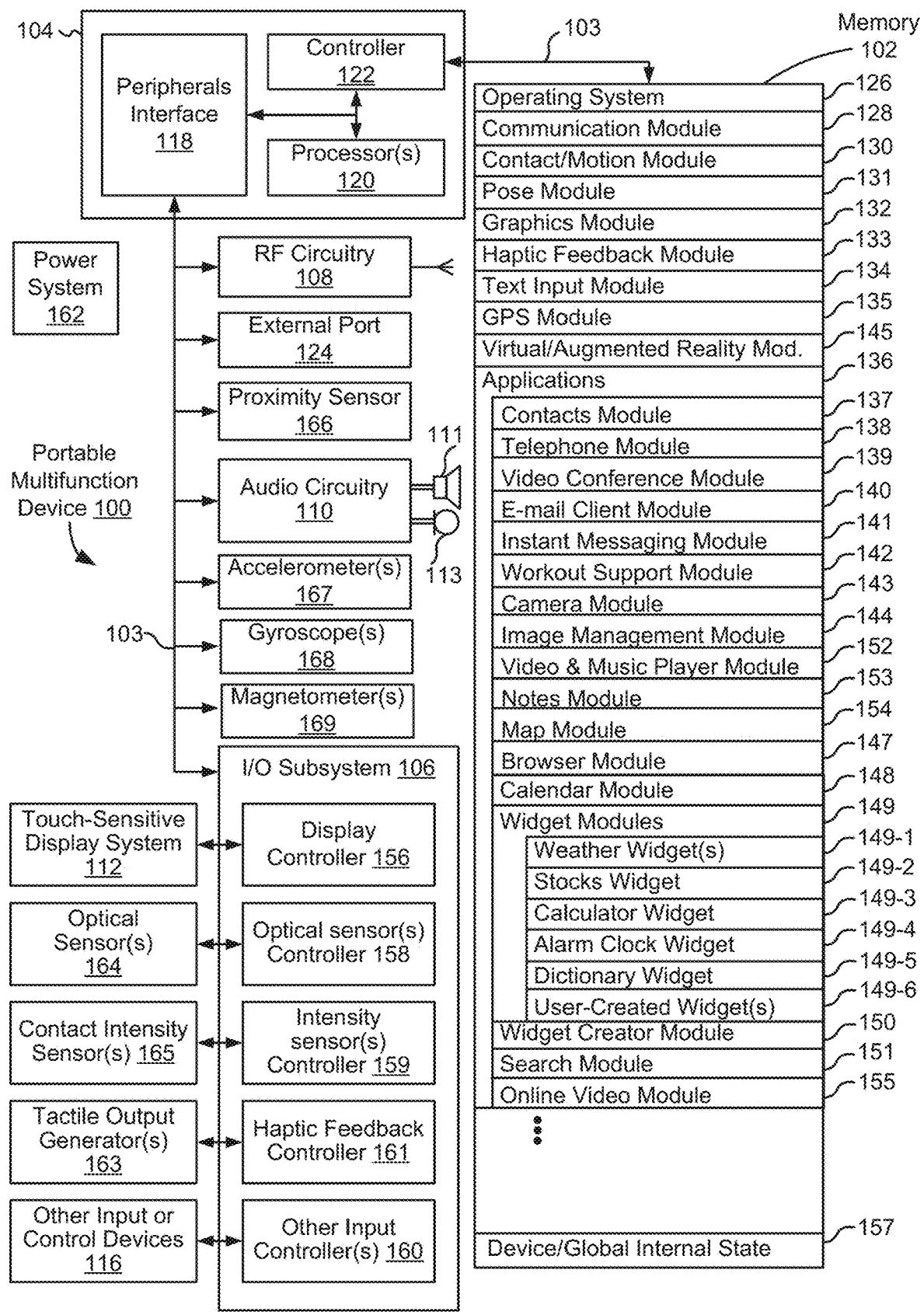
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164 (e.g., as part of one or more cameras). Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164 (e.g., as part of one or more cameras). FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. In some embodiments, tactile output generator(s) 163 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the pose (e.g., position and orientation or attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's pose (e.g., position and orientation).

Operating system 126 (e.g., iOS, Android, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California. In some embodiments, the external port is a USB Type-C connector that is the same as, or similar to and/or compatible with the USB Type-C connector used in some electronic devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Pose module 131, in conjunction with accelerometers 167, gyroscopes 168, and/or magnetometers 169, optionally detects pose information concerning the device, such as the device's pose (e.g., roll, pitch, yaw and/or position) in a particular frame of reference. Pose module 131 includes software components for performing various operations related to detecting the position of the device and detecting changes to the pose of the device.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 163 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Virtual/augmented reality module 145 provides virtual and/or augmented reality logic to applications 136 that implement augmented reality, and in some embodiments virtual reality, features. Virtual/augmented reality module 145 facilitates superposition of virtual content, such as a virtual user interface object, on a representation of at least a portion of a field of view of the one or more cameras. For example, with assistance from the virtual/augmented reality module 145, the representation of at least a portion of a field of view of the one or more cameras may include a respective physical object and the virtual user interface object may be displayed at a location, in a displayed augmented reality environment, that is determined based on the respective physical object in the field of view of the one or more cameras or a virtual reality environment that is determined based on the pose of at least a portion of a computer system (e.g., a pose of a display device that is used to display the user interface to a user of the computer system).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touch-sensitive surface. In some other embodiments, the menu button is a physical push button or other physical input control device instead of a touch-sensitive surface.

Figure 1B:
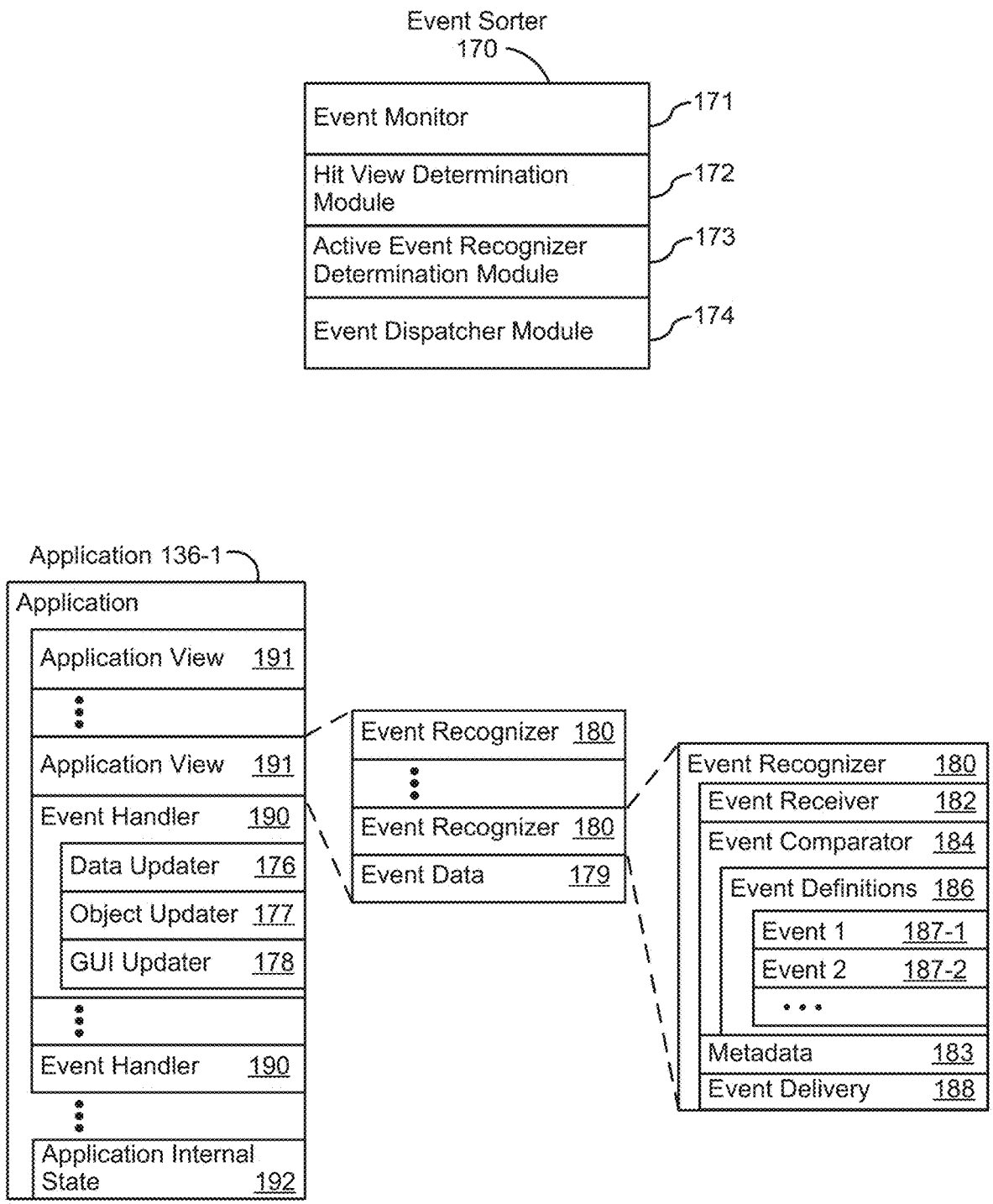
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3A) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current pose (e.g., position and orientation) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; inputs based on real-time analysis of video images obtained by one or more cameras; movement of the device; oral instructions; detected eye movements; biometric inputs; and/or any combination thereof are optionally utilized as inputs corresponding to sub-events which define an event to be recognized.

Figure 2:
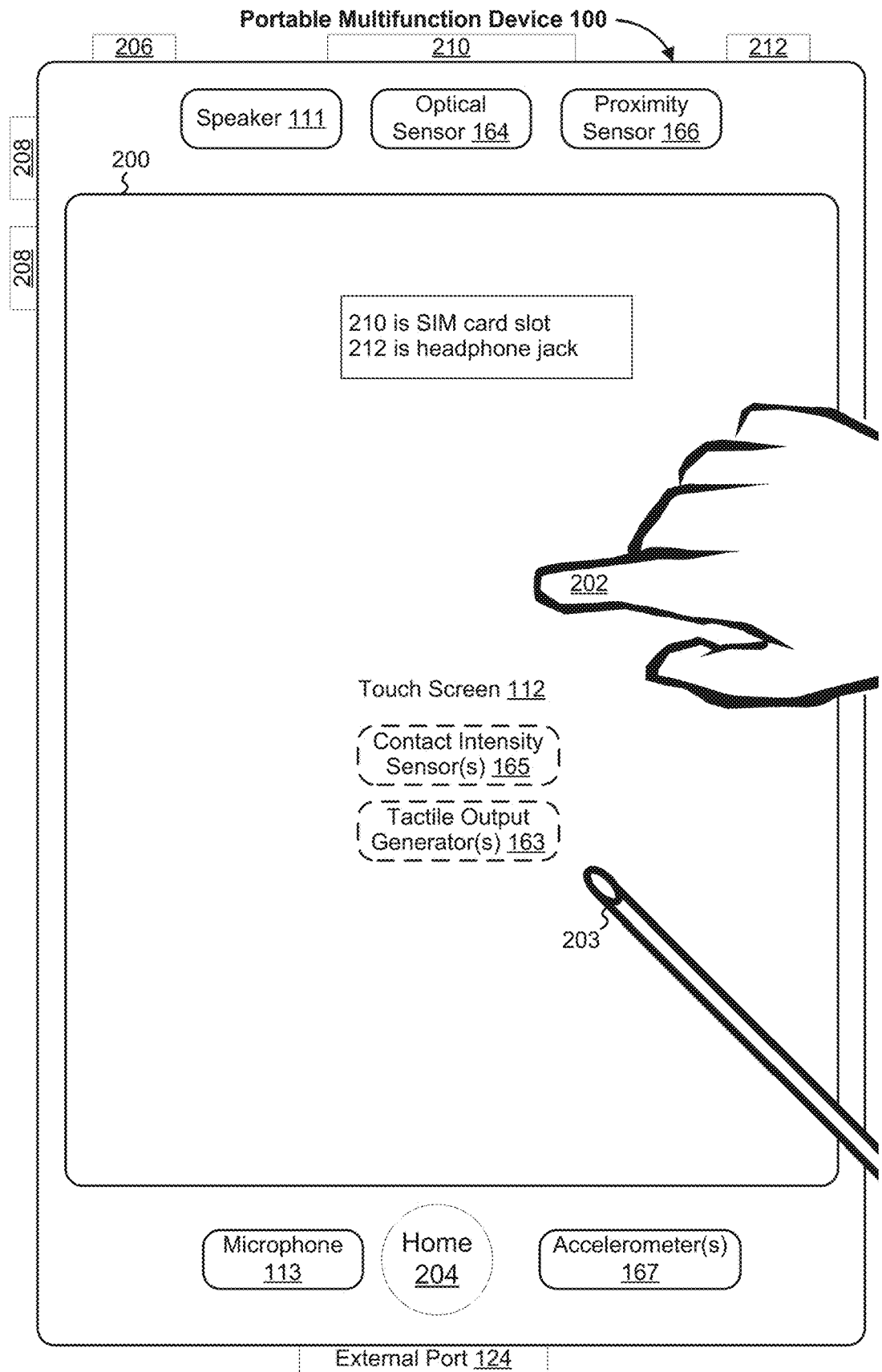
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 163 for generating tactile outputs for a user of device 100.

Figure 3A:
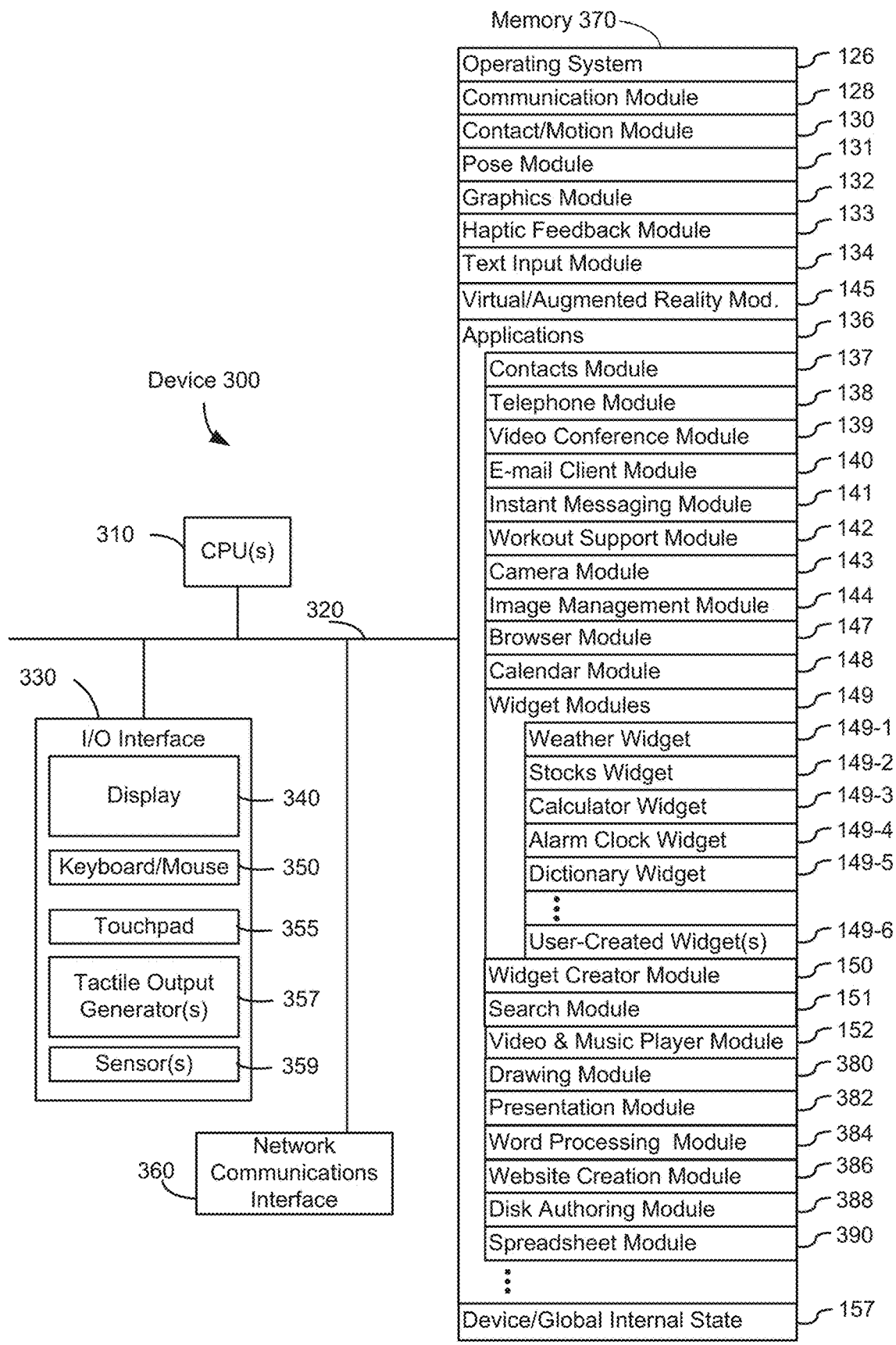
FIG. 3A is a block diagram of an example multifunction device with a display and a touch-sensitive surface in accordance with some embodiments.

FIG. 3A is a block diagram of an example multifunction device with a display and a touch-sensitive surface in accordance with some embodiments. Device 300 need not be portable. In some embodiments, device 300 is a gaming system, a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is optionally a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3A are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 3B:
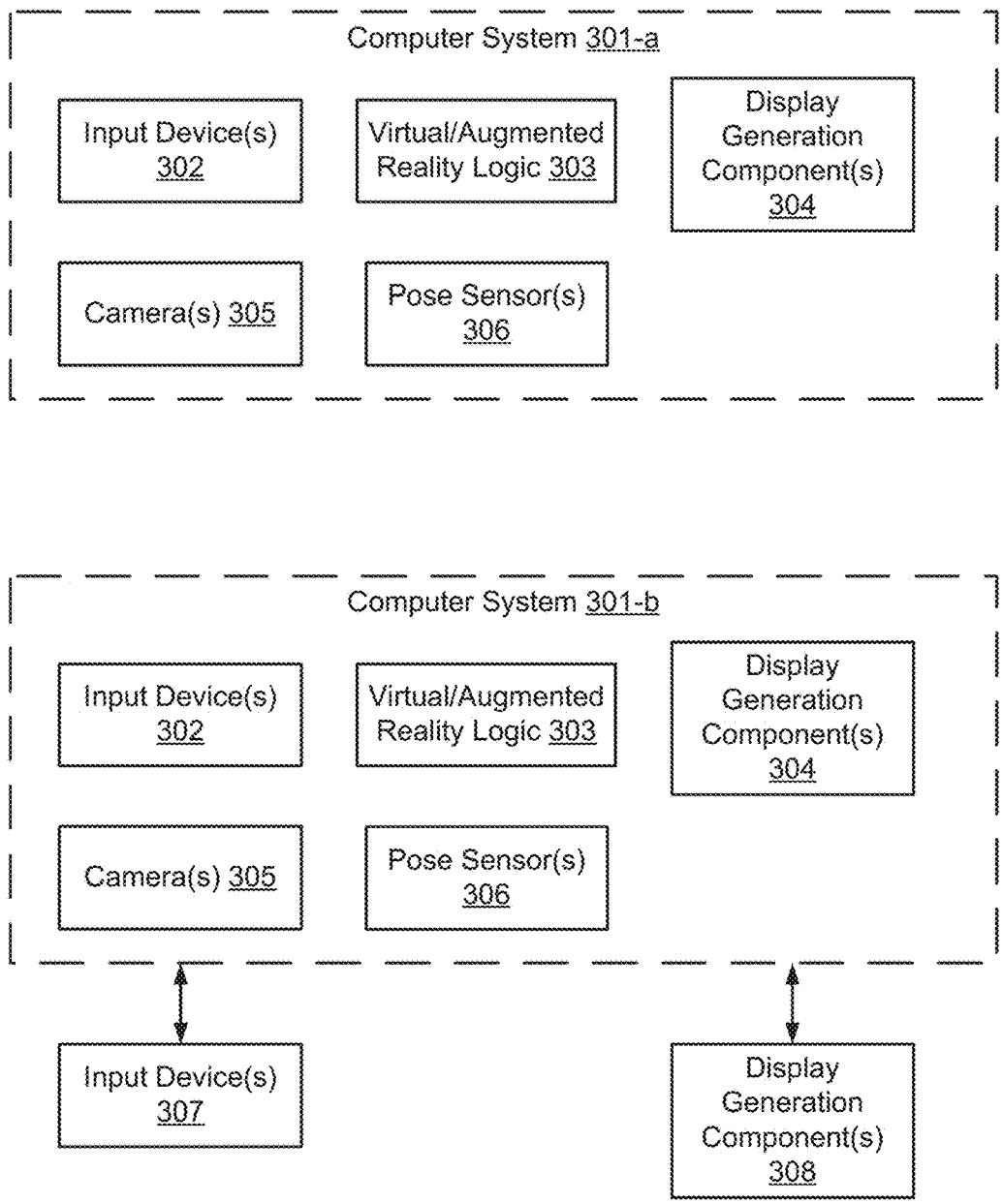
FIGS. 3B-3C are block diagrams of example computer systems in accordance with some embodiments.
Figure 3C:
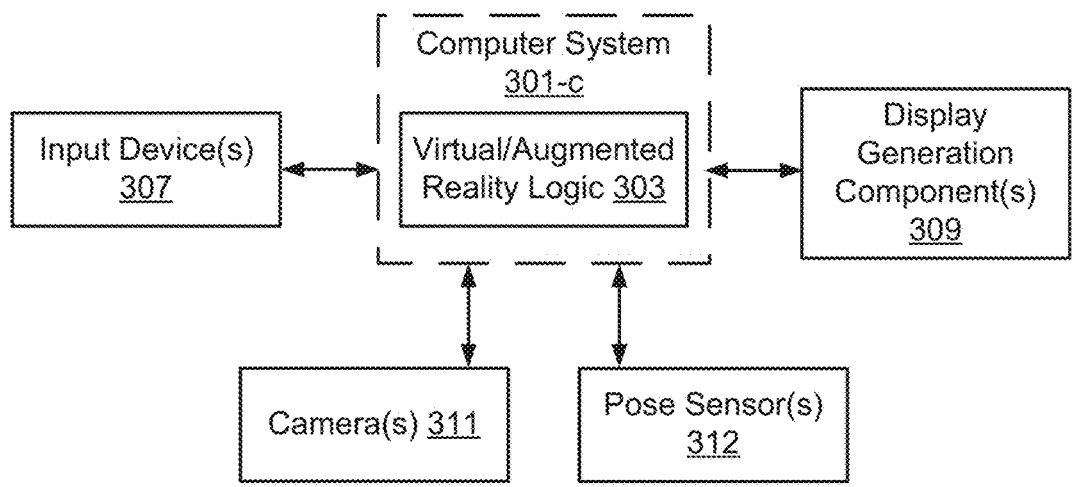

FIGS. 3B-3C are block diagrams of example computer systems 301 in accordance with some embodiments.

In some embodiments, computer system 301 includes and/or is in communication with:
input device(s) (302 and/or 307, e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands);
virtual/augmented reality logic 303 (e.g., virtual/augmented reality module 145);
display generation component(s) (304 and/or 308, e.g., a display, a projector, a heads-up display, or the like) for displaying virtual user interface elements to the user;
camera(s) (e.g., 305 and/or 311) for capturing images of a field of view of the device, e.g., images that are used to determine placement of virtual user interface elements, determine a pose of the device, and/or display a portion of the physical environment in which the camera(s) are located; and
pose sensor(s) (e.g., 306 and/or 311) for determining a pose of the device relative to the physical environment and/or changes in pose of the device.
In some computer systems (e.g., 301-a in FIG. 3B), input device(s) 302, virtual/augmented reality logic 303, display generation component(s) 304, camera(s) 305; and pose sensor(s) 306 are all integrated into the computer system (e.g., portable multifunction device 100 in FIGS. 1A-1B or device 300 in FIG. 3 such as a smartphone or tablet).

In some computer systems (e.g., 301-b), in addition to integrated input device(s) 302, virtual/augmented reality logic 303, display generation component(s) 304, camera(s) 305; and pose sensor(s) 306, the computer system is also in communication with additional devices that are separate from the computer system, such as separate input device(s) 307 such as a touch-sensitive surface, a wand, a remote control, or the like and/or separate display generation component(s) 308 such as virtual reality headset or augmented reality glasses that overlay virtual objects on a physical environment.

In some computer systems (e.g., 301-c in FIG. 3C), the input device(s) 307, display generation component(s) 309, camera(s) 311; and/or pose sensor(s) 312 are separate from the computer system and are in communication with the computer system. In some embodiments, other combinations of components in computer system 301 and in communication with the computer system are used. For example, in some embodiments, display generation component(s) 309, camera(s) 311, and pose sensor(s) 312 are incorporated in a headset that is either integrated with or in communication with the computer system.

In some embodiments, all of the operations described below with reference to FIGS. 5A1-5A48 are performed on a single computing device with virtual/augmented reality logic 303 (e.g., computer system 301-a described below with reference to FIG. 3B). However, it should be understood that frequently multiple different computing devices are linked together to perform the operations described below with reference to FIGS. 5A1-5A48 (e.g., a computing device with virtual/augmented reality logic 303 communicates with a separate computing device with a display 450 and/or a separate computing device with a touch-sensitive surface 451). In any of these embodiments, the computing device that is described below with reference to FIGS. 5A1-5A48 is the computing device (or devices) that contain(s) the virtual/augmented reality logic 303. Additionally, it should be understood that the virtual/augmented reality logic 303 could be divided between a plurality of distinct modules or computing devices in various embodiments; however, for the purposes of the description herein, the virtual/augmented reality logic 303 will be primarily referred to as residing in a single computing device so as not to unnecessarily obscure other aspects of the embodiments.

In some embodiments, the virtual/augmented reality logic 303 includes one or more modules (e.g., one or more event handlers 190, including one or more object updaters 177 and one or more GUI updaters 178 as described in greater detail above with reference to FIG. 1B) that receive interpreted inputs and, in response to these interpreted inputs, generate instructions for updating a graphical user interface in accordance with the interpreted inputs which are subsequently used to update the graphical user interface on a display. In some embodiments, an interpreted input for an input that has been detected (e.g., by a contact motion module 130 in FIGS. 1A and 3), recognized (e.g., by an event recognizer 180 in FIG. 1B) and/or distributed (e.g., by event sorter 170 in FIG. 1B) is used to update the graphical user interface on a display. In some embodiments, the interpreted inputs are generated by modules at the computing device (e.g., the computing device receives raw contact input data so as to identify gestures from the raw contact input data). In some embodiments, some or all of the interpreted inputs are received by the computing device as interpreted inputs (e.g., a computing device that includes the touch-sensitive surface 451 processes raw contact input data so as to identify gestures from the raw contact input data and sends information indicative of the gestures to the computing device that includes the virtual/augmented reality logic 303).

In some embodiments, both a display and a touch-sensitive surface are integrated with the computer system (e.g., 301-a in FIG. 3B) that contains the virtual/augmented reality logic 303. For example, the computer system may be a desktop computer or laptop computer with an integrated display (e.g., 340 in FIG. 3) and touchpad (e.g., 355 in FIG. 3). As another example, the computing device may be a portable multifunction device 100 (e.g., a smartphone, PDA, tablet computer, etc.) with a touch screen (e.g., 112 in FIG. 2).

In some embodiments, a touch-sensitive surface is integrated with the computer system while a display is not integrated with the computer system that contains the virtual/augmented reality logic 303. For example, the computer system may be a device 300 (e.g., a desktop computer or laptop computer) with an integrated touchpad (e.g., 355 in FIG. 3) connected (via wired or wireless connection) to a separate display (e.g., a computer monitor, television, etc.). As another example, the computer system may be a portable multifunction device 100 (e.g., a smartphone, PDA, tablet computer, etc.) with a touch screen (e.g., 112 in FIG. 2) connected (via wired or wireless connection) to a separate display (e.g., a computer monitor, television, etc.).

In some embodiments, a display is integrated with the computer system while a touch-sensitive surface is not integrated with the computer system that contains the virtual/augmented reality logic 303. For example, the computer system may be a device 300 (e.g., a desktop computer, laptop computer, television with integrated set-top box) with an integrated display (e.g., 340 in FIG. 3) connected (via wired or wireless connection) to a separate touch-sensitive surface (e.g., a remote touchpad, a portable multifunction device, etc.). As another example, the computer system may be a portable multifunction device 100 (e.g., a smartphone, PDA, tablet computer, etc.) with a touch screen (e.g., 112 in FIG. 2) connected (via wired or wireless connection) to a separate touch-sensitive surface (e.g., a remote touchpad, another portable multifunction device with a touch screen serving as a remote touchpad, etc.).

In some embodiments, neither a display nor a touch-sensitive surface is integrated with the computer system (e.g., 301-c in FIG. 3C) that contains the virtual/augmented reality logic 303. For example, the computer system may be a stand-alone computing device 300 (e.g., a set-top box, gaming console, etc.) connected (via wired or wireless connection) to a separate touch-sensitive surface (e.g., a remote touchpad, a portable multifunction device, etc.) and a separate display (e.g., a computer monitor, television, etc.).

In some embodiments, the computer system has an integrated audio system (e.g., audio circuitry 110 and speaker 111 in portable multifunction device 100). In some embodiments, the computing device is in communication with an audio system that is separate from the computing device. In some embodiments, the audio system (e.g., an audio system integrated in a television unit) is integrated with a separate display. In some embodiments, the audio system (e.g., a stereo system) is a stand-alone system that is separate from the computer system and the display.

Attention is now directed towards embodiments of user interfaces ("UI") that are, optionally, implemented on portable multifunction device 100.

Figure 4A:
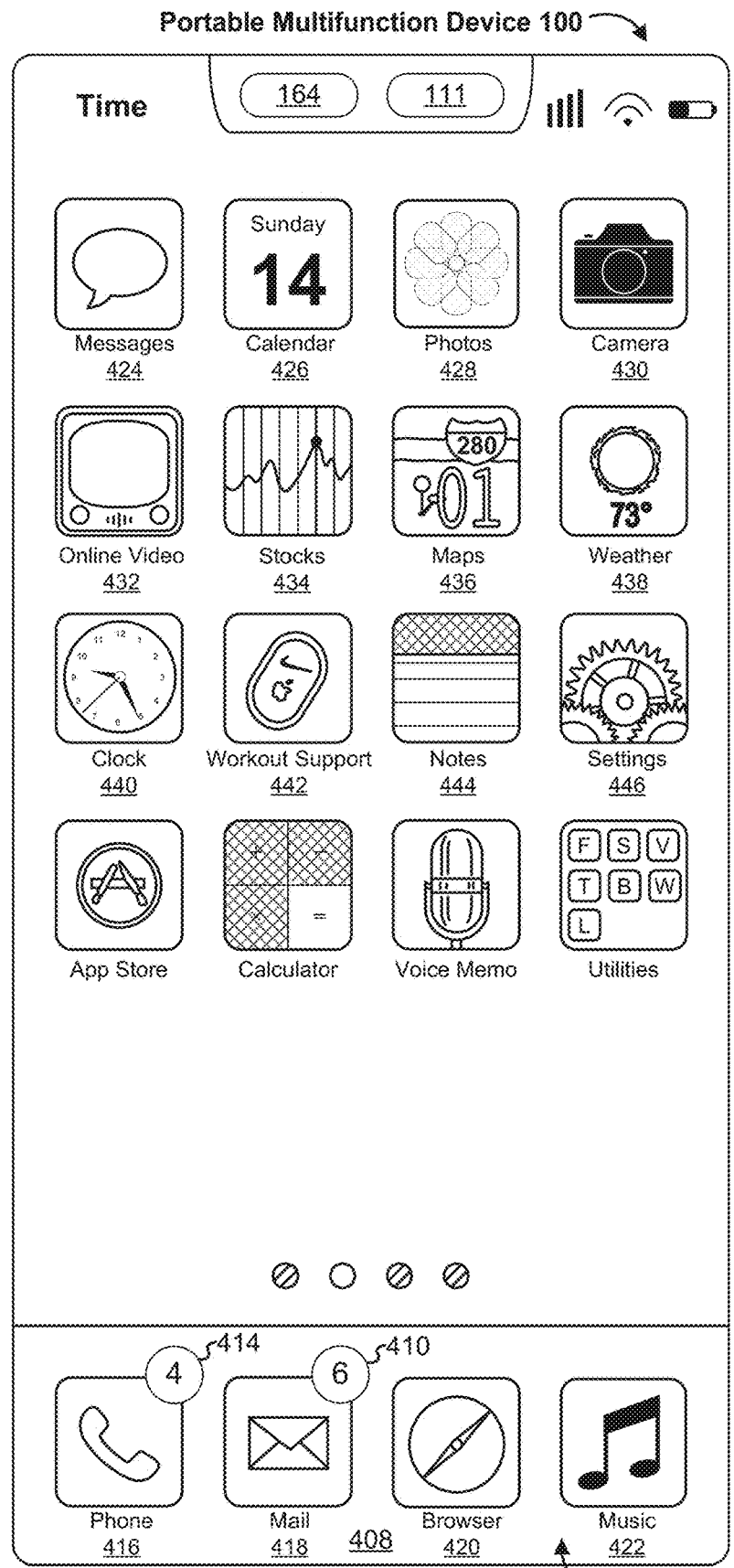
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser"; and
  Icon 422 for video and music player module 152, labeled "Music"; and
Icons for other applications, such as:
  Icon 424 for IM module 141, labeled "Messages";
  Icon 426 for calendar module 148, labeled "Calendar";
  Icon 428 for image management module 144, labeled "Photos";
  Icon 430 for camera module 143, labeled "Camera";
  Icon 432 for online video module 155, labeled "Online Video";
  Icon 434 for stocks widget 149-2, labeled "Stocks";
  Icon 436 for map module 154, labeled "Maps";
  Icon 438 for weather widget 149-1, labeled "Weather";
  Icon 440 for alarm clock widget 149-4, labeled "Clock";
  Icon 442 for workout support module 142, labeled "Workout Support";
  Icon 444 for notes module 153, labeled "Notes"; and
  Icon 446 for a settings application or module, labeled "Settings," which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3A) with a touch-sensitive surface 451 (e.g., a tablet or touchpad 355, FIG. 3A) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input or input through movement of the user, such as a user's head, hands, or arms, optionally as tracked using one or more cameras). For example, a swipe gesture is, optionally, replaced with a mouse click (e.g., instead of a contact) followed by movement of the cursor along the path of the swipe (e.g., instead of movement of the contact), or by the user waving his hand in substantially one direction (e.g., left, right, up, or down). As another example, a tap gesture is, optionally, replaced with a mouse click while the cursor is located over the location of the tap gesture (e.g., instead of detection of the contact followed by ceasing to detect the contact), or by the user performing a gesture. Similarly, when multiple user inputs are simultaneously detected, it should be understood that multiple computer mice are, optionally, used simultaneously, or a mouse and finger contacts are, optionally, used simultaneously, or optionally, the user simultaneously moves multiple parts of his body such as his head and his hand, or two hands simultaneously.

As used herein, the term "focus selector" (sometimes called a "focus indicator") refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3A or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device). In some embodiments, a focus indicator (e.g., a cursor or selection indicator) is displayed via the display device to indicate a current portion of the user interface that will be affected by inputs received from the one or more input devices.

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first intensity threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
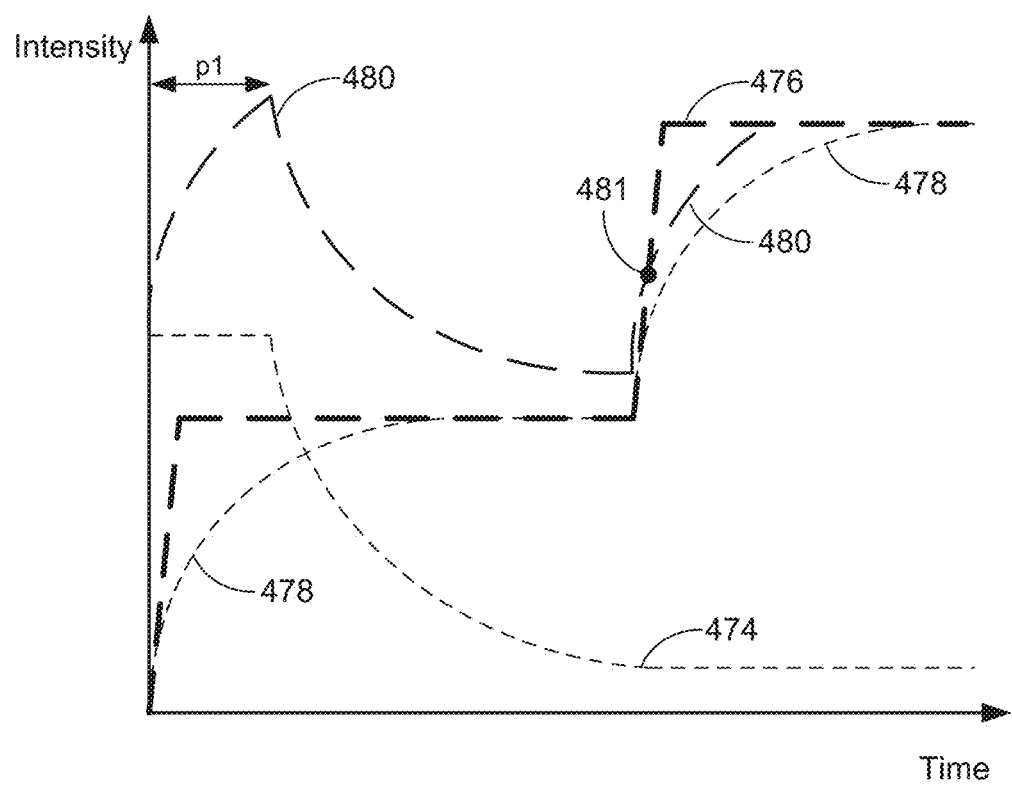
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
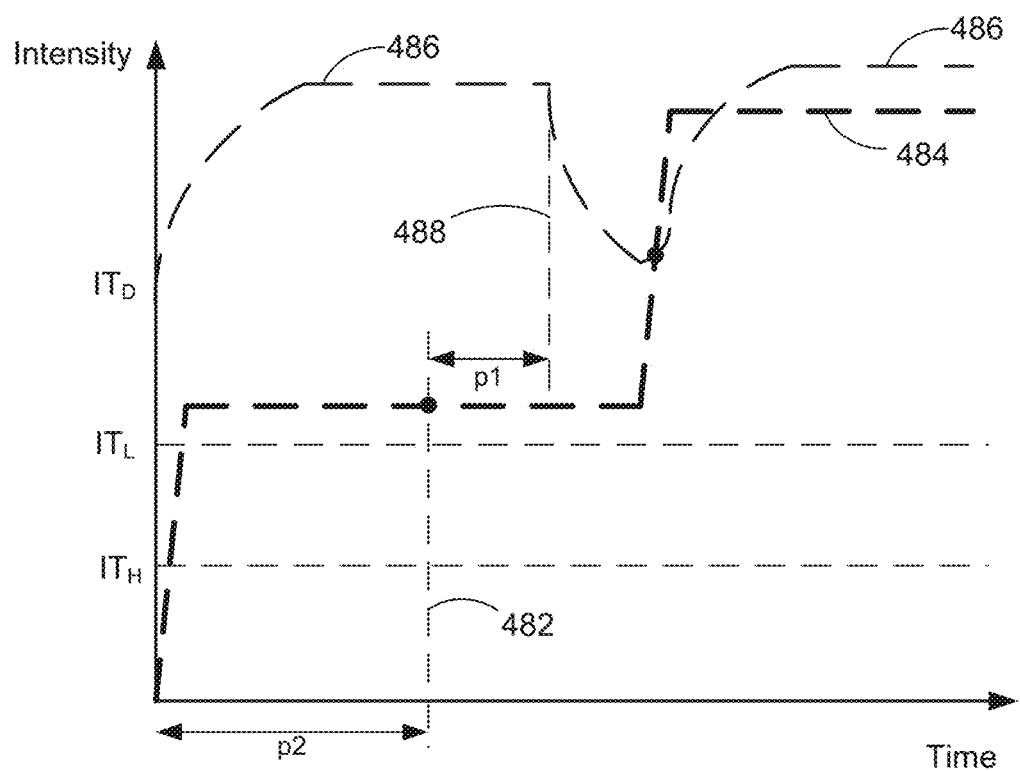

FIG. 4D illustrates another dynamic intensity threshold 486 (e.g., intensity threshold $IT_D$. FIG. 4D also illustrates two other intensity thresholds: a first intensity threshold $IT_H$ and a second intensity threshold $IT_L$. In FIG. 4D, although touch input 484 satisfies the first intensity threshold $IT_H$ and the second intensity threshold $IT_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $IT_L$ was triggered). This type of dynamic intensity threshold reduces accidental triggering of a response associated with the dynamic intensity threshold ITS immediately after, or concurrently with, triggering a response associated with a lower intensity threshold, such as the first intensity threshold $IT_H$ or the second intensity threshold $IT_L$.

Figure 4E:
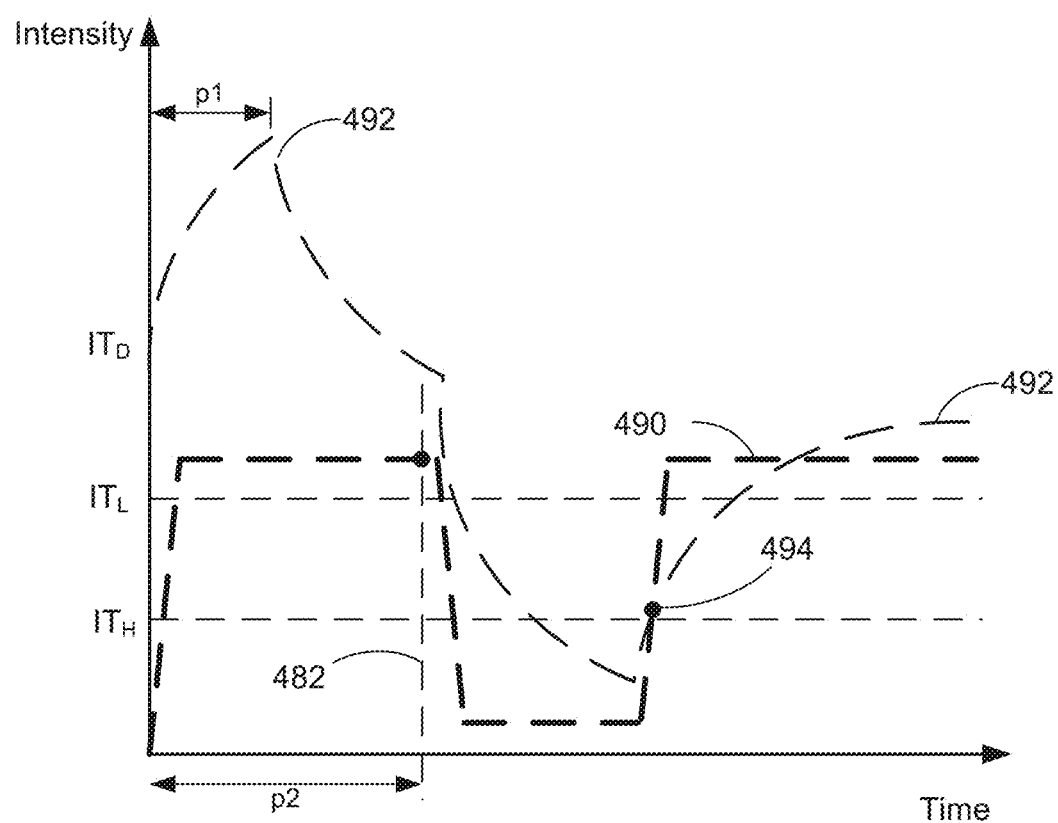
Figure 6A:
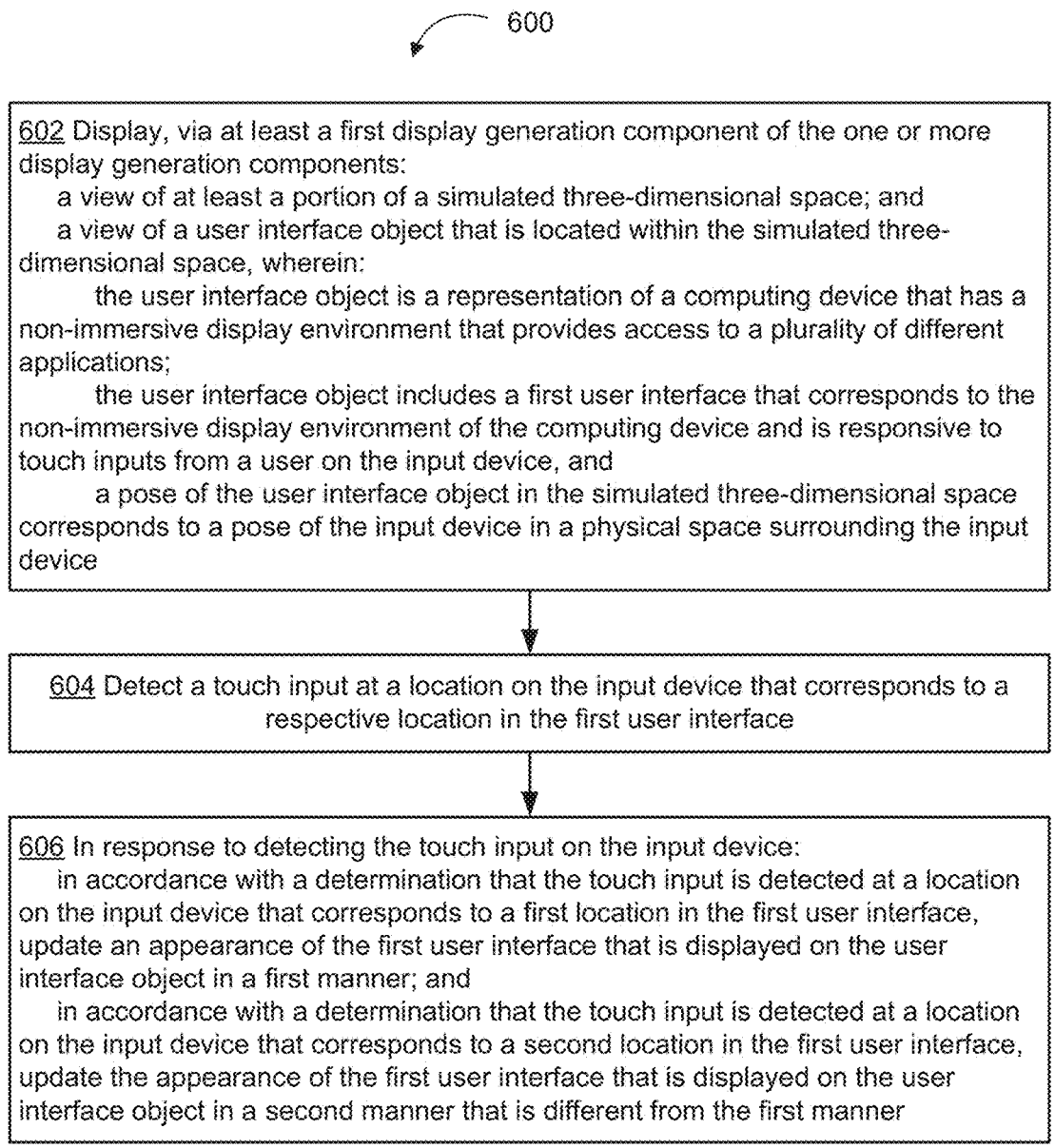

FIG. 4E illustrate yet another dynamic intensity threshold 492 (e.g., intensity threshold ITS). In FIG. 4E, a response associated with the intensity threshold $IT_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $IT_L$, followed by an increase in the intensity of touch input 490, without releasing touch input 490, can trigger a response associated with the intensity threshold ITS (e.g., at time 494) even when the intensity of touch input 490 is below another intensity threshold, for example, the intensity threshold $IT_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on a computer system (e.g., portable multifunction device 100 or device 300) that includes (and/or is in communication with) one or more display generation components (e.g., a display, a projector, a heads-up display, or the like), one or more input devices (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), optionally one or more pose sensors (e.g., one or more pose sensors for detecting respective poses of the one or more input devices and/or the one or more display generation components, including one or more cameras, gyroscopes, inertial measurement units, or other sensors that enable the computer system to detect changes in an orientation and/or position of the computer system or parts thereof relative to a physical environment of the computer system), optionally one or more sensors to detect intensities of contacts with an input device, optionally one or more sensors to detect proximity of an input object (e.g., a user's fingertip) above an input element (e.g., the touch-sensitive surface) of the input device, optionally one or more cameras (e.g., video cameras that continuously provide a live view of at least a portion of the contents that are within the field of view of the cameras and optionally generate video outputs including one or more streams of image frames capturing the contents within the field of view of the cameras), and optionally one or more tactile output generators.

FIGS. 5A1-5A48 illustrate example user interfaces for interacting with virtual reality environments, in accordance with some embodiments. In particular, Figures illustrate example user interfaces for displaying a simulated three-dimensional space (e.g., a virtual reality environment) and, in response to different inputs (e.g., on device 100), adjusting the appearance of the simulated three-dimensional space and/or the appearance of objects in the simulated three-dimensional space, in accordance with some embodiments. The user interfaces in these figures are used to illustrate the processes described below, including the processes described herein with reference to FIGS. 6A-6E, 7A-7C, 8A-8C, 9A-9B, and 10A-10C. For convenience of explanation, some of the embodiments will be discussed with reference to operations performed on a device (e.g., device 100) with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. In some embodiments, a location of the focus selector in the user interface is visually indicated by a displayed focus indicator. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus indicator. Similarly, analogous operations are, optionally, performed on a computer system (e.g., as shown in FIG. 5A1) with a headset 5008 and a separate input device (e.g., device 100 or device 5010) with a touch-sensitive surface in response to detecting the contacts on the touch-sensitive surface of the input device while displaying the user interfaces shown in the figures on the display of headset 5008, along with a focus indicator.

FIG. 5A1 illustrates a context in which user interfaces described with regard to 5A2-5A48 are used. FIG. 5A1 illustrates a physical space 5004 in which user 5002 is located. User 5002 views a virtual reality environment using a computer system that includes a headset 5008, a separate input device with a touch-sensitive surface (e.g., device 100 with a touch-sensitive display system or device 5010 with a touch-sensitive surface that does not include a display), and optionally an additional input device (e.g., watch 5012 with a touch-sensitive display). In this example, headset 5008 displays the virtual reality environment and user 5002 uses the separate input device (e.g., device 100 or device 5010) to interact with the virtual reality environment. In some embodiments, device 100 is used as the separate input device. In some embodiments, device 100 is inserted into a headset (e.g., headset 5008-b) and the separate input device is a touch-sensitive remote control that does not have a display (e.g., device 5010). In some embodiments, the separate input device 5010 is a touch-sensitive remote control, a mouse, a joystick, a wand controller, or the like. In some embodiments, the separate input device (e.g., device 100 or device 5010) includes one or more cameras that track the position of one or more features of user 5002 such as the user's hands and movement. In some embodiments, headset 5008 displays a virtual reality environment that includes at least a portion of a simulated three-dimensional space (e.g., simulated 3D space 5006, FIGS. 5A2-5A48) and one or more user interface objects that are located within the simulated three-dimensional space (e.g., virtual device 5016, Figure that corresponds to the input device held by user 5002, and/or virtual user interface 5126, FIG. 5A33, that corresponds to the user interface of watch 5012 worn by user 5002, etc.). In some embodiments, the display of device 100 (e.g., on touch-sensitive display system 112, sometimes referred to as "touch-screen display 112," "touch screen 112," "display 112" or "touch-sensitive display 112," of device 100, as shown in FIGS. 1A, 4A, and 5A2) is synchronized with the display of a virtual device (e.g., virtual device 5016, FIG. 5A2). In some embodiments, one or more cameras of device 100 (sometimes referred to as "a camera" of device 100) continuously provide a live view of the contents that are within the field of view of the cameras (e.g., when a camera application is launched).

FIGS. 5A2-5A9 illustrate example user interfaces for displaying a simulated three-dimensional space 5006 (sometimes referred to as "simulated 3D space 5006") (e.g., a virtual reality environment) and a user interface object that is located within the simulated 3D space 5006 (e.g., virtual device 5016 that corresponds to an input device, such as device 100, held by user 5002) and, in response to different inputs (e.g., on device 100), adjusting the appearance of the simulated 3D space 5006 and/or the appearance of user interface objects in the simulated 3D space, in accordance with some embodiments. In some embodiments, device 100 displays (or causes headset 5008 to display) the simulated 3D space 5006 and user interface objects in the simulated 3D space 5006. In some embodiments, device 100 updates/adjusts (or causes headset 5008 to update/adjust) the simulated 3D space 5006 and user interface objects in the simulated 3D space 5006. In some embodiments, virtual device 5016 is displayed at a location within the simulated 3D space 5006 that corresponds to a location of the input device (e.g., device 100) in the user's hand in the physical space 5004.

FIGS. 5A2-5A5 illustrate example user interfaces for displaying the simulated 3D space 5006 and virtual device 5016 for a maps application. In FIG. 5A2, device 100 detects an input on an icon for the maps application, such as a tap gesture by contact 5022 (on home screen user interface 5020) in the physical space 5004, and displays (or causes headset 5008 to display) a focus indicator on virtual device 5016 (e.g., focus indicator 5024 on virtual user interface 5018 that corresponds to contact 5022 on device 100) in the simulated 3D space 5006. In response to detecting the input on the icon for the maps application, device 100 launches the maps application (e.g., displaying user interface 5032 for the maps application on device 100), and displays (or causes headset 5008 to display) a virtual user interface 5030 for the maps application on virtual device 5016 and updates the appearance of the simulated 3D space 5006 accordingly (e.g., to display a 3D map corresponding to the launched map application), as shown in FIG. 5A3. In Figures device 100 detects an input to return to the home screen, such as a swipe up gesture by contact 5034 on device 100 (which is displayed as a swipe up gesture by focus indicator 5036 on virtual device 5016, FIG. 5A4) (or alternatively, a press input on the home button of device 100), and in response, displays the home screen (e.g., home screen user interface 5020, FIG. 5A5), which is displayed as virtual user interface 5018 on virtual device 5016 in the simulated 3D space 5006. In some embodiments, when the home screen is displayed on the device, the simulated 3D space 5006 is empty, as shown in FIG. 5A5. Although not shown here, in some embodiments, when the home screen is displayed on the device, the simulated 3D space 5006 includes a stationary background object (e.g., an apple icon).

FIGS. 5A6-5A9 illustrate example user interfaces for displaying the simulated 3D space 5006 and virtual device 5016 for a video player application. In Figure device 100 detects an input on an icon for the video player application, such as a tap gesture by contact 5038 (on home screen user interface 5020) in the physical space 5004, and displays (or causes headset 5008 to display) a focus indicator on virtual device 5016 (e.g., focus indicator 5039 on virtual user interface 5018 that corresponds to contact 5038 on device 100) in the simulated 3D space 5006. In response to detecting the input on the icon for the video player application, device 100 launches the video player application (e.g., displaying user interface 5042 for the video player application on device 100), and displays (or causes headset 5008 to display) a virtual user interface 5040 for the video player application on virtual device 5016 and updates the appearance of the simulated 3D space 5006 accordingly (e.g., to display a plurality of selectable representations of videos available to be launched via the video player application), as shown in FIG. 5A7. In FIGS. 5A8-5A9, device 100 detects an input to return to the home screen, such as a swipe up gesture by contact 5044 on device 100 (which is displayed as a swipe up gesture by focus indicator 5046 on virtual device 5016, FIG. 5A8) (or alternatively, a press input on the home button of device 100), and in response, displays the home screen (e.g., home screen user interface 5020, FIG. 5A9), which is displayed as virtual user interface 5018 on virtual device 5016 in the simulated 3D space 5006. In some embodiments, when the home screen is displayed on the device, the simulated 3D space 5006 is empty, as shown in Figure Although not shown here, in some embodiments, when the home screen is displayed on the device, the simulated 3D space 5006 includes a stationary background object (e.g., an apple icon).

In FIGS. 5A10-5A11, device 100 detects a swipe left gesture by contact 5048 on device 100 in the physical space 5004 (which is displayed as a swipe left gesture by focus indicator 5049 on virtual device 5016 in the simulated 3D space 5006, FIG. 5A10), and in response, displays a second page of the home screen (e.g., home screen user interface 5021 on device 100, FIG. 5A11), which is displayed as virtual user interface 5019 on virtual device 5016 in the simulated 3D space 5006.

FIGS. 5A12-5A15 illustrate displaying and adjusting an appearance of a focus indicator on virtual device 5016 in the simulated 3D space 5006 as the user's finger moves closer to (and eventually touches) device 100 in the physical space 5004. In Figures when the user's finger is within a threshold distance (e.g., 4 millimeters) from touch screen 112, but not touching touch screen 112, focus indicator 5050 is displayed with a first appearance (e.g., each of focus indicators 5050-*a*, 5050-*b*, and 5050-*c* are displayed as an outline of a circular indicator with shading). In FIG. 5A15, when the user's finger is touching touch screen 112, focus indicator 5050 is displayed with a second appearance (e.g., focus indicator 5050-*d* is displayed as a solid circular indicator with no shading). In some embodiments, focus indicator 5050 changes in appearance as the user's finger moves closer to touch screen 112. For example, as shown in FIGS. 5A12-5A14, the size of focus indicator 5050 grows larger as the user's finger moves closer to touch screen 112. As shown in FIG. 5A12, when the user's finger is relatively far away from touch screen 112, focus indicator 5050-*a* is relatively small. As the user's finger moves closer to touch screen 112, as shown in FIGS. 5A13-5A14, focus indicator grows larger (e.g., increasing in diameter from focus indicator 5050-*a* to focus indicator 5050-*b* and increasing further in diameter from focus indicator 5050-*b* to focus indicator 5050-*c*). Although not shown in Figures in some embodiments, a representation of one or more of the user's fingers are displayed in the simulated 3D space 5006 (e.g., as "virtual fingers"). In some embodiments, a representation of the user's finger is displayed in addition to displaying the focus indicator (e.g., focus indicator 5050). In some embodiments, contact touches (e.g., as shown in Figure are displayed as translucent contact points (and not virtual fingers) so that the user interface of virtual device 5016 is not obscured.

FIGS. 5A15-5A19 illustrate example user interfaces for displaying the simulated 3D space 5006 and virtual device 5016 for a weather application. In FIG. 5A15, device 100 detects an input on an icon for the weather application, such as a tap input by the user's finger (on home screen user interface 5021) in the physical space 5004, and displays (or causes headset 5008 to display) a focus indicator on virtual device 5016 (e.g., as focus indicator 5050-*d* on virtual user interface 5019 that corresponds to a contact by the user's finger on device 100) in the simulated 3D space 5006. In response to detecting the input on the icon for the weather application, device 100 launches the weather application (e.g., displaying user interface 5062 for the weather appli-cation on device 100), and displays (or causes headset 5008 to display) a virtual user interface 5060 for the weather application on virtual device 5016 and updates the appearance of the simulated 3D space 5006 in accordance with the current weather for the selected city (e.g., to display clouds based on the current "mostly cloudy" weather in Cupertino), as shown in FIG. 5A16. In some embodiments, virtual user interface 5060 (of virtual device 5016 in the simulated 3D space 5006) includes additional depth compared to user interface 5062 (of device 100 in the physical space 5004). For example, as seen more clearly in FIG. 5A17 (e.g., when device 100 is rotated to the side), the text displayed in virtual user interface 5060 of the weather application is displayed so as to appear to float off virtual device 5016 in the simulated 3D space 5006.

In FIGS. 5A18-5A19, device 100 detects a swipe left gesture by contact 5064 on device 100 in the physical space 5004 (which is displayed as a swipe left gesture by focus indicator 5066 on virtual device 5016 in the simulated 3D space 5006, FIG. 5A18), and in response, displays a second page of the weather application (e.g., user interface 5063 on device 100, FIG. 5A19, showing the weather for San Jose), which is displayed as virtual user interface 5061 on virtual device 5016 in the simulated 3D space 5006. As shown in FIG. 5A19, the simulated 3D space 5006 is updated to show a representation of the current weather for the selected city (e.g., ceasing to display the representation of cloudy weather shown for Cupertino in FIG. 5A18 and displaying a representation of sunny weather for San Jose in FIG. 5A19).

In FIGS. 5A20-5A21, device 100 detects an activation of a button of device 100 (e.g., a long press of the home button of device 100, as shown in FIG. 5A20), and in response, displays an indication of a virtual assistant (e.g., user interface 5072 on device 100, FIG. 5A21), which is displayed as virtual user interface 5070 on virtual device 5016 in the simulated 3D space 5006. Although not shown here, in some embodiments, activation of one or more other buttons of device 100 (e.g., a button on the side or top of device 100) launches display of the virtual assistant and/or causes an update to the appearance of the user interface displayed on virtual device 5016 and/or causes an update to the appearance of the simulated 3D space 5006. In some embodiments, different devices have different buttons or gestures for performing different functions (e.g., a home button on the face of one device is mapped to starting an interaction with a virtual assistant in response to detecting a long press on the home button, displaying a home user interface in response to detecting a short press on the home button, and displaying a multitasking user interface in response to detecting a double press on the home button, whereas a different device starts an interaction with a virtual assistant in response to detecting a long press on a side button, and displays a home user interface or a multitasking user interface in response to detecting a swipe up from a bottom edge of the device depending on parameters of the movement during the gesture) and the interactions with the virtual device are selected to match interactions with a device that the user is holding to use as an input device or a device that is associated with a user profile of the user or a device that is being used as a display for displaying the simulated 3D space. For example, if the user is using (or is otherwise associated with) a device that has a home button on a same side of the device as a display of the device, the virtual device in the simulated 3D space has a virtual home button that is used to go home, go to multitasking, and/or invoke a virtual assistant, whereas if the user is using (or is otherwise associated with) a device without a home button on the same side of the device as the display of the device, the virtual device in the simulated 3D space does not have a virtual button and instead uses gestures and/or a side button to go home, go to multitasking, and/or invoke a virtual assistant. More generally, the buttons and/or functions of the device that is associated with the user (e.g., being used as an input device, being used as an output device, or associated with a user account of the user) are adopted by the virtual device to help provide the user with a familiar set of buttons and/or functions for interacting with the virtual device in the simulated 3D space.

FIG. 5A22 is similar to FIG. 5A3. In particular, FIG. 5A22 illustrates user interface 5032 for the maps application displayed on device 100 in physical space 5004, and, accordingly, virtual user interface 5030 for the maps application displayed on virtual device 5016 in simulated 3D space 5006, as well as virtual 3D model 5104 displayed in simulated 3D space 5006. Virtual 3D model 5104 is a three-dimensional representation of content displayed in virtual user interface 5030 and includes a plurality of virtual buildings including virtual building 5104a. In addition, FIG. 5A22 illustrates input 5102 detected on touch screen 112 of device 100, at a location corresponding to user interface 5032 on device 100. In the example shown in FIG. 5A22, input 5102 includes a contact and movement of the contact (e.g., a drag gesture, or a swipe gesture) in a downward direction. In response to detecting input 5102, focus indicator 5103 is displayed at a corresponding location in virtual user interface 5030 displayed on virtual device 5016.

FIGS. 5A23-5A24 illustrate a transition from FIG. 5A22 in response to input 5102. In particular, FIG. 5A23 illustrates that, in response to input 5102, user interface 5032 displayed on device 100 is shifted downward. In accordance with user interface 5032 being shifted downward, virtual user interface 5030 displayed on virtual device 5016 in simulated 3D space 5006 is shifted downward (e.g., by an amount corresponding to the amount of shift in user interface 5032, so that content displayed in user interface 5032 and content displayed in virtual user interface 5030 remain synchronized). In addition, virtual 3D model 5104 is shifted so as to display a three-dimensional representation of a different portion of virtual user interface 5030 (and of user interface 5032), in accordance with virtual user interface 5030 (and user interface 5032) being shifted downward. That is, virtual 3D model 5104 is shifted so as to appear as if the viewer (e.g., user 5002) moved forward along an aerial flyover view of the three-dimensional representation of virtual user interface 5030. For example, virtual building 5104a appears to move closer and closer to the viewer through the sequence of FIGS. 5A22-5A24.

In some embodiments, in accordance with a determination that input 5102 includes a drag gesture (e.g., a contact and movement of the contact, and optionally liftoff of the contact with a velocity below a predefined threshold), user interface 5032, virtual user interface 5030, and virtual 3D model 5104 are shifted by an amount corresponding to the amount of movement of input 5102 (e.g., the displacement of the contact) without being continuously shifted after liftoff of input 5102.

In some embodiments, in accordance with a determination that input 5102 includes a swipe gesture (e.g., a contact, movement of the contact, and liftoff of the contact with a velocity above a predefined threshold), user interface 5032, virtual user interface 5030, and virtual 3D model 5104 are continuously shifted in response to input 5102. Accordingly, FIG. 5A24 illustrates further shifting of user interface 5032, virtual user interface 5030, and virtual 3D model 5104 in response to input 5102 (e.g., without receiving an additional, intervening input). In some embodiments, the shifting of user interface 5032, virtual user interface 5030, and virtual 3D model 5104 occurs with gradual deceleration (e.g., from an initial velocity to a lower or zero velocity).

FIG. 5A25 illustrates a transition from FIG. 5A24. In particular, Figure illustrates input 5106 detected on touch screen 112 of device 100, at a location corresponding to user interface 5032. In the example shown in FIG. 5A25, input 5106 includes a plurality of contacts and movement of the contacts away from each other (e.g., a depinch gesture). In response to detecting input 5106, focus indicator 5107, in this example represented by a pair of indicators, is displayed at a corresponding location in virtual user interface 5030 displayed on virtual device 5016.

FIG. 5A26 illustrates a transition from FIG. 5A25 in response to input 5106. In particular, FIG. 5A26 illustrates user interface 5032 after zooming in to user interface 5032 as shown in FIG. 5A25, in response to input 5106. In accordance with zooming in to user interface 5032, virtual user interface 5030 is also zoomed in (e.g., by an amount corresponding to the amount of zooming in user interface 5032, so that content displayed in user interface 5032 and content displayed in virtual user interface 5030 remain synchronized). In addition, virtual 3D model 5104 is updated so as to display a three-dimensional representation of the zoomed-in portion of virtual user interface 5030 (and of user interface 5032), in accordance with zooming in to virtual user interface 5030 (and user interface 5032). That is, virtual 3D model 5104 is enlarged and shifted so as to appear as if the viewer moved closer (e.g., forward along an aerial flyover view and/or lower in altitude) to the three-dimensional representation of virtual user interface 5030. For example, virtual building 5104b as displayed in the center region of virtual 3D model 5104 in FIG. 5A25 is displayed larger and closer to the viewer in FIG. 5A26. In addition, details of user interface 5030 and virtual 3D model 5104 that were not visible at the zoom scale shown in FIG. 5A25, such as landmarks 5030a and 5030b of user interface 5030 and virtual buildings 5104c and 5104d of virtual 3D model 5104, are visible at the zoom scale shown in FIG. 5A26.

FIG. 5A27, like FIG. 5A7, illustrates user interface 5042 for the video player application displayed on device 100 in physical space 5004, and, accordingly, virtual user interface 5040 for the video player application displayed on virtual device 5016 in simulated 3D space 5006, as well as a plurality of representations of videos, including videos 5108 and 5116, displayed in simulated 3D space 5006. FIG. 5A28 is similar to FIG. 5A27 in that FIG. 5A28 shows the same display environment shown in simulated 3D space 5006 of FIG. 5A27 but shows, in physical space 5004, a view of user 5002 holding device 100 at a pose that is within a particular range of poses (e.g., greater than 30 degrees from the horizontal direction, but less than, for example, 60 degrees from the horizontal direction).

FIG. 5A29 illustrates a transition from FIG. 5A28. In particular, Figure illustrates a change in simulated 3D space 5006 in response to user 5002 moving device 100 such that the pose of device 100 is within a different particular range of poses (e.g., less than 30 degrees from the horizontal direction and within a predefined region in front of the user). In the example shown in FIG. 5A29, user 5002 has lowered device 100 so that device 100 is substantially horizontal. In response to the change in the pose of device 100, the pose of virtual device 5016 is changed so as to correspond to the pose of device 100 (e.g., virtual device 5016 is displayed so as to appear substantially horizontal from the viewer's perspective).

In addition, in FIG. 5A29, virtual device 5016 is in a pointing mode of operation, used to point at and direct focus to particular virtual objects in simulated 3D space 5006 using focus indicator 5112 (e.g., displayed as a simulated beam of light). In particular, virtual device 5016 is used to direct focus to video 5108 (e.g., a poster representing associated video content), as indicated by highlighting 5110. Virtual device 5016 displays virtual user interface 5114 to indicate that virtual device 5016 is in a pointing mode of operation, and to indicate that an input (e.g., a tap gesture) on device 100 (e.g., on touch screen 112 of device 100), which corresponds to virtual device 5016, will cause a selection operation to be performed with respect to selected video 5108.

FIG. 5A30 illustrates a transition from FIG. 5A29. In particular, Figure illustrates a change in simulated 3D space 5006 in response to user 5002 moving device 100. In the example shown in FIG. 5A30, user 5002 has rotated device 100 slightly counterclockwise so as to move focus indicator 5112, and accordingly highlighting 5110, to video 5116 (e.g., a poster representing associated video content that is different from the video content associated with video 5108). Virtual device 5016 continues to display virtual user interface 5114 to indicate that virtual device 5016 is in the pointing mode of operation and that an input on the input device will cause a selection operation to be performed with respect to selected video 5116.

FIG. 5A31 illustrates a transition from FIG. 5A30. In particular, Figure illustrates a change in simulated 3D space 5006 in response to detecting an input by user 5002 on device 100 while displaying the display environment as shown in FIG. 5A30. In response to the input, video 5116 is selected and played on screen 5118 in simulated 3D space 5006. Virtual device 5016 displays virtual user interface 5120, which includes a poster representing video 5116 and a plurality of video playback control buttons for controlling video playback (e.g., a scrub bar for displaying and controlling video progress, a volume control bar, a pause button (which changes appearance between a pause button and a play button when selected/toggled), and fast-forward and rewind buttons). In addition, virtual user interface 5120 includes a second plurality of control buttons 5124 for controlling the appearance of screen 5118 in simulated 3D space 5006 and/or the appearance of simulated 3D space 5006 itself. In some embodiments, while playing video 5116, device 100 displays user interface 5122, which includes the poster representing video 5116 and the video playback controls. In some embodiments, the second plurality of control buttons is not displayed in user interface 5122 on device 100 (e.g., because the second plurality of control buttons controls features specific to viewing content in a virtual environment, such as simulated 3D space 5006). In some embodiments, while playing video 5116, device 100 displays a blank user interface or switches the display to a sleep state (e.g., because device 100 in physical space 5004 is not visible to user 5002 while user 5002 is viewing simulated 3D space 5006) (e.g., to conserve battery power).

FIG. 5A32 is similar to FIG. 5A31 in that FIG. 5A32 shows the same display environment shown in simulated 3D space of FIG. 5A31 but shows, in physical space 5004, a view of user 5002 holding device 100 at a pose that is at least 30 degrees from the horizontal direction, but less than approximately 60 degrees from the horizontal direction.

FIG. 5A33 illustrates a transition from FIG. 5A32. In FIG. 5A33, user 5002 has raised his left arm, on which user 5002 is wearing watch 5012. In response to detecting the lifting of watch 5012, virtual user interface 5126 is displayed in simulated 3D space 5006. Virtual user interface 5126 in simulated 3D space 5006 is a virtual representation of the user interface of watch 5012 as displayed in physical space 5004.

FIG. 5A34 illustrates device 100 receiving a notification of an incoming call while video content is being played on screen 5118 in simulated 3D space 5006. In response to receiving the incoming call, virtual device 5016 displays virtual user interface 5130 as shown in simulated 3D space 5006 (and, in some embodiments, device 100 accordingly displays user interface 5128 as shown in physical space 5004 of FIG. 5A34).

FIG. 5A35 illustrates a transition from FIG. 5A34. In particular, Figure shows input 5132 detected on touch screen 112 of device 100 at a location corresponding to answer button 5134 in user interface 5128, to answer the incoming call. Accordingly, focus indicator 5136 is displayed on virtual answer button 5138 in virtual user interface 5130.

FIG. 5A36 illustrates a transition from FIG. 5A35. In response to detecting input 5132 to answer the incoming call, virtual device 5016 displays virtual user interface 5142 for an ongoing call (and, in some embodiments, device 100 accordingly displays user interface 5140 for an ongoing call as shown in FIG. 5A36). In addition, playback of video content on screen 5118 is paused during the ongoing call. FIG. 5A36 illustrates, in physical space 5004, that user 5002 is holding device 100 in his hand and away from his body. In some embodiments, while user 5002 holds device 100 as shown in FIG. 5A36, audio from the ongoing call is output from one or more audio output devices of headset 5008 (e.g., headphones, earbuds, or speakers of headset 5008) on both sides of headset 5008 (e.g., so that user 5002 hears the audio in both ears).

FIG. 5A37 illustrates a transition from FIG. 5A36. In FIG. 5A37, user 5002 has moved device 100 up to his ear to continue the ongoing call. Accordingly, because device 100 is no longer in the field of view of user 5002 (or of headset 5008, such as one or more outward-facing cameras of headset 5008), virtual device 5016 ceases to be displayed in simulated 3D space 5006.

FIG. 5A38 illustrates playback of video content on screen 5118, and, in some embodiments, a transition from FIG. 5A37 (e.g., resuming playback of video content after ending the ongoing call illustrated in FIG. 5A37). FIG. 5A38 is similar to FIG. 5A31, except that the displayed video content corresponds to a different (e.g., later) point in the video being played.

FIG. 5A39 illustrates a transition from FIG. 5A38. In particular, Figure illustrates device 100 receiving a notification 5144 of an incoming message, displayed over user interface 5122. Accordingly, a virtual notification 5146 is displayed over virtual user interface 5120 in simulated 3D space 5006.

FIG. 5A40 illustrates a transition from FIG. 5A39. In particular, Figure shows input 5148 detected on touch screen 112 of device 100 at a location corresponding to notification 5144 displayed over user interface 5122. Accordingly, focus indicator 5150 is displayed on virtual notification 5146, which is displayed over virtual user interface 5120 in simulated 3D space 5006.

FIG. 5A41 illustrates a transition from FIG. 5A40. In response to detecting input 5148, virtual device 5016 displays virtual user interface 5154 for a messaging application (and, in some embodiments, device 100 accordingly displays user interface 5152 for the messaging application, as shown in FIG. 5A41). Virtual user interface 5154 is displayed at a pose that corresponds to a pose of virtual device 5016. In addition, playback of video content on screen 5118 is paused while virtual user interface 5154 for the messaging application is displayed on virtual device 5016.

FIG. 5A42 illustrates a transition from FIG. 5A41. In particular, Figure illustrates that user 5002 has raised device 100 so as to increase the pose of device 100 to a threshold pose (e.g., 60 degrees above horizontal and within a predefined region in front of the user). In response to detecting the increase in pose of device 100 to the threshold pose, virtual user interface 5154 is displayed at a slightly increased scale and as if slightly lifted away from the surface of virtual device 5016. Virtual device 5016 continues to be displayed at a location in simulated 3D space 5006 that corresponds to the position of device 100 in physical space 5004.

FIG. 5A43 illustrates a transition from FIG. 5A43. In particular, Figure illustrates that user 5002 has raised device 100 further so as to increase the pose of device 100 to significantly above the threshold pose (e.g., nearly vertical). Virtual device 5016 continues to be displayed at a location in simulated 3D space 5006 that corresponds to the position of device 100 in physical space 5004. In addition, virtual user interface 5154 is displayed at a predefined zoom scale (e.g., a maximum zoom scale) and at a predefined location in simulated 3D space 5006 away from the location of virtual device 5016 (e.g., so as to improve the readability of virtual user interface 5154 as displayed in FIG. 5A43 compared to user interface 5154 as displayed on virtual device 5016 in FIG. 5A41, for example). In some embodiments, the speed of the transition from virtual user interface 5154 being displayed as slightly lifted away from virtual device 5016 to virtual user interface 5154 being displayed at the predefined location and scale in simulated 3D space 5006 is faster than the speed at which user 5002 raises device 100 (e.g., faster than the speed at which the pose of device 100 changes).

FIG. 5A44 illustrates a transition of FIG. 5A43. In particular, Figure illustrates that user 5002 has entered text (e.g., "OK") in the text entry field of virtual user interface 5154, and that, in response to user 5002 entering text, a "Send" affordance is displayed in virtual user interface 5154. FIG. 5A44 also illustrates an input (e.g., a tap gesture) at a location on device 100 in physical space 5004 corresponding to activation of the "Send" affordance, where the input is represented by focus indicator 5156 accordingly displayed on the "Send" affordance in virtual user interface 5154.

FIG. 5A45 illustrates a transition of FIG. 5A44. In particular, Figure illustrates that, in response to the input activating the "Send" affordance, a message (e.g., "OK") is sent to a recipient (e.g., "Bob"), and displayed in virtual user interface 5154 (and, in some embodiments, accordingly in user interface 5152 on device 100).

FIG. 5A46 illustrates a transition of FIG. 5A45. In particular, Figure illustrates that user 5002 has moved device 100 toward the right while maintaining device 100 at the same pose as shown in FIG. 5A45. In response to the movement of device 100 toward the right, display of virtual device 5016 in simulated 3D space 5006 is updated to show movement of virtual device 5016 so that virtual device 5016 continues to be displayed at a location in simulated 3D space 5006 that corresponds to the position of device 100 in physical space 5004.

FIG. 5A47 illustrates a transition of FIG. 5A46. In particular, Figure illustrates that user 5002 has lowered device 100 so as to decrease the pose of device 100 to the same pose as shown in FIG. 5A42 corresponding to the threshold pose. Accordingly, the pose and location of virtual device 5016 in simulated 3D space 5006 is updated so as to correspond to the position of device 100 in physical space 5004. Although device 100 is at the same pose as shown in FIG. 5A42, virtual user interface 5154 is maintained at the predefined zoom scale and at the predefined location in simulated 3D space 5006 away from the location of virtual device 5016, rather than being redisplayed as if slightly lifted away from the surface of virtual device 5016. That is, the pose threshold at which upward movement of device 100 triggers display of virtual user interface 5154 at the predefined zoom scale and predefined location away from virtual device 5016 is distinct from (e.g., higher than) the pose threshold at which downward movement of device 100 triggers redisplay of virtual user interface 5154 on or nearly on the surface of virtual device 5016 (e.g., the upward and downward thresholds include hysteresis).

FIG. 5A48 illustrates a transition from FIG. 5A47. In particular, Figure illustrates that user 5002 has lowered device 100 so as to decrease the pose of device 100 to the same pose as shown in FIG. 5A41. In the example shown in FIG. 5A48, device 100 has been lowered so as to have a pose that is below a (downward) pose threshold and, accordingly, virtual user interface 5154 is redisplayed on the surface of virtual device 5016 (e.g., the viewing mode in which virtual user interface 5154 is displayed at the predefined zoom scale and predefined location away from virtual device 5016 has been terminated).

FIGS. 6A-6E are flow diagrams illustrating method 600 of displaying and adjusting an appearance of a virtual user interface object in a virtual reality environment based on user inputs in the physical world, in accordance with some embodiments. Method 600 is performed at a computer system (e.g., portable multifunction device 100, FIG. 1A, device 300, FIG. 3A, or a multi-component computer system including headset 5008 and an input device (e.g., device 100 or device 5010), FIG. 5A1) that includes (and/or is in communication with) one or more display generation components (e.g., a display, a projector, a heads-up display, or the like), an input device (e.g., a touch-sensitive surface, such as a touch-sensitive remote control, or a touch-screen display that also serves as a display generation component of the computer system, a mouse, a joystick, a wand controller, and/or cameras tracking the position of one or more features of the user such as the user's hands or eyes), and optionally one or more pose sensors for detecting respective poses of one or more of the input device (e.g., device 100 or device 5010 and/or watch 5012, FIG. 5A1) and display generation components (e.g., the pose sensors include one or more cameras, gyroscopes, inertial measurement units, or other sensors that enable the computer system to detect changes in an orientation and/or position of the computer system or parts thereof relative to a physical environment of the computer system). In some embodiments, the computer system (e.g., the input device of the computer system) includes one or more sensors to detect intensities of contacts with the input device (e.g., a touch-sensitive surface), and optionally one or more tactile output generators. In some embodiments, the computer system includes one or more cameras (e.g., video cameras that continuously provide a live view of at least a portion of the contents that are within the field of view of the cameras and optionally generate video outputs including one or more streams of image frames capturing the contents within the field of view of the cameras). In some embodiments, the input device (e.g., with a touch-sensitive surface) and the display generation component are integrated into a touch-sensitive display. As described above with respect to FIGS. 3B-3C, in some embodiments, method 600 is performed at a computer system 301 (e.g., computer system 301-*a*, 301-*b*, or 301-*c*) in which respective components, such as a display generation component, one or more cameras, one or more input devices, and optionally one or more pose sensors are each either included in or in communication with computer system 301.

In some embodiments, the display generation component is a touch-screen display and the input device (e.g., with a touch-sensitive surface) is on or integrated with the display generation component. In some embodiments, the display generation component is separate from the input device (e.g., as shown in FIG. 4B and FIG. 5A1). Some operations in method 600 are, optionally, combined and/or the order of some operations is, optionally, changed.

For convenience of explanation, some of the embodiments will be discussed with reference to operations performed on a computer system (e.g., as shown in FIG. 5A1) with a headset 5008 and a separate input device (e.g., device 100 or device 5010) with a touch-sensitive surface in response to detecting contacts on the touch-sensitive surface of the input device while displaying some of the user interfaces shown in the figures on the display of headset 5008, and optionally while displaying some of the user interfaces shown in the figures on a separate display generation component of input device 100. However, analogous operations are, optionally, performed on a computer system with a touch-sensitive display system 112 (e.g., on device 100 with touch screen 112) and optionally one or more integrated cameras. Similarly, analogous operations are, optionally, performed on a computer system having one or more cameras that are implemented separately (e.g., in a headset) from one or more other components (e.g., an input device) of the computer system; and in some such embodiments, "movement of the computer system" corresponds to movement of one or more cameras of the computer system, or movement of one or more cameras in communication with the computer system.

As described below, method 600 relates to displaying and adjusting an appearance of a virtual user interface object (e.g., a representation of a smartphone) in a virtual reality environment (e.g., an immersive three-dimensional environment that is experienced through sensory stimuli such as sights and sounds and that provides additional information and experiences to a user that are not available in the physical world), based on user inputs in the physical world (e.g., on a smartphone in the physical world). Allowing a user to interact with and control a virtual device in the virtual reality environment as if the user were interacting with the corresponding real device in the physical world provides an intuitive and efficient way for the user to access functions of the real device while still immersed in the virtual reality environment (e.g., without requiring the user to remove equipment such as a virtual reality headset and headphones), thereby enhancing the operability of the device and making the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

The computer system (e.g., device 100, FIG. 5A2) displays (602), via at least a first display generation component (e.g., a VR headset, a stereo display, a 3D display, a holographic projector, a volumetric display, etc.) (e.g., headset 5008, FIG. 5A1) of the one or more display generation components, a view of at least a portion of a simulated three-dimensional space (e.g., a portion of a 3D virtual environment that is within the user's field of view) (e.g., simulated 3D space 5006, FIG. 5A2). In some embodiments, the simulated three-dimensional space is an immersive environment that has boundaries that do not move relative to the user (e.g., as the user moves around, the boundaries are either hidden from the user by being placed outside of a field of view of the user and/or the boundaries move as the user moves or provides inputs that correspond to movement in the immersive environment to give the illusion that the simulated three-dimensional space extends in all directions around the user). The computer system also displays, via at least the first display generation component, a view of a user interface object (e.g., virtual device 5016, FIG. 5A2) that is located within the simulated three-dimensional space. The user interface object is a representation of a computing device (e.g., a handheld computing device, such as a smartphone) (e.g., device 100, FIG. 5A2) that has a non-immersive display environment (e.g., a user interface where the boundaries of the user interface are visible to the user and the boundaries of the user interface move relative to the user in accordance with user inputs) (e.g., a touch screen display of a handheld computing device, such as touch screen 112 of device 100, FIG. 5A2) that provides access to a plurality of different applications (e.g., the user interface object is a 3D graphical image that visually resembles and/or represents a handheld device (e.g., a smartphone) that provides access to a plurality of user applications, such as an instant messages application, a maps application, a calendar application, an e-mail application, etc.) (e.g., as shown in FIG. 5A2). In some embodiments, the computer system includes the computing device (e.g., device 100, FIG. 5A2), wherein a touch-screen display of the computing device (e.g., touch screen 112, FIG. 5A2) is the input device of the computer system. The user interface object (e.g., virtual device 5016, FIG. 5A2) includes a first user interface (e.g., a two-dimensional user interface) (e.g., virtual user interface 5018, FIG. 5A2) that corresponds to the non-immersive display environment (e.g., user interface 5020, Figure (e.g., the 3D graphical image of the handheld device (e.g., virtual device 5016, Figure includes a representation of (e.g., an exact image, or augmented image, or stylized image) of a user interface of a type that is, in some circumstances, displayed on the touch-screen display that provides access to the plurality of user applications) of the computing device (e.g., user interface 5020, FIG. 5A2) and is responsive to touch inputs from a user on the input device (e.g., in the same manner or a consistent manner that the user interface shown in the non-immersive display environment responds to touch inputs). In addition, a pose of the user interface object in the simulated three-dimensional space corresponds to a pose of the input device in a physical space surrounding the input device (e.g., the orientation of the user interface object is continuously updated to correspond to the orientation of the input device when the input device moves relative to the physical space surrounding the input device) (e.g., as shown in FIGS. 5A28-5A30). The computer system detects (604) a touch input (e.g., a tap or swipe input) at a location on the input device that corresponds to a respective location in the first user interface (e.g. a button shown in the first user interface, or a slider or scrollable map shown in the first user interface) (e.g., as shown in FIG. 5A2). In response to detecting the touch input on the input device (606): in accordance with a determination that the touch input is detected at a location on the input device that corresponds to a first location in the first user interface, the computer system updates an appearance of the first user interface that is displayed on the user interface object in a first manner (e.g., launches a first application in the first user interface that is included on the surface of the user interface object or move or resize a user interface object displayed in the first user interface at the first location) (e.g., as shown in FIGS. 5A2-5A3, where a tap input on the icon for the maps application launches the maps application); and in accordance with a determination that the touch input is detected at a location on the input device that corresponds to a second location in the first user interface, the computer system updates the appearance of the first user interface that is displayed on the user interface object in a second manner that is different from the first manner (e.g., launches a second application in the first user interface that is included on the surface of the user interface object or move or resize a user interface object displayed in the first user interface at the second location) (e.g., as shown in FIGS. 5A6-5A7, where a tap input on the icon for the video player application launches the video player application).

In some embodiments, in response to detecting the touch input on the input device (608): in accordance with a determination that the touch input is detected at the location on the input device that corresponds to the first location in the first user interface, the computer system updates an appearance of the three-dimensional space in a third manner in accordance with the update in appearance made to the first user interface (e.g., in accordance with the update in appearance made to the first user interface in the first manner); and in accordance with a determination that the touch input is detected at the location on the input device that corresponds to the second location in the first user interface, the computer system updates the appearance of the three-dimensional space in a fourth manner that is different from the third manner, in accordance with the update in appearance made to the first user interface (e.g., in accordance with the update in appearance made to the first user interface in the second manner). For example, in some embodiments, in accordance with a determination that the touch input is detected at the location on the input device that corresponds to the first location in the first user interface, a first application (e.g., a map application) is launched in the first user interface and the appearance of the three-dimensional space is updated to match the first application (e.g., the three-dimensional space is updated to include a 3D map corresponding to the launched map application, as shown in FIG. 5A3). In some embodiments, in accordance with a determination that the touch input is detected at the location on the input device that corresponds to the second location in the first user interface, a second application (e.g., a video player application) is launched in the first user interface and the appearance of the three-dimensional space is updated to match the second application (e.g., the three-dimensional space is updated to include a plurality of selectable representations of videos available to be launched via the video player application, as shown in FIG. 5A7). In some embodiments, the computer system detects a plurality of (distinct) touch inputs at respective locations on the input device that correspond to respective locations in the first user interface (e.g., a series, or sequence of touch inputs), and the plurality of touch inputs includes at least one touch input that is detected at a location on the input device that corresponds to the first location in the first user interface, and at least one touch input that is detected at a location on the input device that corresponds to the second location in the first user interface. Updating the appearance of the three-dimensional space in accordance with the updates made to the user interface of the virtual device (e.g., the first user interface of the user interface object) improves the visual feedback provided to the user (e.g., by making the computer system appear more responsive to user input), provides the user with a more immersive and/or intuitive viewing experience, enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the computer system updates (610), or causes the computing device to update, a second user interface (e.g., user interface 5032, FIG. 5A3) displayed through the non-immersive display environment of the computing device (e.g., device 100, FIG. 5A3) in accordance with the touch input directed to the first location in the first user interface (e.g., as shown in FIG. 5A2). In some embodiments, the second user interface (e.g., user interface 5032, FIG. 5A3) corresponds to the first user interface (e.g., virtual user interface 5030, FIG. 5A3). For example, the change made to the second user interface in the non-immersive display environment on the display of the computing device is the same change that is shown on the first user interface in the immersive display environment, and the same change to the second user interface can be shown concurrently with the change shown in the immersive display environment (e.g., as shown in FIG. 5A3). Similarly, in some embodiments, the second user interface displayed through the non-immersive display environment of the computing device is updated in accordance with the touch input directed to the second location in the first user interface (e.g., as shown in FIGS. 5A6-5A7) (e.g., the user interface of the computing device and the user interface of the corresponding virtual device in the immersive display environment are kept synchronized as the user interacts with the virtual device by providing inputs to the computing device while viewing the virtual device in the immersive display environment, as shown in FIGS. 5A2-5A11). Updating the appearance of the user interface of the real device (e.g., the second user interface displayed through the non-immersive display environment of the computing device) in accordance with updates made to the user interface of the virtual device (e.g., with touch inputs in the first user interface of the user interface object) improves the visual feedback provided on the computing device (e.g., by keeping the user interface of the computing device synchronized with the corresponding virtual device), enhances the operability of the device (e.g., by allowing the user to interact with either the virtual device or the real device), and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the computing device that has the non-immersive display environment (e.g., a smartphone, such as device 100) has (612) an internal state that is used to determine the appearance of the first user interface that is displayed on the user interface object (e.g., in the simulated three-dimensional immersive display environment) (e.g., the virtual user interface that is displayed on virtual device 5016 in the simulated 3D space 5006, FIGS. 5A2-5A11). Using the internal state of the computing device to determine the appearance of the virtual device (e.g., the appearance of the first user interface that is displayed on the user interface object) keeps the real computing device and the virtual device synchronized, improves the visual feedback provided to the user (e.g., by making the computer system appear more responsive to user input), enhances the operability of the device (e.g., by allowing the user to interact with either the virtual device or the real device), and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, inputs in the first user interface on the user interface object (e.g., touch inputs from the user on the input device that correspond to inputs in the first user interface) (e.g., touch inputs from user 5002 on device 100 that correspond to inputs in the virtual user interface that is displayed on virtual device 5016) cause (614) one or more changes in the internal state of the computing device (e.g., device 100) that has the non-immersive display environment (e.g., sent/read messages, reordered applications, recently used application information, etc.). For example, in some embodiments, messages that are marked as read in the first user interface on the user interface object in the simulated three-dimensional space (e.g., in the virtual user interface on virtual device 5016 in the simulated 3D space 5006) are also marked as read in the internal state of the computing device that has the non-immersive display environment (e.g., in device 100 in the physical space 5004). Changing the internal state of the computing device in response to inputs in the virtual device (e.g., in the first user interface on the user interface object) keeps the real computing device and the virtual device synchronized, improves the visual feedback provided to the user (e.g., by making the computer system appear more responsive to user input), enhances the operability of the device (e.g., by allowing the user to interact with either the virtual device or the real device), and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, changes in the internal state of the computing device that has the non-immersive display environment (e.g., device 100 in the physical space 5004) cause (616) changes in the first user interface on the user interface object (e.g., in the simulated three-dimensional immersive display environment) (e.g., in the virtual user interface on virtual device 5016 in the simulated 3D space 5006) (e.g., incoming notifications). For example, in some embodiments, incoming notifications for the computing device that has the non-immersive display environment (e.g., incoming notifications on a smartphone) cause changes in the first user interface on the user interface object (e.g., the incoming notifications also appear in the first user interface on the user interface object in the simulated three-dimensional immersive display environment) (e.g., as shown in FIG. 5A39 with respect to an incoming text message) (e.g., as shown in Figure with respect to an incoming phone call). Changing the virtual device (e.g., changing the first user interface on the user interface object) in accordance with changes in the real computing device (e.g., in the internal state of the computing device) keeps the real computing device and the virtual device synchronized, improves the visual feedback provided to the user (e.g., by making the computer system appear more responsive to user input), enhances the operability of the device (e.g., by allowing the user to interact with either the virtual device or the real device), and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the first user interface that is displayed on the user interface object (e.g., in the simulated three-dimensional immersive display environment) (e.g., the virtual user interface that is displayed on virtual device 5016 in the simulated 3D space 5006, FIGS. 5A2-5A11) is (618) a simulation of a touch-sensitive user interface on the computing device (e.g., a device with a touch-sensitive display that has a non-immersive display environment) (e.g., the user interface on device 100, FIGS. 5A2-5A11). For example, in some embodiments, the first user interface that is displayed on the user interface object is a simulation of a smartphone user interface (e.g., as shown in Figures Simulating a touch-sensitive user interface of a real device on the user interface of the virtual device (e.g., the first user interface that is displayed on the user interface object) provides a consistent user interface (and consistency between what is displayed and what a user would expect to see), improves the visual feedback provided to the user (e.g., by making the computer system appear more responsive to user input), enhances the operability of the device (e.g., by allowing the user to interact with either the virtual device or the real device), and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the computer system detects (620) a change in the pose of the input device in the physical space surrounding the input device; and in response to detecting the change in the pose of the input device in the physical space surrounding the input device, changes the pose of the user interface object (and the included first user interface) in the simulated three-dimensional space (e.g., as shown in FIGS. 5A28-5A30 where user 5002 changes the pose of device 100 in the physical space 5004 and the pose of virtual device 5016 in the simulated 3D space 5006 changes accordingly). For example, in some embodiments, the pose of the user interface object in the simulated three-dimensional space (e.g., the pose of virtual device 5016 in the simulated 3D space 5006) is continuously updated to correspond to the pose of the input device (e.g., the pose of device 100 in the physical space 5004) when the input device moves relative to the physical space surrounding the input device. Changing the pose of the virtual device (e.g., the user interface object) in response to changes in pose of the input device improves the visual feedback provided to the user (e.g., by making the computer system appear more responsive to user input and user movement and by providing consistency between what is displayed and what a user would expect to see), enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the first display generation component is (622) a virtual reality headset (e.g., headset 5008-a, FIG. 5A1); the input device is a handheld computing device (e.g., a smartphone with a touch-sensitive display) (e.g., device 100, FIG. 5A1) that is distinct from the virtual reality headset; and the handheld computing device sends the first user interface (e.g., the virtual user interface on virtual device 5016 in the simulated 3D space 5006) to the virtual reality headset for display. Allowing the user to use a handheld computing device (e.g., a smartphone) as the input device and view the virtual reality environment via a separate virtual reality headset improves the feedback provided to the user (e.g., by allowing the user to use a familiar input device with familiar tactile feedback), enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the computer system is (624) a handheld computing device (e.g., a smartphone); and the first display generation component is a touch-screen display of the handheld computing device (e.g., touch screen 112 of device 100). For example, in some embodiments, a touch-screen display of a smartphone displays the view of at least a portion of the simulated three-dimensional space and the view of the user interface object that is located within the simulated three-dimensional space, and the smartphone is inserted into a VR headset (e.g., headset 5008-b, FIG. 5A1) (e.g., a cardboard VR headset) for the user to wear. Displaying the virtual reality environment using the display of a handheld computing device (e.g., a smartphone) allows the user to view the virtual reality environment without requiring a separate display generation component, enhances the operability of the device (e.g., by allowing the user to use the device as a smartphone or as a virtual reality viewer), and makes the user-device interface more efficient (e.g., by helping the user to achieve an intended outcome with the required inputs), which, additionally, reduces power usage and improves battery life of the device by enabling the user to use the device more quickly and efficiently.

In some embodiments, the input device is (626) a touch-sensitive remote control that does not have a display (e.g., device 5010, FIG. 5A1). Allowing the user to use a touch-sensitive remote control as the input device (while using a handheld computing device such as a smartphone to view the virtual reality environment) provides an efficient way to operate/interact with the computing device when the computing device is not available as an input device and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, while displaying the three-dimensional space in a manner corresponding to a first application (e.g., a video player application, as shown in FIG. 5A38) (628), the computer system: detects a second touch input (e.g., a tap or swipe input) at a location on the input device that corresponds to launching a second application, distinct from the first application, in the first user interface that is included on the surface of the user interface object (e.g., in the simulated three-dimensional immersive display environment) (e.g., as shown in FIG. 5A40); and in response to detecting the second touch input on the input device: displays the second application in the first user interface, while maintaining display of the three-dimensional space in a manner corresponding to the first application (e.g., as shown in FIG. 5A41). For example, in some embodiments, the first user interface of the user interface object in the simulated three-dimensional display environment is used to view and/or interact with a second application (e.g., a camera application, a messaging application, a phone application, etc.) while the simulated three-dimensional display environment continues to correspond to a first application (e.g., a video player application that is playing a movie in the simulated three-dimensional display environment) (e.g., as shown in FIGS. 5A33-5A48). For example, notifications (e.g., messages, calls, etc.) received on the virtual phone (e.g., on the first user interface of the user interface object) can be answered in the simulated three-dimensional display environment (e.g., via touch inputs on the virtual phone) (e.g., as described herein with reference to operation 646 of method 600). As another example, in some embodiments, the second application is used to "punch through" the simulated three-dimensional display environment to the real physical world. For example, the virtual phone (e.g., through the first user interface of the user interface object, virtual device 5016) becomes a window to the real world (e.g., through a camera application). Allowing the user to view content from a first application in the virtual reality environment (e.g., in the three-dimensional space) and content from a second application on the virtual phone (e.g., on the first user interface of the user interface object) simulates usage of a real phone in the physical world, improves the visual feedback provided to the user (e.g., by making the computer system appear more responsive to user input), enhances the operability of the device (e.g., by allowing the user to interact with either the virtual device or the real device), and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the user interface object is (630) displayed at a location within the simulated three-dimensional space that corresponds to a location of the input device in the user's hand in the physical space (e.g., as shown in FIGS. 5A28-5A30). Displaying the user interface object at a location within the simulated three-dimensional space that corresponds to a location of the input device in the user's hand in the physical space improves the visual feedback provided to the user (e.g., by making the computer system appear more responsive to user input and by providing consistency between what is displayed and what a user would expect to see), provides the user with a more immersive and/or intuitive viewing experience, enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the first user interface that is displayed on the user interface object (e.g., the virtual user interface that is displayed on virtual device 5016 in the simulated 3D space 5006, FIGS. 5A2-5A11) when the computing device is in a first mode of operation (e.g., a first application or home screen is designated for display on the computing device, such as device 100 in FIGS. 5A2-5A11) while the user is viewing the simulated three-dimensional environment (e.g., in the simulated three-dimensional immersive display environment) corresponds (632) to a second user interface that is displayed on the computing device (e.g., the user interface that is displayed on device 100 in the physical space 5004, FIGS. 5A2-5A11) when the computing device is in the first mode of operation (e.g., displayed on the display of the computing device through the non-immersive display environment of the computing device) (e.g., as shown in FIGS. 5A2-5A11). In some embodiments, the first user interface that is displayed on the user interface object (e.g., the user interface of the virtual reality phone in the simulated three-dimensional immersive display environment) (e.g., the virtual user interface that is displayed on virtual device 5016 in the simulated 3D space 5006, FIGS. 5A2-5A11) mimics the user interface of a smartphone in the physical environment (e.g., the user interface that is displayed on device 100 in the physical space 5004, FIGS. 5A2-5A11). For example, in some embodiments, applications on the virtual reality phone are the same applications as on the smartphone in the physical environment, with the same organization (e.g., as shown in FIG. 5A2). In some embodiments, navigational inputs on the virtual reality phone result in the same changes as navigational inputs on the actual smartphone (e.g., as shown in Figures In some embodiments, the first user interface includes more or less information (e.g., device status information) than the second user interface (e.g., as shown in Figure user interface 5020 displayed on device 100 in the physical space 5004 includes device status information that is not displayed in virtual user interface 5018 that is displayed on virtual device 5016 in the simulated 3D space 5006). Displaying a first user interface (e.g., on the virtual reality phone in the simulated three-dimensional environment) that corresponds to a second user interface (e.g., on the real computing device in the physical world) provides a consistent user interface (and consistency between what is displayed and what a user would expect to see), improves the visual feedback provided to the user (e.g., by making the computer system appear more responsive to user input), enhances the operability of the device (e.g., by allowing the user to interact with either the virtual device or the real device), and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the first user interface that is displayed on the user interface object (e.g., virtual user interface 5060 that is displayed on virtual device 5016 in the simulated 3D space 5006, FIG. 5A17) includes (634) additional depth compared to the second user interface displayed through the non-immersive display environment of the computing device (e.g., on a display of the computing device) (e.g., user interface 5062 that is displayed on device 100 in the physical space 5004, FIG. 5A17). In some embodiments, one or more user interface elements from the second user interface (e.g., icons and/or text from user interface 5062 that is displayed on device 100 in the physical space 5004, Figure that are spaced apart by a respective amount in a first direction on the display of the device (e.g., along a simulated z-axis that extends out of the display of the device) are spaced apart by more than the respective amount in the first direction (e.g., along a simulated z-axis that extends out of the simulated display of the user interface object) in the first user interface (e.g., in the simulated three-dimensional environment) (e.g., icons and/or text from virtual user interface 5060 that is displayed on virtual device 5016 in the simulated 3D space 5006 are spaced apart by more than the respective amount in the first direction, FIG. 5A17). For example, in some embodiments, the icons and/or text displayed in the first user interface appear to float off the virtual reality phone in the simulated three-dimensional immersive display environment (e.g., as shown in FIG. 5A17). Displaying the first user interface (e.g., of the virtual device) with additional depth compared to the second user interface (e.g., of the real device) provides the user with a more enhanced and immersive viewing experience, improves the visual feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the computer system detects (636) an activation of a button of the input device (e.g., volume up/down, home, power, etc.); and in response to detecting the activation of the button of the input device, updates the appearance of the first user interface that is displayed on the user interface object in accordance with the activation of the button (e.g., as shown in FIGS. 5A20-5A21). For example, in some embodiments, where the input device is a smartphone with a home button (e.g., device 100, FIG. 5A20), in response to detecting activation of the home button, the computer system updates (or causes the computing device and/or one or more display generation components to update) the first user interface to display the home screen (e.g., virtual user interface 5019, FIG. 5A11). In some embodiments, the button is a display off button and in response to detecting activation of the button the first user interface is replaced with a representation of the device with a display off (e.g., virtual device 5016 with the display off). In some embodiments, the button is a display lock button and in response to the detecting activation of the button the first user interface is replaced with a lock screen. In some embodiments, the button is a virtual assistant button (e.g., a home button of device 100) and in response to detecting activation of the button (e.g., a long press of the home button of device 100, as shown in FIG. 5A20), the device displays an indication of a virtual assistant (e.g., as shown in FIG. 5A21). Updating the appearance of the first user interface (e.g., of the virtual device) in accordance with activation of a button of the input device (e.g., the real computing device) keeps the real computing device and the virtual device synchronized, improves the visual feedback provided to the user (e.g., by making the computer system appear more responsive to user input and by providing consistency between what is displayed and what a user would expect to see), enhances the operability of the device (e.g., by allowing the user to interact with either the virtual device or the real device), and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the computer system displays (638) a first view of at least a portion of the simulated three-dimensional space (e.g., a portion of a 3D virtual environment associated with a third application), wherein the first view is associated with a third application; and detects a second touch input (e.g., a tap or swipe input) on the input device, wherein the second touch input launches a fourth application, distinct from the third application (e.g., the second touch input is a tap input on an application icon to launch the fourth application) (e.g., the second touch input is a side swipe input to switch between different applications in the application stack). In some embodiments, the first user interface in the simulated three-dimensional environment is a view of the third application when the second touch input is detected (e.g., a view of the maps application, as shown in FIG. 5A3, and the second touch input is a side swipe input used to switch between open applications from the maps application to the video player application). In some embodiments, the first user interface in the simulated three-dimensional environment is a view of a home screen of the device when the second touch input is detected (e.g., a view of home screen user interface 5020, as shown in 5A6, and the second touch input is a tap input on an application icon to launch the video player application, as shown in FIG. 5A7). In some embodiments, in response to detecting the second touch input on the input device, the computer system displays a second view of at least a portion of the simulated three-dimensional space (e.g., simulated 3D space 5006), distinct from the first view, wherein the second view is associated with the fourth application (e.g., a video player application, as shown in FIG. 5A7). Updating the appearance of the simulated three-dimensional space in accordance with a currently selected application improves the visual feedback provided to the user (e.g., by making the computer system appear more responsive to user input and by providing consistency between what is displayed and what a user would expect to see), provides the user with a more immersive and/or intuitive viewing experience, enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the first user interface that is displayed on the user interface object (e.g., in the simulated three-dimensional immersive display environment) (e.g., virtual user interface 5030 that is displayed on virtual device 5016 in the simulated 3D space 5006, FIGS. 5A22-5A24) extends (640) outside the user interface object (e.g., when scrolling a list on the first user interface, the list appears to scroll beyond the edge of the user interface object before fading out) (e.g., when scrolling through the map of virtual user interface 5030, the map is displayed so as to appear to extend beyond the edge of virtual device 5016 before fading out, as shown in FIGS. 5A22-5A24). Displaying the first user interface (e.g., of the virtual device) extending outside the user interface object (e.g., beyond the edge(s) of the virtual device) provides the user with a more enhanced and immersive viewing experience, improves the visual feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the first user interface that is displayed on the user interface object (e.g., in the simulated three-dimensional immersive display environment) (e.g., the virtual user interface that is displayed on virtual device 5016 in the simulated 3D space 5006, FIGS. 5A2-5A11) includes (642) additional information about one or more of the user interface objects in the simulated three-dimensional space. For example, the device (e.g., virtual device 5016, FIG. 5A27) displays metadata about a representation of a media item (e.g., audio or video such as a song, movie, television show, or the like) that is displayed in the simulated three-dimensional space (e.g., in FIG. 5A27, although not shown in detail here, in some embodiments, virtual user interface 5040 displays metadata about the listed movie selections). Displaying additional information about one or more of the user interface objects in the simulated three-dimensional space on the first user interface (e.g., of the virtual device) provides the user with a more enhanced and immersive viewing experience, improves the visual feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the first user interface that is displayed on the user interface object corresponds (644) to a respective application, and the method further includes: in accordance with a determination that the respective application includes instructions for displaying one or more three-dimensional objects in the simulated three-dimensional space (e.g., a full virtual reality experience), updating an appearance of the three-dimensional space in accordance with the instructions from the respective application (e.g., as shown in FIG. 5A3 with respect to a maps application) (e.g., as shown in FIG. 5A7 with respect to a video player application); and in accordance with a determination that the respective application does not include instructions for displaying a simulated three-dimensional environment (e.g., a full virtual reality experience), displaying the simulated three-dimensional space includes displaying at least a portion of a two-dimensional user interface for the respective application that is adapted for display in the non-immersive display environment of the computing device (e.g., a weather forecast user interface) along with one or more other user interface objects (e.g., clouds, raindrops, lightning, etc.) generated based on information from the respective application (e.g., that includes a slightly enhanced version of the application content (e.g., weather app with VR weather such as clouds or rain)) (e.g., as shown in FIGS. 5A16-5A19). In some embodiments, the computer system displays a plurality of (distinct) user interfaces on the user interface object, the plurality of user interfaces corresponding to respective applications, and the plurality of user interfaces includes at least one user interface corresponding to an application that includes instructions for displaying one or more three-dimensional objects in the simulated three-dimensional space, and at least one user interface corresponding to an application that does not include instructions for displaying a simulated three-dimensional environment. Displaying the simulated three-dimensional space with at least one or more other user interface objects generated based on information from the respective application (e.g., when the respective application does not include instructions for displaying a full virtual reality experience) or displaying the three-dimensional space in accordance with instructions from the respective application provides the user with a more enhanced and immersive viewing experience, improves the visual feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the computer system receives (646) an indication that an event (e.g., receipt of an electronic communication such as a phone call, email, or other electronic message, or notification that corresponds to an application on the device) has occurred that corresponds to generation of a notification at the computing device (e.g., receiving a phone call, as shown in FIG. 5A34) (e.g., receiving a text message, as shown in FIG. 5A39); and in response to receiving the indication, displays a representation of the notification on the first user interface that is displayed on the user interface object (e.g., in the simulated three-dimensional immersive display environment) (e.g., as shown in FIG. 5A34 and FIG. 5A39) and, optionally in some embodiments, displays a representation of the notification on the non-immersive display environment of the computing device (e.g., on device 100, as shown in FIG. 5A34 and FIG. 5A39). For example, in some embodiments, the notification received on the computing device is an incoming phone call, which the user can answer or decline by tapping on (or sliding) affordances on the first user interface (e.g., in the simulated three-dimensional immersive display environment) (e.g., as shown in FIGS. 5A34-5A37). As another example, in some embodiments, the notification received on the computing device is a message or alert, which the user can respond to in the simulated three-dimensional immersive display environment by: 1) ignoring the message/alert, which will cause the computer system to cease to display the message/alert in the first user interface in the simulated three-dimensional space after a respective period of time with no interaction, 2) dismissing the message/alert with a gesture such as a flick on the touch-sensitive surface (of the input device) at a location that corresponds to the message/alert in the first user interface in the simulated three-dimensional space before the respective period of time has elapsed, which will cause the computer system to cease to display the message/alert before the respective period of time has elapsed, or 3) tapping on the touch-sensitive surface (of the input device) (e.g., on device 100, as shown in FIG. 5A40) at a location that corresponds to the message/alert in the first user interface in the simulated three-dimensional space, which will cause the computer system to display a corresponding application for responding to the message/alert in the first user interface in the simulated three-dimensional space (e.g., as shown in FIGS. 5A40-5A41). Displaying a representation of a notification on the first user interface (e.g., of the virtual device) in response to receiving an indication that an event has occurred that corresponds to generation of the notification at the computing device simulates usage of a real phone in the physical world, improves the visual feedback provided to the user (e.g., by making the computer system appear more responsive to user input), enhances the operability of the device (e.g., by allowing the user to interact with either the virtual device or the real device), and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

It should be understood that the particular order in which the operations in FIGS. 6A-6E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, and 1000) are also applicable in an analogous manner to method 600 described above with respect to FIGS. 6A-6E. For example, the contacts, gestures, user interface objects, intensity thresholds, focus indicators, and/or animations described above with reference to method 600 optionally have one or more of the characteristics of the contacts, gestures, user interface objects, intensity thresholds, focus indicators, and/or animations described herein with reference to other methods described herein (e.g., methods 700, 800, 900, and 1000). For brevity, these details are not repeated here.

FIGS. 7A-7C are flow diagrams illustrating method 700 of selecting a mode of operation of an input device in accordance with movement of and changes in pose of the input device, in accordance with some embodiments. Method 700 is performed at a computer system (e.g., portable multifunction device 100, FIG. 1A, device 300, FIG. 3A, or a multi-component computer system including headset 5008 and an input device (e.g., device 100 or device 5010), FIG. 5A1) that includes (and/or is in communication with) one or more display generation components (e.g., a display, a projector, a heads-up display, or the like), an input device (e.g., a touch-sensitive surface, such as a touch-sensitive remote control, or a touch-screen display that also serves as a display generation component of the computer system, a mouse, a joystick, a wand controller, and/or cameras tracking the position of one or more features of the user such as the user's hands or eyes), and optionally one or more pose sensors for detecting respective poses of one or more of the input device (e.g., device 100 or device 5010 and/or watch 5012, FIG. 5A1) and display generation components (e.g., the pose sensors include one or more cameras, gyroscopes, inertial measurement units, or other sensors that enable the computer system to detect changes in an orientation and/or position of the computer system or parts thereof relative to a physical environment of the computer system). In some embodiments, the computer system (e.g., the input device of the computer system) includes one or more sensors to detect intensities of contacts with the input device (e.g., a touch-sensitive surface), and optionally one or more tactile output generators. In some embodiments, the computer system includes one or more cameras (e.g., video cameras that continuously provide a live view of at least a portion of the contents that are within the field of view of the cameras and optionally generate video outputs including one or more streams of image frames capturing the contents within the field of view of the cameras). In some embodiments, the input device (e.g., with a touch-sensitive surface) and the display generation component are integrated into a touch-sensitive display. As described above with respect to FIGS. 3B-3C, in some embodiments, method 700 is performed at a computer system 301 (e.g., computer system 301-a, 301-b, or 301-c) in which respective components, such as a display generation component, one or more cameras, one or more input devices, and optionally one or more pose sensors are each either included in or in communication with computer system 301.

In some embodiments, the display generation component is a touch-screen display and the input device (e.g., with a touch-sensitive surface) is on or integrated with the display generation component. In some embodiments, the display generation component is separate from the input device (e.g., as shown in FIG. 4B and FIG. 5A1). Some operations in method 700 are, optionally, combined and/or the order of some operations is, optionally, changed.

For convenience of explanation, some of the embodiments will be discussed with reference to operations performed on a computer system (e.g., as shown in FIG. 5A1) with a headset 5008 and a separate input device (e.g., device 100 or device 5010) with a touch-sensitive surface in response to detecting contacts on the touch-sensitive surface of the input device while displaying some of the user interfaces shown in the figures on the display of headset 5008, and optionally while displaying some of the user interfaces shown in the figures on a separate display generation component of input device 100. However, analogous operations are, optionally, performed on a computer system with a touch-sensitive display system 112 (e.g., on device 100 with touch screen 112) and optionally one or more integrated cameras. Similarly, analogous operations are, optionally, performed on a computer system having one or more cameras that are implemented separately (e.g., in a headset) from one or more other components (e.g., an input device) of the computer system; and in some such embodiments, "movement of the computer system" corresponds to movement of one or more cameras of the computer system, or movement of one or more cameras in communication with the computer system.

As described below, method 700 relates to determining an input mode of an input device (e.g., a smartphone or other physical controller in the physical world) in a virtual reality environment (e.g., an immersive three-dimensional environment that is experienced through sensory stimuli such as sights and sounds and that provides additional information and experiences to a user that are not available in the physical world), based on a pose of the input device, and specifically based on whether the pose of the input device meets predefined criteria associated with respective input modes. Allowing a user to interact with a virtual reality environment through a plurality of available input modes (e.g., a pointer mode, where the input device is held at or near a substantially horizontal pose, in which a corresponding user interface object in the virtual reality environment shifts focus between other user interface objects, or a mode in which the input device in conjunction with the corresponding user interface object simulate usage of a real phone in the physical world) provides an intuitive and efficient way for the user to switch between input modes (e.g., by changing the pose of the input device using straightforward and intuitive motions) without cluttering the display environment with additional control affordances or requiring numerous inputs, thereby enhancing the operability of the device and making the user-device interface more efficient (e.g., by helping the user to achieve an intended outcome with the required inputs and reducing user mistakes when operating/ interacting with the device), which, additionally, reduces power usage and improves battery life of the device by enabling the user to use the device more quickly and efficiently.

The computer system displays (702) via at least a first display generation component (e.g., a VR headset, or a stereo display, a 3D display, a holographic projector, a volumetric display, etc.) of the one or more display generation components: a view of at least a portion of a simulated three-dimensional space (e.g., simulated 3D space 5006, FIG. 5A27); and a view of a user interface object that is located within the simulated three-dimensional space (e.g., virtual device 5016, FIG. 5A27), wherein: the user interface object includes a first user interface (e.g., a two-dimensional user interface) that is responsive to touch inputs on the input device (e.g., virtual user interface 5040 for the video player application displayed on virtual device 5016 in simulated 3D space 5006, responsive to touch inputs on device 100 in physical space 5004, FIG. 5A27), and a pose of the user interface object in the simulated three-dimensional space corresponds to a pose of the input device in a physical space surrounding the input device. For example, the user interface object is a representation of a computing device (e.g., device 100 in physical space 5004, FIG. 5A27) that has a non-immersive display environment (e.g., a touch-screen display, such as touch screen 112, FIG. 5A27) that provides access to a plurality of different applications (e.g., the user interface object is a 3D graphical image that visually resembles and/or represents a handheld device (e.g., a smartphone) that provides access to a plurality of user applications, such as an instant messages application, a maps application, a calendar application, an e-mail application, etc.); the first user interface corresponds to the non-immersive display environment (e.g., the 3D graphical image of the handheld device includes an exact image (or augmented image, or stylized image) of the touch-screen display that provides access to the plurality of user applications) and is responsive to touch inputs from the user on the input device in the same manner or a consistent manner that the user interface shown in the non-immersive display environment (e.g., user interface 5042 shown on device 100 in physical space 5004, FIG. 5A27) responds to touch inputs. The computer system detects (704) a movement input via the input device that includes movement of the input device relative to a physical environment surrounding the input device (e.g., lowering and/or rotating of device 100, as shown and described in greater detail herein with reference to FIGS. 5A27-5A30). In response to detecting the movement input via the input device (706): in accordance with a determination that the movement of the input device is detected while the input device meets first input-mode criteria that include a first criterion that is satisfied when a pose of the input device is within a first range of poses (e.g., substantially horizontal or less than 30 degrees tilted up from the horizontal plane, as shown and described in greater detail herein with reference to FIGS. 5A29-5A30), the computer system performs a respective operation within the simulated three-dimensional space (e.g., moving a focus indicator within the simulated three-dimensional space, such as moving focus indicator 5112 within simulated 3D space 5006 as described with reference to FIGS. 5A29-5A30, dragging an object in the three-dimensional space, etc.) in accordance with the movement of the input device (and optionally, ceasing to display the first user interface, such as ceasing to detect virtual user interface 5040 in FIG. 5A29), wherein at least a portion of the respective operation occurs outside of the user interface object (e.g., the user interface object acts as a source of the force or action that affects object(s) or space that is located outside of the user interface object); and, in accordance with a determination that the movement of the input device is detected while the input device meets second input-mode criteria that require a pose of the input device to be within a second range of poses distinct from the first range of poses (e.g., greater than 30 degrees from the horizontal direction), the computer system repositions the user interface object in the simulated three-dimensional space in accordance with the movement of the input device without performing the respective operation (e.g., movement of device 100 while at the pose displayed in FIG. 5A28 results in repositioning virtual device 5016 without displaying or moving focus indicator 5112). In some embodiments, the first input-mode criteria require a pose of the input device to be within the first range of poses. In some embodiments, the computer system detects a plurality of (distinct) movement inputs that include movement of the input device relative to the physical environment (e.g., a series, or sequence of movement inputs), and the plurality of movement inputs includes at least one movement input for which the movement of the input device is detected while the input device meets the first input-mode criteria that require the pose of the input device to be within the first range of poses, and at least one movement input for which the movement of the input device is detected while the input device meets the second input-mode criteria that require the pose of the input device to be within the second range of poses distinct from the first range of poses.

In some embodiments, the computer system detects (708) a touch input via the input device; in accordance with a determination that the touch input is detected while the input device meets the second input-mode criteria, performs a user interface operation in the first user interface (e.g., performing a user interface operation corresponding to the detected touch input); and in accordance with a determination that the touch input is detected while the input device meets the first input-mode criteria, forgoes performance of the user interface operation in the first user interface. In some embodiments, the first user interface is responsive to (e.g., operations are performed in the first user interface in response to) touch inputs from the user while the input device is in the second input mode (satisfying the second input-mode criteria) but not while the input device is in the first input mode (satisfying the first input-mode criteria) (e.g., in response to a tap input on device 100 the computer system performs an operation in user interface 5040 (FIG. 5A27) corresponding to the location of the tap input, while device 100 is at the pose shown in FIG. 5A28, but forgoes performance of an operation in user interface 5040 corresponding to the location of the tap input, while device 100 is at the pose shown in FIG. 5A29). In some embodiments, the computer system detects a plurality of (distinct) touch inputs (e.g., a series, or sequence of touch inputs), and the plurality of touch inputs includes at least one touch input that is detected while the input device meets the second input-mode criteria, and at least one touch input that is detected while the input device meets the first input-mode criteria. Forgoing performance of a user interface operation in the first user interface while in the first input mode (e.g., while using the input device as a pointer), where the user interface operation is or would have been performed in the second input mode (e.g., as if the user were interacting with a corresponding physical device with a non-immersive display environment) improves the feedback provided to the user (e.g., by distinguishing the two modes of operation and providing distinct control options in each mode) and enhances the operability of the device (e.g., by allowing the user to perform intended operations while in the second mode of operation and preventing inadvertent activation of operations of the second mode while in the first mode of operation), and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, in response to detecting the movement input via the input device (710): in accordance with a determination that the movement of the input device meets first pose criteria that require the pose of the input device to enter a third range of poses distinct from the first range of poses as a result of the movement (e.g., the input device is raised so that the pose of the input device is within the third range of poses), the computer system displays the first user interface in the simulated three-dimensional space at a location away from the user interface object (e.g., as shown and described in greater detail herein with reference to FIGS. 5A41-5A43 and method 1000). In some embodiments, the third range of poses includes poses greater than the first range of poses (e.g., greater than 30 degrees from the horizontal direction). In some embodiments, the third range of poses includes at least some poses in the second range of poses. In some embodiments, the third range of poses is distinct from both the first and second ranges of poses (e.g., the third range of poses includes poses greater than both the first and second ranges). In some embodiments, the plurality of (distinct) movement inputs includes at least one movement input for which movement of the input device meets the first pose criteria that require the input device to enter the third range of poses as a result of the movement. Displaying the first user interface in the simulated three-dimensional space at a location away from the user interface object in response to the pose of the input device entering a particular range of poses improves the visual feedback provided to the user (e.g., by providing a visual indication that a different mode of operation is being activated (or will be activated if the user continues to move further into the particular range of poses)), provides additional control options without cluttering the display environment with additional displayed controls and reduces the number of inputs needed to perform an operation (e.g., providing a third mode of operation, in addition to the first and second modes, and allowing the user to easily switch between all three modes using straightforward motion(s) (raising or lowering the input device, or the pose of the input device)), enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the user interface object is (712) a first user interface object (e.g., virtual device 5016, FIGS. 5A29-5A30), and the method includes: displaying, via at least the first display generation component, a second user interface object that is located within the simulated three-dimensional space (e.g., video 5116, FIGS. 5A29-5A30), wherein the second user interface object is distinct from the first user interface object, and performing the respective operation within the simulated three-dimensional space includes displaying an indication that the second user interface object is in focus (e.g., focus indicator 5112 and/or highlighting 5110, FIGS. 5A29-5A30) (e.g., the second user interface object is a user interface object that will be affected by inputs such as a selection input); and in accordance with a determination that the movement of the input device is detected while the input device meets the first input-mode criteria: after performing the respective operation, detecting a touch input via the input device (e.g., detecting one or more contacts on a touch-sensitive surface of the input device and liftoff of the one or more contacts, such as touch screen 112 of device 100 in physical space 5004, FIG. 5A30); and in response to detecting the touch input (e.g., in accordance with a determination that the touch input includes one or more contacts on the touch-sensitive surface and subsequent liftoff of the one or more contacts (e.g., the touch input is a tap gesture)), performing a selection operation with respect to the second user interface object (e.g., visually distinguishing, such as highlighting, the second user interface object, or displaying additional content associated with the second user interface object (e.g., launching an application or multimedia file, as shown and described in greater detail herein with reference to FIGS. 5A30-5A31)). Using the input device to direct focus to user interface objects in the simulated three-dimensional space, displaying an indication of which object is in focus improves the visual feedback provided to the user (e.g., by indicating which object will be affected by inputs such as a selection input), and, in response to a touch input, performing a selection operation with respect to the object in focus provides additional control options without cluttering the display environment with additional displayed controls and reduces the number of inputs needed to perform an operation (e.g., by allowing the user to use straightforward motions of the input device to focus on objects and a single touch input to select an object), enhances the operability of the device, and makes the user-device interface more efficient (e.g., by providing an intuitive interaction for the selection operation consistent with use of a pointing device, and helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the computer system detects (714) a touch input via the input device that includes detecting one or more contacts (e.g., on a touch-sensitive surface of the input device). In response to detecting the touch input via the input device, in accordance with a determination that the touch input is detected while the input device meets the first input-mode criteria (e.g., the input device met the first input-mode criteria at the time of initial detection of the touch input), and while the touch input is maintained on the input device (e.g., on the touch-sensitive surface of the input device), the computer system performs the respective operation without regard to whether the input device meets the first input-mode criteria (e.g., while the touch input is maintained on (the touch-sensitive surface of) the input device, the respective operation continues to be performed even if the input device moves such that the pose of the input device moves outside of the first range of poses). For example, in response to a touch input on device 100 (FIG. 5A30), the computer system moves focus indicator 5112 and, if focus indicator 5112 corresponds to a virtual object in simulated 3D space 5006, highlights the virtual object using highlighting 5110 without regard to whether device 100 remains within the range of poses between horizontal and 30 degrees above horizontal while the touch input is maintained. The computer system also detects liftoff of the one or more contacts; and, after detecting the liftoff of the one or more contacts, detects a second movement input via the input device that includes subsequent movement of the input device relative to the physical environment surrounding the input device. In response to detecting the second movement input via the input device: in accordance with a determination that the subsequent movement of the input device is detected while the input device meets the first input-mode criteria, the computer system performs a second respective operation within the simulated three-dimensional space in accordance with the subsequent movement of the input device, wherein at least a portion of the second respective operation occurs outside of the user interface object; and, in accordance with a determination that the subsequent movement of the input device is detected while the input device meets the second input-mode criteria, the computer system repositions the user interface object in the simulated three-dimensional space in accordance with the subsequent movement of the input device without performing the second respective operation. In other words, after the one or more contacts are lifted off the touch-sensitive surface, performance of the respective operation depends on whether the input device meets the first input-mode criteria (in which case the respective operation is performed), whether the input device meets the second input-mode criteria (in which case the respective operation is not performed, and instead, if the input device is moved, the user interface object is repositioned in accordance with the movement of the input device), or whether the input device meets other criteria (e.g., as described herein with reference to operation 720 of method 700). Maintaining operation in the first mode while a touch input received in the first mode is maintained, regardless of input device pose, allows the user to direct focus to objects that are outside of the pose range required for entering the first mode, and provides an intuitive interaction consistent with use of a pointing device (e.g., by confining operation of the input device to the first mode until the touch input is released). Reevaluating whether subsequent movement of the input meets first or second input-mode criteria to make a new determination of the mode of operation after the touch input is released allows the user to easily exit the first input mode and select a subsequent input mode by changing the pose of the input device. These features provide additional control options without cluttering the display environment with additional displayed controls and reduce the number of inputs needed to perform an operation, enhance the operability of the device, and make the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, in response to detecting the movement input via the input device (716), in accordance with a determination that the movement of the input device is detected while the input device meets the first input-mode criteria, the computer system ceases to display the first user interface on the user interface object (e.g., the computer system ceases to display virtual user interface 5040 on virtual device 5016, as shown and described in greater detail herein with reference to FIGS. 5A28-5A29). Ceasing to display the first user interface on the user interface object in the first input mode improves the visual feedback provided to the user (e.g., by indicating to the user that the input device is operating in the first mode rather than the second mode, and accordingly indicating that operations of the second mode are unavailable), enhances the operability of the device, and makes the user-device interface more efficient (e.g., by reducing user distraction as a result of clutter in the user interface to help the user focus on the respective operation being performed in the simulated three-dimensional space, and by reducing user frustration and mistakes when operating/interacting with the device), which, additionally, reduces power usage and improves battery life of the device by enabling the user to use the device more quickly and efficiently.

In some embodiments, in response to detecting the movement input via the input device (718), in accordance with a determination that the movement of the input device is detected while the input device meets the first input-mode criteria, the computer system displays a second user interface (e.g., a second user interface associated with performing the respective operation, such as a pointer user interface; that is, a user interface indicating that the user interface object is operating as a pointer) on the user interface object (e.g., the computer system displays virtual user interface 5114 on virtual device 5016, as shown and described in greater detail herein with reference to FIG. 5A29). Replacing display of the first user interface on the user interface object with a second user interface (e.g., associated with use of the input device as a pointing device) improves the visual feedback provided to the user (e.g., by providing a visual indication on the user interface object that the input device is operating in the first input mode, and by reducing user distraction as a result of clutter in the user interface to help the user focus on the respective operation being performed in the simulated three-dimensional space), enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the first input-mode criteria further include (720): a second criterion that is satisfied when a distance from the input device to the user's eyes is within a predefined range of distances; and a third criterion that is satisfied when a manner in which the user holds the input device satisfies predefined criteria (e.g., the input device is held in a predefined orientation or range of orientations, or the user's hand and fingers are placed on the device so as to contact predefined areas of the device, etc.). In some embodiments, the first input-mode criteria are satisfied when at least one of the first criterion, the second criterion, and the third criterion is satisfied. In some embodiments, the first input-mode criteria require two or more of the criteria be satisfied (e.g., a combination of pose and distance, or a combination of distance and manner of holding the device, etc.). For example, a movement that causes the input device to enter a respective pose range, such as the first pose range, when the input device is within a predefined threshold distance from the user's face may activate the first input mode (e.g., as shown and described in greater detail herein with reference to FIGS. 5A28-5A29), while the same movement performed when the input device is beyond a predefined threshold distance from the user's face might not. Using alternative or additional criteria for determining whether the input device satisfies criteria for operating in the first input mode provides additional control options without cluttering the display environment with additional displayed controls (e.g., by providing additional ways that the user can activate the first input mode, and/or by making other control options or interactions available for movements of the input device that do not satisfy enough of the first input-mode criteria), enhances the operability of the device (e.g., by preventing inadvertent or erroneous activation of the first input mode and improving system responsiveness to user input), and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more efficiently and quickly.

In some embodiments, in accordance with a determination that the movement of the input device is detected while the input device meets the first input-mode criteria (722), the user interface object is displayed as a pointing device (e.g., a laser pointer) (e.g., as shown and described in greater detail herein with reference to FIGS. 5A29-5A30). In some embodiments, the pointing device includes one or more buttons or other controls for performing selection or adjustment operations. In some embodiments, in accordance with a determination that the movement of the input device is detected while the input device meets the second input-mode criteria, the user interface object is displayed as a simulation of a non-immersive display environment (e.g., a mobile device user interface) (e.g., as shown and described in greater detail herein with reference to FIGS. 5A27-5A28). In some embodiments, the computer system displays a virtual pointing device or virtual mobile phone. In some embodiments, the user interface object is displayed as a pointer while the input device is in pointer mode (e.g., while performing the respective operation, and/or while continuing to detect one or more contacts that were detected on a touch-sensitive surface of the input device while the input device met the first input-mode criteria, without regard to whether the input device meets the first input-mode criteria, as discussed herein with reference to operation 714 of method 700). The display of a simulation of a non-immersive display environment within an immersive display environment is described in greater detail herein with reference to method 600. Changing the display of the user interface object based on the mode of operation of the input device improves the visual feedback provided to the user (e.g., by providing a visual indication on the user interface object of its current mode of operation), enhances the operability of the device (e.g., by providing an intuitive interaction for the respective mode of operation, including, for the first mode, an interaction consistent with the use of a pointing device for performing a selection operation, and, for the second mode, an interaction consistent with the use of a mobile device), and makes the user-device interface more efficient (e.g., by reducing user distraction and user mistakes when operating/interacting with the device), which, additionally, reduces power usage and improves battery life of the device by enabling the user to use the device more efficiently and quickly.

It should be understood that the particular order in which the operations in FIGS. 7A-7C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 900, and 1000) are also applicable in an analogous manner to method 700 described above with respect to FIGS. 7A-7C. For example, the contacts, gestures, user interface objects, pose thresholds, focus indicators, and/or animations described above with reference to method 700 optionally have one or more of the characteristics of the contacts, gestures, user interface objects, pose thresholds, focus indicators, and/or animations described herein with reference to other methods described herein (e.g., methods 600, 800, 900, and 1000). For brevity, these details are not repeated here.

FIGS. 8A-8C are flow diagrams illustrating method 800 of displaying and performing navigation operations within corresponding two-dimensional and three-dimensional user interfaces, in accordance with some embodiments. Method 800 is performed at a computer system (e.g., portable multifunction device 100, FIG. 1A, device 300, FIG. 3A, or a multi-component computer system including headset 5008 and an input device (e.g., device 100 or device 5010), FIG. 5A1) that includes (and/or is in communication with) one or more display generation components (e.g., a display, a projector, a heads-up display, or the like), an input device (e.g., a touch-sensitive surface, such as a touch-sensitive remote control, or a touch-screen display that also serves as a display generation component of the computer system, a mouse, a joystick, a wand controller, and/or cameras tracking the position of one or more features of the user such as the user's hands or eyes), and optionally one or more pose sensors for detecting respective poses of one or more of the input device (e.g., device 100 or device 5010 and/or watch 5012, FIG. 5A1) and display generation components (e.g., the pose sensors include one or more cameras, gyroscopes, inertial measurement units, or other sensors that enable the computer system to detect changes in an orientation and/or position of the computer system or parts thereof relative to a physical environment of the computer system). In some embodiments, the computer system (e.g., the input device of the computer system) includes one or more sensors to detect intensities of contacts with the input device (e.g., a touch-sensitive surface), and optionally one or more tactile output generators. In some embodiments, the computer system includes one or more cameras (e.g., video cameras that continuously provide a live view of at least a portion of the contents that are within the field of view of the cameras and optionally generate video outputs including one or more streams of image frames capturing the contents within the field of view of the cameras). In some embodiments, the input device (e.g., with a touch-sensitive surface) and the display generation component are integrated into a touch-sensitive display. As described above with respect to FIGS. 3B-3C, in some embodiments, method 800 is performed at a computer system 301 (e.g., computer system 301-a, 301-b, or 301-c) in which respective components, such as a display generation component, one or more cameras, one or more input devices, and optionally one or more pose sensors are each either included in or in communication with computer system 301.

In some embodiments, the display generation component is a touch-screen display and the input device (e.g., with a touch-sensitive surface) is on or integrated with the display generation component. In some embodiments, the display generation component is separate from the input device (e.g., as shown in FIG. 4B and FIG. 5A1). Some operations in method 800 are, optionally, combined and/or the order of some operations is, optionally, changed.

For convenience of explanation, some of the embodiments will be discussed with reference to operations performed on a computer system (e.g., as shown in FIG. 5A1) with a headset 5008 and a separate input device (e.g., device 100 or device 5010) with a touch-sensitive surface in response to detecting contacts on the touch-sensitive surface of the input device while displaying some of the user interfaces shown in the figures on the display of headset 5008, and optionally while displaying some of the user interfaces shown in the figures on a separate display generation component of input device 100. However, analogous operations are, optionally, performed on a computer system with a touch-sensitive display system 112 (e.g., on device 100 with touch screen 112) and optionally one or more integrated cameras. Similarly, analogous operations are, optionally, performed on a computer system having one or more cameras that are implemented separately (e.g., in a headset) from one or more other components (e.g., an input device) of the computer system; and in some such embodiments, "movement of the computer system" corresponds to movement of one or more cameras of the computer system, or movement of one or more cameras in communication with the computer system.

As described below, method 800 relates to providing a view of a three-dimensional representation of content shown in a corresponding two-dimensional user interface on a virtual user interface object (e.g., a representation of a smartphone) in a virtual reality environment (e.g., an immersive three-dimensional environment that is experienced through sensory stimuli such as sights and sounds and that provides additional information and experiences to a user that are not available in the physical world), and updating the content in response to touch gestures on an input device (e.g., a smartphone or other physical controller in the physical world). Allowing a user to interact with a three-dimensional representation of content using touch gestures to control a corresponding two-dimensional representation of the content provides an immersive, intuitive, and efficient way for the user to adjust the representations and obtain additional information about the content (e.g., information that is available using a three-dimensional representation but that is not readily available from a two-dimensional representation or from the physical world), thereby enhancing the operability of the device and making the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

The computer system displays (802), via at least a first display generation component (e.g., a VR headset, or a stereo display, a 3D display, a holographic projector, a volumetric display, etc.) of the one or more display generation components: a view of at least a portion of a simulated three-dimensional space (e.g., simulated 3D space 5006, FIG. 5A22); a view of a first user interface object that is located within the simulated three-dimensional space (e.g., virtual device 5016, FIG. 5A22), wherein the first user interface object includes a view of a first user interface (e.g., a maps application interface, such as virtual user interface 5030, FIG. 5A22); and a view of a second user interface object (e.g., a three-dimensional rendering of an object represented in the first user interface (e.g., a map)) that is a three-dimensional representation of content shown in at least a portion of the first user interface (e.g., virtual 3D model 5104, FIG. 5A22). The computer system detects (804) a touch gesture (e.g., input 5102, FIG. 5A22) via the input device (e.g., device 100 in physical space 5004, FIG. 5A22), including detecting one or more contacts on the touch-sensitive surface of the input device and detecting movement of the one or more contacts across the touch-sensitive surface of the input device (e.g., movement of the one or more contacts in a first direction, such as a drag gesture or a swipe gesture in the first direction, or movement of two or more contacts toward or away from each other, such as a pinch gesture or a depinch gesture, respectively). In response to detecting the touch gesture via the input device (806): the computer system adjusts (e.g., by shifting and/or zooming, or otherwise dynamically manipulating) a currently displayed portion of the first user interface on the first user interface object in accordance with the touch gesture (e.g., as shown and described in greater detail herein with reference to FIGS. 5A22-5A24). In some embodiments, adjusting the currently displayed portion of the first user interface on the first user interface object in accordance with the touch gesture includes displaying a previously undisplayed portion of the first user interface on the first user interface object. In some embodiments, at least a portion of the previously displayed view of the first user interface continues to be displayed in conjunction with the previously undisplayed portion. For example, in response to detecting a drag gesture in a first direction (e.g., upward), the currently displayed portion of the first user interface is shifted in the first direction (e.g., upward), and a previously undisplayed portion of the first user interface (e.g., that is adjacent to the shifted portion of the first user interface with respect to the first direction, for example, below the shifted portion of the first user interface) is displayed (e.g., as shown and described in greater detail herein with reference to virtual user interface 5030, Figures Note, in some embodiments, adjusting a currently displayed portion of the first user interface on the first user interface object in accordance with the touch gesture is distinct from shifting a focus selector onto or away from the portion of the first user interface on the first user interface object; instead, the amount of adjusting (e.g., zooming, shifting, rotating, shading, etc.) directly and dynamically corresponds to a magnitude of a property associated with the touch gesture (e.g., movement of the contact, speed, intensity of the contact(s), etc.). The computer system also updates the view of the second user interface object in the simulated three-dimensional space in accordance with the adjusting (e.g., shifting and/or zooming) of the first user interface on the first user interface object (e.g., as shown and described in greater detail herein with reference to virtual 3D model 5104, FIGS. 5A22-5A24). In some embodiments, updating the view of the second user interface object in the simulated three-dimensional space in accordance with the adjusting of the first user interface on the first user interface object includes displaying a previously undisplayed portion of the second user interface object that corresponds to the previously undisplayed portion of the first user interface. Note, in some embodiments, the updating of the second user interface object in accordance with the adjusting of the first user interface on the first user interface object also dynamically corresponds to a magnitude of a property associated with the touch gesture (e.g., movement of the contact, speed, intensity of the contact(s), etc.). In some embodiments, the adjusting and updating are performed in accordance with a determination that the input device meets predefined pose criteria (e.g., a range of poses between 30 degrees above horizontal and, for example, 60 degrees above horizontal) when the touch gesture is detected via the input device, as described in greater detail herein with reference to method 700. For example, in some embodiments the adjusting and updating are performed in accordance with a determination that the input device meets the second input-mode criteria of method 700.

In some embodiments, adjusting the currently displayed portion of the first user interface on the first user interface object in accordance with the touch gesture includes (808) displaying a previously undisplayed portion of the first user interface on the first user interface object in conjunction with continuing to display at least a portion of the previously displayed view of the first user interface (e.g., as shown and described in greater detail herein with reference to virtual user interface 5030, FIGS. 5A22-5A26); and updating the view of the second user interface object in the simulated three-dimensional space in accordance with the adjusting of the first user interface on the first user interface object includes displaying a previously undisplayed portion of the second user interface object that corresponds to the previously undisplayed portion of the first user interface in conjunction with continuing to display at least a portion of the previously displayed view of the second user interface object (e.g., as shown and described in greater detail herein with reference to virtual 3D model 5104, FIGS. 5A22-5A26). Displaying previously undisplayed portions of the first user interface and of the second user interface object in conjunction with continuing to display previously displayed portions improves the visual feedback provided to the user (e.g., by providing the user with a smoother transition when changing content that is displayed and by helping the user to maintain context), enhances the operability of the device (e.g., by providing an intuitive interaction for manipulating two-dimensional and three-dimensional representations of content), and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, adjusting the currently displayed portion of the first user interface on the first user interface object in accordance with the touch gesture includes (810) laterally shifting the first user interface (e.g., as shown and described in greater detail herein with reference to virtual user interface 5030, FIGS. 5A22-5A24); and updating the view of the second user interface object in the simulated three-dimensional space in accordance with the adjusting of the first user interface on the first user interface object includes traversing a path between a first position and a second position on a spherical surface in the simulated three-dimensional space, wherein the first position corresponds to the first user interface, and the second position corresponds to the laterally shifted first user interface (e.g., as shown and described in greater detail herein with reference to virtual 3D model 5104, associated with traversing a path across a geographic area on Earth, FIGS. 5A22-5A24). Using the second user interface object to represent traversing a path along a spherical surface in conjunction with shifting the first user interface in response to a touch gesture improves the visual feedback provided to the user (e.g., by making the computer system appear more responsive to user input and providing additional information that is not readily available to the user in the physical world, such as a more realistic or more immersive visualization of displayed content), enhances the operability of the device, and makes the user-device interface more efficient (e.g., by helping the user to achieve an intended outcome with the required inputs and by reducing user mistakes when operating/interacting with the device), which, additionally, reduces power usage and improves battery life of the device by enabling the user to use the device more quickly and efficiently.

In some embodiments, the first user interface includes (812) a two-dimensional view of content; adjusting the currently displayed portion of the first user interface on the first user interface object in accordance with the touch gesture includes traversing the two-dimensional view of the content; and updating the view of the second user interface object in the simulated three-dimensional space in accordance with the adjusting of the first user interface on the first user interface object includes traversing a three-dimensional panoramic view of the content in the simulated three-dimensional space. For example, if the virtual user interface displayed on virtual device 5016 displays a two-dimensional image captured using panoramic image capture, the virtual 3D model is a three-dimensional simulation of the panoramic view of the displayed image, and traversing the image on virtual device 5016 corresponds to the viewer traversing a 360-degree panoramic view using the virtual 3D model. Using the second user interface object to represent traversing a three-dimensional panoramic view of content in conjunction with traversing a two-dimensional view of the content in the first user interface in response to a touch gesture improves the visual feedback provided to the user (e.g., by making the computer system appear more responsive to user input and providing additional information that is not readily available to the user in the physical world, such as a more realistic or more immersive visualization of the displayed content), enhances the operability of the device, and makes the user-device interface more efficient (e.g., by helping the user to achieve an intended outcome with the required inputs and by reducing user frustration and mistakes when operating/interacting with the device), which, additionally, reduces power usage and improves battery life of the device by enabling the user to use the device more quickly and efficiently.

In some embodiments, the touch gesture includes (814) a swipe gesture in a first direction; adjusting the currently displayed portion of the first user interface on the first user interface object in accordance with the touch gesture includes continuously shifting the first user interface in the first direction (e.g., including continuously adding previously undisplayed portions of the first user interface to the display) on the first user interface object (e.g., as shown and described in greater detail herein with reference to virtual user interface 5030, FIGS. 5A22-5A24). In some embodiments, the amount of movement of the first user interface is determined by a magnitude of the touch gesture (e.g., a magnitude of a property associated with the touch gesture, such as speed of the touch gesture). In some embodiments, the direction of movement of the first user interface (e.g., downward movement of virtual user interface 5030, FIGS. 5A22-5A24) is determined by a direction of the touch gesture (e.g., downward movement of input 5102, FIG. 5A22). Also, in some embodiments, updating the view of the second user interface object in the simulated three-dimensional space in accordance with the adjusting of the first user interface on the first user interface object includes continuously updating the view of the second user interface object in accordance with the continuous shifting of the first user interface in the first direction (e.g., continuously updating the view of the second user interface object to correspond to the displayed first user interface as the first user interface is shifted). For example, in response to a swipe gesture on an application user interface (e.g., a map user interface, such as a two-dimensional map, in a maps application) displayed on the first user interface object, the displayed portion of the application user interface (e.g., the displayed portion of the map user interface) is continuously shifted in the direction of the swipe gesture (e.g., as shown and described in greater detail herein with reference to virtual user interface 5030, FIGS. 5A22-5A24). In accordance with the continuous shifting of the application user interface, the view of the three-dimensional representation of at least a portion of the application user interface (e.g., a three-dimensional map of at least a portion of the displayed map user interface) is updated (e.g., as the map user interface moves, the view of the three-dimensional map is updated (e.g., shifted) so as to remain synchronized with the displayed portion of the map user interface (e.g., the map user interface and the three-dimensional map both represent the same geographic location)) (e.g., as shown and described in greater detail herein with reference to virtual 3D model 5104, FIGS. 5A22-5A24). In some embodiments, the amount of movement of the second user interface is determined by a magnitude of the touch gesture (e.g., amount of movement (displacement) or speed of the touch gesture). In some embodiments, the direction of movement of the second user interface is determined by a direction of the touch gesture. Continuously shifting or panning the first user interface and the second user interface object in a direction of the touch gesture improves the visual feedback provided to the user (e.g., by providing the user with a continuous visualization of traversing two-dimensional and three-dimensional representations of content), reduces the number of inputs needed to perform an operation (e.g., using only a single swipe gesture rather than requiring the user to repeatedly make separate inputs to move the user interfaces), enhances the operability of the device, and makes the user-device interface more efficient (e.g., by reducing user frustration and mistakes when operating/interacting with the device), which, additionally, reduces power usage and improves battery life of the device by enabling the user to use the device more quickly and efficiently.

In some embodiments, the touch gesture includes (816) a depinch gesture; and adjusting the currently displayed portion of the first user interface on the first user interface object in accordance with the touch gesture includes displaying additional details of at least a sub-portion of the currently displayed portion of the first user interface (e.g., zooming in from an first initial zoom level to a sub-portion of the currently displayed portion at a second zoom level, and displaying additional details about the sub-portion that are visible at the second zoom level but not the first zoom level). In some embodiments, the amount of zooming of the first user interface is determined by a magnitude of the touch gesture (e.g., an amount by which a distance between two contacts increases or decreases). In some embodiments, the direction of zooming (e.g., in or out) of the first user interface is determined by a direction of the touch gesture (e.g., whether the gesture includes movement of the contacts toward each other in a pinch gesture or movement of the contacts away from each other in a depinch gesture). Also, in some embodiments, updating the view of the second user interface object in the simulated three-dimensional space in accordance with the adjusting of the first user interface on the first user interface object includes displaying additional details of the displayed view of the second user interface object that correspond to the additional details of at least the sub-portion of the currently displayed portion of the first user interface (e.g., zooming in from a first initial zoom level to a sub-portion of the displayed view of the second user interface object at a second zoom level, where the sub-portion of the displayed view of the second user interface corresponds to the sub-portion of the first user interface, and displaying additional details about the sub-portion that are visible at the second zoom level but not the first zoom level). For example, with respect to the previously-discussed map user interface example, in response to a depinch gesture via the input device (e.g., input 5106 via device 100 in physical space 5004, FIG. 5A25), the computer system zooms in to a portion of the two-dimensional map user interface displayed on the first user interface object (e.g., as shown and described in greater detail herein with reference to virtual user interface 5030, FIGS. 5A25-5A26), including displaying additional information such as additional map elements (e.g., additional building footprints, additional streets, and text and/or image labels for displayed map elements, as shown and described in greater detail herein with respect to landmarks 5030*a* and 5030*b*, FIG. 5A26). In conjunction with displaying the additional information for the zoomed-in portion of the two-dimensional map user interface, the computer system zooms in to a portion of the three-dimensional representation of the map displayed in the simulated three-dimensional space (e.g., a three-dimensional representation of the zoomed-in portion of the two-dimensional map) (e.g., as shown and described in greater detail herein with reference to virtual 3D model 5104, FIGS. 5A25-5A26), including displaying additional information such as additional map elements (e.g., additional three-dimensional objects such as buildings, additional streets, and text and/or image labels, as shown and described in greater detail herein with reference to virtual buildings 5104*c* and 5104*d*, FIG. 5A26). In some embodiments, the amount of zooming of the second user interface is determined by a magnitude of the touch gesture (e.g., an amount by which a distance between two contacts increases or decreases). In some embodiments, the direction of zooming (e.g., in or out) of the second user interface is determined by a direction of the touch gesture (e.g., whether the gesture includes movement of the contacts toward each other in a pinch gesture or movement of the contacts away from each other in a depinch gesture). Zooming into and displaying additional details of the first user interface and the second user interface object in response to a touch gesture (e.g., a depinch gesture, or other gesture for increasing a zoom scale of a displayed user interface) improves the visual feedback provided to the user (e.g., by displaying additional details of the two-dimensional and three-dimensional representations of the content being viewed), provides additional control options without cluttering the display environment with additional displayed controls and reduces the number of inputs needed to perform an operation (e.g., using straightforward gestures rather than requiring display and activation of additional control affordances), enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the first user interface displayed on the first user interface object includes (818) a map user interface that includes map content, and the second user interface object is a three-dimensional representation of map content shown in at least a portion of the map user interface (e.g., as shown and described in greater detail herein with reference to FIGS. 5A22-5A26). Displaying a (two-dimensional) map user interface that includes map content and a three-dimensional representation of map content shown in the map user interface improves the visual feedback provided to the user (e.g., by providing the user with an immersive experience for visualizing and interacting with a map of a particular geographic area, including providing additional information (e.g., a flyover view of the geographic area) that is not readily available to the user in the physical world), enhances the operability of the device, and makes the user-device interface more efficient (e.g., by reducing user mistakes when operating/interacting with the device), which, additionally, reduces power usage and improves battery life of the device by enabling the user to use the device more quickly and efficiently.

In some embodiments, the first user interface displayed on the first user interface object includes (820) a multimedia user interface that includes one or more multimedia items (e.g., photos, audio tracks, videos, messages, etc.), and the second user interface object is a three-dimensional representation of one or more of the multimedia items shown in the multimedia user interface (e.g., as shown and described in greater detail herein with reference to FIG. 5A27). Displaying a multimedia user interface that includes multimedia items and a three-dimensional representation of the multimedia items shown in the multimedia user interface improves the visual feedback provided to the user (e.g., by providing the user with an immersive experience for visualizing and interacting with a selection of multimedia items), enhances the operability of the device, and makes the user-device interface more efficient (e.g., by reducing user mistakes when operating/interacting with the device), which, additionally, reduces power usage and improves battery life of the device by enabling the user to use the device more quickly and efficiently.

It should be understood that the particular order in which the operations in FIGS. 8A-8C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 900, and 1000) are also applicable in an analogous manner to method 800 described above with respect to FIGS. 8A-8C. For example, the contacts, gestures, user interface objects, pose thresholds, focus indicators, and/or animations described above with reference to method 800 optionally have one or more of the characteristics of the contacts, gestures, user interface objects, pose thresholds, focus indicators, and/or animations described herein with reference to other methods described herein (e.g., methods 600, 700, 900, and 1000). For brevity, these details are not repeated here.

FIGS. 9A-9B are flow diagrams illustrating method 900 of displaying and adjusting an appearance of a focus indicator on a virtual user interface object in a virtual reality environment based on user inputs in the physical world, in accordance with some embodiments. Method 900 is performed at a computer system (e.g., portable multifunction device 100, FIG. 1A, device 300, FIG. 3A, or a multi-component computer system including headset 5008 and an input device (e.g., device 100 or device 5010), FIG. 5A1) that includes (and/or is in communication with) one or more display generation components (e.g., a display, a projector, a heads-up display, or the like), an input device with an input element (e.g., a touch-sensitive surface, a button, a mouse, a joystick, a slider, a dial, a wand controller, and/or cameras tracking the position of one or more features of the user such as the user's hands or eyes) that includes first sensors for detecting contact with the input element (e.g., the touch-sensitive surface) and second sensors for detecting proximity of an input object above the input element (e.g., the touch-sensitive surface) (e.g., a touch-sensitive remote control, or a touch-screen display that also serves as a display generation component of the computer system), and optionally one or more pose sensors for detecting respective poses of one or more of the input device (e.g., device 100 or device 5010 and/or watch 5012, FIG. 5A1) and display generation components (e.g., the pose sensors include one or more cameras, gyroscopes, inertial measurement units, or other sensors that enable the computer system to detect changes in an orientation and/or position of the computer system or parts thereof relative to a physical environment of the computer system). In some embodiments, the computer system (e.g., the input device of the computer system) includes one or more sensors to detect intensities of contacts with the input device (e.g., a touch-sensitive surface), and optionally one or more tactile output generators. In some embodiments, the computer system includes one or more cameras (e.g., video cameras that continuously provide a live view of at least a portion of the contents that are within the field of view of the cameras and optionally generate video outputs including one or more streams of image frames capturing the contents within the field of view of the cameras). In some embodiments, the input device (e.g., with a touch-sensitive surface) and the display generation component are integrated into a touch-sensitive display. As described above with respect to FIGS. 3B-3C, in some embodiments, method 900 is performed at a computer system 301 (e.g., computer system 301-*a*, 301-*b*, or 301-*c*) in which respective components, such as a display generation component, one or more cameras, one or more input devices, and optionally one or more pose sensors are each either included in or in communication with computer system 301.

In some embodiments, the display generation component is a touch-screen display and the input device (e.g., with a touch-sensitive surface) is on or integrated with the display generation component. In some embodiments, the display generation component is separate from the input device (e.g., as shown in FIG. 4B and FIG. 5A1). Some operations in method 900 are, optionally, combined and/or the order of some operations is, optionally, changed.

For convenience of explanation, some of the embodiments will be discussed with reference to operations performed on a computer system (e.g., as shown in FIG. 5A1) with a headset 5008 and a separate input device (e.g., device 100 or device 5010) with a touch-sensitive surface in response to detecting contacts on the touch-sensitive surface of the input device while displaying some of the user interfaces shown in the figures on the display of headset 5008, and optionally while displaying some of the user interfaces shown in the figures on a separate display generation component of input device 100. However, analogous operations are, optionally, performed on a computer system with a touch-sensitive display system 112 (e.g., on device 100 with touch screen 112) and optionally one or more integrated cameras. Similarly, analogous operations are, optionally, performed on a computer system having one or more cameras that are implemented separately (e.g., in a headset) from one or more other components (e.g., an input device) of the computer system; and in some such embodiments, "movement of the computer system" corresponds to movement of one or more cameras of the computer system, or movement of one or more cameras in communication with the computer system.

As described below, method 900 relates to displaying and adjusting an appearance of a focus indicator on a virtual user interface object (e.g., a representation of a smartphone) in a virtual reality environment (e.g., an immersive three-dimensional environment that is experienced through sensory stimuli such as sights and sounds and that provides additional information and experiences to a user that are not available in the physical world), based on user inputs in the physical world (e.g., on a smartphone in the physical world). Specifically, this method relates to displaying the focus indicator with a first appearance (e.g., an outline of a circular indicator) in response to detecting a hover input and displaying the focus indicator with a second appearance (e.g., a solid circular indicator) in response to detecting a contact. Allowing a user to see hover inputs (where an input object, such as a finger, is not touching the input element) differently from contacts in the virtual reality environment improves the visual feedback provided to the user (e.g., by displaying an indication of the location of the user's fingers, since the user's fingers are not visible to the user in the immersive virtual reality environment) and allows the user to interact with and control a virtual device in the virtual reality environment as if the user were interacting with the corresponding real device in the physical world, thereby providing an intuitive and efficient way for the user to access functions of the real device while still immersed in the virtual reality environment (e.g., without requiring the user to remove equipment such as a virtual reality headset and headphones), enhancing the operability of the device, and making the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

The computer system (e.g., device 100, FIG. 5A2) displays (902) via at least a first display generation component (e.g., a VR headset, or a stereo display, a 3D display, a holographic projector, a volumetric display, etc.) (e.g., headset 5008, FIG. 5A1) of the one or more display generation components: a view of at least a portion of a simulated three-dimensional space (e.g., a portion of a three-dimensional virtual environment that is within the user's field of view) (e.g., simulated 3D space 5006, FIGS. 5A12-5A15). In some embodiments, the simulated three-dimensional space is part of an immersive display environment (e.g., a virtual reality environment). The computer system also displays, via at least the first display generation component, a view of a first user interface object (e.g., virtual device 5016, FIG. 5A2) that is located within the simulated three-dimensional space, and that includes a first user interface (e.g., a two-dimensional user interface) (e.g., virtual user interface 5019 that is displayed on virtual device 5016 in the simulated 3D space 5006, FIGS. 5A12-5A15). For example, the first user interface object is a representation of a computing device (e.g., device 100, FIG. 5A12) that has a non-immersive display environment (e.g., a user interface where the boundaries of the user interface are visible to the user and the boundaries of the user interface move relative to the user in accordance with user inputs) (e.g., a touch screen display of a handheld computing device, such as touch screen 112 of device 100, FIG. 5A12) that provides access to a plurality of different applications (e.g., the first user interface object is a 3D graphical image that visually resembles and/or represents a handheld device (e.g., a smartphone) that provides access to a plurality of user applications, such as an instant messages application, a maps application, a calendar application, an e-mail application, etc.) (e.g., as shown in FIG. 5A12); the first user interface (e.g., virtual user interface 5019, FIG. 5A12) corresponds to the non-immersive display environment (e.g., user interface 5021, Figure (e.g., the 3D graphical image of the handheld device (e.g., virtual device 5016, FIG. 5A12) includes a representation of (e.g., an exact image, or augmented image, or stylized image) of a user interface of a type that is, in some circumstances, displayed on the touch-screen display that provides access to the plurality of user applications) of the computing device (e.g., user interface 5021, FIG. 5A12) and is responsive to touch inputs from a user on the input device (e.g., in the same manner or a consistent manner that the user interface shown in the non-immersive display environment responds to touch inputs). In addition, a pose of the user interface object in the simulated three-dimensional space corresponds to a pose of the input device in a physical space surrounding the input device (e.g., the orientation of the user interface object is continuously updated to correspond to the orientation of the input device when the input device moves relative to the physical space surrounding the input device) (e.g., as shown in FIGS. 5A28-5A30). The computer system detects (904) a hover input via the input device, including detecting an input object (e.g., a fingertip) above the input element of the input device while the input object is not touching the input element, wherein proximity of the input object to the input element meets first proximity criteria (e.g., within a first threshold distance from the input element) (e.g., as shown in FIGS. 5A12-5A14). In response to detecting the hover input via the input device, the computer system displays (906) a focus indicator with a first appearance (e.g., an outline of an oval or circular indicator, a crosshair, etc.) at a hover location above the first user interface object (e.g., in the 3D virtual space) that corresponds to a hover location of the input object above the input element of the input device (e.g., in a physical environment) (e.g., as shown in FIGS. 5A12-5A14). Although the focus indicators in FIGS. 5A12-5A14 are displayed with a particular appearance (e.g., a dotted outline of a circular indicator with shading), in some embodiments, the focus indicators for hover inputs are displayed in another manner with a different appearance (e.g., a partially translucent circular indicator with no outline). While displaying the focus indicator with the first appearance at the hover location above the first user interface object (e.g., in the virtual 3D space), the computer system detects (908) a contact between the input object and the input element (e.g., in the physical environment) (e.g., as shown in FIG. 5A15). In response to detecting the contact between the input object and the input element, the computer system displays (910) the focus indicator with a second appearance (e.g., a solid oval or circular indicator, a bolded crosshair, etc.) that is distinct from the first appearance at a location on the first user interface object that corresponds to a contact location of the input object on the input element of the input device (e.g., as shown in FIG. 5A15). In some embodiments, method 900 of displaying the focus indicator with a first appearance (e.g., an outline of a circular indicator) in response to detecting a hover input and displaying the focus indicator with a second appearance (e.g., a solid circular indicator) in response to detecting a contact improves the operations of method 600, as described above.

In some embodiments, in response to detecting the hover input via the input device (e.g., including detecting the input object above the input element of the input device while the input object is not touching the input element) (912), the computer system displays a representation of the input object in the view of the simulated three-dimensional space at a second hover location above the first user interface object (e.g., where the second hover location has an x, y, and z component in the simulated three-dimensional space) that corresponds to the hover location of the input object above the input element of the input device (e.g., in the physical environment). For example, in some embodiments, when a user's fingers are within a threshold distance from the input element (e.g., meeting the first proximity criteria), but are not touching the input element, a representation of (one or more of) the user's fingers are displayed in the simulated three-dimensional space (e.g., as "virtual fingers"). In some embodiments, the representation of the input object (e.g., a user's finger) is displayed in addition to displaying the focus indicator with the first appearance (e.g., an outline of an oval or circular indicator, a crosshair, etc.). For example, in some embodiments, the representation of the input object is displayed above the focus indicator with the first appearance (e.g., the virtual finger is displayed slightly above an outline of an oval or circular indicator). In some embodiments, the focus indicator changes in appearance as the input object moves closer to the touch-sensitive surface of the input device (e.g., the size of the focus indicator grows smaller as the input object moves closer to the input device) (e.g., the size of the focus indicator grows larger as the input object moves closer to the input device, as shown in FIGS. 5A12-5A14), but the representation of the input object (e.g., the user's finger) does not change in appearance as the input object moves closer to the touch-sensitive surface of the input device. In some embodiments, the representation of the input object (e.g., a user's finger) is displayed instead of displaying the focus indicator with the first appearance (e.g., the representation of the input object is the focus indicator, as shown in FIGS. 5A12-5A14). Displaying a representation of the input object (e.g., the user's finger) in the simulated three-dimensional space improves the visual feedback provided to the user (e.g., by displaying one or more "virtual fingers" of the user since the user's fingers are not visible to the user in the immersive virtual reality environment), allows the user to interact with and control a virtual device in the virtual reality environment as if the user were interacting with the corresponding real device in the physical world, provides an intuitive and efficient way for the user to access functions of the real device while still immersed in the virtual reality environment (e.g., without requiring the user to remove equipment such as a virtual reality headset and headphones), enhances the operability of the device (e.g., by allowing the user to interact with either the virtual device or the real device), and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, displaying the focus indicator with the second appearance (e.g., in response to detecting the contact between the input object and the input element) on the first user interface object includes (914) displaying the focus indicator as a translucent contact point on the first user interface object (e.g., not a virtual finger); and at least a portion of the first user interface that is at a location of the focus indicator is at least partly visible through the focus indicator (e.g., as shown in FIG. 5A15). In some embodiments, contact touches (e.g., as shown in FIG. 5A15) (as opposed to hover inputs where the input object is not touching the input element, as shown in FIGS. 5A12-5A14) are displayed as translucent contact points (and not virtual fingers) so that the user interface of the virtual phone is not obscured (e.g., the first user interface of the first user interface object in the simulated three-dimensional space is not obscured) (e.g., virtual user interface 5019 is not obscured). Displaying the focus indicator as a translucent contact point (in response to detecting a contact) allows the user to still see the first user interface (e.g., the user interface of the virtual phone) while also providing visual feedback to the user about the location of the contact, improves the visual feedback provided to the user (e.g., by displaying an indication of the location of the user's finger, since the user's fingers are not visible to the user in the immersive virtual reality environment), allows the user to interact with and control a virtual device in the virtual reality environment as if the user were interacting with the corresponding real device in the physical world, provides an intuitive and efficient way for the user to access functions of the real device while still immersed in the virtual reality environment (e.g., without requiring the user to remove equipment such as a virtual reality headset and headphones), enhances the operability of the device (e.g., by allowing the user to interact with either the virtual device or the real device), and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the first user interface (e.g., virtual user interface 5019 that is displayed on virtual device 5016 in the simulated 3D space 5006, FIGS. 5A12-5A14) is (916) a representation of a respective user interface of a respective device (e.g., user interface 5021 that is displayed on device 100 in the physical space 5004, Figures that is represented by the first user interface object (e.g., the first user interface is a simulated user interface of a computing device such as a smartphone and the first user interface object is a simulation of the computing device) (e.g., as shown in FIGS. 5A12-5A14); the respective device is capable of detecting hover inputs; and the respective device does not display representations of hover inputs in the respective user interface when hover inputs are detected while the respective device is displaying the respective user interface (e.g., device 100 does not display representations of hover inputs in user interface 5021, FIGS. 5A12-5A14) (e.g., the focus indicators are displayed overlaying the first user interface when in the immersive display environment (e.g., simulated 3D space 5006) because the user's fingers are not visible in the immersive display environment; however when the respective user interface that corresponds to the first user interface is displayed in the non-immersive display environment (e.g., physical space 5004), the focus indicators that correspond to hover inputs are not needed because the user's fingers are visible to the user when the fingers hover over the respective user interface). In some embodiments, the focus indicator changes in appearance as the input object moves closer to the touch-sensitive surface of the input device (e.g., the size of the focus indicator grows smaller as the input object moves closer to the input device or the size of the focus indicator grows larger as the input object moves closer to the input device, as shown in FIGS. 5A12-5A14, and/or some other characteristic of the focus indicator changes (e.g., boldness, color, shading, pattern, etc.)). While representations of hover inputs are useful in the simulated three-dimensional space (e.g., on the virtual device) because the user's fingers are not visible in the immersive display environment, representations of hover inputs are not needed on the respective device (e.g., on the real device) because the user's fingers are visible to the user in the physical world. Forgoing display of the hover inputs in the respective user interface of the respective device (e.g., the user interface of the real device in the physical world) reduces clutter in the user interface of the respective device, reduces user distraction, enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, while displaying the focus indicator with the first appearance at the hover location above the first user interface object (e.g., in the virtual 3D space) (e.g., as shown in FIG. 5A14) (918), the computer system detects a touch input (e.g., a tap input) at a location on the input device that corresponds to a first location in the first user interface (e.g., as shown in FIG. 5A15); and in response to detecting the touch input on the input device, activates an element of the first user interface located at the first location (e.g., launching an application corresponding to the application icon located at the first location, as shown in FIGS. 5A15-5A16). Activating an element of the first user interface (e.g., of the virtual device) in response to a touch input at a location on the input device that corresponds to a location of the element allows the user to interact with and control a virtual device in the virtual reality environment as if the user were interacting with the corresponding real device in the physical world, provides an intuitive and efficient way for the user to access functions of the real device while still immersed in the virtual reality environment (e.g., without requiring the user to remove equipment such as a virtual reality headset and headphones), enhances the operability of the device (e.g., by allowing the user to interact with either the virtual device or the real device), and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the computer system detects (920) a change in intensity of the contact between the input object and the input element (e.g., in the physical environment) (e.g., a change in intensity of the contact between the user's finger and touch screen 112, FIG. 5A15); and in response to the detecting the change in intensity of the contact between the input object and the input element, displays the focus indicator with a third appearance that is distinct from the first appearance and distinct from the second appearance. For example, in some embodiments, if the intensity of the contact between the input object and the input element increases, the focus indicator increases in size (e.g., the solid oval or circular indicator increases in diameter). Similarly, if the intensity of the contact between the input object and the input element decreases, the focus indicator decreases in size (e.g., the solid oval or circular indicator decreases in diameter). Alternatively, in some embodiments, if the intensity of the contact between the input object and the input element increases, the focus indicator decreases in size (e.g., the solid oval or circular indicator decreases in diameter) and if the intensity of the contact between the input object and the input element decreases, the focus indicator increases in size (e.g., the solid oval or circular indicator increases in diameter). As another example, in some embodiments, if the intensity of the contact between the input object and the input element increases, the focus indicator remains the same size, but the focus indicator changes in another manner (e.g., boldness, color, shading, pattern, etc.). Updating an appearance of the focus indicator (e.g., in the simulated three-dimensional space) in accordance with a change in intensity of the contact between the input object and the input element (e.g., in the physical environment) improves the visual feedback provided to the user (e.g., by making the computer system appear more responsive to user input), provides the user with a more immersive and/or intuitive viewing experience, enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

It should be understood that the particular order in which the operations in FIGS. 9A-9B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, and 1000) are also applicable in an analogous manner to method 900 described above with respect to FIGS. 9A-9B. For example, the contacts, gestures, user interface objects, intensity thresholds, focus indicators, and/or animations described above with reference to method 900 optionally have one or more of the characteristics of the contacts, gestures, user interface objects, intensity thresholds, focus indicators, and/or animations described herein with reference to other methods described herein (e.g., methods 600, 700, 800, and 1000). For brevity, these details are not repeated here.

FIGS. 10A-10C are flow diagrams illustrating method 1000 of updating display of virtual user interface objects and associated virtual user interfaces in accordance with movement of and changes in pose of an input device, in accordance with some embodiments. Method 1000 is performed at a computer system (e.g., portable multifunction device 100, FIG. 1A, device 300, FIG. 3A, or a multi-component computer system including headset 5008 and an input device (e.g., device 100 or device 5010), FIG. 5A1) that includes (and/or is in communication with) one or more display generation components (e.g., a display, a projector, a heads-up display, or the like), an input device (e.g., a touch-sensitive surface, such as a touch-sensitive remote control, or a touch-screen display that also serves as a display generation component of the computer system, a mouse, a joystick, a wand controller, and/or cameras tracking the position of one or more features of the user such as the user's hands or eyes), and optionally one or more pose sensors for detecting respective poses of one or more of the input device (e.g., device 100 or device 5010 and/or watch 5012, FIG. 5A1) and display generation components (e.g., the pose sensors include one or more cameras, gyroscopes, inertial measurement units, or other sensors that enable the computer system to detect changes in an orientation and/or position of the computer system or parts thereof relative to a physical environment of the computer system). In some embodiments, the computer system (e.g., the input device of the computer system) includes one or more sensors to detect intensities of contacts with the input device (e.g., a touch-sensitive surface), and optionally one or more tactile output generators. In some embodiments, the computer system includes one or more cameras (e.g., video cameras that continuously provide a live view of at least a portion of the contents that are within the field of view of the cameras and optionally generate video outputs including one or more streams of image frames capturing the contents within the field of view of the cameras). In some embodiments, the input device (e.g., with a touch-sensitive surface) and the display generation component are integrated into a touch-sensitive display. As described above with respect to FIGS. 3B-3C, in some embodiments, method 1000 is performed at a computer system 301 (e.g., computer system 301-*a*, 301-*b*, or 301-*c*) in which respective components, such as a display generation component, one or more cameras, one or more input devices, and optionally one or more pose sensors are each either included in or in communication with computer system 301.

In some embodiments, the display generation component is a touch-screen display and the input device (e.g., with a touch-sensitive surface) is on or integrated with the display generation component. In some embodiments, the display generation component is separate from the input device (e.g., as shown in FIG. 4B and FIG. 5A1). Some operations in method 1000 are, optionally, combined and/or the order of some operations is, optionally, changed.

For convenience of explanation, some of the embodiments will be discussed with reference to operations performed on a computer system (e.g., as shown in FIG. 5A1) with a headset 5008 and a separate input device (e.g., device 100 or device 5010) with a touch-sensitive surface in response to detecting contacts on the touch-sensitive surface of the input device while displaying some of the user interfaces shown in the figures on the display of headset 5008, and optionally while displaying some of the user interfaces shown in the figures on a separate display generation component of input device 100. However, analogous operations are, optionally, performed on a computer system with a touch-sensitive display system 112 (e.g., on device 100 with touch screen 112) and optionally one or more integrated cameras. Similarly, analogous operations are, optionally, performed on a computer system having one or more cameras that are implemented separately (e.g., in a headset) from one or more other components (e.g., an input device) of the computer system; and in some such embodiments, "movement of the computer system" corresponds to movement of one or more cameras of the computer system, or movement of one or more cameras in communication with the computer system.

As described below, method 1000 relates to displaying a user interface at a location away from a virtual user interface object (e.g., a representation of a smartphone) in a virtual reality environment (e.g., an immersive three-dimensional environment that is experienced through sensory stimuli such as sights and sounds and that provides additional information and experiences to a user that are not available in the physical world), and optionally at an increased scale, based on a change in pose of an input device (e.g., a smartphone or other physical controller in the physical world). Displaying a user interface at a position away from the virtual user interface object improves the readability of the user interface and relieves the user from having to track the location of the user interface while displayed on the virtual user interface object, which may move as the input device moves, thereby improving the visual feedback provided to the user, enhancing the operability of the device, and making the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

The computer system displays (1002), via at least a first display generation component (e.g., a VR headset, or a stereo display, a 3D display, a holographic projector, a volumetric display, etc.) of the one or more display generation components: a view of at least a portion of a simulated three-dimensional space (e.g., simulated 3D space 5006, FIG. 5A41); and a view of a user interface object that is located within the simulated three-dimensional space (e.g., virtual device 5016, FIG. 5A41), wherein the user interface object includes a view of a first user interface (e.g., virtual user interface 5154, FIG. 5A41) that is displayed at a pose that corresponds to a pose of the user interface object in the simulated three-dimensional space, and wherein the pose of the user interface object in the simulated three-dimensional space corresponds to a pose of the input device (e.g., device 100, FIG. 5A41) in a physical space surrounding the input device (e.g., physical space 5004, FIG. 5A41). The computer system detects (1004) a movement input via the input device (e.g., user 5002 raising device 100, as shown and described in greater detail herein with reference to FIG. 5A42). In response to detecting the movement input (1006): in accordance with a determination that the movement input corresponds to a movement of the input device relative to the physical environment surrounding the input device, and that the movement of the input device meets first pose criteria that require that a parameter of change in the pose of the input device meet a set of one or more thresholds (e.g., pose criteria that are met when the device has entered a first pose range, a rate of change in orientation of the device has met a pose change threshold that is indicative of movement of the input device toward a face of the user, or acceleration of change in pose of the device has met a pose acceleration threshold that is indicative of movement of the input device toward a face of the user) as a result of the movement (e.g., the input device is raised so that the pose of the input device is within the first pose range), the computer system displays the first user interface in the simulated three-dimensional space at a location away from the user interface object (e.g., the first user interface appears to be lifted away from the surface of the user interface object) (and optionally increasing a scale of the first user interface) (e.g., as shown and described in greater detail herein with reference to virtual user interface 5154 and virtual device 5016, FIGS. 5A42-5A47). Also, in accordance with a determination that the movement input corresponds to a movement of the input device relative to the physical environment surrounding the input device, and that the movement of the input device does not meet the first pose criteria, the computer system updates the pose of the user interface object in the simulated three-dimensional space in accordance with the movement of the input object, while maintaining display of the first user interface at a pose that corresponds to the pose of the user interface object (e.g., the first user interface appears to be displayed on the surface of the user interface object) (e.g., virtual user interface 5154 is not displayed so as to appear to be lifted away from the surface of virtual device 5016, if movement of device 100 in physical space 5004 does not meet the associated pose criteria). In some embodiments, the computer system detects a plurality of (distinct) movement inputs (e.g., a series, or sequence of movement inputs) via the input device, and the plurality of movement inputs includes at least one movement input that corresponds to a movement of the input device relative to the physical environment and for which the movement of the input device meets the first pose criteria that require the pose of the input device to enter the first pose range as a result of the movement, and at least one movement input that corresponds to a movement of the input device relative to the physical environment and for which the movement of the input device does not meet the first pose criteria.

In some embodiments, in accordance with a determination that the movement input corresponds to a movement of the input device relative to the physical environment (1008), and that the movement of the input device meets the first pose criteria, the computer system continues to display the user interface object while displaying the first user interface in the simulated three-dimensional space at a location away from the user interface object. In some embodiments, the user interface object continues to be displayed while the first user interface moves (e.g., during an animated transition) toward or away from the user interface object (and optionally, the pose of the user interface object is updated in accordance with the movement of the input device). For example, in some embodiments, the user interface object continues to be displayed while the first user interface moves from appearing to be displayed on the surface of the user interface object to appearing lifted away from the surface of the user interface object, or vice versa. As shown and described in greater detail herein with respect to FIGS. 5A42-5A47, virtual device 5016 continues to be displayed in simulated 3D space 5006 while virtual user interface 5154 is displayed at locations away from virtual device 5016. Maintaining display of the first user interface object while displaying the first user interface away from the user interface object improves the visual feedback provided to the user (e.g., by making the computer system appear more responsive to user input and user movement, and by helping the user to maintain context through consistency between what is displayed and what a user would expect to see and avoiding abrupt changes in what is displayed), enhances the operability of the device, and makes the user-device interface more efficient (e.g., by helping the user to achieve an intended outcome with the required inputs and by reducing user frustration and mistakes when operating/interacting with the device), which, additionally, reduces power usage and improves battery life of the device by enabling the user to use the device more quickly and efficiently.

In some embodiments, displaying the first user interface in the simulated three-dimensional space at a location away from the user interface object includes (1010) increasing a scale of the first user interface, wherein a rate of change in the scale of the first user interface with respect to time is greater than a rate of change in the pose of the input device with respect to time (e.g., as shown and described in greater detail herein with reference to FIG. 5A43). Increasing the scale of the first user interface faster than the speed at which the pose of the input device is changed improves the visual feedback provided to the user (e.g., by enlarging and improving the readability of the user interface without requiring the user to move extensively and by making the computer system appear more responsive to user input and user movement), enhances the operability of the device, and makes the user-device interface more efficient (e.g., by helping the user to achieve an intended outcome with the required inputs and by reducing user frustration and mistakes when operating/interacting with the device), which, additionally, reduces power usage and improves battery life of the device by enabling the user to use the device more quickly and efficiently.

In some embodiments, displaying the first user interface in the simulated three-dimensional space at a location away from the user interface object includes (1012): increasing a scale of the first user interface; and displaying the first user interface with increased scale at a predefined location in the simulated three-dimensional space (e.g., as shown and described in greater detail herein with reference to FIG. 5A43). Displaying the first user interface at a fixed, predefined location and at increased scale improves the visual feedback provided to the user (e.g., by enlarging and improving the readability of the user interface and displaying the user interface at an expected location or position in the simulated three-dimensional space rather than requiring the user to track the location of the user interface while displayed on a virtual object that may move as the input device moves), enhances the operability of the device, and makes the user-device interface more efficient (e.g., by reducing user frustration and mistakes when operating/interacting with the device), which, additionally, reduces power usage and improves battery life of the device by enabling the user to use the device more quickly and efficiently.

In some embodiments, displaying the first user interface in the simulated three-dimensional space at a location away from the user interface object includes (1014) increasing a scale of the first user interface, and the method includes, after displaying the first user interface in the simulated three-dimensional space at the location away from the user interface object: detecting a second movement input via the input device; and in response to detecting the second movement input: in accordance with a determination that the second movement input corresponds to a movement of the input device relative to the physical environment surrounding the input device, and that the movement of the input device meets second pose criteria that require the pose of the input device to decrease as a result of the movement, decreasing the scale of the first user interface. In some embodiments, the second pose criteria require the pose of the input device to move outside of the first pose range as a result of the movement (e.g., by lowering the input device so that the pose of the input device falls below the first pose range) (e.g., as shown and described in greater detail herein with reference to FIGS. 5A47-5A48). Decreasing the scale of the first user interface in response to movement that decreases the pose of the input device improves the visual feedback provided to the user (e.g., by providing consistency between what is displayed and what a user would expect to see and by making the computer system appear more responsive to user input and user movement), provides additional control options without cluttering the display environment with additional displayed controls and reduces the number of inputs needed to perform an operation (e.g., using a straightforward gesture to dismiss the enlarged user interface rather than requiring display and activation of additional control affordances), enhances the operability of the device, and makes the user-device interface more efficient (e.g., by helping the user to achieve an intended outcome with the required inputs and by reducing user frustration and mistakes when operating/interacting with the device), which, additionally, reduces power usage and improves battery life of the device by enabling the user to use the device more quickly and efficiently.

In some embodiments, the first pose criteria requiring a parameter of change in the pose of the input device to meet a set of one or more thresholds includes (1016) the first pose criteria requiring a pose of the input device to enter a first pose range, and the second pose criteria require the pose of the input device to leave a second pose range that encompasses a greater range of poses in at least one direction (or in all directions) than the first pose range (e.g., although the first user interface zooms in when the device enters the first pose range, once the device has entered the second pose range, the first user interface is maintained in the zoomed state until the input device is lowered so that the pose of the input device falls outside of a second pose range that encompasses a greater range of poses than the first pose range) (e.g., as shown and described in greater detail herein with reference to FIGS. 5A47-5A48). In some embodiments, in accordance with the pose of the input device entering the first pose range (e.g., reaching a first threshold value, such as a lower limit, of the first pose range), the first user interface (e.g., virtual user interface 5154, FIG. 5A42) is displayed in the simulated three-dimensional space at a location away from the user interface object, and gradually displayed further and further from the user interface object and/or gradually increasing in scale (optionally in accordance with the pose of the input device continuing to increase) until the first user interface is displayed at the predefined location (e.g., in accordance with the pose of the input device reaching a second threshold pose in the first pose range) and/or at a predefined zoom scale (e.g., virtual user interface 5154, FIG. 5A43). In some embodiments, while the input device remains within the second pose range, the first user interface continues to be displayed at the predefined zoom scale and/or at the predefined location (e.g., without displaying gradual changes in scale or position in accordance with changes in pose of the input device) until the input device is lowered so that the pose of the input device falls below the first threshold value (e.g., lower limit) of the second pose range (e.g., as shown and described in greater detail herein with reference to FIGS. 5A47-5A48). In some embodiments, in accordance with the input device being lowered so that the pose of the input device falls outside of the second pose range, the first user interface is redisplayed at a pose and/or scale that corresponds to the pose of the user interface object (e.g., the first user interface appears to be redisplayed on the surface of the user interface object) (e.g., as shown and described in greater detail herein with reference to FIG. 5A48). Increasing the scale of the first user interface in accordance with the pose of the input device entering the first pose range, and maintaining the increased scale until the pose of the input device leaves a second pose range that encompasses a greater range of poses in at least one direction than the first pose range improves the visual feedback provided to the user (e.g., by stabilizing and maintaining readability of the first user interface so long as the pose of the input device is within the first pose range rather than continuously updating the position of the first user interface in response to small movements of the user's hand, which would be distracting and frustrating to the user), enhances the operability of the device, and makes the user-device interface more efficient (e.g., by reducing user distraction and mistakes when operating/interacting with the device), which, additionally, reduces power usage and improves battery life of the device by enabling the user to use the device more quickly and efficiently.

In some embodiments, after displaying the first user interface in the simulated three-dimensional space at the location away from the user interface object (1018), the computer system: detects a third movement input via the input device; and in response to detecting the third movement input: in accordance with a determination that the third movement input corresponds to a movement of the input device relative to the physical environment surrounding the input device, and that the movement of the input device meets third pose criteria that require the pose of the input device to move outside of the first pose range as a result of the movement (e.g., by lowering the input device so that the pose of the input device falls below the first pose range), redisplays the first user interface at a pose that corresponds to a pose of the user interface object (e.g., the first user interface appears to be displayed, or redisplayed, on the surface of the user interface object) (e.g., as shown and described in greater detail herein with reference to FIGS. 5A47-5A48). In some embodiments, the third pose criteria may include hysteresis, by requiring the pose of the input to move outside of a predefined pose range that extends beyond the first pose range (e.g., the input device must be raised above a first pose threshold to trigger display of the first user interface at a location away from the user interface object, while the input device must be lowered below a second pose threshold, lower than the first pose threshold, to trigger redisplay of the first user interface at a pose that corresponds to the pose of the user interface object) (e.g., as shown and described in greater detail herein with reference to FIGS. 5A47-5A48). Redisplaying the first user interface at a pose that corresponds to the pose of the user interface object (e.g., on the surface of the user interface object) in response to movement of the input device outside of the first pose range improves the visual feedback provided to the user (e.g., by providing consistency between what is displayed and what a user would expect to see and by making the computer system appear more responsive to user input and user movement), provides additional control options without cluttering the display environment with additional displayed controls and reduces the number of inputs needed to perform an operation (e.g., using a straightforward gesture to return to the first user interface being displayed with the user interface object rather than requiring display and activation of additional control affordances), enhances the operability of the device, and makes the user-device interface more efficient (e.g., by returning to a more intuitive interaction where the first user interface is displayed on the user interface object, by helping the user to achieve an intended outcome with the required inputs and by reducing user frustration and mistakes when operating/interacting with the device), which, additionally, reduces power usage and improves battery life of the device by enabling the user to use the device more quickly and efficiently.

In some embodiments, while the first user interface is displayed at a pose that corresponds to the pose of the user interface object (e.g., while the first user interface appears to be displayed on the surface of the user interface object) (1020), the first user interface is responsive to touch inputs from a user on the input device (e.g., virtual user interface 5154 is responsive to touch inputs from user 5002 on device 100 in physical space 5004, FIG. 5A41). Enabling the first user interface to be responsive to touch inputs on the input device while the first user interface is displayed at a pose that corresponds to the pose of the user interface object (e.g., on the surface of the user interface object) improves the visual feedback provided to the user (e.g., by providing consistency between what is displayed and what a user would expect to see and by making the computer system appear more responsive to user input and user movement), enhances the operability of the device, and makes the user-device interface more efficient (e.g., by providing a more intuitive interaction as if the user were interacting with a corresponding physical device with a non-immersive display environment, by helping the user to achieve an intended outcome with the required inputs and by reducing user frustration and mistakes when operating/interacting with the device), which, additionally, reduces power usage and improves battery life of the device by enabling the user to use the device more quickly and efficiently.

In some embodiments, while the user interface is displayed at the location away from the user interface object (e.g., while the first user interface appears to be lifted away from the surface of the user interface object) (1022), the first user interface is responsive to touch inputs from a user on the input device (e.g., on a touch-sensitive surface of the input device) (e.g., while virtual user interface 5154 is displayed away from virtual device 5016, virtual user interface 5154 is responsive to touch inputs from user 5002 on device 100, as shown and described in greater detail herein with reference to FIGS. 5A47-5A48). Enabling the first user interface to be responsive to touch inputs on the input device even while the first user interface is displayed away from the user interface object (e.g., lifted away from the surface of the user interface object) improves the visual feedback provided to the user (e.g., by enlarging and improving the readability of the user interface and by making the computer system appear more responsive to user input and user movement), enhances the operability of the device, and makes the user-device interface more efficient (e.g., by facilitating user interaction with the computer system through providing an intuitive and familiar set of controls as if the user were interacting with a corresponding physical device with a non-immersive display environment, by helping the user to achieve an intended outcome with the required inputs and by reducing user frustration and mistakes when operating/ interacting with the device), which, additionally, reduces power usage and improves battery life of the device by enabling the user to use the device more quickly and efficiently.

In some embodiments, the computer system detects (1024) a touch input on the input device that includes a drag gesture (e.g., a contact and movement of the contact by at least a predefined distance along a touch-sensitive surface of the input device), and, in response to detecting the touch input that includes the drag gesture, scrolls at least a portion of the first user interface (e.g., a drag gesture on device 100 in FIG. 5A47 or 5A48 would cause scrolling through messages displayed in virtual user interface 5154). Scrolling the first user interface in response to a touch input that includes a drag gesture improves the visual feedback provided to the user (e.g., by making the computer system appear more responsive to user input), provides additional control options without cluttering the display environment with additional controls and reduces the number of inputs needed to perform an operation (e.g., using a straightforward and intuitive gesture rather than requiring display and activation of additional control affordances), enhances the operability of the device, and makes the user-device interface more efficient (e.g., by helping the user to achieve an intended outcome with the required inputs and by reducing user frustration and mistakes when operating/interacting with the device), which, additionally, reduces power usage and improves battery life of the device by enabling the user to use the device more quickly and efficiently.

In some embodiments, the computer system detects (1026) a touch input that includes a tap gesture (e.g., a contact and liftoff of the contact from a touch-sensitive surface of the input device, optionally within a predefined time period, and/or prior to movement of the contact by at least a predefined distance along the touch-sensitive surface) corresponding to a respective user interface object in the first user interface (e.g., an application icon, a multimedia file icon, a messaging contact, etc.), and, in response to detecting the touch input that includes the tap gesture, performing an operation associated with the respective user interface object in the first user interface (e.g., selecting the respective user interface object, launching the application associated with the application icon, displaying or playing the multimedia file, etc.) (e.g., as shown and described in greater detail herein with reference to entry of the text "OK" and activation of the "Send" affordance, FIGS. 5A44-5A45). Performing an operation associated with a respective user interface object in the first user interface in response to a touch input that includes a tap gesture corresponding to the respective user interface object improves the visual feedback provided to the user (e.g., by making the computer system appear more responsive to user input), enhances the operability of the device, and makes the user-device interface more efficient (e.g., by facilitating user interaction with the computer system using a straightforward and intuitive gesture, by helping the user to achieve an intended outcome with the required inputs, and by reducing user frustration and mistakes when operating/interacting with the device), which, additionally, reduces power usage and improves battery life of the device by enabling the user to use the device more quickly and efficiently.

It should be understood that the particular order in which the operations in FIGS. 10A-10C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, and 900) are also applicable in an analogous manner to method 1000 described above with respect to FIGS. 10A-10C. For example, the contacts, gestures, user interface objects, pose thresholds, focus indicators, and/or animations described above with reference to method 1000 optionally have one or more of the characteristics of the contacts, gestures, user interface objects, pose thresholds, focus indicators, and/or animations described herein with reference to other methods described herein (e.g., methods 600, 700, 800, and 900). For brevity, these details are not repeated here.

The operations described above with reference to FIGS. 6A-6E, 7A-7C, 8A-8C, 9A-9B, and 10A-10C are, optionally, implemented by components depicted in FIGS. 1A-1B. For example, display operations 602, 702, 802, 902, 906, 910, and 1002; detection operations 604, 704, 804, 904, 908, and 1004; and adjusting and/or updating operations 606 and 806 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at a computer system having one or more display generation components, wherein the computer system is in communication with an input device, one or more pose sensors for detecting respective poses of one or more of the input device and display generation components, and a computing device that is distinct from the computer system and that has a non-immersive display environment that provides access to a plurality of different applications:
   displaying, via at least a first display generation component of the one or more display generation components:
   a view of at least a portion of a simulated three-dimensional space; and
   a view of a simulated user interface object that is located within the simulated three-dimensional space, wherein:
   the simulated user interface object is a representation of the computing device that has the non-immersive display environment that provides access to the plurality of different applications;
   the simulated user interface object includes a simulated first user interface that comprises a representation of the non-immersive display environment of the computing device and is responsive to touch inputs from a user on the input device; and
   a pose of the simulated user interface object in the simulated three-dimensional space corresponds to a pose of the input device in a physical space surrounding the input device, and the simulated user interface object is moved in the simulated three-dimensional space in accordance with the user moving the input device relative to the physical space surrounding the input device;
   detecting movement of the input device relative to the physical space surrounding the input device that changes an orientation of the input device;
   in response to detecting the movement of the input device that changes the orientation of the input device, changing an orientation of the simulated user interface object and the simulated first user interface of the simulated user interface object in accordance with changing the orientation of the input device; and while displaying the simulated three-dimensional space in a manner corresponding to a first application of the plurality of different applications, including displaying content of the first application in a portion of the simulated three-dimensional space that is outside of the simulated user interface object:

detecting a touch input at a location on the input device that corresponds to launching a second application, distinct from the first application;

in response to detecting the touch input on the input device:

displaying a user interface of the second application in the simulated first user interface on the simulated user interface object, while maintaining display of the simulated three-dimensional space in the manner corresponding to the first application, including maintaining display of the content of the first application in the portion of the simulated three-dimensional space that is outside of the simulated user interface object; and while displaying the user interface of the second application in the simulated first user interface on the simulated user interface object:

detecting second movement of the input device relative to the physical space surrounding the input device that changes the orientation of the input device; and in response to detecting the second movement of the input device that changes the orientation of the input device, changing the orientation of the simulated user interface object and the simulated first user interface of the simulated user interface object, including the user interface of the second application, in accordance with changing the orientation of the input device.

2. The method of claim 1, including:

in response to detecting a second touch input on the input device:

in accordance with a determination that the second touch input is detected at a location on the input device that corresponds to a first location in the simulated first user interface, updating an appearance of the simulated first user interface that is displayed on the simulated user interface object in a first manner; and updating an appearance of the simulated three-dimensional space in a second manner in accordance with the update in appearance made to the simulated first user interface; and in accordance with a determination that the second touch input is detected at a location on the input device that corresponds to a second location in the simulated first user interface, updating the appearance of the simulated first user interface that is displayed on the simulated user interface object in a third manner that is different from the first manner; and updating the appearance of the simulated three-dimensional space in a fourth manner that is different from the second manner, in accordance with the update in appearance made to the simulated first user interface.

3. The method of claim 2, further including updating, or causing the computing device to update, a second user interface displayed through the non-immersive display environment of the computing device in accordance with the second touch input directed to the first location in the simulated first user interface.

4. The method of claim 1, wherein the computing device that has the non-immersive display environment has an internal state that is used to determine an appearance of the simulated first user interface that is displayed on the simulated user interface object.

5. The method of claim 4, wherein inputs in the simulated first user interface on the simulated user interface object cause one or more changes in the internal state of the computing device that has the non-immersive display environment.

6. The method of claim 4, wherein changes in the internal state of the computing device that has the non-immersive display environment cause changes in the simulated first user interface on the simulated user interface object.

7. The method of claim 1, wherein the simulated first user interface that is displayed on the simulated user interface object is a simulation of a touch-sensitive user interface on the computing device.

8. The method of claim 1, wherein:
the first display generation component is a virtual reality headset;
the input device is a handheld computing device that is distinct from the virtual reality headset; and
the handheld computing device sends the simulated first user interface to the virtual reality headset for display.

9. The method of claim 1, wherein:
the computer system is a handheld computing device; and
the first display generation component is a touch-screen display of the handheld computing device.

10. The method of claim 1, wherein the input device is a touch-sensitive remote control that does not have a display.

11. The method of claim 1, wherein the simulated user interface object is displayed at a location within the simulated three-dimensional space that corresponds to a location of the input device in a user's hand in the physical space.

12. The method of claim 1, wherein the simulated first user interface that is displayed on the simulated user interface object when the computing device is in a first mode of operation while the user is viewing the simulated three-dimensional space corresponds to a second user interface that is displayed on the computing device when the computing device is in the first mode of operation.

13. The method of claim 12, wherein the simulated first user interface that is displayed on the simulated user interface object includes additional depth compared to the second user interface displayed through the non-immersive display environment of the computing device.

14. The method of claim 1, including:
detecting an activation of a button of the input device; and
in response to detecting the activation of the button of the input device, updating an appearance of the simulated first user interface that is displayed on the simulated user interface object in accordance with the activation of the button.

15. The method of claim 1, including:
displaying a first view of at least a portion of the simulated three-dimensional space, wherein the first view is associated with a third application;
detecting a second touch input on the input device, wherein the second touch input launches a fourth application, distinct from the third application; and
in response to detecting the second touch input on the input device, displaying a second view of at least a portion of the simulated three-dimensional space, distinct from the first view, wherein the second view is associated with the fourth application.

16. The method of claim 1, wherein the simulated first user interface that is displayed on the simulated user interface object extends outside the simulated user interface object.

17. The method of claim 1, wherein the simulated first user interface that is displayed on the simulated user interface object includes additional information about one or more user interface objects in the simulated three-dimensional space.

18. The method of claim 1, wherein the simulated first user interface that is displayed on the simulated user interface object corresponds to a respective application, and the method further includes:
in accordance with a determination that the respective application includes instructions for displaying one or more three-dimensional objects in the simulated three-dimensional space, updating an appearance of the simulated three-dimensional space in accordance with the instructions from the respective application; and
in accordance with a determination that the respective application does not include instructions for displaying a simulated three-dimensional environment, displaying the simulated three-dimensional space includes displaying at least a portion of a two-dimensional user interface for the respective application that is adapted for display in the non-immersive display environment of the computing device along with one or more other user interface objects generated based on information from the respective application.

19. The method of claim 1, including:
while displaying the simulated three-dimensional space in a manner corresponding to the first application:
receiving an indication that an event has occurred that corresponds to generation of a notification at the computing device; and
in response to receiving the indication, displaying a representation of the notification on the simulated first user interface that is displayed on the simulated user interface object, while maintaining display of the simulated three-dimensional space in a manner corresponding to the first application.

20. The method of claim 1, including:
prior to detecting the touch input on the input device that corresponds to launching the second application, detecting a second touch input on the input device that corresponds to launching the first application;
wherein the displaying of the simulated three-dimensional space in the manner corresponding to the first application and the displaying of the content of the first application in the portion of the simulated three-dimensional space are performed in response to detecting the second touch input.

21. The method of claim 1, wherein the content of the first application that is displayed in the portion of the simulated three-dimensional space that is outside of the simulated user interface object is multimedia content of the first application.

22. A computer system, comprising:
one or more display generation components;
one or more processors; and
memory storing one or more programs, wherein the computer system is in communication with an input device and one or more pose sensors for detecting respective poses of one or more of the input device and display generation components, and wherein the one or more programs are configured to be executed by the one or more processors, the one or more programs including instructions for:
displaying, via at least a first display generation component of the one or more display generation components:
a view of at least a portion of a simulated three-dimensional space; and
a view of a simulated user interface object that is located within the simulated three-dimensional space, wherein:
the computer system is in communication with a computing device that is distinct from the computer system and that has a non-immersive display environment that provides access to a plurality of different applications;
the simulated user interface object is a representation of the computing device that has the non-immersive display environment that provides access to the plurality of different applications;
the simulated user interface object includes a simulated first user interface that comprises a representation of the non-immersive display environment of the computing device and is responsive to touch inputs from a user on the input device; and
a pose of the simulated user interface object in the simulated three-dimensional space corresponds to a pose of the input device in a physical space surrounding the input device, and the simulated user interface object is moved in the simulated three-dimensional space in accordance with the user moving the input device relative to the physical space surrounding the input device;
detecting movement of the input device relative to the physical space surrounding the input device that changes an orientation of the input device;
in response to detecting the movement of the input device that changes the orientation of the input device, changing an orientation of the simulated user interface object and the simulated first user interface of the simulated user interface object in accordance with changing the orientation of the input device; and
while displaying the simulated three-dimensional space in a manner corresponding to a first application of the plurality of different applications, including displaying content of the first application in a portion of the simulated three-dimensional space that is outside of the simulated user interface object:
detecting a touch input at a location on the input device that corresponds to launching a second application, distinct from the first application;
in response to detecting the touch input on the input device:
displaying a user interface of the second application in the simulated first user interface on the simulated user interface object, while maintaining display of the simulated three-dimensional space in the manner corresponding to the first application, including maintaining display of the content of the first application in the portion of the simulated three-dimensional space that is outside of the simulated user interface object; and while displaying the user interface of the second application in the simulated first user interface on the simulated user interface object:
detecting second movement of the input device relative to the physical space surrounding the input device that changes the orientation of the input device; and
in response to detecting the second movement of the input device that changes the orientation of the input device, changing the orientation of the simulated user interface object and the simulated first user interface of the simulated user interface object, including the user interface of the second application, in accordance with changing the orientation of the input device.

23. The computer system of claim 22, wherein the one or more programs include instructions for:
in response to detecting a second touch input on the input device:
in accordance with a determination that the second touch input is detected at a location on the input device that corresponds to a first location in the simulated first user interface,
updating an appearance of the simulated first user interface that is displayed on the simulated user interface object in a first manner; and
updating an appearance of the simulated three-dimensional space in a second manner in accordance with the update in appearance made to the simulated first user interface; and
in accordance with a determination that the second touch input is detected at a location on the input device that corresponds to a second location in the simulated first user interface,
updating the appearance of the simulated first user interface that is displayed on the simulated user interface object in a third manner that is different from the first manner; and
updating the appearance of the simulated three-dimensional space in a fourth manner that is different from the second manner, in accordance with the update in appearance made to the simulated first user interface.

24. The computer system of claim 22, wherein the one or more programs include instructions for: updating, or causing the computing device to update, a second user interface displayed through the non-immersive display environment of the computing device in accordance with the second touch input directed to the first location in the simulated first user interface.

25. The computer system of claim 22, wherein the computing device that has the non-immersive display environment has an internal state that is used to determine an appearance of the simulated first user interface that is displayed on the simulated user interface object.

26. The computer system of claim 25, wherein inputs in the simulated first user interface on the simulated user interface object cause one or more changes in the internal state of the computing device that has the non-immersive display environment.

27. The computer system of claim 25, wherein changes in the internal state of the computing device that has the non-immersive display environment cause changes in the simulated first user interface on the simulated user interface object.

28. The computer system of claim 22, wherein the simulated first user interface that is displayed on the simulated user interface object is a simulation of a touch-sensitive user interface on the computing device.

29. The computer system of claim 22, wherein:
the first display generation component is a virtual reality headset;
the input device is a handheld computing device that is distinct from the virtual reality headset; and
the handheld computing device sends the simulated first user interface to the virtual reality headset for display.

30. The computer system of claim 22, wherein:
the computer system is a handheld computing device; and
the first display generation component is a touch-screen display of the handheld computing device.

31. The computer system of claim 22, wherein the input device is a touch-sensitive remote control that does not have a display.

32. The computer system of claim 22, wherein the simulated user interface object is displayed at a location within the simulated three-dimensional space that corresponds to a location of the input device in a user's hand in the physical space.

33. The computer system of claim 22, wherein the simulated first user interface that is displayed on the simulated user interface object when the computing device is in a first mode of operation while the user is viewing the simulated three-dimensional space corresponds to a second user interface that is displayed on the computing device when the computing device is in the first mode of operation.

34. The computer system of claim 33, wherein the simulated first user interface that is displayed on the simulated user interface object includes additional depth compared to the second user interface displayed through the non-immersive display environment of the computing device.

35. The computer system of claim 22, wherein the one or more programs include instructions for:
detecting an activation of a button of the input device; and
in response to detecting the activation of the button of the input device, updating an appearance of the simulated first user interface that is displayed on the simulated user interface object in accordance with the activation of the button.

36. The computer system of claim 22, wherein the one or more programs include instructions for:
displaying a first view of at least a portion of the simulated three-dimensional space, wherein the first view is associated with a third application;
detecting a second touch input on the input device, wherein the second touch input launches a fourth application, distinct from the third application; and
in response to detecting the second touch input on the input device, displaying a second view of at least a portion of the simulated three-dimensional space, distinct from the first view, wherein the second view is associated with the fourth application.

37. The computer system of claim 22, wherein the simulated first user interface that is displayed on the simulated user interface object extends outside the simulated user interface object.

38. The computer system of claim 22, wherein the simulated first user interface that is displayed on the simulated user interface object includes additional information about one or more user interface objects in the simulated three-dimensional space.

39. The computer system of claim 22, wherein the simulated first user interface that is displayed on the simulated user interface object corresponds to a respective application, and wherein the one or more programs include instructions for:

in accordance with a determination that the respective application includes instructions for displaying one or more three-dimensional objects in the simulated three-dimensional space, updating an appearance of the simulated three-dimensional space in accordance with the instructions from the respective application; and in accordance with a determination that the respective application does not include instructions for displaying a simulated three-dimensional environment, displaying the simulated three-dimensional space includes displaying at least a portion of a two-dimensional user interface for the respective application that is adapted for display in the non-immersive display environment of the computing device along with one or more other user interface objects generated based on information from the respective application.

40. The computer system of claim 22, wherein the one or more programs include instructions for:

while displaying the simulated three-dimensional space in a manner corresponding to the first application:
receiving an indication that an event has occurred that corresponds to generation of a notification at the computing device; and
in response to receiving the indication, displaying a representation of the notification on the simulated first user interface that is displayed on the simulated user interface object, while maintaining display of the simulated three-dimensional space in a manner corresponding to the first application.

41. The computer system of claim 22, wherein the one or more programs include instructions for:

prior to detecting the touch input on the input device that corresponds to launching the second application, detecting a second touch input on the input device that corresponds to launching the first application;
wherein the displaying of the simulated three-dimensional space in the manner corresponding to the first application and the displaying of the content of the first application in the portion of the simulated three-dimensional space are performed in response to detecting the second touch input.

42. The computer system of claim 22, wherein the content of the first application that is displayed in the portion of the simulated three-dimensional space that is outside of the simulated user interface object is multimedia content of the first application.

43. A non-transitory computer readable storage medium storing one or more programs, the one or more programs comprising instructions, which, when executed by a computer system with one or more display generation components, wherein the computer system is in communication with an input device, and one or more pose sensors for detecting respective poses of one or more of the input device and display generation components, and a computing device that is distinct from the computer system and that has a non-immersive display environment that provides access to a plurality of different applications, cause the computer system to:

display, via at least a first display generation component of the one or more display generation components:
a view of at least a portion of a simulated three-dimensional space; and
a view of a simulated user interface object that is located within the simulated three-dimensional space, wherein:
the simulated user interface object is a representation of the computing device that has the non-immersive display environment that provides access to the plurality of different applications;
the simulated user interface object includes a simulated first user interface that comprises a representation of the non-immersive display environment of the computing device and is responsive to touch inputs from a user on the input device; and
a pose of the simulated user interface object in the simulated three-dimensional space corresponds to a pose of the input device in a physical space surrounding the input device, and the simulated user interface object is moved in the simulated three-dimensional space in accordance with the user moving the input device relative to the physical space surrounding the input device;

detect movement of the input device relative to the physical space surrounding the input device that changes an orientation of the input device;

in response to detecting the movement of the input device that changes the orientation of the input device, change an orientation of the simulated user interface object and the simulated first user interface of the simulated user interface object in accordance with changing the orientation of the input device; and while displaying the simulated three-dimensional space in a manner corresponding to a first application of the plurality of different applications, including displaying content of the first application in a portion of the simulated three-dimensional space that is outside of the simulated user interface object:

detect a touch input on the input device that corresponds to launching a second application, distinct from the first application;

in response to detecting the touch input on the input device:
display a user interface of the second application in the simulated first user interface on the simulated user interface object, while maintaining display of the simulated three-dimensional space in the manner corresponding to the first application, including maintaining display of the content of the first application in the portion of the simulated three-dimensional space that is outside of the simulated user interface object; and while displaying the user interface of the second application in the simulated first user interface on the simulated user interface object:
detect second movement of the input device relative to the physical space surrounding the input device that changes the orientation of the input device; and
in response to detecting the second movement of the input device that changes the orientation of the input device, change the orientation of the simulated user interface object and the simulated first user interface of the simulated user interface object, including the user interface of the second application, in accordance with changing the orientation of the input device.

44. The non-transitory computer readable storage medium of claim 43, wherein the one or more programs include instructions that, when executed by the computer system, cause the computer system to:
  in response to detecting a second touch input on the input device:
    in accordance with a determination that the second touch input is detected at a location on the input device that corresponds to a first location in the simulated first user interface,
      update an appearance of the simulated first user interface that is displayed on the simulated user interface object in a first manner; and
      update an appearance of the simulated three-dimensional space in a second manner in accordance with the update in appearance made to the simulated first user interface; and
    in accordance with a determination that the second touch input is detected at a location on the input device that corresponds to a second location in the simulated first user interface,
      update the appearance of the simulated first user interface that is displayed on the simulated user interface object in a third manner that is different from the first manner; and
      update the appearance of the simulated three-dimensional space in a fourth manner that is different from the second manner, in accordance with the update in appearance made to the simulated first user interface.

45. The non-transitory computer readable storage medium of claim 43, wherein the one or more programs include instructions that, when executed by the computer system, cause the computer system to: update, or cause the computing device to update, a second user interface displayed through the non-immersive display environment of the computing device in accordance with the second touch input directed to the first location in the simulated first user interface.

46. The non-transitory computer readable storage medium of claim 43, wherein the computing device that has the non-immersive display environment has an internal state that is used to determine an appearance of the simulated first user interface that is displayed on the simulated user interface object.

47. The non-transitory computer readable storage medium of claim 46, wherein inputs in the simulated first user interface on the simulated user interface object cause one or more changes in the internal state of the computing device that has the non-immersive display environment.

48. The non-transitory computer readable storage medium of claim 46, wherein changes in the internal state of the computing device that has the non-immersive display environment cause changes in the simulated first user interface on the simulated user interface object.

49. The non-transitory computer readable storage medium of claim 43, wherein the simulated first user interface that is displayed on the simulated user interface object is a simulation of a touch-sensitive user interface on the computing device.

50. The non-transitory computer readable storage medium of claim 43, wherein:
  the first display generation component is a virtual reality headset;
  the input device is a handheld computing device that is distinct from the virtual reality headset; and
  the handheld computing device sends the simulated first user interface to the virtual reality headset for display.

51. The non-transitory computer readable storage medium of claim 43, wherein:
  the computer system is a handheld computing device; and
  the first display generation component is a touch-screen display of the handheld computing device.

52. The non-transitory computer readable storage medium of claim 43, wherein the input device is a touch-sensitive remote control that does not have a display.

53. The non-transitory computer readable storage medium of claim 43, wherein the simulated user interface object is displayed at a location within the simulated three-dimensional space that corresponds to a location of the input device in a user's hand in the physical space.

54. The non-transitory computer readable storage medium of claim 43, wherein the simulated first user interface that is displayed on the simulated user interface object when the computing device is in a first mode of operation while the user is viewing the simulated three-dimensional space corresponds to a second user interface that is displayed on the computing device when the computing device is in the first mode of operation.

55. The non-transitory computer readable storage medium of claim 54, wherein the simulated first user interface that is displayed on the simulated user interface object includes additional depth compared to the second user interface displayed through the non-immersive display environment of the computing device.

56. The non-transitory computer readable storage medium of claim 43, wherein the one or more programs include instructions that, when executed by the computer system, cause the computer system to:
  detect an activation of a button of the input device; and
  in response to detecting the activation of the button of the input device, update an appearance of the simulated first user interface that is displayed on the simulated user interface object in accordance with the activation of the button.

57. The non-transitory computer readable storage medium of claim 43, wherein the one or more programs include instructions that, when executed by the computer system, cause the computer system to:
  display a first view of at least a portion of the simulated three-dimensional space, wherein the first view is associated with a third application;
  detect a second touch input on the input device, wherein the second touch input launches a fourth application, distinct from the third application; and
  in response to detecting the second touch input on the input device, display a second view of at least a portion of the simulated three-dimensional space, distinct from the first view, wherein the second view is associated with the fourth application.

58. The non-transitory computer readable storage medium of claim 43, wherein the simulated first user interface that is displayed on the simulated user interface object extends outside the simulated user interface object.

59. The non-transitory computer readable storage medium of claim 43, wherein the simulated first user interface that is displayed on the simulated user interface object includes additional information about one or more user interface objects in the simulated three-dimensional space.

60. The non-transitory computer readable storage medium of claim 43, wherein the simulated first user interface that is displayed on the simulated user interface object corresponds to a respective application, and wherein the one or more programs include instructions that, when executed by the computer system, cause the computer system to:

in accordance with a determination that the respective application includes instructions for displaying one or more three-dimensional objects in the simulated three-dimensional space, update an appearance of the simulated three-dimensional space in accordance with the instructions from the respective application; and in accordance with a determination that the respective application does not include instructions for displaying a simulated three-dimensional environment, display the simulated three-dimensional space including display at least a portion of a two-dimensional user interface for the respective application that is adapted for display in the non-immersive display environment of the computing device along with one or more other user interface objects generated based on information from the respective application.

61. The non-transitory computer readable storage medium of claim 43, wherein the one or more programs include instructions that, when executed by the computer system, cause the computer system to:

while displaying the simulated three-dimensional space in a manner corresponding to the first application:
receive an indication that an event has occurred that corresponds to generation of a notification at the computing device; and
in response to receiving the indication, display a representation of the notification on the simulated first user interface that is displayed on the simulated user interface object, while maintaining display of the simulated three-dimensional space in a manner corresponding to the first application.

62. The non-transitory computer readable storage medium of claim 43, wherein the one or more programs include instructions that, when executed by the computer system, cause the computer system to:

prior to detecting the touch input on the input device that corresponds to launching the second application, detect a second touch input on the input device that corresponds to launching the first application;
wherein to display the simulated three-dimensional space in the manner corresponding to the first application and to display the content of the first application in the portion of the simulated three-dimensional space are performed in response to detecting the second touch input.

63. The non-transitory computer readable storage medium of claim 43, wherein the content of the first application that is displayed in the portion of the simulated three-dimensional space that is outside of the simulated user interface object is multimedia content of the first application.

* * * * *